(12) United States Patent
Jeong et al.

(10) Patent No.: US 10,384,201 B2
(45) Date of Patent: Aug. 20, 2019

(54) DIRECT SYNTHESIS METHOD OF NANOSTRUCTURED CATALYST PARTICLES ON VARIOUS SUPPORTS AND CATALYST STRUCTURE PRODUCED BY THE SAME

(71) Applicant: KOREA INSTITUTE OF ENERGY RESEARCH, Daejeon (KR)

(72) Inventors: Namjo Jeong, Daejeon (KR); Chan-Soo Kim, Jeju (KR); Eun-Jin Jwa, Jeju (KR); Ji Yeon Choi, Seoul (KR); Joo-Youn Nam, Jeju (KR); Soon-Chul Park, Jeju (KR); Moon-Seok Jang, Daejeon (KR); Yong Seok Seo, Daejeon (KR); Kyo Sik Hwang, Jeju (KR); Han Ki Kim, Jeju (KR); Ji Hyung Han, Jeju (KR); Tae Young Kim, Jeonju (KR); Young Gi Yoon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/435,386

(22) Filed: Feb. 17, 2017

(65) Prior Publication Data

US 2017/0232431 A1    Aug. 17, 2017

(30) Foreign Application Priority Data

Feb. 17, 2016    (KR) .................. 10-2016-0018209
Feb. 17, 2017    (KR) .................. 10-2017-0021649

(51) Int. Cl.
| | | |
|---|---|---|
| *B01J 21/06* | (2006.01) |
| *B01J 23/06* | (2006.01) |
| *B01J 27/051* | (2006.01) |
| *B01J 35/04* | (2006.01) |
| *B01J 37/02* | (2006.01) |
| *B01J 35/00* | (2006.01) |
| *B01J 21/18* | (2006.01) |
| *B01J 23/42* | (2006.01) |
| *B01J 23/75* | (2006.01) |
| *B01J 27/24* | (2006.01) |
| *B01J 37/08* | (2006.01) |

(Continued)

(52) U.S. Cl.
CPC ........... *B01J 37/0238* (2013.01); *B01J 21/18* (2013.01); *B01J 21/185* (2013.01); *B01J 23/42* (2013.01); *B01J 23/462* (2013.01); *B01J 23/468* (2013.01); *B01J 23/62* (2013.01); *B01J 23/626* (2013.01); *B01J 23/6562* (2013.01); *B01J 23/745* (2013.01); *B01J 23/75* (2013.01); *B01J 23/755* (2013.01); *B01J 23/8892* (2013.01); *B01J 23/892* (2013.01); *B01J 23/894* (2013.01); *B01J 23/8906* (2013.01); *B01J 23/8913* (2013.01); *B01J 23/8926* (2013.01); *B01J 23/8966* (2013.01); *B01J 23/8993* (2013.01); *B01J 27/24* (2013.01); *B01J 35/002* (2013.01); *B01J 35/0006* (2013.01); *B01J 35/006* (2013.01); *B01J 35/0013* (2013.01); *B01J 35/08* (2013.01); *B01J 37/08* (2013.01)

(58) Field of Classification Search
CPC ...... B01J 37/0238; B01J 21/06; B01J 21/063; B01J 21/18; B01J 21/85; B01J 23/06; B01J 23/42; B01J 23/75; B01J 27/051; B01J 27/0515; B01J 27/24; B01J 35/0006; B01J 35/0013; B01J 35/04
USPC ......................................................... 502/220
See application file for complete search history.

(56) References Cited

U.S. PATENT DOCUMENTS

| | | | |
|---|---|---|---|
| 4,501,774 A | | 2/1985 | Miyazawa et al. |
| 5,879,827 A | * | 3/1999 | Debe .................. B01J 23/42 |
| | | | 429/524 |

(Continued)

FOREIGN PATENT DOCUMENTS

| | | |
|---|---|---|
| CN | 105126876 | 12/2015 |
| CN | 105148947 | 12/2015 |

(Continued)

OTHER PUBLICATIONS

EPO, Extended European Search Report of EP 17156670.6 dated Jun. 29, 2017.

*Primary Examiner* — Patricia L. Hailey
(74) *Attorney, Agent, or Firm* — Lex IP Meister, PLLC

(57) ABSTRACT

Disclosed is a direct synthesis method of nanostructured catalyst particles on surfaces of various supports. In the disclosed synthesis method of a catalyst structure having a plurality of nanostructured catalyst particles dispersed in a support by a one-step process using a high-temperature high-pressure closed reactor, the one-step process includes supplying the support and a catalyst source into the high-temperature high-pressure closed reactor; supplying an atmosphere forming gas of the reactor into the reactor; perfectly sealing the high-temperature high-pressure closed reactor and heating the reactor to produce the catalyst structure in the reactor under self-generated pressure and synthesis temperature conditions, the catalyst structure including the plurality of nanostructured catalyst particles dispersed in the support; removing internal gases of the reactor to allow the reactor to be in a high-temperature, atmospheric pressure state and supplying an inert gas into the reactor to remove unreacted materials and byproducts remaining in the reactor; and cooling the reactor to room temperature while supplying the inert gas to synthesize the catalyst structure.

25 Claims, 332 Drawing Sheets

(51) Int. Cl.
  *B01J 23/889* (2006.01)
  *B01J 23/46* (2006.01)
  *B01J 23/62* (2006.01)
  *B01J 23/656* (2006.01)
  *B01J 23/745* (2006.01)
  *B01J 23/755* (2006.01)
  *B01J 23/89* (2006.01)
  *B01J 35/08* (2006.01)

(56) References Cited

U.S. PATENT DOCUMENTS

| | | |
|---|---|---|
| 2006/0035101 A1 | 2/2006 | Yuan |
| 2008/0268288 A1* | 10/2008 | Jin ............... B81C 1/00031 428/800 |
| 2009/0250353 A1 | 10/2009 | Chen |
| 2012/0015284 A1* | 1/2012 | Merzougui ............ B01J 21/18 429/520 |
| 2014/0356705 A1* | 12/2014 | Shaw ............... C01B 17/22 429/212 |
| 2015/0238935 A1 | 8/2015 | Abdalla |

FOREIGN PATENT DOCUMENTS

| | | |
|---|---|---|
| CN | 105833864 | 8/2016 |
| EP | 0055311 | 7/1982 |
| FR | 3039779 | 2/2017 |
| JP | 2016-068054 | 5/2016 |
| KR | 10-2013-0122102 | 11/2013 |
| KR | 10-2014-0004310 | 1/2014 |
| KR | 10-1568247 | 11/2015 |
| WO | 2009-048186 | 4/2009 |
| WO | 2014/202749 | 12/2014 |

* cited by examiner

DIRECT SYNTHESIS METHOD OF NANOSTRUCTURED CATALYST PARTICLES ON VARIOUS SUPPORTS AND CATALYST STRUCTURE PRODUCED BY THE SAME

CROSS-REFERENCE TO RELATED APPLICATION

This application claims priority to and the benefit of Korean Patent Application No. 10-2016-0018209 filed on Feb. 17, 2016 and Korean Patent Application No. 10-2017-0021649 filed on Feb. 17, 2017 in the Korean Intellectual Property Office, and all the benefits accruing therefrom under 35 U.S.C. 119, the contents of which in its entirety are herein incorporated by reference.

BACKGROUND

1. Field

The present invention relates to a direct synthesis method of a nanostructured catalyst particles on various supports and a catalyst structure produced by the same.

2. Description of the Related Art

In every technical field in which catalysts are used, it is quite important to address challenges in improving performance of high priced platinum (Pt) based catalysts or replacing the high priced Pt based catalysts with price-competitive catalysts.

In particular, in technical fields, in which catalysts for electrochemical reactions are required, such as an oxygen reduction reaction (ORR) for oxygen reduction in a fuel cell system, a reduction-oxygen (REDOX) couple reaction in a reverse electrodialysis system, a cathodic hydrogen evolution reaction, a water oxidation reaction, and the like, it is urgently demanded to reduce the costs of conventional expensive Pt based catalysts or to develop catalysts for replacing the conventional catalysts.

Since only exposed atoms of most metal catalysts are involved in reactions, it is possible to reduce the amount of expensive metals used. In addition, since metals are readily sintered due to poor thermal stability, metal catalysts may suppress catalytic activity from being lowered. Further, since use of only metals makes it difficult to achieve an appropriate level of mechanical strength, metal catalysts dispersed in a carbon based support or a non-carbon based support may be used.

An electroless method as one of the most traditional methods, in which a catalyst is generally coated on a support, was proposed by Ki Chul Park et al. in an article "Carbon-supported Pt—Ru nanoparticles prepared in glyoxylate-reduction system promoting precursor-support interaction, *Journal of Materials Chemistry*, 2010, 20, 5545-5556. According to the proposed method, however, many steps should be performed, which is quite burdensome. In addition, it is necessary to use different kinds of reducing agents according to the kind of support used. Moreover, it is difficult to control a particle size to 2 nm or less, and it is also difficult to achieve uniform distribution of particles and an increased dispersion density.

A method of controlling a catalyst structure, which is very advantageous in synthesizing heterostructures, such as core-shell structures, was proposed by Dan Chen, et al. in a report "Ultra-high-performance core shell structured Ru@Pt/C catalyst prepared by a facile pulse electrochemical deposition method," *Scientific Reports*, 2015, 5, 11624. This method is advantageous in that the process is simplified and can be performed at room temperature. According to this method, however, it is difficult to produce the catalyst structure in large scales and to control a particle size of the catalyst structure to 2 nm or less, and it is also difficult to achieve uniform distribution of particles and an increased dispersion density. In addition, it is quite difficult to hold catalyst particles in a powder-type support.

A chemical vapor deposition (CVD) method is described in a literature entitled "Chemical Vapor Deposition (CVD) of Iridium, Platinum, Rhodium and Palladium," by J. R. Vargas Garcia et al., *Materials Transactions*, 2003, 44, 1717-1728. An atomic layer deposition method is described in an article entitled "A highly active, stable and synergistic Pt nanoparticles/$Mo_2C$ nanotube catalyst by atomic layer deposition (ALD) for methanol electro-oxidation, K Zhang et al., *NPG Asia Materials*, 2015, 7, e155. A method of synthesizing nano-sized catalysts on support surfaces while supplying molecules generated by evaporating a precursor containing a metal or an organic material useful as a catalyst in a wide sense at room temperature or low temperatures into a reactor is described in a report entitled "Green synthesis of carbon-supported nanoparticle catalysts by physical vapor deposition (PVD) on soluble powder supports" by H. Y. Park et al., *Scientific Reports*, 2015, 5, 1424. According to the above-described methods, uniform synthesis and controlling are easily achieved in a case where supports in the form of powder are used. However, in a case where supports are used in large quantities, the catalyst may not be uniformly coated, making it disadvantageous to be employed in coating a powder-type catalyst. Above all, this method is disadvantageous in that there is a considerable loss of precursor sources, lowering economic efficiency.

A microwave assisted polyol method for the preparation of Pt/C, Ru/C and PtRu/C nanoparticles and its application in electrooxidation of methanol were proposed by Srinivasan Harish et al. According to the proposed method, a metal salt material is used as a catalyst source and the nanoparticles are prepared at relatively low temperatures in the range of approximately 100° C. to approximately 200° C. for 10 minutes, thereby minimizing the synthesis cost and time. However, it is not easy to synthesize the catalyst to have a particle size of 2 nm or less, and it is difficult to achieve uniform distribution of particles and an increased dispersion density. In addition, mass production of catalysts in kilogram scales is quite difficult to achieve, resulting in poor economical efficiency.

SUMMARY

To overcome the drawbacks of the conventional catalysts, there is a need for a simplified synthesis method of nanostructured catalyst particles dispersed on surfaces of various supports, which can control a particle size to 2 nm or less while achieving uniform distribution of particles and an increased dispersion density, and which enables mass production of catalysts in kilogram scales while fully utilizing a precursor, thereby attaining high economical efficiency.

Therefore, embodiments of the present invention provide a direct synthesis method of nanostructured catalyst particles dispersed on surfaces of various types of supports, which can control a particle size to 2 nm or less while achieving uniform distribution of particles and an increased dispersion density, and which enables mass production of catalysts in kilogram scales while fully utilizing a precursor, thereby attaining high economical efficiency.

The above and other aspects of the present invention will be described in or be apparent from the following description of exemplary embodiments.

According to an aspect of the present invention, there is provided a synthesis method synthesis method of a catalyst structure having a plurality of nanostructured catalyst particles dispersed in a support by a one-step process using a high-temperature high-pressure closed reactor, wherein the one-step process includes supplying the support and a catalyst source into the high-temperature high-pressure closed reactor, perfectly sealing the high-temperature high-pressure closed reactor and heating the reactor to produce the catalyst structure in the reactor under self-generated pressure and synthesis temperature conditions, the catalyst structure including the plurality of nanostructured catalyst particles dispersed in the support, removing internal gases of the reactor to allow the reactor to be in a high-temperature, atmospheric pressure state and supplying an inert gas into the reactor to remove unreacted materials and byproducts remaining in the reactor, and cooling the reactor to room temperature while supplying the inert gas to synthesize the catalyst structure.

As described above, according to an embodiment of the present invention, since kilogram scale mass production is enabled by a simplified process, high economic efficiency can be attained.

In addition, according to embodiments of the present invention, a catalyst structure can be synthesized by a one-step process on all types of the supports without artificially performing any functional treatment (addition of functional groups by surface oxidation, acid treatment, etc.) on surfaces of the supports.

According to embodiments of the present invention, it is possible to synthesize catalyst structures employing various kinds of materials, structures and components, including a metal, a non-metal, platinum, a non-platinum based catalyst material, and so on.

According to embodiments of the present invention, since the catalyst source (precursor) used for synthesis of the catalyst structure is fully dispersed in the support without loss, it is possible to accurately control the content of the Pt catalyst to be contained in the catalyst structure. In addition, incurred costs in association with the use of the catalyst source (precursor) can be remarkably reduced, compared to the conventional synthesis process.

According to embodiments of the present invention, it is possible to control the particle size of the synthesized nanostructured catalyst particles to be at least 1 nm, and the synthesized nanostructured catalyst particles can be produced to have a uniform particle size of 2 nm or less.

According to embodiments of the present invention, since the precursor evaporated during the synthesis process is supplied in a uniform concentration even to fine nanopores formed between supports in a high-temperature high-pressure closed state reactor, the nanostructured catalyst particles has a uniform particle size on all locations of the support and can be synthesized with a uniform dispersion density.

According to embodiments of the present invention, since synthesis of the nanostructured catalyst particles and formation of a carbon shell consisting of one or two layers are achieved by a one-step process, catalyst poisoning due to reactants and byproducts of a reaction procedure can be reduced and a reduction of activity due to agglomeration between catalyst particles can be suppressed during a long-term operation.

According to embodiments of the present invention, since the nanostructured catalyst particles is synthesized by being stacked on carbon shells of one to two layers by a one-step process, the nanostructured catalyst particles can be piled one layer on another. Therefore, since the nanostructured catalyst particles having various structures is formed on a surface of a single support, performance of the catalyst structure can be maximized while overcoming drawbacks of the catalyst structure including a single component.

BRIEF DESCRIPTION OF THE DRAWINGS

The above and other features of the present invention will become more apparent by describing in detail exemplary embodiments thereof with reference to the attached drawings in which:

FIG. 42B is a HRTEM image, and FIG. 42C is an EDX graph;

DETAILED DESCRIPTION

Hereinafter, examples of embodiments of the invention will be described in detail with reference to the accompanying drawings. The present invention may, however, be embodied in many different forms and should not be construed as being limited to the embodiments set forth herein.

Figure 1A:
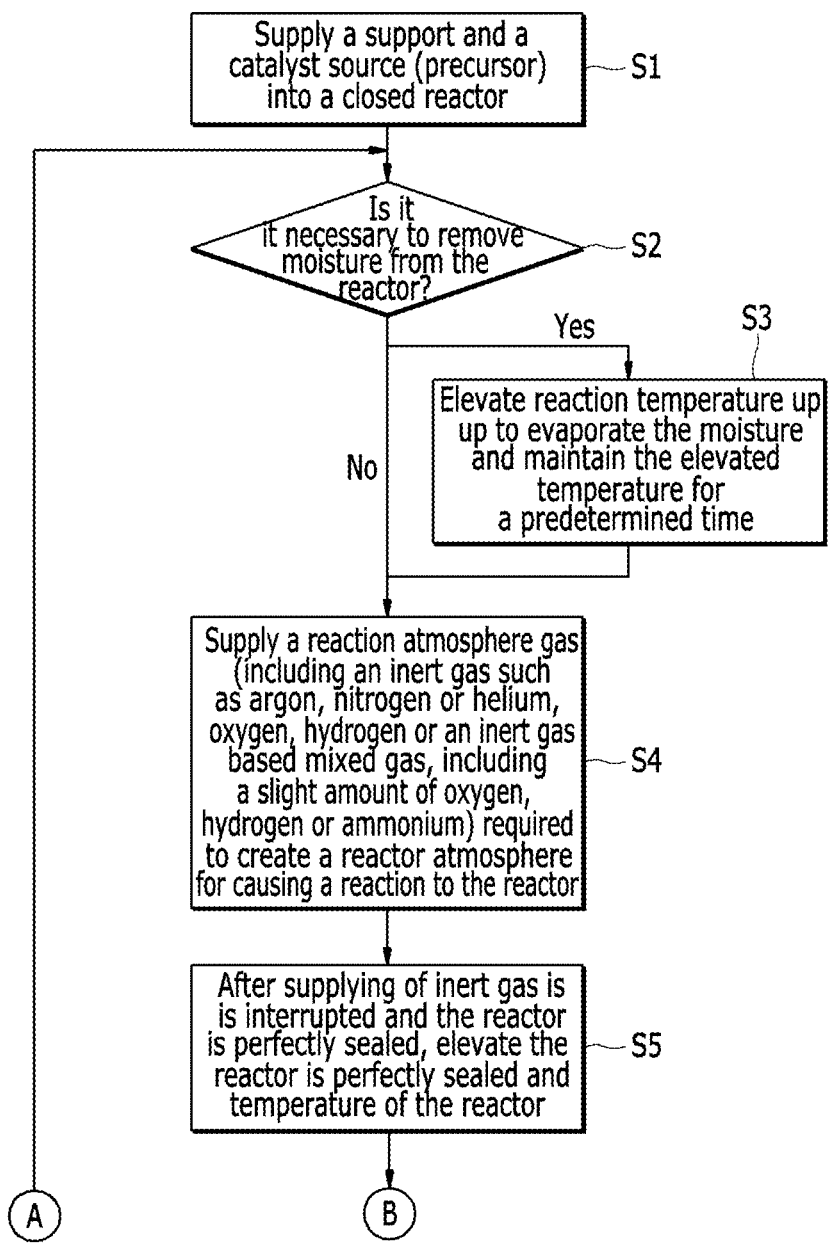
FIG. 1A through FIG. 1C is a flowchart illustrating a synthesis method of a catalyst structure having nanostructured catalyst particles dispersed in various supports according to embodiments of the present invention.
Figure 1B:
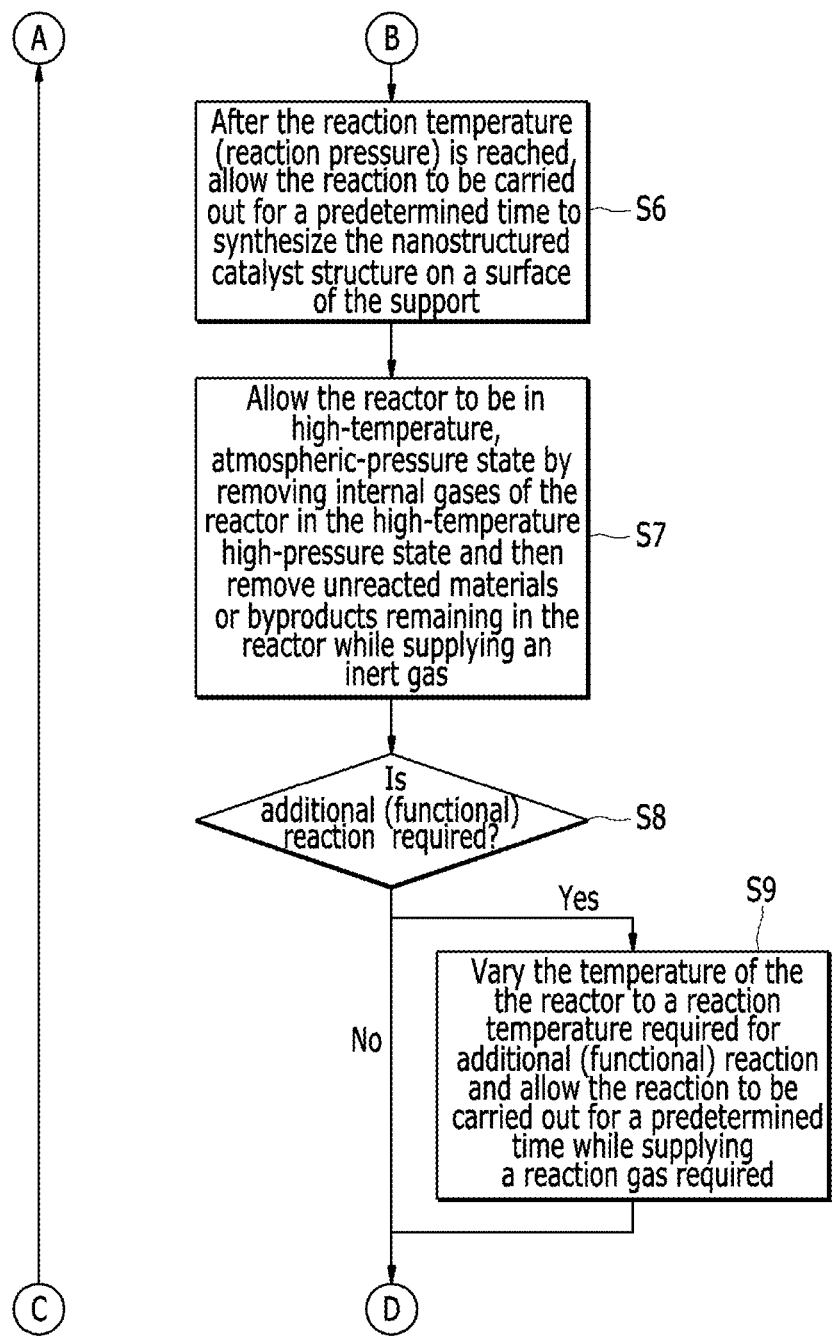
Figure 1C:
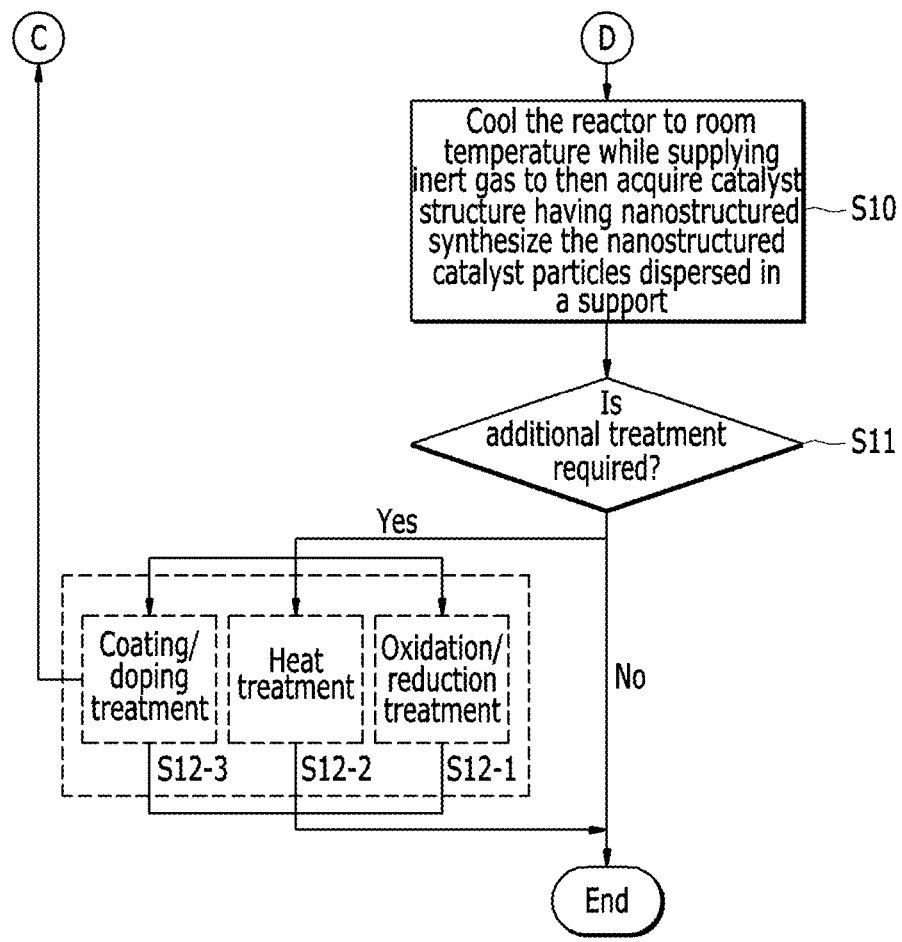

A synthesis method of a catalyst structure having nano-structured catalyst particles dispersed in various types of supports according to embodiments of the present invention will now be described with reference to FIG. 1A to FIG. 1C3333.

First, a support and a catalyst source are supplied together into a high-temperature high-pressure closed reactor (S1).

The term "high-temperature high-pressure closed reactor" refers to a reactor that can be perfectly sealed under temperature pressure conditions required to cause reactions to take place. The term "high pressure" is used to mean a pressure higher than room temperature, that is, a pressure greater than or equal to 10 atm, a pressure greater than or equal to 20 atm, a pressure greater than or equal to 30 atm, or a pressure greater than or equal to 40 atm. The term "high temperature" refers to a temperature range exceeding at least 300° C. In embodiments of the present invention, the term "high temperature" may encompass a temperature ranging between 300° C. and 600° C.

The high-temperature high-pressure reactor can be modified in various types according to reaction materials, reaction conditions, and so on. The reactor volume may be at least 1 cc and may vary according to the design employed.

Any one of a carbon based support and a non-carbon based support can be used as the support. Usable examples of the carbon based support may include, but are not limited to, a zero-dimensional support, such as carbon spheres, a one-dimensional support, such as carbon nanotubes, a two-dimensional support, such as graphenes or N-doped graphenes, an amorphous support, such as other graphitized mesoporous carbon nanoparticles, carbon black, metal-carbon shell particles, or metal oxide-carbon shell particles, and a 3-dimensional support, such as combinations of the respective dimensional supports. Usable examples of the non-carbon based support may include metal oxide particles, such as Al$_2$O$_3$ particles, SiO$_2$ particles, CeO$_2$ particles, SnO$_2$ particles, or ZnO particles, spinel type particles, such as CaAl$_2$O$_4$ particles or MgAl$_2$O$_4$ particles, other metal particles, such as Ti particles, Si particles, Zn particles, or the like, and besides non-metal support, such as boron nitride.

Nano-sized particles may be typically used as the support but micron-sized or larger particles may also be used as targets for catalyst coating. In addition, a non-powder support in the form of a bulk foil, a foam, a mesh, a wire or a sheet can also be used as the support.

Any one of a noble metal catalyst source, a non-noble metal catalyst source, and an organometallic catalyst source can be used as the catalyst source. Usable examples of the noble metal catalyst may include Pt, Ru, Ir, Rh, Pd, Au, Ag, Re and so on, and examples of the non-noble metal catalyst may include Fe, Co, Ni, Mn, Mo, Zn, V, Cr, Cu, Al, Ga, Ge, In, Sn, Sb and so on. Usable examples of the organometallic catalyst may include Fe based organic metal, Co based organic metal, Ni based organic metal, Mn based organic metal, Cu based organic metal, and Sn based organic metal.

Usable examples of the Pt source may include, but are not limited to, trimethyl(methylcyclopentadienyl) platinum (C$_5$H$_4$CH$_3$Pt(CH$_3$)$_3$), platinum (II) acetylacetonate (PtC$_{10}$H$_{14}$O$_4$), and 1,5-Cyclooctadiene)dimethylplatinum (II) (C$_{10}$H$_{18}$Pt), usable examples of the Ru source may include, but are not limited to, ruthenium (III) acetylacetonate (Ru(C$_5$H$_7$O$_2$)$_3$), ruthenocene (Ru(C$_5$H$_5$)$_2$), bis(ethylcyclopentadienyl) ruthenium (II) (C$_7$H$_9$RuC$_7$H$_9$), bis(2,4 dimethylpentadienyl)ruthenium (II) (C$_{14}$H$_{22}$Ru), and bis (pentamethylcyclopentadienyl)ruthenium (II) (Ru(C$_5$(CH$_3$)$_5$)$_2$), usable examples of the Ir sources may include, but are not limited to, methylcyclopentadienyl)(1, 5-cycloctadiene)iridium (I), iridium (III) acetylacetonate (Ir(C$_5$H$_7$O$_2$)$_3$), and (1,5-Cyclooctadiene)-η5-indenyeiridium (I) ((C$_9$H$_7$)Ir(C$_8$H$_{12}$)), usable examples of the Rh sources may include, but are not limited to, rhodium (III) acetylacetonate (Rh(C$_5$H$_7$O$_2$)$_3$, and usable examples of the Pd source may include, but are not limited to, palladium (II) acetylacetonate (Pd(C$_5$H$_7$O$_2$)$_2$. Usable examples of the Ag source may include, but are not limited to, silver cyanide (CAgN), and silver acetylacetonate (Ag(C$_5$H$_7$O$_2$)), usable examples of the Au source may include, but are not limited to, gold cyanide (CAuN), and methyl(triphenylphosphine) gold (1) (C$_{19}$H$_{18}$AuP), and usable examples of the Re source may include, but are not limited to, rhenium carboxyl (C$_{10}$O$_{10}$Re$_2$).

Usable examples of the Fe source may include, but are not limited to, ferrocene (C$_{10}$H$_{10}$Fe), vinyl ferrocene (C$_{12}$H$_{12}$Fe), and iron (III) acetylacetonate (Fe(C$_5$H$_7$O$_2$)$_3$), usable examples of the Co source may include, but are not limited to, cobaltocene (C$_{10}$H$_{10}$Co), and cobalt (III) acetylacetonate (Co(C$_5$H$_7$O$_2$)$_3$), usable examples of the Ni source may include, but are not limited to, nickelocene (C$_{10}$H$_{10}$Ni), and nickel (II) acetylacetonate (Ni(C$_5$H$_7$O$_2$)$_2$), usable examples of the Mn source may include, but are not limited to, manganocene (C$_{10}$H$_{10}$Mn), manganese (II) acetylacetonate (Mn(C$_5$H$_7$O$_2$)$_2$), vanadium(III) acetylacetonate (V(C$_5$H$_7$O$_2$)$_3$), and chromium (III) acetylacetonate (Cr(C$_5$H$_7$O$_2$)$_3$), usable examples of the Mo source may include, but are not limited to, bis(acetylacetonato)dioxomolybdenum (VI) (MoO$_2$(C$_5$H$_7$O$_2$)$_2$), bis(t-butylimido)bis(dimethylamino)molybdenum (VI) (C$_{12}$H$_{30}$MoN$_4$), molybdenum (II) acetate dimer (C$_8$H$_{12}$Mo$_2$O$_8$), and molybdenum carboxyl (Mo(CO)$_6$), usable examples of the Zn source may include, but are not limited to, zinc(II) acetylacetonate (Zn(C$_5$H$_7$O$_2$)$_2$ xH$_2$O), diethylzinc (C$_4$H$_{10}$Zn), and dimethylzinc (C$_2$H$_6$Zn), usable examples of the Cu source may include, but are not limited to, copper(II) acetylacetonate (Cu(C$_5$H$_7$O$_2$)$_2$), and copper cyanide (CCuN), Al sources may include, but are not limited to, aluminum (III) acetylacetonate (Al(C$_5$H$_7$O$_2$)$_3$), trimethylaluminum (C$_3$H$_9$Al), trimethylaluminum (C$_6$H$_{15}$Al), and tri-butylaluminum (C$_{12}$H$_{27}$Al), usable examples of the Ga source may include, but are not limited to, gallium (III) acetylacetonate (Ga(C$_5$H$_7$O$_2$)$_3$), usable examples of the In source may include, but are not limited to, indium (III) acetylacetonate (In(C$_5$H$_7$O$_2$)$_3$), usable examples of the Sn source may include, but are not limited to, tin (II) acetylacetonate (Sn(C$_5$H$_7$O$_2$)$_2$), tetramethyltin (C$_4$H$_{12}$Sn), and tetraphenyltin (C$_{24}$H$_{20}$Sn), usable examples of the Sb source may include, but are not limited to, antimony(III) acetate (C$_6$H$_9$O$_6$Sb), triphenylantimony (C$_{18}$H$_{15}$Sb), and tris(dimethylamino)antimony ((CH$_3$)$_2$N)$_3$Sb), and usable examples of the Ge source may include, but are not limited to, tetraethylgermanium (C$_8$H$_{20}$Ge), tetramethylgermanium (C$_4$H$_{12}$Ge), and tetra-butylgermanium (C$_{16}$H$_{36}$Ge).

Usable examples of the organometallic catalyst source may include, but are not limited to, iron (II) phthalocyanine (C$_{32}$H$_{16}$FeN$_8$), iron porphyrin (C$_{20}$H$_{14}$FeN$_4$), cobalt (II) phthalocyanine (C$_{32}$H$_{16}$CoN$_8$), nickel (II) phthalocyanine (C$_{32}$H$_{16}$NiN$_8$), manganese (II) phthalocyanine (C$_{32}$H$_{16}$MnN$_8$), copper (II) phthalocyanine (C$_{32}$H$_{16}$CuN$_8$), tin (II) phthalocyanine (C$_{32}$H$_{16}$SnN$_8$).

When the noble metal catalyst source is used in combination with another catalyst source, a noble metal based binary alloy catalyst can be synthesized. When the Pt based catalyst source and the transition metal based catalyst source are used in combination, a Pt-transition metal based binary alloy catalyst can be synthesized. When the Pt based catalyst source and the organometallic catalyst source are used in combination, a Pt-organometal based binary alloy catalyst can be synthesized. When three or more catalyst sources are used in combination, a multicomponent alloy catalyst can be synthesized.

When the catalyst source is supplied into the reactor (S1), the content of catalyst contained in the substrate can be controlled to be in a desired range by controlling the content of the catalyst source supplied. The controlling of the content of the catalyst source supplied can be performed based on the weight ratio of the substrate and the catalyst source.

When the supplying of the catalyst source is completed, it is determined whether moisture contained in a sample needs to be removed from the reactor (S2).

When it is determined that moisture contained in a sample needs to be removed from the reactor, the temperature of the reactor is elevated to a temperature required to evaporate the moisture, e.g., up to 100° C., while supplying an inert gas into the reactor, and the elevated temperature is maintained for a predetermined time (S3). The step of removing the moisture (S4) is maintained for 1 to 60 minutes.

When it is not determined that moisture contained in a sample needs to be removed from the reactor, a reaction atmosphere gas required to create a reactor atmosphere to immediately cause a reaction is supplied (S4). For example, when a catalyst is prepared when a pure metal catalyst or a support is vulnerable to oxidation, an inert atmosphere without oxygen is required. In order to control the size of a catalyst based on, for example, platinum (Pt), an atmosphere with a trace amount of oxygen is required at an initial reaction stage. In addition, for nitrogen doping, it is necessary to supply a trace amount of ammonium gas before the reaction.

For the reasons stated above, an inert gas such as argon, nitrogen or helium, and a reactant such as oxygen or hydrogen, or an inert gas based mixed gas, including a slight amount of oxygen, hydrogen or ammonium, may be supplied as the reaction atmosphere gas.

The supplying of the reaction atmosphere gas may be controlled to be in the range of 1 to 10 atm relative to the volume of the reactor.

Next, the high-temperature high-pressure reactor is perfectly sealed and the temperature of the closed reactor is elevated (S5).

While the temperature of the reactor is elevated up to a reaction temperature, the internal pressure of the reactor is increased while the catalyst source is evaporated and dilated to then be subjected to thermal decomposition in the reactor. A self-generated pressure as much as a gas constant corresponding to a formation (or synthesis) temperature is produced in the reactor while the catalyst source is evaporated.

The reaction temperature may vary according to the material of the reactor or the reactor volume. In embodiments of the present invention, the reaction temperature is preferably in the range of 200° C. to 600° C. in consideration of economic efficiency of the reaction, particle size and dispersion density of nanostructured catalyst particles coated. When the reaction temperature is not higher than 200° C., nanostructured catalyst particles having a particle size of 1 nm or less may be synthesized. In this case, however, the catalyst source may not be properly decomposed and may not smoothly react with a surface of the support. When the reaction temperature is higher than 600° C., agglomeration of the nanostructured catalyst particles may be noticeably demonstrated. In addition, it is quite difficult to design the reactor and to select a material to be supplied to the reactor so as to cope with the distortion of the reactor, which may increase the manufacturing cost of the reactor, causing an increase in the production cost. The reaction temperature is more preferably in the range of 200° C. to 500° C. from standpoints of manufacturability and economic efficiency.

When the reactor reaches the reaction temperature (reaction pressure), the reaction is carried out for a predetermined time to synthesize the nanostructured catalyst particles on the support surface (S6).

The reaction time may be between 1 minute to 2 hours, which is, however, provided only for illustration and may vary according to the structural design of the catalyst to be synthesized (size, crystallinity, shape, etc.), the economic efficiency of reaction, the speed of chemical reaction between catalyst sources supplied.

After the reaction is completed, internal gases are removed from the reactor in the high-temperature high-pressure state to allow the reactor to be in a high-temperature, atmospheric-pressure state, and unreacted materials and byproducts remaining in the reactor are removed while supplying an inert gas (S7).

Then, it is checked whether additionally functioning of the reactor is required (S8).

If the additionally functioning is required, the reaction is carried out for a predetermined time while varying the temperature of the reactor up to a reaction temperature required for functioning the reactor and supplying reaction gases required (S9).

The functioning may include oxidation treatment, reduction treatment or a combination thereof.

The oxidation treatment may be performed by supplying an inert gas and oxygen-containing gas while maintaining the catalyst structure at a temperature higher than 200° C. and lower than 600° C. The oxidation treatment may be performed for approximately 1 to approximately 2 hours. When the acquired catalyst structure is maintained at a temperature of 200° C. or below, the oxidation reaction may not be sufficiently performed, and when the acquired catalyst structure is maintained at a temperature of 600° C. or higher, oxidation of the catalyst shell or the support may be facilitated and agglomeration of the nanostructured catalyst particles may be accelerated. When the nanostructured catalyst particles include a transition metal, a catalyst structure having transition-metal-oxide nanostructured catalyst particles dispersed in the support can be easily synthesized. When the nanostructured catalyst particles include a metal oxide, the activated oxygen adsorbed into the metal oxide or the interstitial oxygen of the metal oxide may be involved in an oxidation reaction and may function as a catalyst in the oxidation reaction. In addition, the metal oxide may also be used in dehydrogenation, condensation and decomposition of an oxygen-containing material as well as the oxidation reaction. Moreover, the metal oxide may be effectively used in removing ligands remaining on a catalyst surface.

Reduction treatment may be performed by supplying an inert gas and hydrogen-containing gas while maintaining the catalyst structure at a temperature higher than 200° C. and lower than 600° C. The reduction treatment may be performed for approximately 1 to approximately 2 hours. In particular, in a case of a metal catalyst, impurities can be removed from the surface of the catalyst structure through the reduction treatment. When the support includes an oxide, the reduction treatment may alter the oxide support into a support having a metallic property. When the acquired catalyst structure is maintained at a temperature of 200° C. or below, the reduction reaction may not be sufficiently performed. When the acquired catalyst structure is maintained at a temperature of 600° C. or higher, agglomeration of the nanostructured catalyst particles may be accelerated due to the high temperature.

When the additionally functioning is completed or the additionally functioning is not required, the reactor is cooled back to room temperature while supplying an inert gas and the catalyst structure having nanostructured catalyst particles dispersed in the support is then acquired in the reactor (S10).

The nanostructured catalyst particles in the acquired resultant product were uniformly distributed at all locations of the support, demonstrating a very high dispersion density. In addition, agglomeration of the nanostructured catalyst particles rarely occurs. Further, the nanostructured catalyst particles can be controlled to have a particle size of 2 nm or less, preferably approximately 1 nm.

The steps S1 to S10 are performed by a single process in which operations of the respective steps S1 to S10 take place within a single reactor. Therefore, according to embodiments of the present invention, since several to several tens of kilograms of the catalyst structure having nanostructured catalyst particles uniformly dispersed in the support is produced by the one-step process, high economic efficiency can be demonstrated.

In addition, the catalyst structure can be synthesized by dispersing the nanostructured catalyst particles in all locations of the support by the one-step process without artificially performing any functional treatment (addition of functional groups by surface oxidation, acid treatment, etc.) on the surface of the support.

According to embodiments of the present invention, it is possible to synthesize catalyst structures employing various kinds of materials, structures and components, including a metal, a non-metal, platinum, a non-platinum based catalyst material, and so on.

In addition, since the catalyst source (precursor) used for synthesizing a catalyst is fully dispersed on the support without loss, it is possible to accurately control the content of the catalyst to be contained in the catalyst structure, and incurred costs associated with the use of the catalyst source (precursor) can be remarkably reduced.

In addition, since the catalyst source evaporated under a high-temperature high-pressure closed atmosphere exists on all locations of the support surface in a constant concentration, it is possible to synthesize the nanostructured catalyst particles having a uniform size and an increased dispersion density on all locations of the support surface.

Moreover, it is possible to control the particle size of the synthesized nanostructured catalyst particles to be at least 1 nm, and the synthesized nanostructured catalyst particles can be produced to have a uniform particle size at all locations of the support in a uniform dispersion density.

Figure 2A:
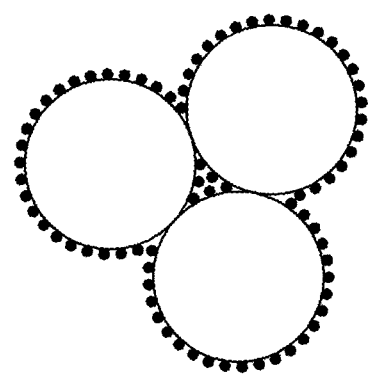
FIG. 2A illustrates carbon nanosphere supports.
Figure 2B:
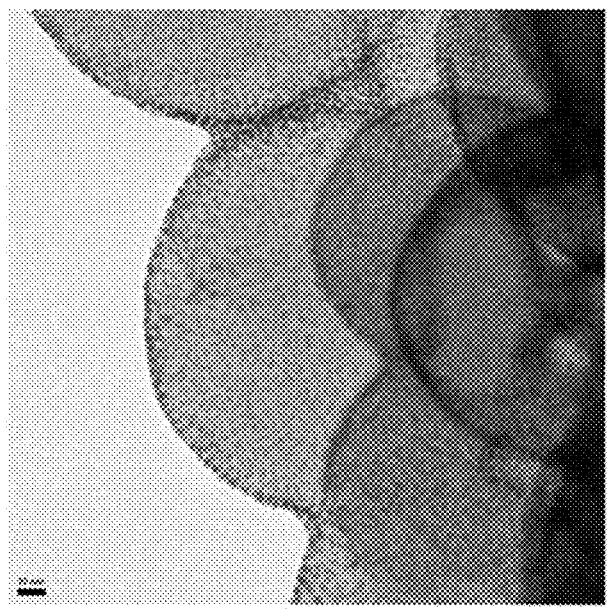
FIG. 2B illustrates a high resolution transmission electron microscopy (HRTEM) photograph showing a catalyst structure having Pt catalyst particles dispersed in carbon nanospheres.
Figure 3A:
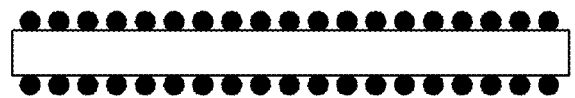
FIG. 3A illustrates carbon nanotube supports.
Figure 3B:
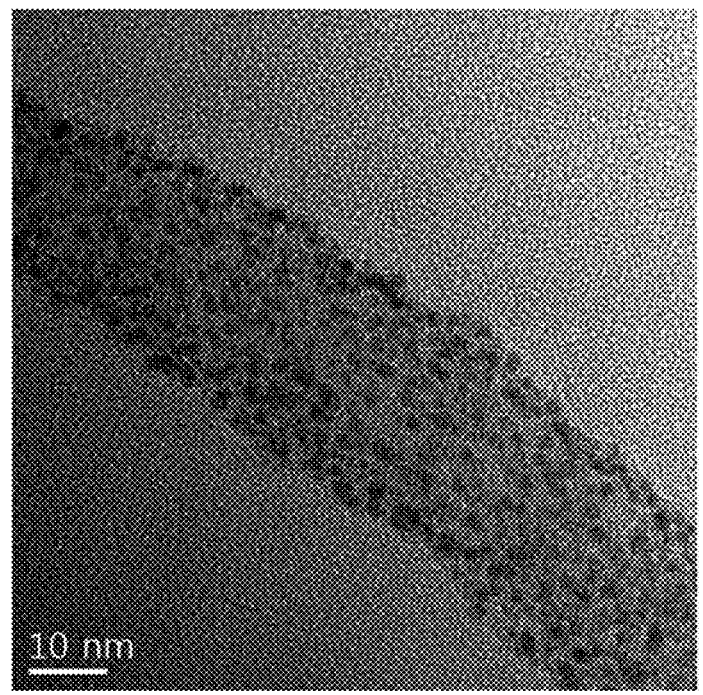
FIG. 3B illustrates an HRTEM photograph showing a catalyst structure having Pt catalyst particles dispersed in carbon nanotubes.
Figure 4A:
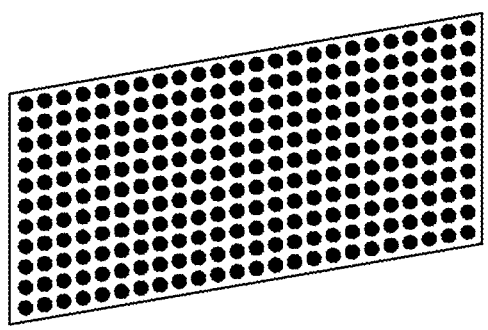
FIG. 4A illustrates graphene supports.

FIG. 2A illustrates carbon nanosphere supports, and FIG. 2B is a high resolution transmission electron microscopy (HRTEM) photograph showing a catalyst structure having Pt catalyst particles dispersed in a carbon nanosphere support, FIG. 3A illustrates carbon nanotube supports, and FIG. 3B is an HRTEM photograph showing a catalyst structure having Pt catalyst particles dispersed in a carbon nanotube support, FIG. 4A illustrates graphene supports, and FIG. 3B is an HRTEM photograph showing a catalyst structure having Pt catalyst particles dispersed in a graphene support. It was confirmed from FIGS. 2B, 3B and 4B that uniform size and distribution of the nanostructured catalyst particles are improved.

Figure 4B:
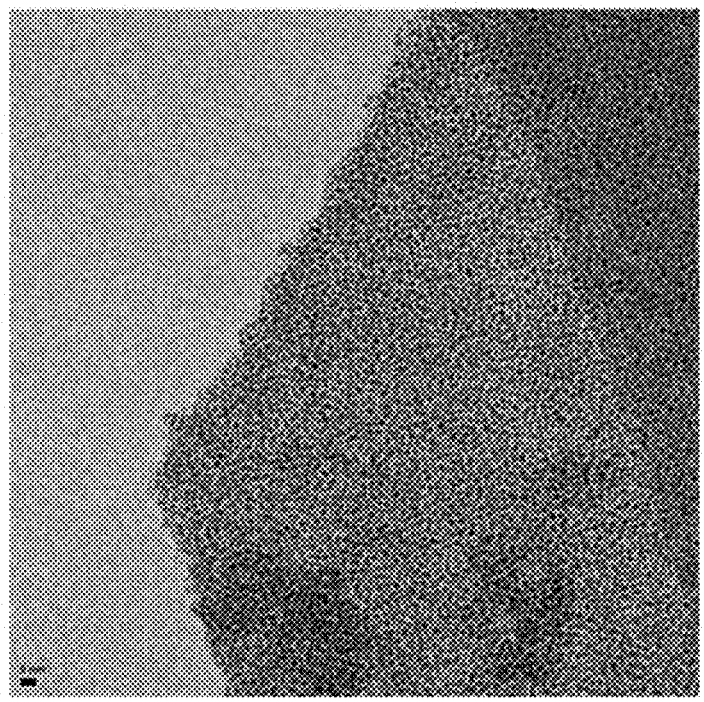
FIG. 4B illustrates an HRTEM photograph showing a catalyst structure having Pt catalyst particles dispersed in graphenes.

As illustrated in FIGS. 2B, 3B and 4B, the sizes of the nanostructured catalyst particles are very uniformly controlled and the dispersion density is increased, the reasons of which will now be described. That is to say, the precursor supplied for catalyst synthesis is evaporated according to conditions of the high-temperature high-pressure closed reactor to then be dilated in the reactor without loss. Here, the evaporated precursor will have a uniform concentration at all locations of the support under a uniform pressure. For these reasons, the uniformly sized nanostructured catalyst particles can be formed on all locations of the support surfaces. In addition, since the nanostructured catalyst particles are synthesized without agglomeration, the dispersion density is also increased. Moreover, the nanostructured catalyst particles are firmly bonded with the support.

Figure 5A:
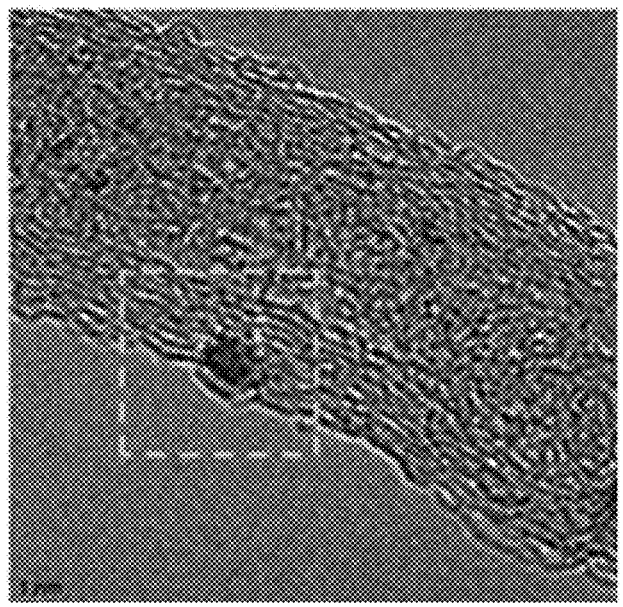
FIGS. 5A and 6A illustrate HRTEM photographs showing catalyst structures having Pt catalysts dispersed in carbon nanotubes.
Figure 5B:
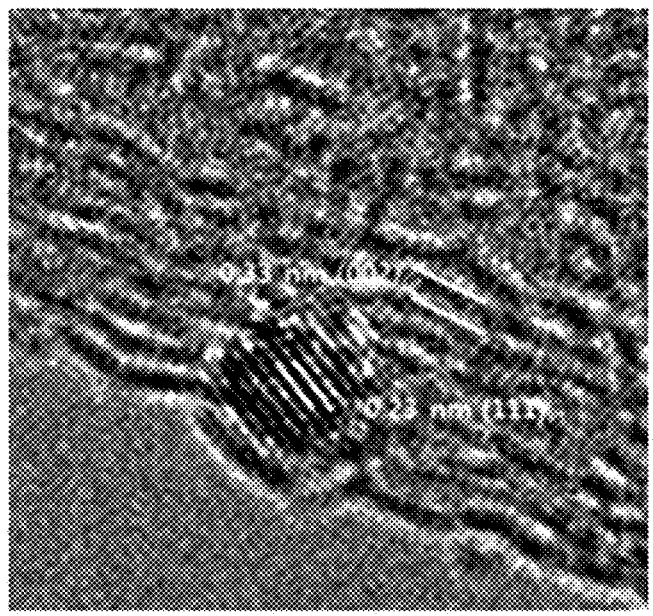
FIGS. 5B and 6B illustrate enlarged HRTEM photographs of rectangular regions of FIGS. 5A and 6A, respectively.
Figure 6A:
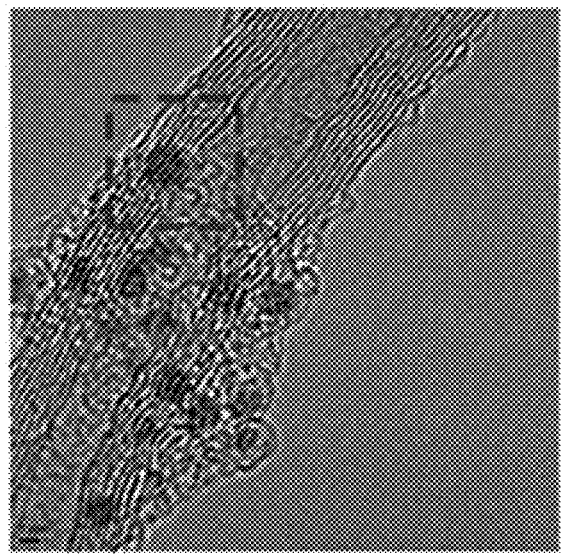
Figure 6B:
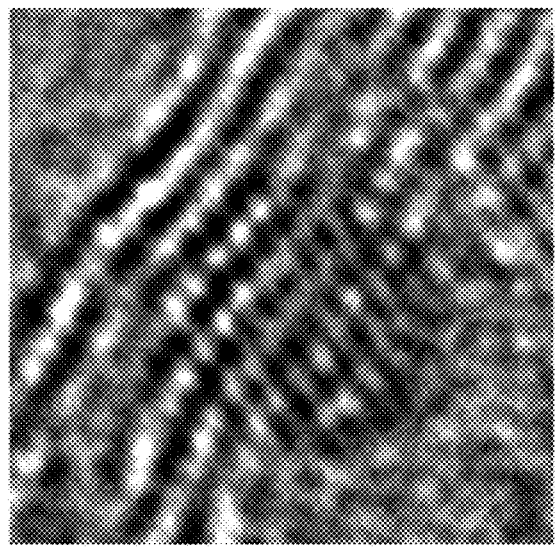

FIGS. 5A and 6A are HRTEM photographs showing catalyst structures having Pt catalyst nanoparticles dispersed in a carbon nanotube support, and FIGS. 5B and 6B are enlarged HRTEM photographs of rectangular regions of FIGS. 5A and 6A, respectively. It was confirmed from the HRTEM photographs illustrated in FIGS. 5A to 6B that the nanostructured catalyst particles very firmly bonded with the support, which is interpret that strong bonds are formed between the support surfaces and the nanostructured catalyst particles during the manufacturing process. With the strong bonds, the catalyst structure may advantageously have improved durability.

That is to say, compared to the conventional process in which at least two or three steps are performed, according to embodiments of the present invention, uniformly sized nanostructured catalyst particles can be dispersed on the support by a one-step process in an increased dispersion density, the processing cost can be reduced. In addition, since there is little material cost incurred in performing the process, high economic efficiency can be demonstrated. Moreover, since little detrimental materials are exhausted during the synthesis process of the catalyst structure according to the present invention, the synthesis process may be referred to as an environmentally friendly process. The durability of the synthesized catalyst structure is also improved.

Figure 7A:
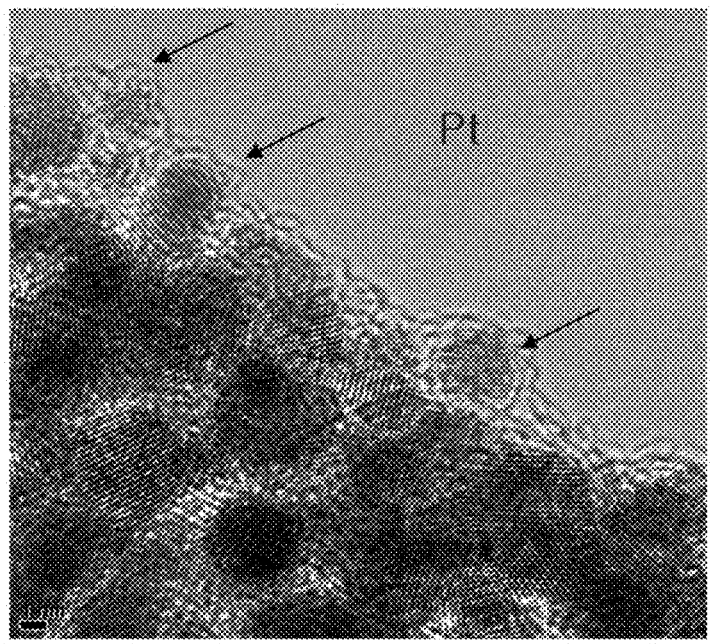
FIG. 7A illustrates an HRTEM photograph showing Pt nanostructured catalyst particles and a carbon shell.
Figure 7B:
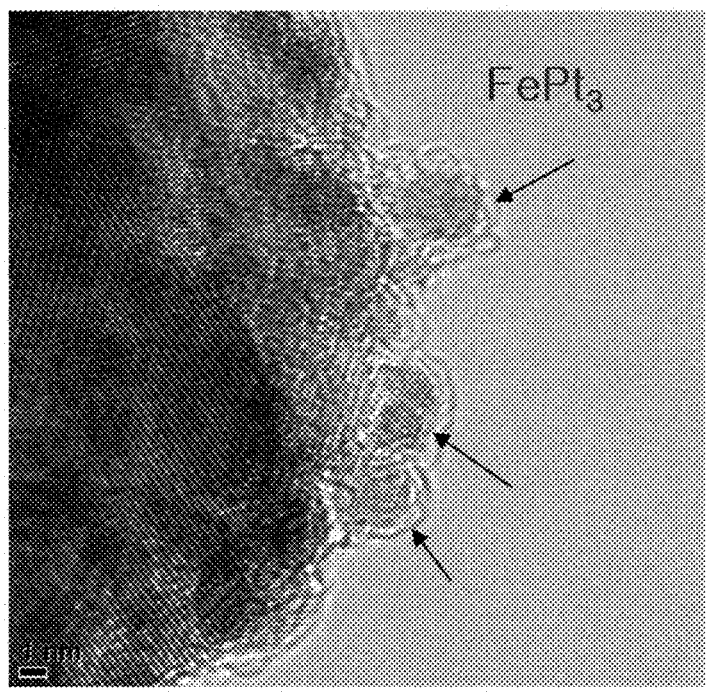
FIG. 7B illustrates an HRTEM photograph showing FePt3 nanostructured catalyst particles and a carbon shell.

In addition, according to the present invention, as illustrated in FIG. 7A (Pt nanostructured catalyst particles) and FIG. 7B (FePt3 nanostructured catalyst particles), synthesis of the nanostructured catalyst particles and formation of a carbon shell consisting of one or two layers are achieved by a one-step process at the same time. Accordingly, the synthesized catalyst structure can minimize deterioration of activity due to poisonous materials contained in reactants of an electrochemical reaction and a general chemical reaction and byproducts generated during a reaction procedure. In addition, since the synthesized catalyst structure can be stably bonded with the support in a long-term basis, agglomeration of the nanostructured catalyst particles can be avoided. Moreover, since the number of shells formed in the present invention is controlled to be not greater than two and the synthesized catalyst structure has quite many defects, the above-stated advantages can be maximized while suppressing catalyst performance from being lowered, which may be caused in a case where the shell structure becomes thick and is formed using a perfectly crystalline structure.

Figure 8A:
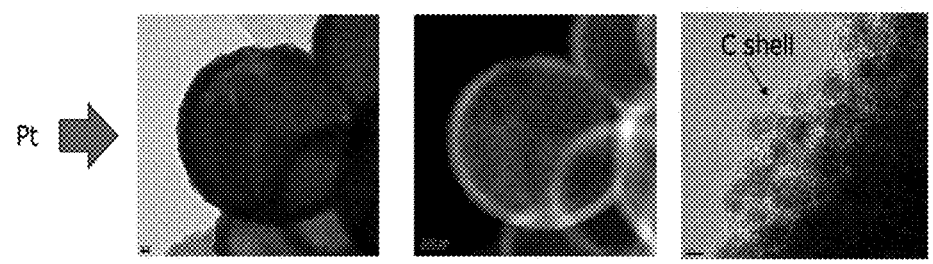
FIG. 8A illustrates an HRTEM photograph showing Pt nanostructured catalyst particles dispersed in a support.
Figure 8B:
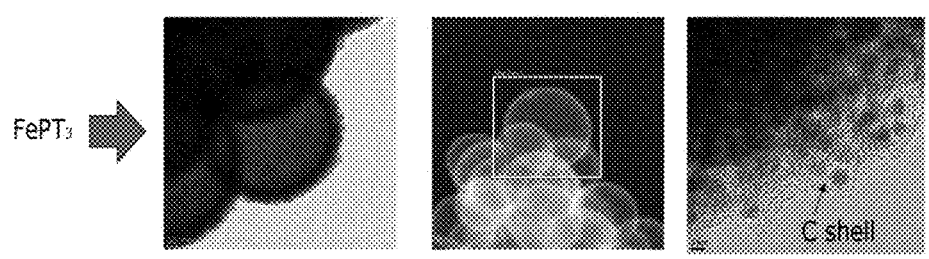
FIG. 8B illustrates an HRTEM photograph showing FePt3 nanostructured catalyst particles dispersed in a support.

In addition, since the one or two layers of carbon shells are piled by the one-step process to synthesize the nanostructured catalyst particles, the nanostructured catalyst particles can be deposited one on the other. FIG. 8A is an HRTEM photograph showing Pt nanostructured catalyst particles dispersed in a support, and FIG. 8B is an HRTEM photograph showing FePt3 nanostructured catalyst particles dispersed in a support. Referring to FIGS. 8A and 8B, during the synthesis of the catalyst structure, the nanostructured catalyst particles are surrounded by one or two carbon shell layers and separated from each other by the carbon shells, suggesting that the nanostructured catalyst particles constructed by multiple layers are dispersed in the support without agglomeration.

It is determined whether additional treatment, including coating/doping treatment, heat treatment or oxidation/reduction treatment, is (S11).

The additional treatment may be performed immediately after the reaction is completed in the high-temperature high-pressure closed reactor including the acquired catalyst structure. However, the additional treatment may also be performed in a general reactor for normal treatment after the resultant product is acquired.

Oxidation treatment/reduction treatment may further be performed on the acquired catalyst structure (S12-1). The oxidation treatment may be performed with a stream of air or oxygen while the acquired catalyst structure is maintained at a temperature higher than 200° C. and lower than 600° C. The oxidation treatment may be performed in substantially the same manner as in step S9.

In some cases, reduction treatment may further be performed on the acquired catalyst structure (S12-1). The reduction treatment may be performed in substantially the same manner as in step S9.

Heat treatment (S12-2) may be performed to increase crystallinity of the catalyst structure.

The heat treatment (S12-2) may be performed using an inert gas, a mixed gas of an inert gas and hydrogen, a mixed gas of an inert gas and a gaseous hydrocarbon gas, or a mixed gas of an inert gas and a nitrogen-containing gas.

The heat treatment (S12-2) may be performed at a temperature in the range of approximately 900° C. to approximately 1300° C. for approximately 1 to 6 hours in an inert gas atmosphere under an atmospheric pressure. When the heat treatment is performed at a temperature lower than 900° C., a noticeable effect exerted by performing the heat treatment cannot be expected, and when the heat treatment is performed at a temperature higher than 1300° C., deformation of the catalyst structure may be aggravated. When the catalyst structure includes an oxide, the carbon shell may be removed by a reaction between the oxide and the carbon shell.

In addition, coating/doping treatment may further be performed on the acquired catalyst structure (S12-3). The coating/doping treatment may be performed by supplying a material to be coated/doped into a closed reactor while the acquired catalyst structure is maintained at a temperature higher than 200° C. and lower than 600° C. The coating/doping treatment (S12-3) may be performed in a high-temperature high-pressure closed reactor through the same process steps with steps S2 to S11.

For example, N-doping may be performed on the nanostructured catalyst particles or the carbon shell, after supplying ammonia gas at approximately 500° C. or supplying ammonia gas with a nitrogen (N) containing source into the reactor. Additionally, boron (B), phosphorus (P), vanadium (V), molybdenum (Mo), etc. may also be doped in a similar manner. The doping treatment may be performed for approximately 1 to 2 hours. Doping temperatures may vary according to the source supplied for doping. However, when the doping temperature is maintained at a temperature of 200° C. or below, a doping reaction may not be sufficiently performed. When the doping temperature is maintained at a temperature of 600° C. or higher, agglomeration of the nanostructured catalyst particles may be accelerated due to the high temperature.

The catalyst structure prepared by the embodiments may be applied to various catalyst field and nanomaterial field, e.g., fuel cell, reverse electrodialysia, electrodialysis for desalination, hydrogen evolution reaction, catalysts for electrochemistry, batteries, catalysts for reformer, and photocatalysts.

The following experimental examples and figures are provided for a better understanding of conceptual aspects and methods of embodiments of the present invention and detailed descriptions of functions and effects of the present invention. However, the following Experimental Examples are provided by way of illustration and are not intended to be limiting the scope of the present invention.

Unless conditions of an internal reactor atmosphere gas before sealing are specified otherwise in the following examples, the expression "atmosphere gas before sealing" is used to mean an inert gas.

Experimental Example 1

A glassy carbon sphere having a diameter of approximately 200 nm as a 0-dimensional support and trimethy (methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 15 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the carbon sphere support was acquired.

Figure 9A:
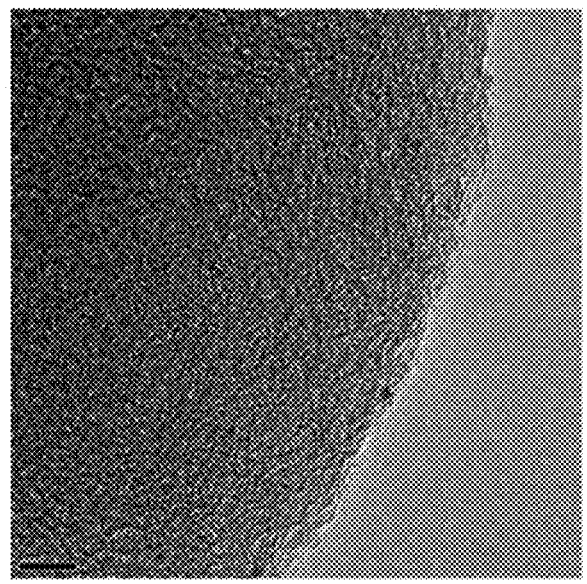
FIG. 9A illustrates an HRTEM image of a carbon sphere support prepared in Experimental Example 1 and FIGS. 9B to 9H illustrate catalyst structures having Pt nanostructured catalyst particles dispersed in the carbon sphere support, specifically FIG. 9B illustrating an HRTEM image, FIG. 9C illustrating an HRTEM image for confirming a Pt crystallographic plane having an interval of 0.223 nm, FIG. 9D illustrating an FFT pattern for identifying a (111) crystallographic plane of a pure single crystal Pt metal, FIG. 9E illustrating an STEM image of Pt nanostructured catalyst particles produced on surfaces of the carbon spheres to have a uniform size, and FIGS. 9F to 9H illustrating energy-dispersive X-ray spectroscopy (EDX) images, respectively.
Figure 9B:
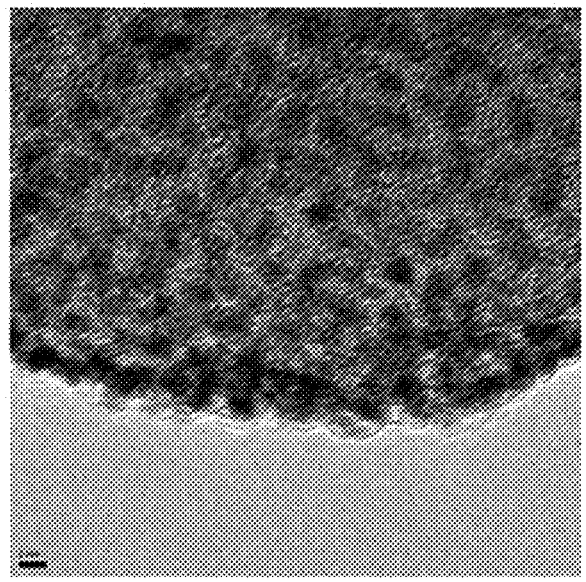
Figure 9C:
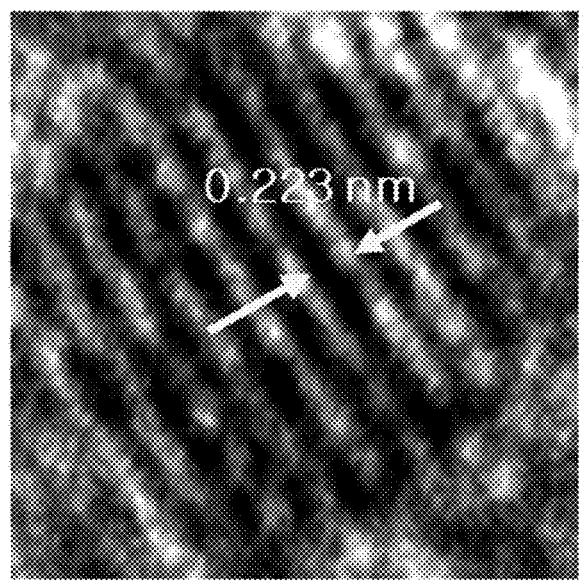
Figure 9D:
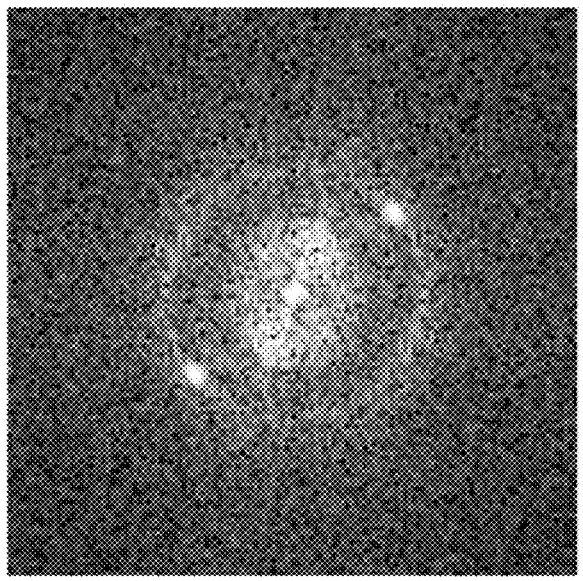
Figure 9E:
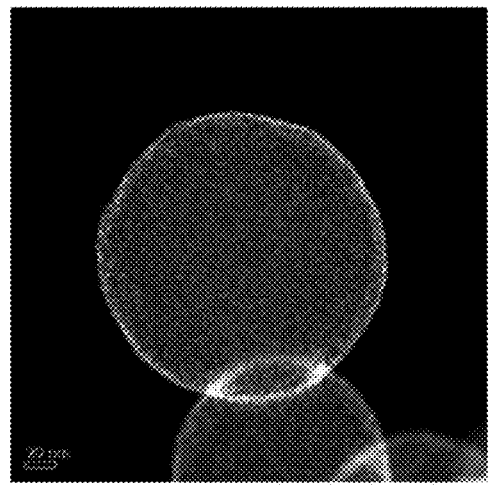
Figure 9F:
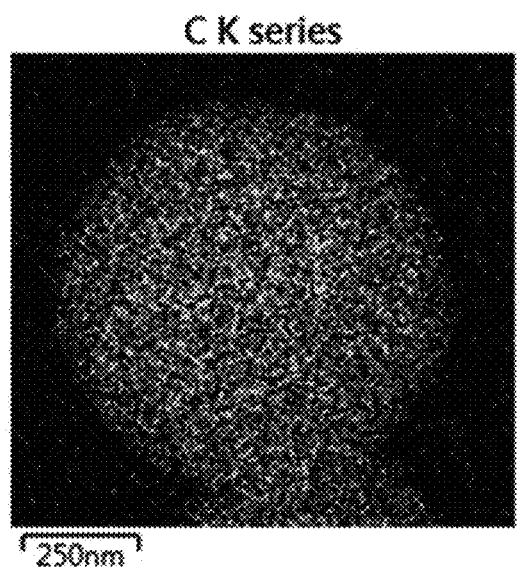
Figure 9G:
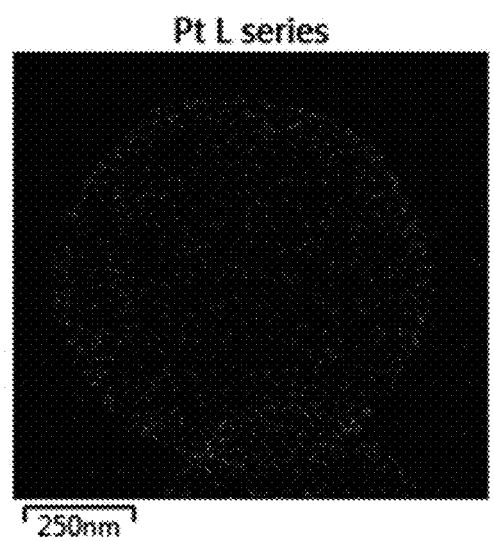
Figure 9H:
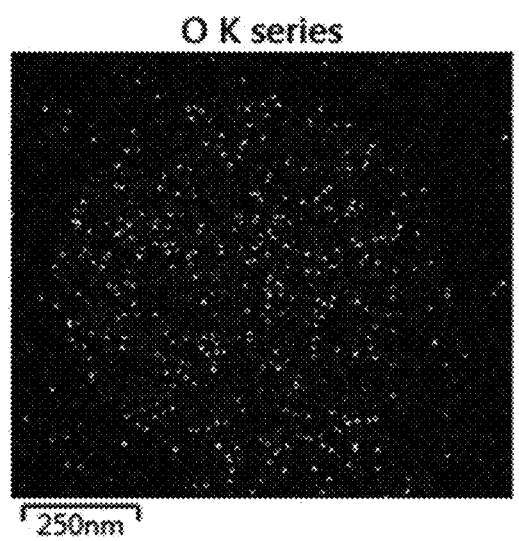

FIG. 9A illustrates an HRTEM image of a carbon sphere support before Pt nanostructured catalyst particles are dispersed. It was confirmed from FIG. 9A that a crystallographic plane of the carbon sphere surface has a glassy structure. FIG. 9B illustrates an HRTEM image of the carbon sphere support after Pt nanostructured catalyst particles are dispersed. It was confirmed from FIG. 9B that 1 to 1.5 nm sized Pt nanostructured catalyst particles were very uniformly distributed on the surface of the carbon sphere support. FIG. 9C illustrates an HRTEM image, from which a major crystallographic plane of Pt having a 0.223 nm interval is identified. FIG. 9D illustrates an FFT pattern, from which a (111) crystallographic plane of a pure single crystal Pt metal is identified. FIG. 9E illustrates an STEM image, from which Pt nanostructured catalyst particles distributed on surfaces of the carbon spheres are identified to have a uniform size. FIGS. 9F to 9H illustrate energy-dispersive X-ray spectroscopy (EDX) images. Specifically, distribution of C components of carbon spheres is illustrated in FIG. 9F, distribution of Pt nanoparticles is illustrated in FIG. 9G, and a surface oxide layer of the final catalyst structure is illustrated in FIG. 9H.

It was confirmed from FIGS. 9A to 9H that 1 to 1.5 nm sized Pt nanoparticles were very uniformly dispersed on the surface of the carbon sphere support.

Experimental Example 2

Multi-walled carbon nanotubes having a diameter of approximately 10 nm to approximately 20 nm and a length of 5 μm as a 1-dimensional support and trimethyl(methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 15 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the carbon nanotube support was acquired.

Figure 10A:
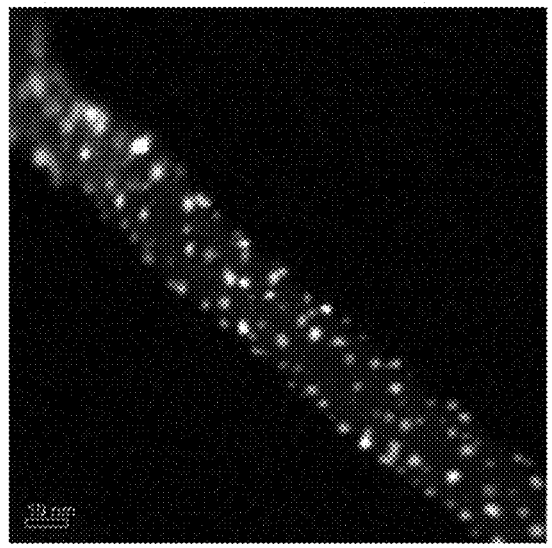
FIGS. 10A to 11B illustrate a catalyst structure having Pt nanostructured catalyst particles dispersed in carbon nanotubes acquired in Experimental Example 2, specifically FIGS. 10A and 10B illustrating STEM and HRTEM images of the catalyst structure synthesized at 300° C., respectively, and FIGS. 11A and 11B illustrating STEM and HRTEM images of the catalyst structure synthesized at 600° C., respectively.
Figure 10B:
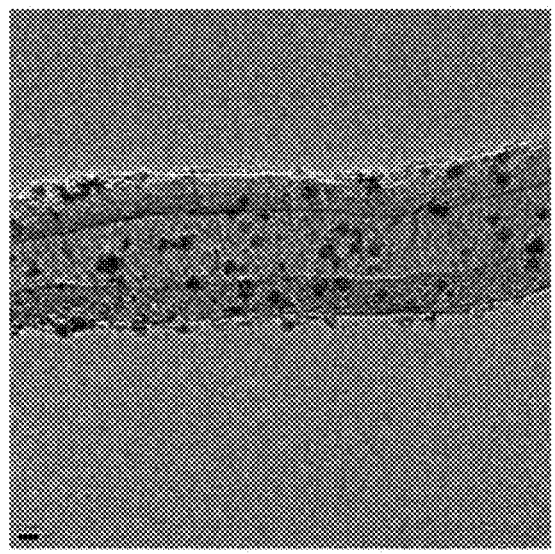
Figure 11A:
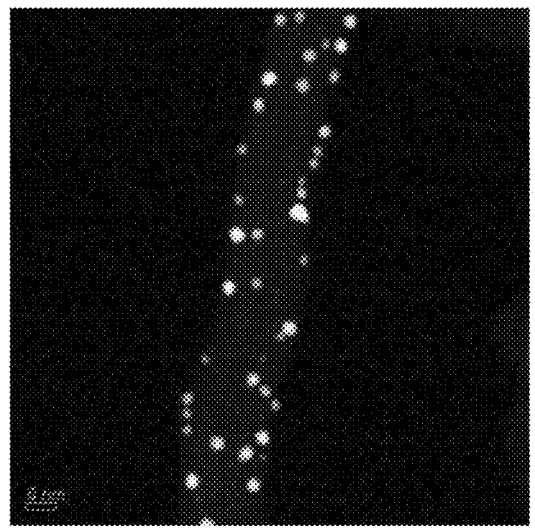
Figure 11B:
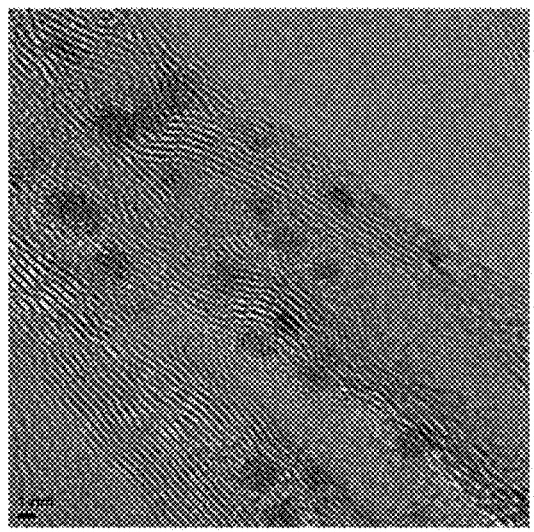

FIGS. 10A to 11B illustrate a catalyst structure having Pt nanostructured catalyst particles dispersed in a carbon nanotube support, acquired in Experimental Example 2. Specifically, FIGS. 10A and 11B are an STEM image and an HRTEM image of the acquired catalyst structure.

Meanwhile, the catalyst structure was acquired by varying the elevated temperature to 600° C. while the other conditions were constantly maintained. FIGS. 11A and 11B illustrate an STEM image and an HRTEM image of the acquired catalyst structure.

It was confirmed from FIGS. 10A to 11B that Pt nanoparticles were very uniformly dispersed on surfaces of multi-walled carbon nanotubes. When the reaction temperature was 300° C., Pt nanoparticles having a size of approximately 1 to 1.5 nm were uniformly synthesized on surfaces of the multi-walled carbon nanotubes (FIGS. 10A and 10B). When the reaction temperature was 600° C., Pt nanoparticles having an increased diameter of approximately 2 nm were synthesized on surfaces of the multi-walled carbon nanotubes (FIGS. 11A and 11B).

Experimental Example 3

Figure 12A:
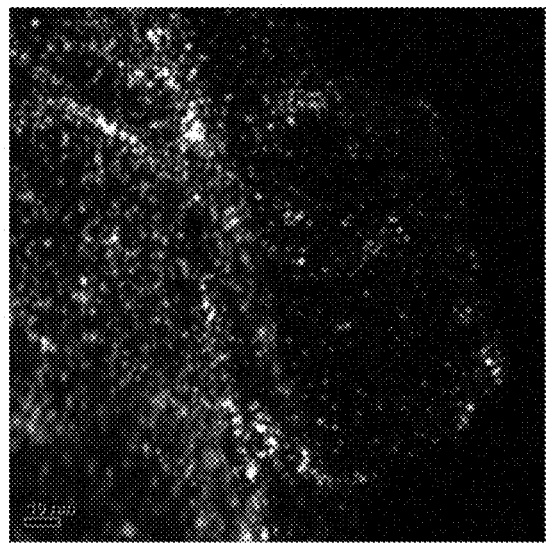
FIGS. 12A to 13B illustrate a catalyst structure having Pt nanostructured catalyst particles dispersed in graphenes acquired in Experimental Example 3, specifically FIGS. 12A and 12B illustrating STEM and HRTEM images of the catalyst structure synthesized at 300° C., respectively, and FIGS. 13A and 13B illustrating STEM and HRTEM images of the catalyst structure synthesized at 600° C., respectively.
Figure 12B:
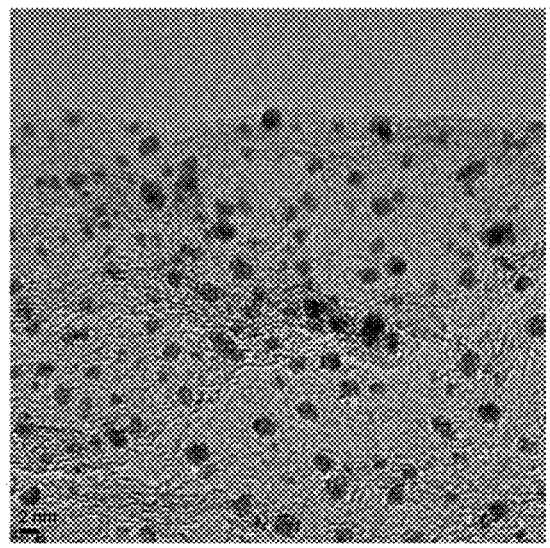

Graphenes spheres having a thickness of approximately 1.6 nm and a diameter of approximately 5 μm and constructed in a layered structure having 1 to 3 layers as a 2-dimensional support and trimethyl(methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 20 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the graphene support was acquired. FIGS. 12A and 12B illustrate an STEM image and an HRTEM image of the acquired catalyst structure.

Figure 13A:
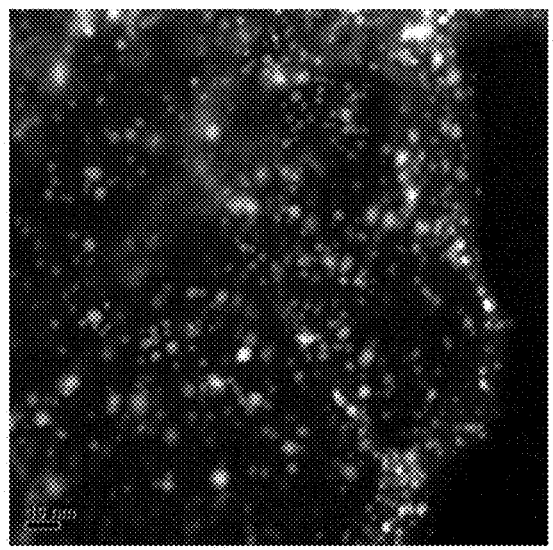
Figure 13B:
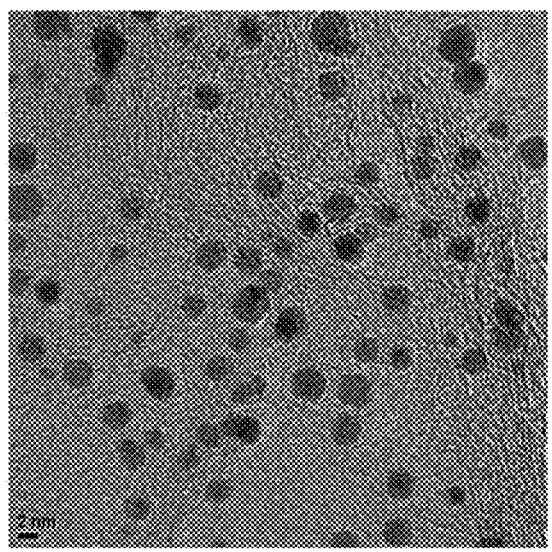

Meanwhile, the catalyst structure was acquired by varying the elevated temperature to 600° C. while the other conditions were constantly maintained. FIGS. 13A and 13B illustrate an STEM image and an HRTEM image of the acquired catalyst structure.

It was confirmed from FIGS. 12A to 13B that Pt nanoparticles were very uniformly dispersed on surfaces of graphenes. When the reaction temperature was 300° C., approximately 1 to 1.5 nm sized Pt nanoparticles were uniformly synthesized on the surfaces of the graphenes (FIGS. 12A and 12B). When the reaction temperature was 600° C., Pt nanoparticles having an increased particle size of approximately 2 nm were synthesized on the surfaces of the graphenes (FIGS. 13A and 13B).

Experimental Example 4

Figure 14A:
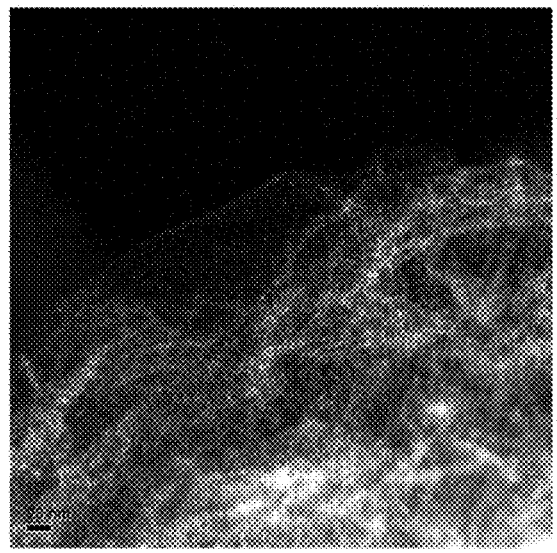
FIGS. 14A and 14B illustrate a catalyst structure having Pt nanostructured catalyst particles dispersed in N-doped graphenes acquired in Experimental Example 4, specifically illustrating STEM and HRTEM images of the acquired catalyst structure, respectively.
Figure 14B:
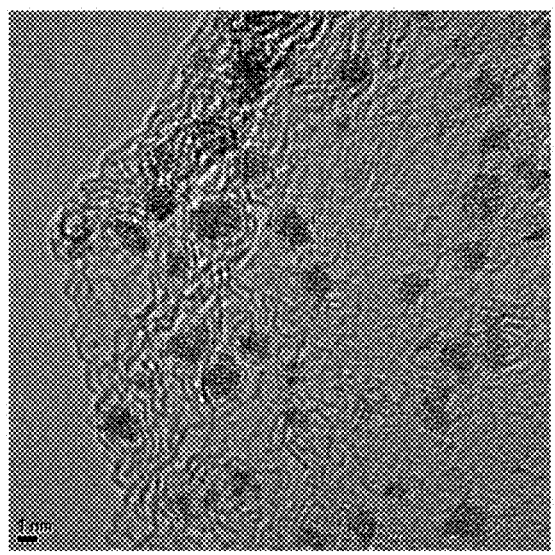

Approximately 1.5 nm thick and approximately 5 μm sized N-doped graphenes spheres having a layered structure of 1 to 3 layers as a 2-dimensional support and trimethyl (methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 20 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the N-doped graphene support was acquired. FIG. 14A illustrates an STEM image and an HRTEM image of the catalyst structure and FIG. 14B illustrates an HRTEM image of the catalyst structure. It was confirmed from FIGS. 14A and 14A that Pt nanoparticles were very uniformly dispersed on surfaces of N-doped graphenes.

Experimental Example 5

Figure 15A:
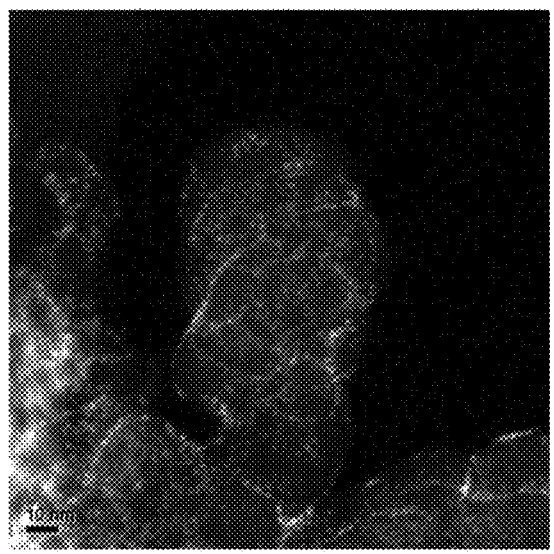
FIGS. 15A to 16B illustrate a catalyst structure having Pt nanostructured catalyst particles dispersed in mesoporous carbon nanoparticles acquired in Experimental Example 5, specifically FIGS. 15A and 15B illustrating STEM and HRTEM images of the catalyst structure synthesized at 300° C., and FIGS. 16A and 16B illustrating STEM and HRTEM images of the catalyst structure synthesized at 600° C.
Figure 15B:

Graphitized mesoporous carbon nanoparticles having a diameter of approximately 500 nm or less as a support and trimethyl(methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 15 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in a mesoporous carbon nanoparticle support was acquired. FIGS. 15A and 15B illustrate an STEM image and an HRTEM image of the acquired catalyst structure.

Figure 16A:
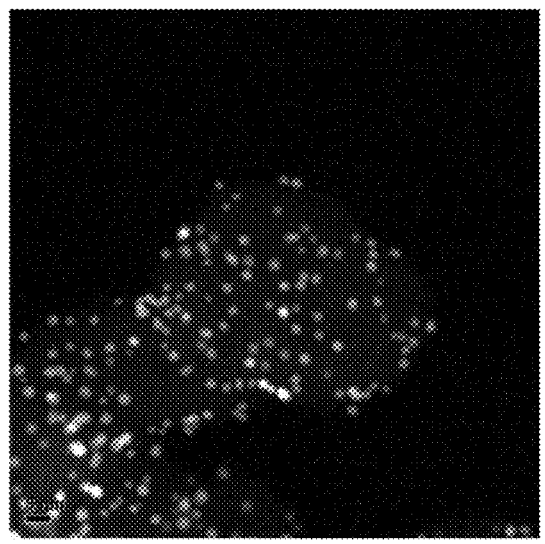
Figure 16B:
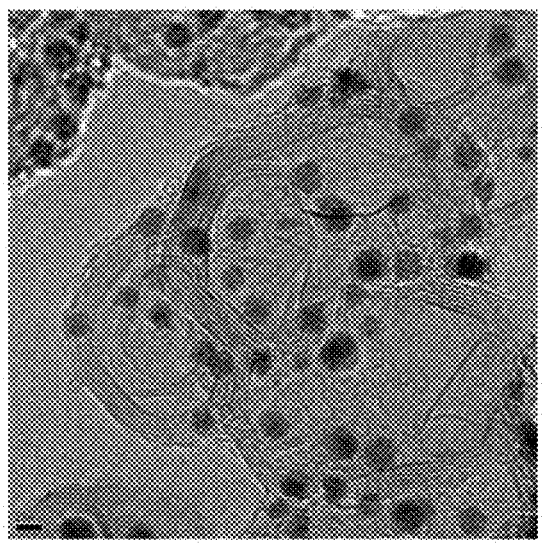

Meanwhile, the catalyst structure was acquired by varying the elevated temperature to 600° C. while the other conditions were constantly maintained. FIGS. 16A and 16B illustrate an STEM image and an HRTEM image of the acquired catalyst structure.

It was confirmed from FIGS. 15A to 16B that that Pt nanoparticles were very uniformly dispersed on surfaces of mesoporous carbon nanoparticles. When the reaction temperature was 300° C., approximately 1 to 1.5 nm sized Pt nanoparticles were uniformly synthesized on the surfaces of mesoporous carbon nanoparticles (FIGS. 15A and 15B). When the reaction temperature was 600° C., Pt nanoparticles having an increased diameter of approximately 2 nm were synthesized on surfaces of the mesoporous carbon nanoparticles (FIGS. 16A and 16B).

Experimental Example 6

Figure 17:
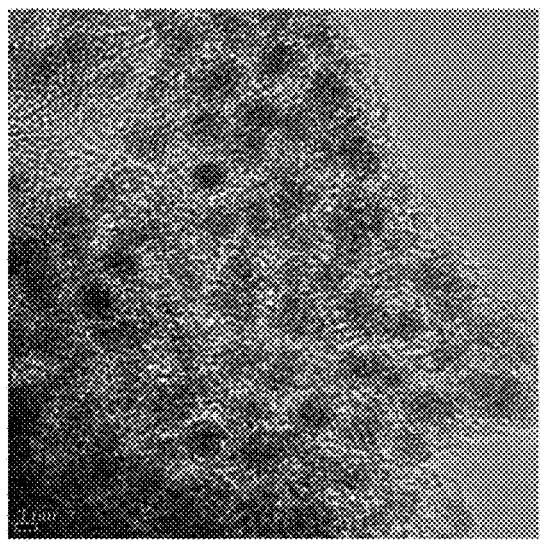
FIGS. 17 and 18 illustrate a catalyst structure having Pt nanostructured catalyst particles dispersed in carbon black acquired in Experimental Example 6, specifically HRTEM images of the catalyst structures synthesized at 300° C. and 600° C.

Carbon black having a diameter of approximately 50 nm or less as a support and trimethyl(methylcyclopentadienyl) Pt(IV) ($C_5H_4CH_3Pt(CH_3)_3$) as a Pt based catalyst source (precursor) were supplied into a reactor under room temperature and atmospheric pressure conditions, such that Pt metal content became 20 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in a carbon black support was acquired. FIG. 17 illustrates an HRTEM image of the acquired catalyst structure.

Figure 18:
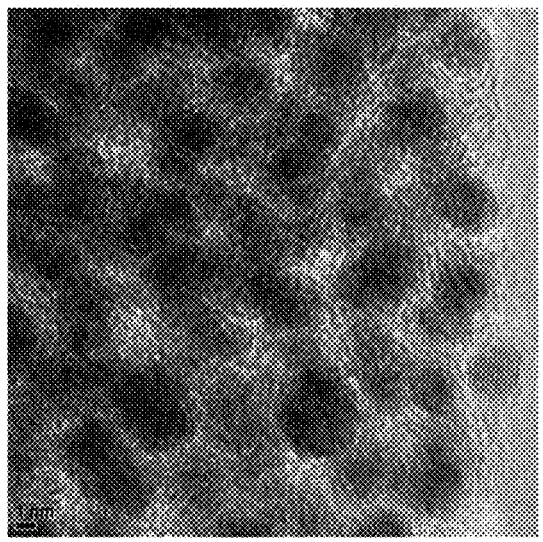

Meanwhile, the catalyst structure was acquired by varying the elevated temperature to 600° C. while the other conditions were constantly maintained. FIG. 18 illustrates an HRTEM image of the acquired catalyst structure.

It was confirmed from FIGS. 17 and 18 that Pt nanoparticles were very uniformly dispersed on a surface of a carbon black support. When the reaction temperature was 300° C., approximately 1 to 1.5 nm sized Pt nanoparticles were uniformly synthesized on the surface of the carbon black support (FIG. 17). When the reaction temperature was 600° C., Pt nanoparticles having an increased diameter of approximately 2 nm were synthesized on the surface of the carbon black support (FIG. 18).

Experimental Example 7

100 nm sized Cu/N doped carbon core/shell including a 20 nm thick N doped carbon shell as a support and trimethyl (methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 15 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in Cu/N doped carbon core/shell was acquired.

Figure 19A:
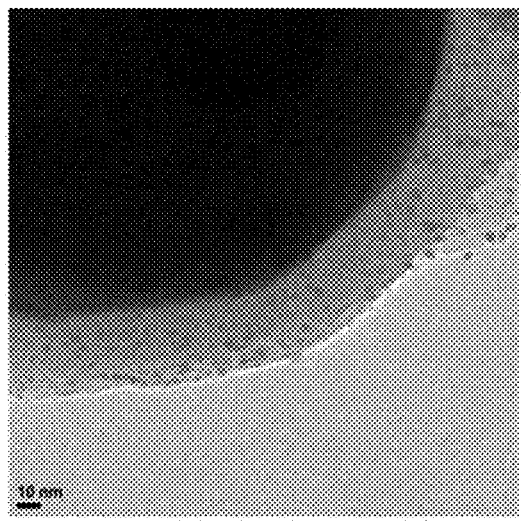
FIGS. 19A to 19D illustrate a catalyst structure having Pt nanostructured catalyst particles dispersed in surfaces of the Cu/N doped carbon core/shell acquired in Experimental Example 7, specifically FIGS. 19A and 19B illustrating HRTEM images of the acquired catalyst structure, FIG. 19C illustrating an FFT pattern, and FIG. 19D illustrating an EDX graph.
Figure 19B:
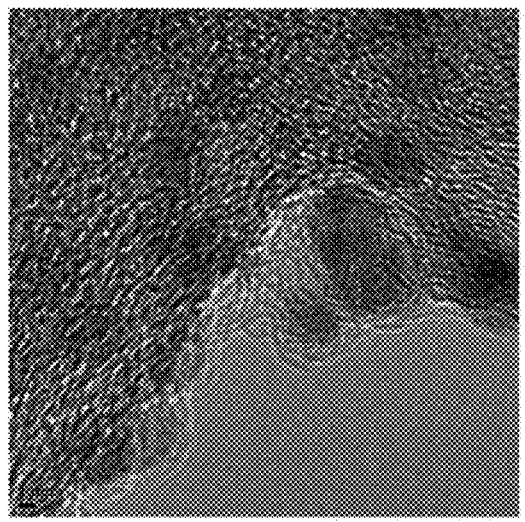
Figure 19C:
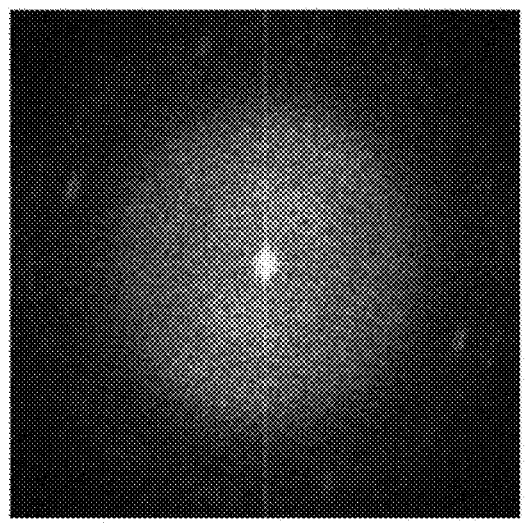
Figure 19D:
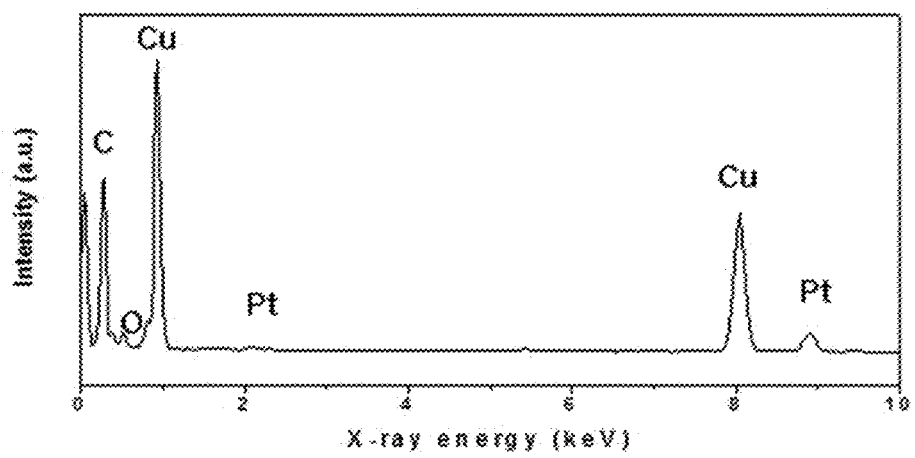

FIGS. 19A and 19B illustrate HRTEM images of the catalyst structure after Pt nanoparticles are dispersed. It was confirmed from FIGS. 19A and 19B that approximately 1.5 to 2 nm sized Pt nanostructured catalyst particles were uniformly synthesized on a surface of the Cu/N doped carbon core/shell. FIG. 19C illustrates an FFT pattern, from which a (111) crystallographic plane of a pure single crystal Pt metal and a (111) crystallographic plane of a Cu metal are identified. FIG. 19D is an EDX graph, from which Cu, C, N, and Pt components observed from the acquired resultant product are identified. In addition, oxygen (O) is presumably derived from a surface oxidation layer.

Experimental Example 8

A 100 nm sized $Fe_3O_4$/N doped carbon core/shell including a 20 nm thick N doped carbon shell as a support and trimethyl(methylcyclopentadienyl)Pt(IV) ($C_5H_4CH_3Pt(CH_3)_3$) as a Pt based catalyst source (precursor) were supplied into a reactor under room temperature and atmospheric pressure conditions, such that Pt metal content became 15 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the $Fe_3O_4$/N doped carbon core/shell was acquired.

Figure 20A:
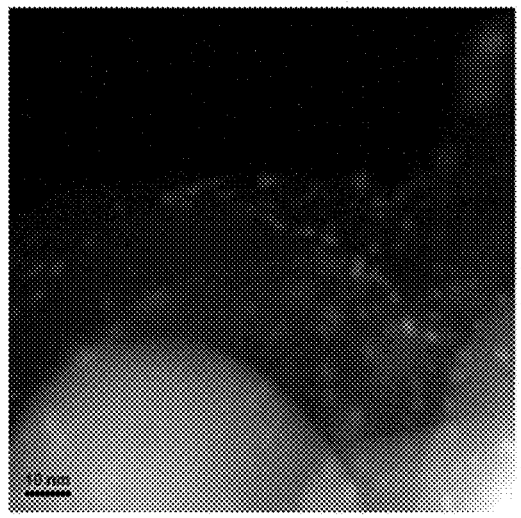
FIGS. 20A to 20D illustrate a catalyst structure having Pt nanostructured catalyst particles dispersed in $Fe_3O_4$/N doped carbon core/shell acquired in Experimental Example 8, specifically FIGS. 20A and 20B illustrating STEM and HRTEM images, FIG. 20C illustrating a photograph showing that the catalyst structure is drawn by a magnet due to magnetic components of the acquired catalyst structure, and FIG. 20D illustrating an EDX graph.
Figure 20B:
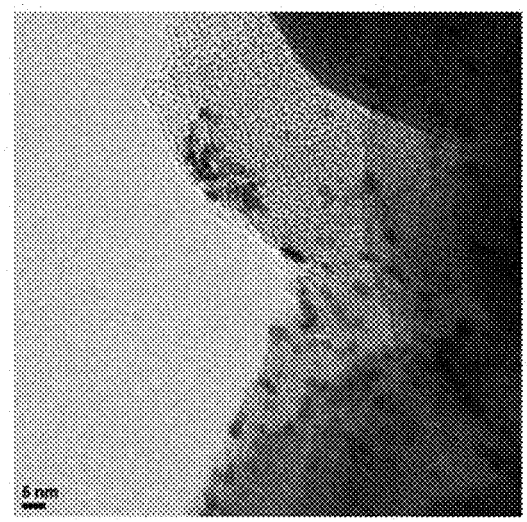
Figure 20C:
Figure 20D:
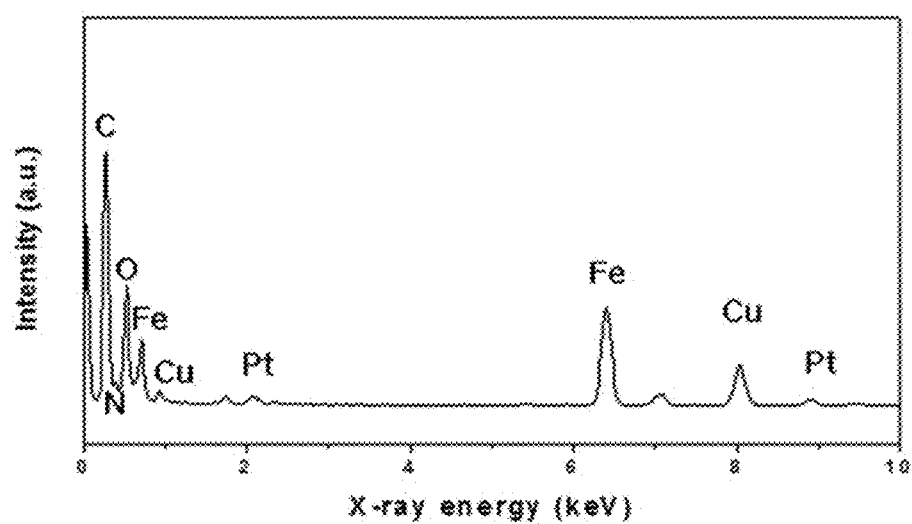

FIG. 20A illustrates a STEM image after Pt nanoparticles were very uniformly dispersed in $Fe_3O_4$/N doped carbon core/shell. FIG. 20B illustrates an HRTEM image after 1.5 to 2 nm sized Pt nanostructured catalyst particles were very uniformly dispersed on surfaces of the $Fe_3O_4$/N doped carbon core/shell. FIG. 20C illustrates a photograph showing that the catalyst structure is drawn by a magnet due to magnetic components of the acquired catalyst structure. FIG. 20D illustrates an EDX graph. It was confirmed from FIG. 20D that Fe, O, C, N, and Pt components were identified from the acquired catalyst structure. In FIG. 20D, Cu indicates TEM grid peaks.

Experimental Example 9

A catalyst structure having Pt nanostructured catalyst particles dispersed in a carbon sphere support was acquired in the same manner as in Experimental Example 1, except that Pt metal content became 50 wt %, based on the total weight of the catalyst structure.

Figure 21:
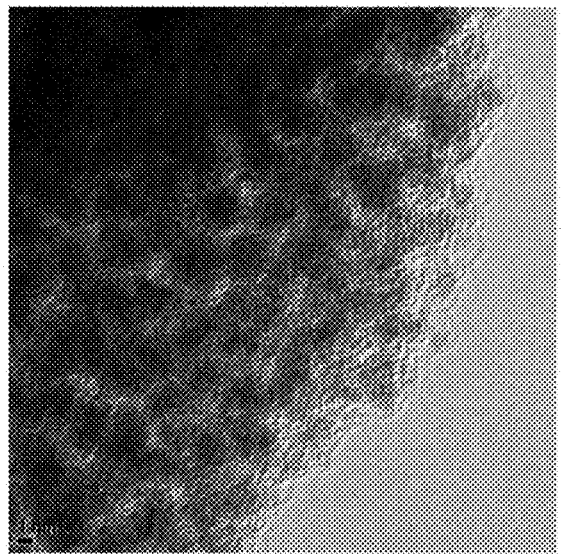
FIG. 21 illustrates an HRTEM image of a catalyst structure having Pt nanostructured catalyst particles dispersed in a carbon sphere support, such that Pt metal content is 50 wt %, based on the total weight of the catalyst structure.

It was confirmed from FIG. 21 that approximately 1 to 1.5 nm sized Pt nanoparticles were very uniformly dispersed on surfaces of carbon spheres. While the Pt nanoparticles are synthesized in a high dispersion density so as to entirely cover the surfaces of the carbon spheres, it was confirmed that the Pt nanoparticles having a uniform size were synthesized on a surface of a support with little agglomeration of particles, which is presumably caused by the shell thinly formed on a surface of a catalyst. Accordingly, it is understood that the dispersion density can be easily controlled by controlling the content of a catalyst source.

Experimental Example 10

A catalyst structure having Pt nanostructured catalyst particles dispersed in a carbon sphere support was acquired in substantially the same manner as in Experimental Example 1, except that only synthesis temperatures were varied to 200° C., 300° C., 400° C., 500° C., and 600° C., as listed in Table 1, followed by measuring sizes (diameters) of Pt nanostructured catalyst particles.

TABLE 1

| Experimental Example | Synthesis temperature (° C.) | Pt nanoparticle size (nm) |
|---|---|---|
| 10-1 | 200 | Less than 1.0 nm |
| 10-2 | 300 | 1.0~1.5 nm |
| 10-3 | 400 | 1.5 nm |
| 10-4 | 500 | 1.5~2.0 nm |
| 10-5 | 600 | 2.0 nm |

Figure 22A:
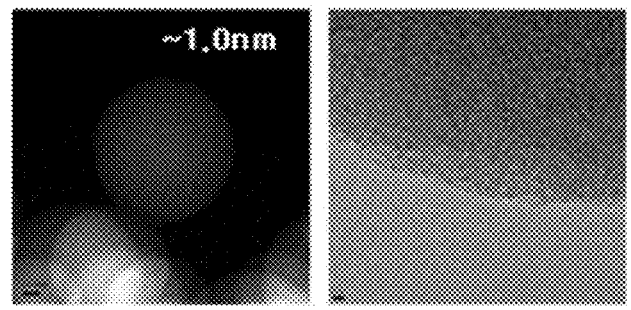
FIGS. 22A to 22E illustrate STEM images (left) and HRTEM images (right) of catalyst structures acquired in Experimental Examples 10-1 to 10-5.
Figure 22B:
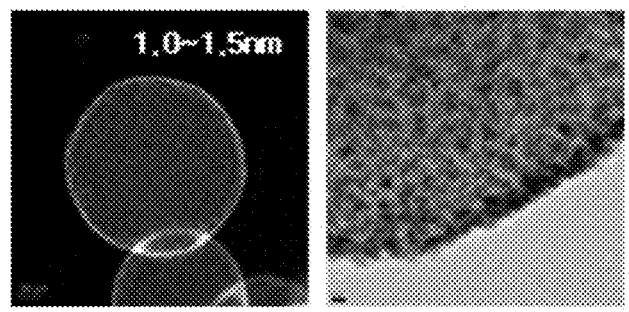
Figure 22C:
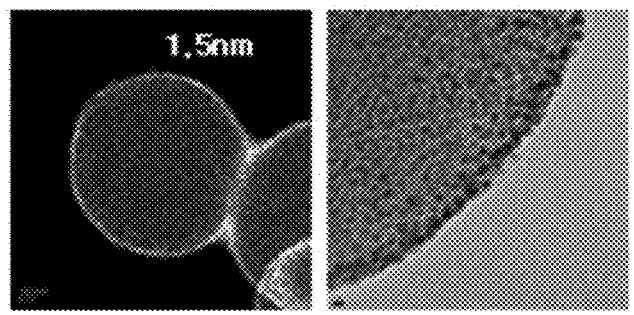
Figure 22D:
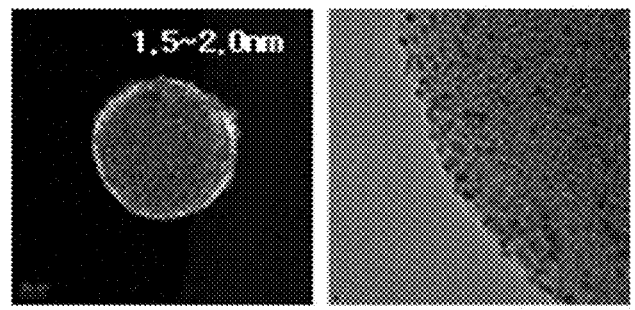
Figure 22E:
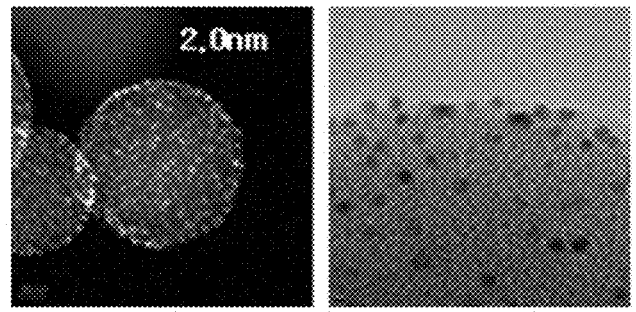

FIGS. 22A to 22E illustrate STEM images (left) and HRTEM images (right) of catalyst structures acquired in Experimental Examples 10-1 to 10-5. While very small black spots present within a crystallographic plane of the carbon sphere catalyst at a synthesis temperature of 200° C. were vaguely identified from the HRTEM image illustrated in FIG. 22A, Pt nanoparticles having a diameter of less than 1 nm and dispersed very sparsely on surfaces of the carbon spheres were clearly identified from the STEM images, which are images for density differences between two materials of carbon (C) and platinum (Pt). However, from the standpoint of dispersion density, it was confirmed that the supplied Pt sources were not completely used in the reaction for catalyst synthesis at a synthesis temperature of 200° C. Referring to FIG. 22B, it was confirmed that the catalyst structure included Pt nanoparticles having a uniform size and synthesized in a high dispersion density at a synthesis temperature of 300° C. Specifically, the Pt nanoparticle size was in the range of approximately 1 nm to 1.5 nm. It was also confirmed that a relatively vigorous reaction of the supplied Pt source was carried out from a standpoint of the dispersion density of the catalyst structure synthesized at 200° C. Referring to FIG. 22C, it was confirmed that Pt nanoparticles had a uniform size at a synthesis temperature of 400° C. and were synthesized in a high dispersion density. Specifically, the Pt nanoparticle size was approximately 1.5 nm. Referring to FIG. 22D, it was confirmed that the catalyst structure included Pt nanoparticles having a uniform size and synthesized in a high dispersion density at a synthesis temperature of 500° C. Specifically, the Pt nanoparticle size was in the range of approximately 1.5 nm to 2.0 nm. Referring to FIG. 22E, it was confirmed that the catalyst structure included Pt nanoparticles having a uniform size and synthesized in a high dispersion density at a synthesis temperature of 600° C. Specifically, the Pt nanoparticle size was approximately 2.0 nm. In Experimental Examples 10-1 to 10-5, it was confirmed that Pt nanoparticle sizes were increased and distances among the Pt nanoparticles were increased as the synthesis temperatures were elevated. This is consequent on the reduced dispersion density of the Pt nanoparticles because the distances among the Pt nanoparticles on the surface of support were naturally increased when the Pt nanoparticles having a uniform size were synthesized under the condition that Pt sources were supplied in the same amount.

Experimental Example 11

As listed in Table 2, a catalyst structure having Pt nanostructured catalyst particles dispersed in a carbon sphere support was acquired in substantially the same manner as in Experimental Example 3, except that amounts of Pt based catalyst sources were varied to 10 wt %, 20 wt %, and 70 wt %, followed by measuring dispersion densities of the Pt nanostructured catalyst particles.

TABLE 2

| Experimental Example | Content of Pt based catalyst source (wt %) | Dispersion density |
|---|---|---|
| 11-1 | 10 | Low |
| 11-2 | 20 | Intermediate |
| 11-3 | 70 | High |

Figure 23A:
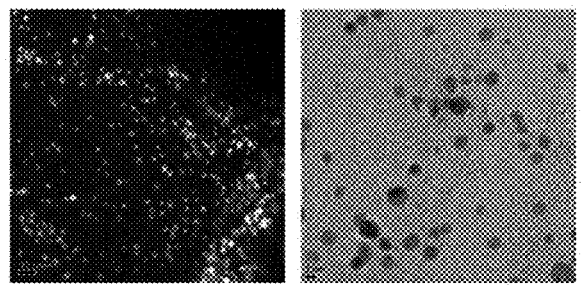
FIGS. 23A to 23C illustrate STEM images (left) and HRTEM images (right) of catalyst structures acquired in Experimental Examples 11-1 to 11-3.
Figure 23B:
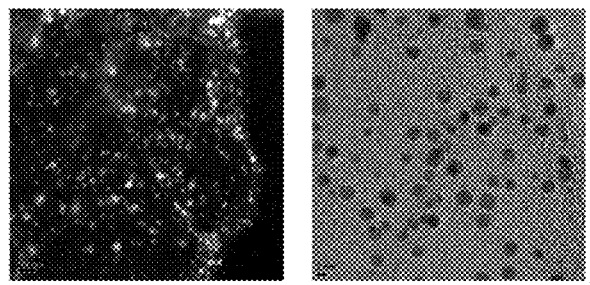
Figure 23C:
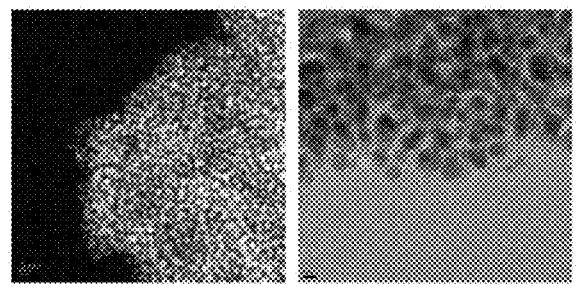
Figure 24A:
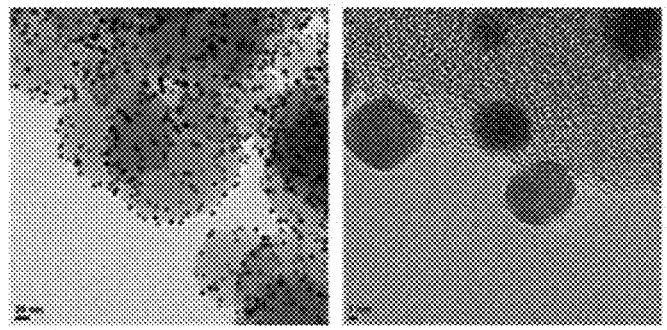
FIGS. 24A to 24e illustrate HRTEM images (left) and enlarged images (right) of catalyst structures acquired in Experimental Examples 12-1 to 12-5.
Figure 24B:
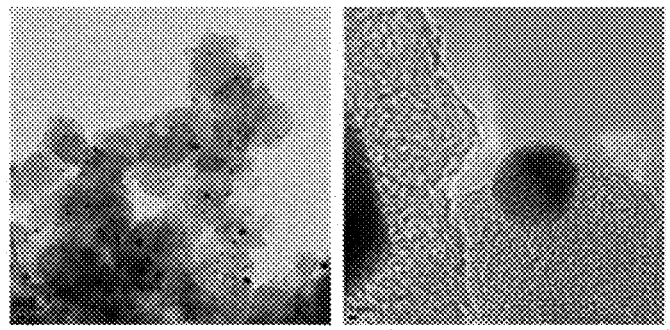
Figure 24C:
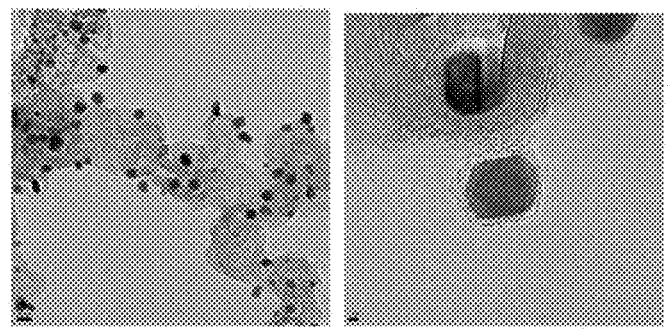
Figure 24D:
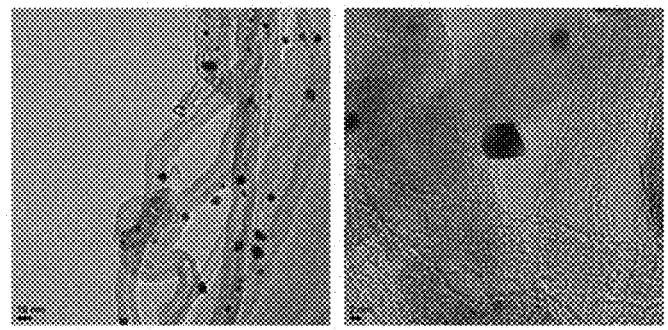
Figure 24E:
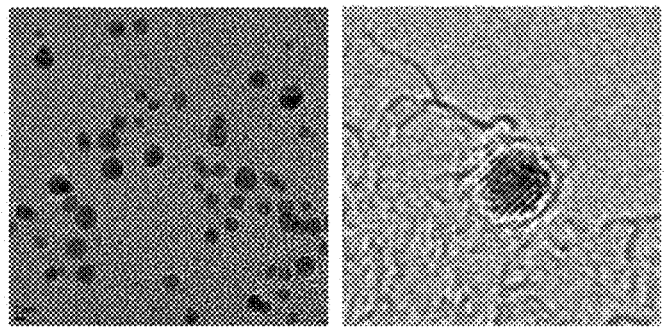

FIGS. 23A to 23C illustrate STEM images (left) and HRTEM images (right) of catalyst structures acquired in Experimental Examples 11-1 to 11-3. It was confirmed from FIG. 23A, Pt nanoparticles having a very uniform size were dispersed on surfaces of graphenes. It was confirmed from FIG. 23B that the dispersion density of Pt coated was further increased without a change in the Pt nanoparticle size. It was confirmed from FIG. 23C that surfaces of the graphenes were almost entirely covered by the coated Pt without a change in the Pt nanoparticle size. Accordingly, it can be understood that the dispersion density of the Pt nanoparticles was increased in proportion to the increased content of the precursor used without a change in the Pt nanoparticle size even if the content of the Pt source (precursor) was increased.

Experimental Example 12

In order to investigate whether Pt nanostructured catalyst particles of a catalyst structure can be coated with an N-doped carbon shell, the catalyst structure was synthesized by N-doping using different conditions listed in Table 3 below. An N-doped catalyst structure was acquired by allowing the reaction to take place using pyridine ($C_5H_5N$) as an N-doped carbon shell source at a synthesis temperature of 600° C. for 1 hour.

TABLE 3

| Experimental Example | Support | Content of Pt based catalyst source (wt %) | Reactor volume: Content of N-doped carbon shell source (vol %) |
|---|---|---|---|
| 12-1 | Carbon spheres | 15 | 1:0.01 |
| 12-2 | Carbon black | 15 | 1:0.01 |
| 12-3 | Graphitized mesoporous carbon | 15 | 1:0.01 |
| 12-4 | Carbon nanotubes | 15 | 1:0.01 |
| 12-5 | Graphenes | 15 | 1:0.01 |

FIGS. 24A to 24E illustrate HRTEM images (left) and enlarged images (right) of catalyst structures acquired in Experimental Examples 12-1 to 12-5. Referring to FIGS. 24A to 24e, it can be confirmed that the catalyst structures include Pt coated on surfaces of catalysts well capsulated by one or two graphite layers, irrespective of the kind of the support used. It was confirmed that sizes of Pt nanoparticles synthesized at a reaction temperature of 600° C. were increased to approximately 4 nm to approximately 5 nm, compared to 1.5 nm sized Pt nanoparticles synthesized at a reaction temperature of 300° C., while maintaining distribution uniformity.

Experimental Example 13

A glassy carbon sphere having a diameter of approximately 200 nm as a support and platinum (II) acetylacetonate ($PtC_{10}H_{14}O_4$) as a Pt based catalyst source (precursor) were supplied into a reactor under room temperature and atmospheric pressure conditions, such that Pt metal content became 15 wt %, based on the total weight of the catalyst structure. The reactor was perfectly sealed and the temperature of the reactor was elevated up to 350° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the carbon sphere support was acquired.

Figure 25A:
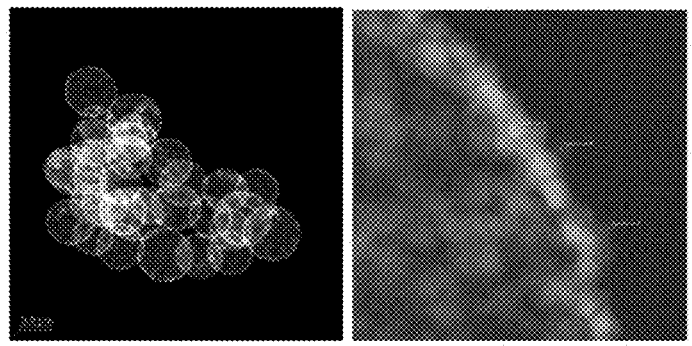
FIGS. 25A to 25D illustrate STEM images (left) and enlarged images (right) of a catalyst structure acquired in Experimental Example 13, specifically FIG. 25A illustrating an STEM image (left) and an enlarged image (right) of the acquired catalyst structure, FIG. 25B illustrating a TEM image (left) and an enlarged image (right) of the acquired catalyst structure, FIG. 25C illustrating an FFT pattern of the acquired catalyst structure, and FIG. 25D illustrating an EDX image of the acquired catalyst structure, respectively.
Figure 25B:
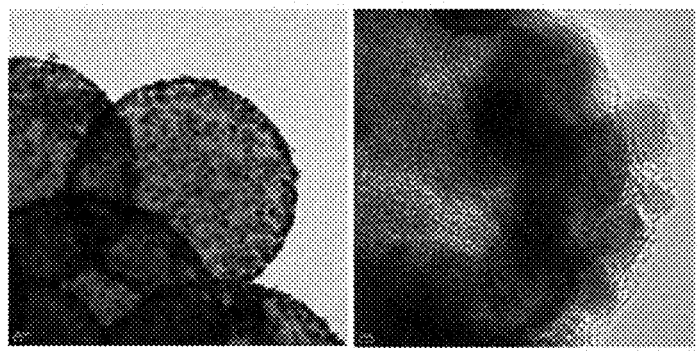
Figure 25C:
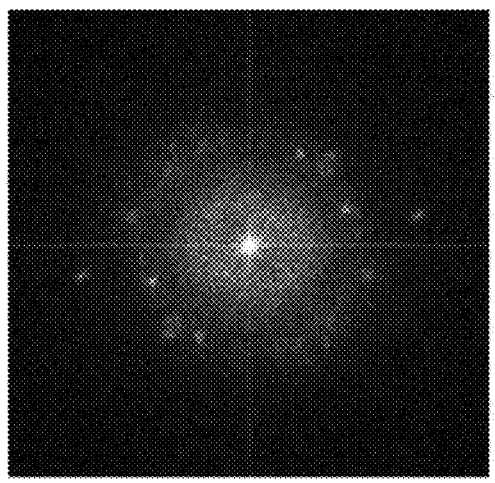
Figure 25D:
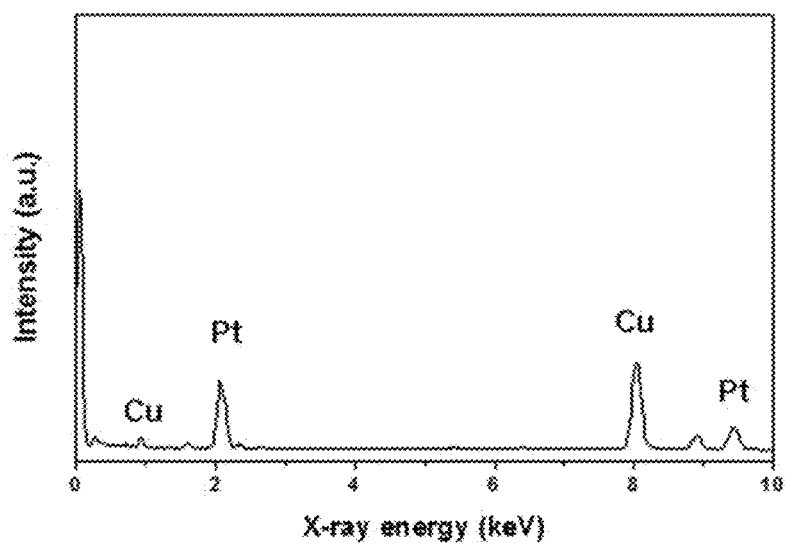

FIG. 25A illustrates an STEM image (left) and an enlarged image (right) of the acquired catalyst structure, in which Pt nanoparticles were uniformly dispersed on surfaces of carbon spheres. FIG. 25B illustrates a TEM image (left) and an enlarged image (right) of the acquired catalyst structure. It was confirmed from FIGS. 25A and 25B that 5 nm sized Pt nanoparticles were uniformly dispersed on surfaces of the carbon spheres. FIG. 25C illustrates an FFT pattern of the acquired catalyst structure, from which a (111) crystallographic plane of a pure single crystal Pt metal is identified. FIG. 25D illustrates an EDX image of the acquired catalyst structure, from which peaks of nanoparticles are identified.

Experimental Example 14

Multi-walled carbon nanotubes having a diameter of approximately 10 nm to approximately 20 nm and a length of 5 μm as a support and ruthenium (III) acetylacetonate ($Ru(C_5H_7O_2)_3$) as a Ru based catalyst source (precursor) were supplied into a reactor under room temperature and atmospheric pressure conditions, such that Ru metal content became 10 wt %, based on the total weight of the catalyst structure. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Ru nanostructured catalyst particles dispersed in the carbon nanotube support was acquired.

Figure 26A:
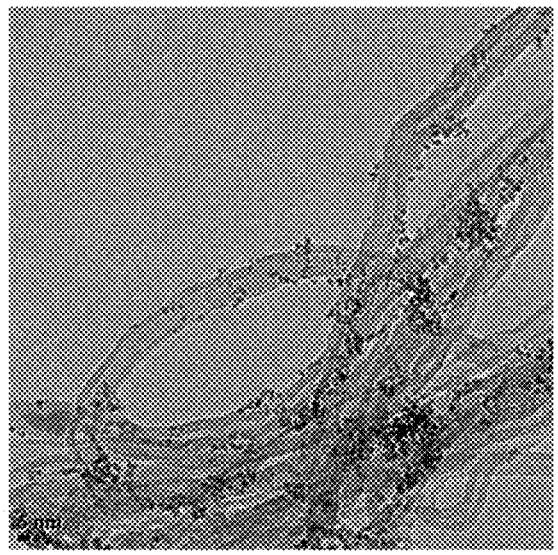
FIGS. 26A to 26E illustrate a catalyst structure having Ru nanostructured catalyst particles dispersed in a carbon nanotube support, acquired in Experimental Example 14, specifically illustrating a TEM image and an HRTEM image, and EDX images of the acquired catalyst structure, respectively.
Figure 26B:
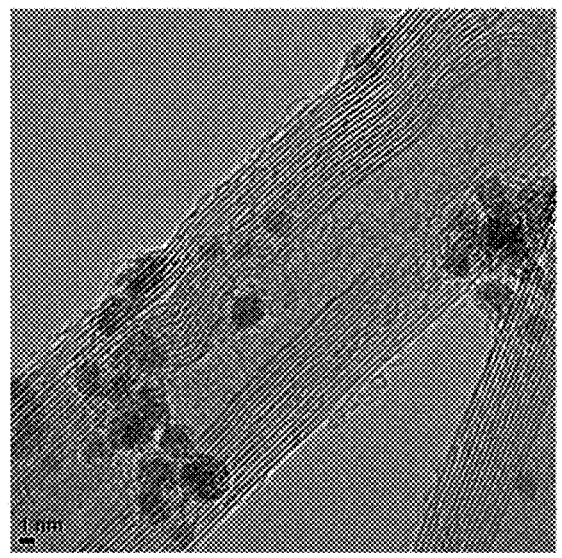
Figure 26C:
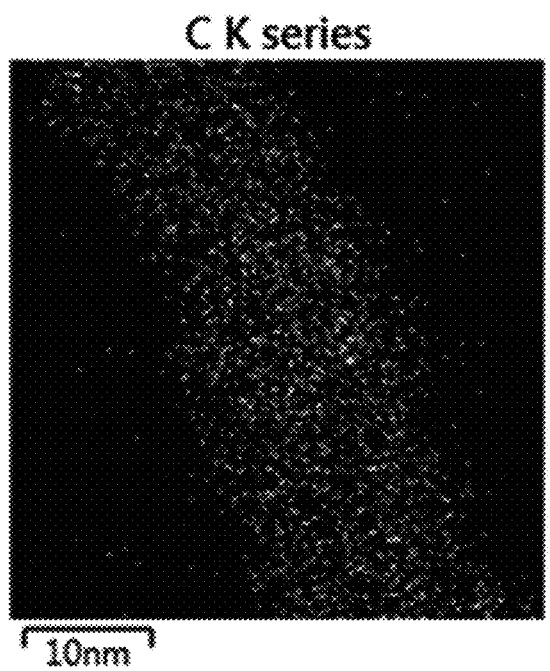
Figure 26D:
Figure 26E:
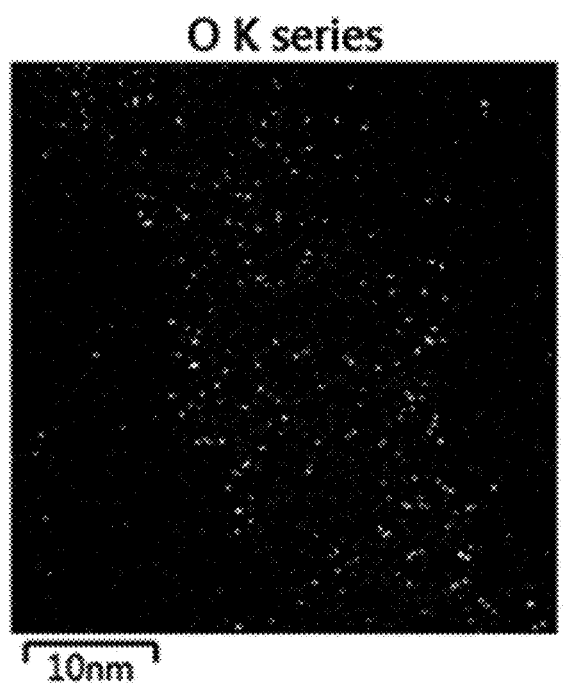

FIGS. 26A to 26E illustrate a catalyst structure acquired in Experimental Example 14. Specifically, FIG. 26A illustrates a TEM image of the acquired catalyst structure and FIG. 26B illustrates an HRTEM image of the acquired catalyst structure. It was confirmed from FIGS. 26A and 26B that 1 to 2 nm sized Ru nanostructured catalyst particles were uniformly dispersed in carbon nanotubes. FIGS. 26C to 26E illustrate EDX images of the acquired catalyst structure. Specifically, distribution of C components of carbon nanotubes is illustrated in FIG. 26C, distribution of Ru nanoparticles is illustrated in FIG. 26D, and a surface oxide layer of the final catalyst structure is illustrated in FIG. 26E.

Experimental Example 15

A glassy carbon sphere having a diameter of approximately 200 nm as a support and methylcyclopentadienyl(1,5-cyclooctadien)iridium(I) ($C_{14}H_{19}Ir$) as an Ir based catalyst source (precursor) were supplied into a reactor under room temperature and atmospheric pressure conditions, such that Ir metal content became 10 wt %, based on the total weight of the catalyst structure. The reactor was perfectly sealed and the temperature of the reactor was elevated up to 350° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Ir nanostructured catalyst particles dispersed in the carbon sphere support was acquired.

Figure 27A:
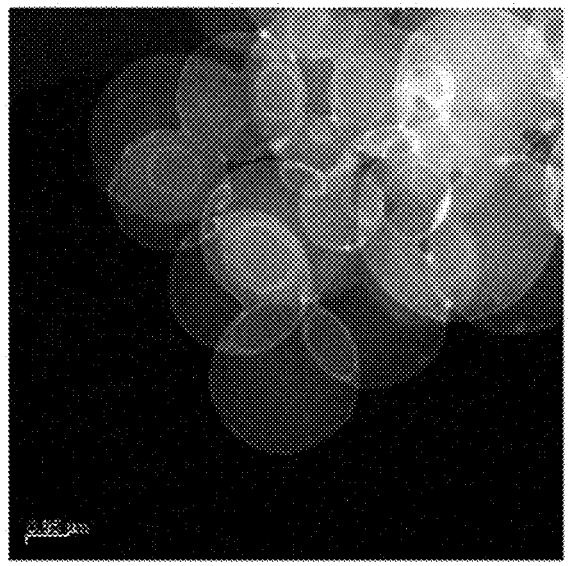
FIGS. 27A to 27E illustrate a catalyst structure acquired in Experimental Example 15, specifically illustrating an STEM image, an HRTEM image and EDX graphs of the acquired catalyst structure, respectively.
Figure 27B:
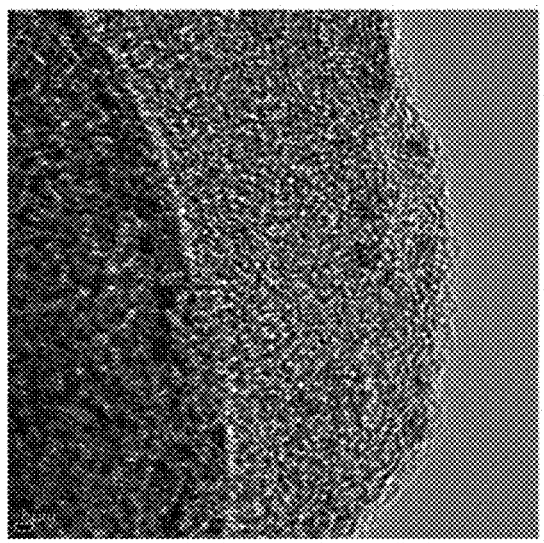
Figure 27C:
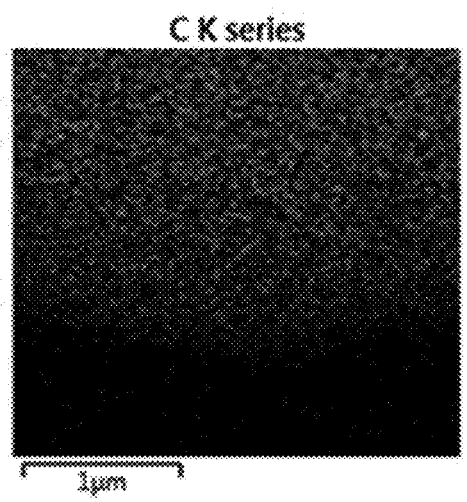
Figure 27D:
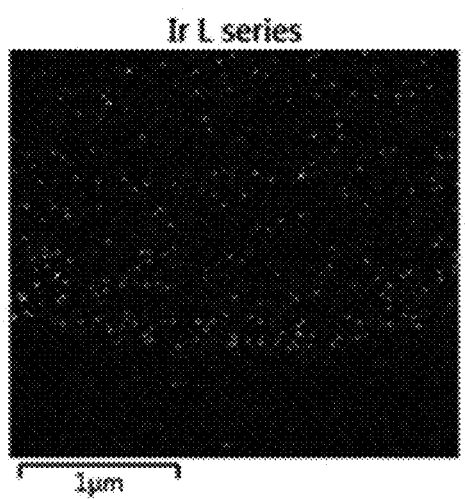
Figure 27E:
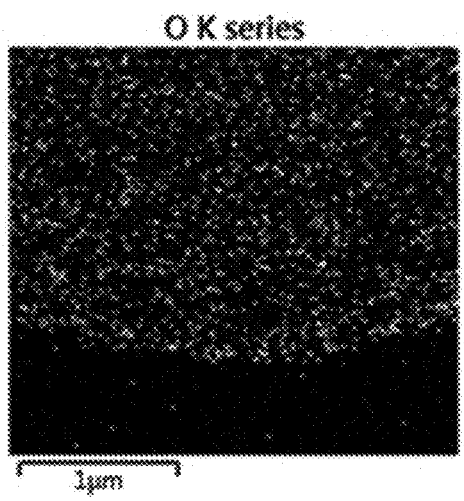

FIGS. 27A to 27E illustrate a catalyst structure acquired in Experimental Example 15. Specifically, FIG. 27A illustrates an STEM image of the acquired catalyst structure, and FIG. 27B illustrates an HRTEM image of the acquired catalyst structure. It was confirmed from FIGS. 27A and 27B that 1 nm sized Ir catalyst particles were uniformly dispersed on surfaces of carbon spheres. FIGS. 27C to 27E illustrate EDX graphs of the acquired catalyst structure. Specifically, distribution of C components of carbon spheres is illustrated in FIG. 27C, distribution of Ir nanoparticles is illustrated in FIG. 27D, and a surface oxide layer of the final catalyst structure is illustrated in FIG. 27E.

Experimental Example 16

In order to investigate whether catalyst structures can be produced in the same manner as in the case of a transition metal, the catalyst structures having nanostructured catalyst particles dispersed in a carbon sphere support were acquired in substantially the same manner as in Experimental Example 1, except that only transition metal catalyst sources are varied under the conditions listed in Table 4 below.

TABLE 4

| Experimental Example | Transition metal catalyst source (Metal content, wt %) |
|---|---|
| 16-1 | Ferrocene ($C_{10}H_{10}Fe$) (15 wt %) |
| 16-2 | Cobaltocene ($C_{10}H_{10}Co$) (15 wt %) |
| 16-3 | Nickelocene ($C_{10}H_{10}Ni$) (10 wt %) |

Figure 28A:
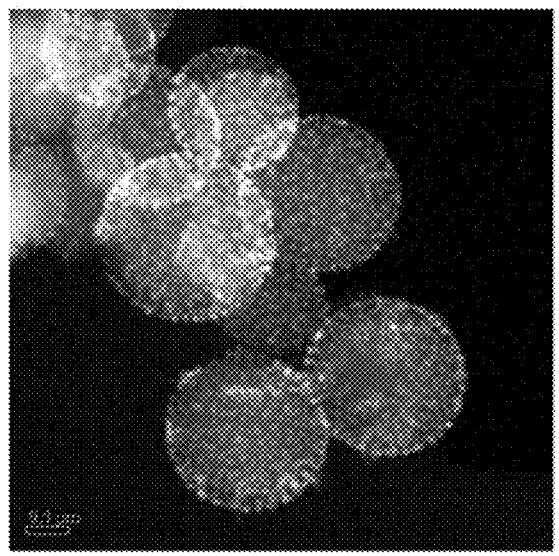
FIGS. 28A to 28D illustrate a catalyst structure acquired in Experimental Example 16-1, specifically illustrating an STEM, a TEM image, an HRTEM image and an EDX graph of the acquired catalyst structure, respectively.
Figure 28B:
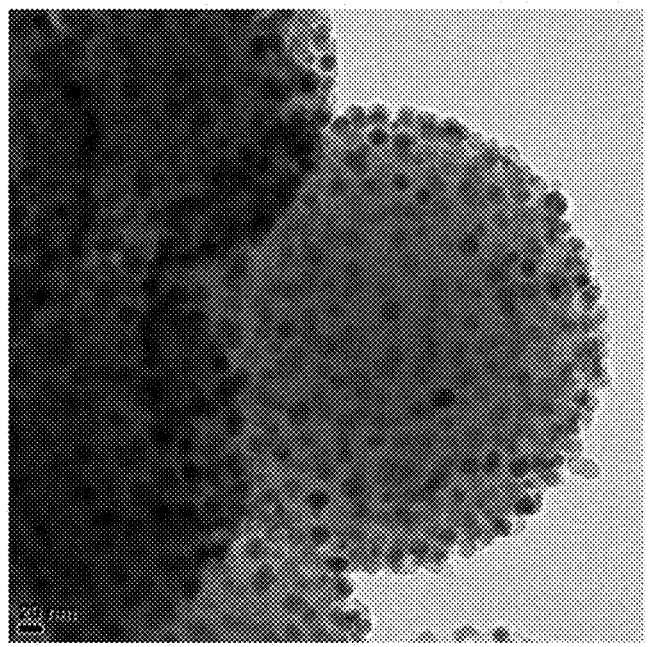
Figure 28C:
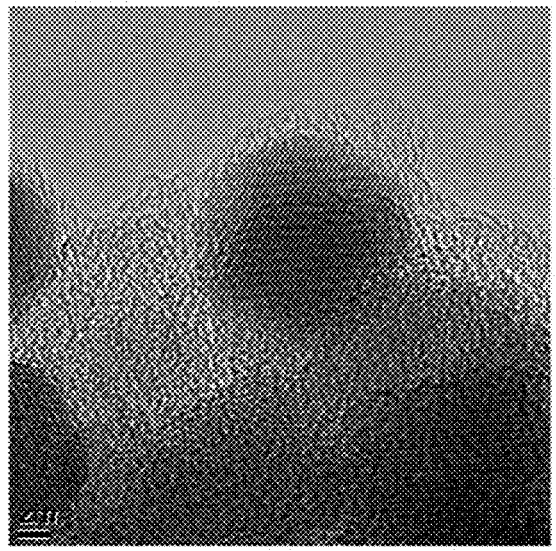
Figure 28D:
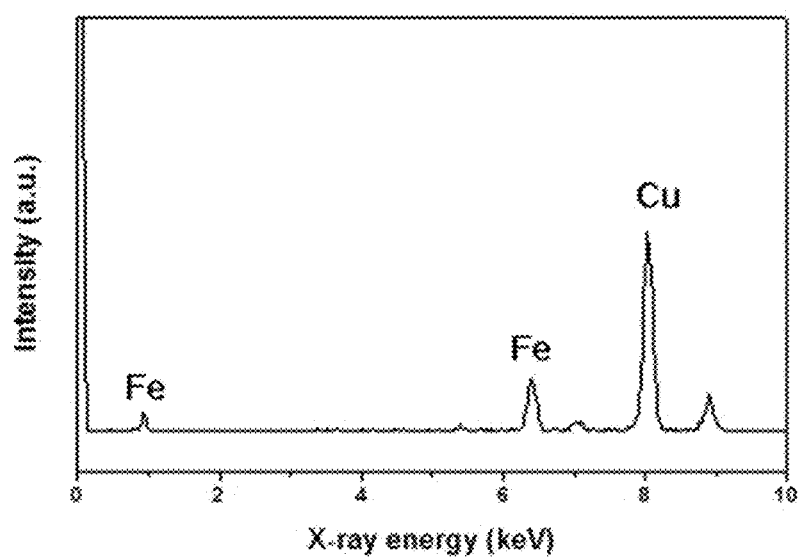

FIGS. 28A to 28D illustrate a catalyst structure acquired in Experimental Example 16-1. Specifically, FIG. 28A illustrates an STEM image of the acquired catalyst structure, FIG. 28B illustrates a TEM image of the acquired catalyst structure, and FIG. 28C illustrates an HRTEM image of the acquired catalyst structure. It was confirmed from FIGS. 28A to 28C that 5 to 10 nm sized Fe catalyst particles were uniformly dispersed on surfaces of carbon spheres. FIG. 28D is an EDX graph of the acquired catalyst structure, from which Fe peaks are identified. It is confirmed from FIGS. 28A to 28C that nanoparticles of the acquired catalyst structure include Fe nanoparticles.

Figure 29A:
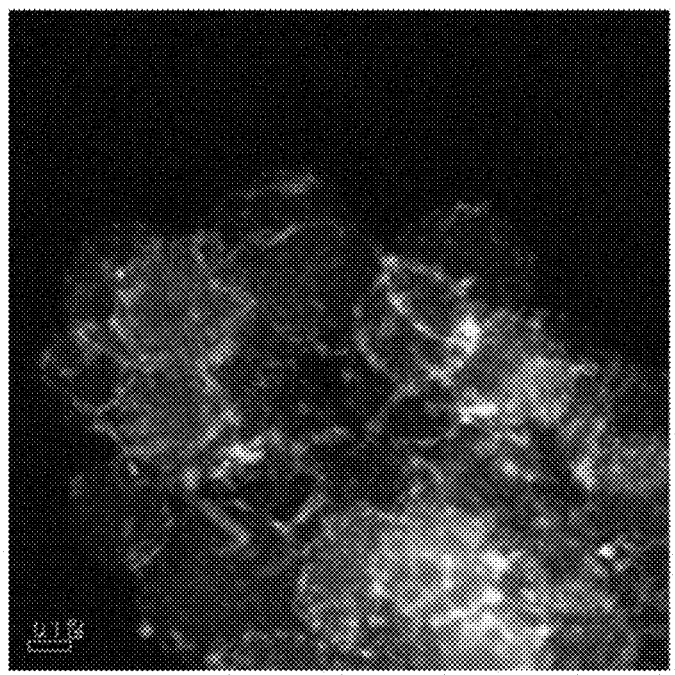
FIGS. 29A to 29D illustrate a catalyst structure acquired in Experimental Example 16-2, specifically illustrating an STEM, a TEM image, an HRTEM image and an EDX graph of the acquired catalyst structure, respectively.
Figure 29B:
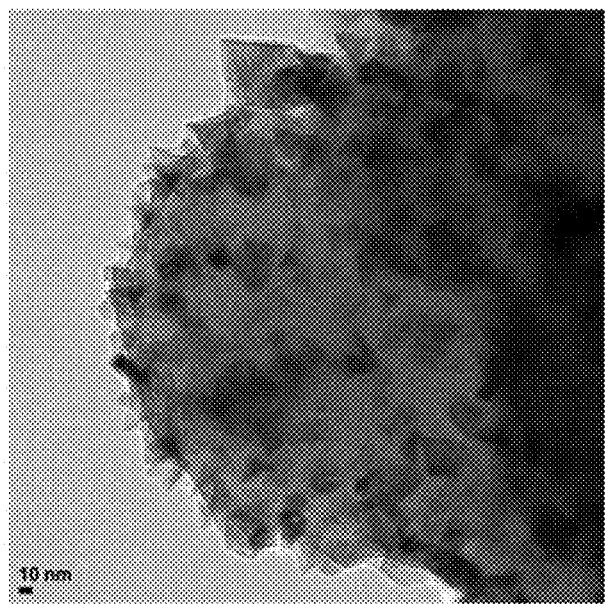
Figure 29C:
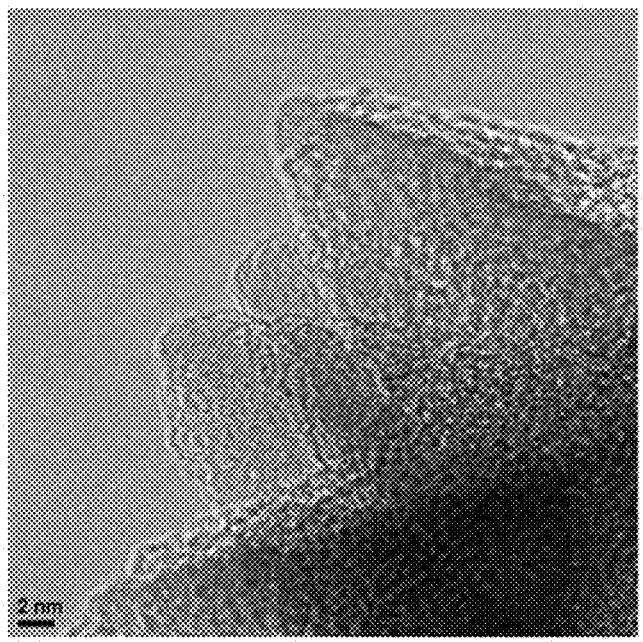
Figure 29D:
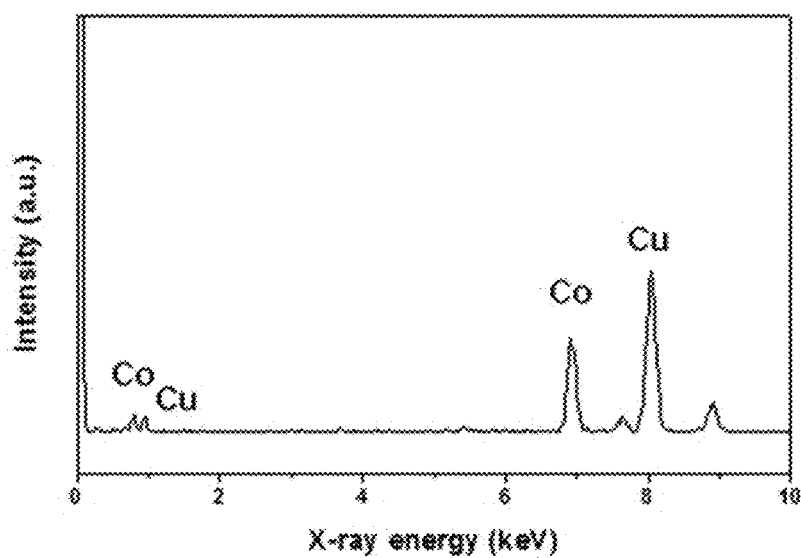

FIGS. 29A to 29D illustrate a catalyst structure acquired in Experimental Example 16-2, specifically illustrating STEM and HRTEM images of the acquired catalyst structure in which 10 to 30 nm sized Co catalyst particles are uniformly dispersed on surfaces of carbon spheres. FIG. 29D illustrates an EDX graph of the acquired catalyst structure, from which Co peaks are identified. It is confirmed from FIGS. 29A to 29C that nanoparticles of the acquired catalyst structure include Co nanoparticles.

Figure 30A:
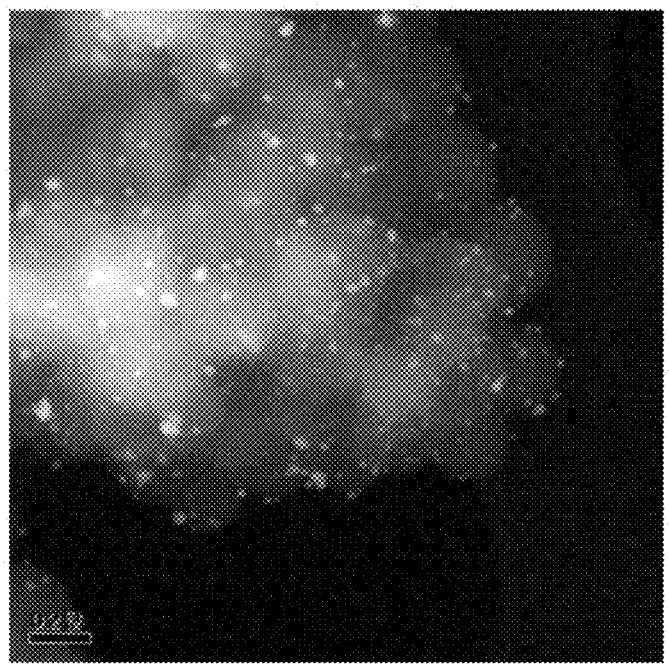
FIGS. 30A to 30D illustrate a catalyst structure acquired in Experimental Example 16-3, specifically illustrating an STEM image, a TEM image, an HRTEM image and an EDX graph of the acquired catalyst structure, respectively.
Figure 30B:
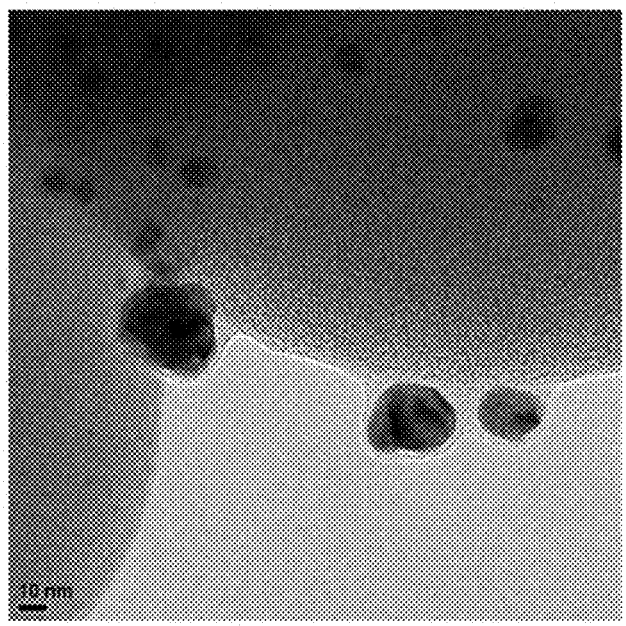
Figure 30C:
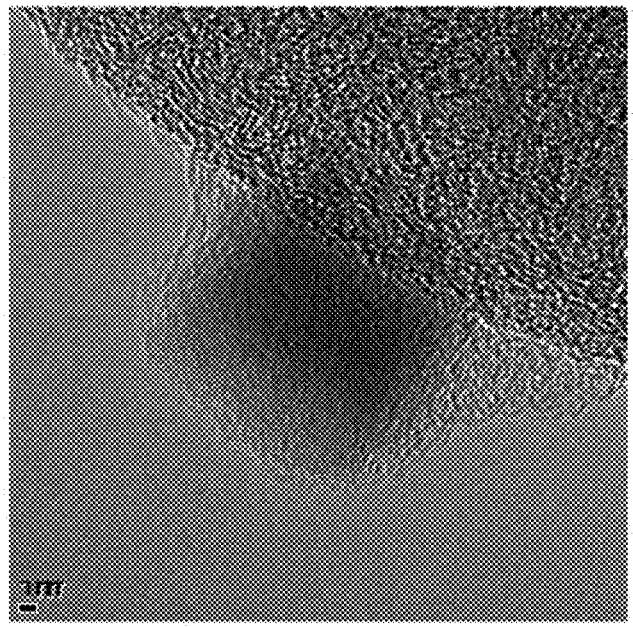
Figure 30D:
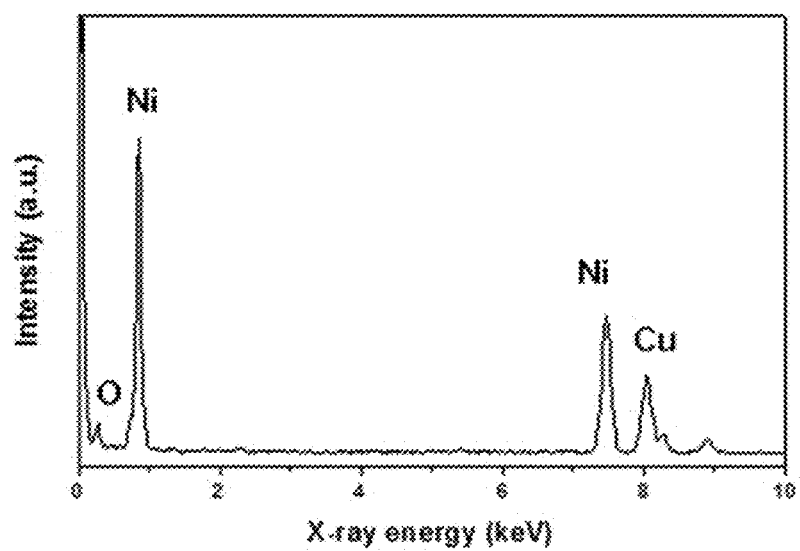

FIGS. 30A to 30D illustrate a catalyst structure acquired in Experimental Example 16-3. Specifically, FIG. 30A illustrates an STEM image of the acquired catalyst structure, FIG. 30B illustrates a TEM image of the acquired catalyst structure, and FIG. 30C illustrates an HRTEM image of the acquired catalyst structure. It was confirmed from FIGS. 30A to 30C that 5 to 20 nm sized Ni catalyst particles are uniformly dispersed on surfaces of carbon spheres. FIG. 30D is an EDX graph of the acquired catalyst structure, from which Ni peaks are identified, confirming that the nanoparticles of the catalyst structure illustrated in FIGS. 30A to 30C are Ni nanoparticles.

Experimental Example 17

In order to investigate effects of a transition metal source (precursor) depending on the change in the content of Ferrocene as an Fe catalyst source, the catalyst structures having Fe nanoparticles dispersed in a carbon sphere support were acquired in substantially the same manner as in Experimental Example 16-1, except that the content of Ferrocene as the Fe catalyst source was varied to 5 wt %, 10 wt % and 15 wt %, followed by measuring dispersion densities of Fe nanostructured catalyst particles.

Figure 31A:
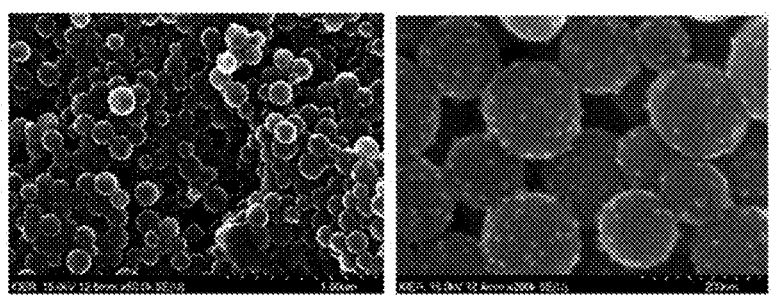
FIGS. 31A to 31C illustrate a catalyst structure having Fe nanoparticles dispersed in a carbon sphere support, acquired in Experimental Example 17, in cases where contents of Ferrocene as an Fe catalyst source are 5 wt %, 10 wt %, and 15 wt %.
Figure 31B:
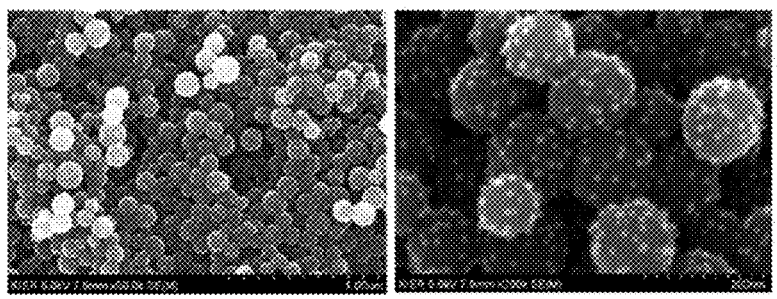
Figure 31C:
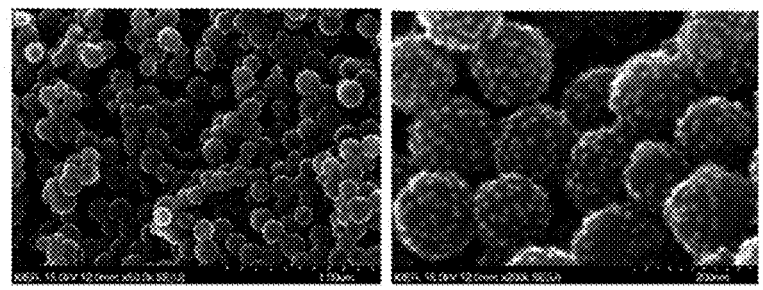

FIG. 31A illustrates the catalyst structure having Fe nanoparticles dispersed in a carbon sphere support in a case where the content of Ferrocene is 5 wt %, FIG. 31B illustrates the catalyst structure having Fe nanoparticles dispersed in a carbon sphere support in a case where the content of Ferrocene is 10 wt %, and FIG. 31C illustrates the catalyst structure having Fe nanoparticles dispersed in a carbon sphere support in a case where the content of Ferrocene is 15 wt %. It was confirmed from FIGS. 31A to 31C that 5 to 10 nm sized Fe nanoparticles were relatively uniformly dispersed to then be synthesized on surfaces of the carbon spheres. It is also confirmed that the dispersion densities of the Fe nanoparticles are increased in the carbon spheres according to the increase in the density of the catalyst source (precursor).

Experimental Example 18

In order to investigate whether a catalyst structure having transition metal oxide nanoparticles dispersed in the support can be produced by oxidizing a transition metal from the catalyst structure having transition metal nanoparticles, catalyst structures were primarily synthesized in substantially the same manner as in Experimental Examples 16-1 to 16-3, oxidation reactions of the respective synthesized catalyst structures were allowed to take place under the conditions listed in Table 5.

TABLE 5

| Experimental Example | Transition metal catalyst source (Metal content, wt %) | Oxidation temperature (° C.) | Oxidation reaction time (Hr) |
|---|---|---|---|
| 18-1 | Ferrocene ($C_{10}H_{10}Fe$) (15 wt %) | 300° C. in air | 1 |
| 18-2 | Cobaltocene ($C_{10}H_{10}Co$) (15 wt %) | 300° C. in air | 1 |
| 18-3 | Nickelocene ($C_{10}H_{10}Ni$) (15 wt %) | 400° C. in air | 1 |

Experimental Example 18

Figure 32A:
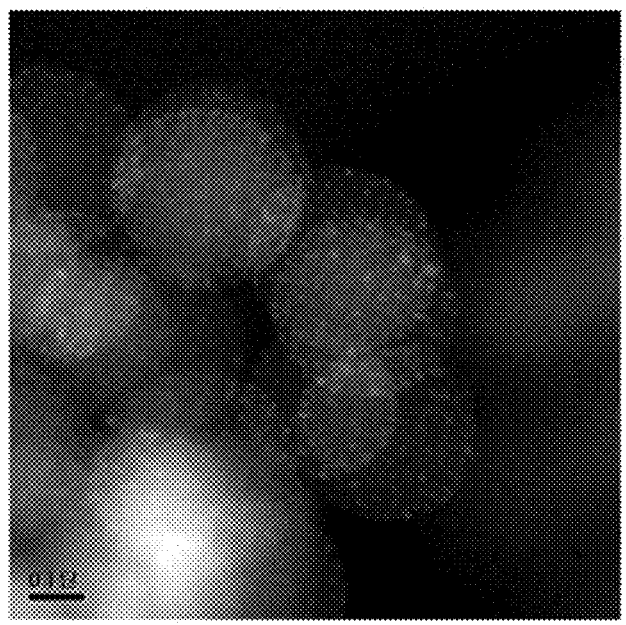
FIGS. 32A to 32D illustrate a catalyst structure acquired in Experimental Example 18-1, specifically illustrating an STEM image, a TEM image an HRTEM image and FIG. 32D illustrating an EDX graph of the acquired catalyst structure, respectively.
Figure 32B:
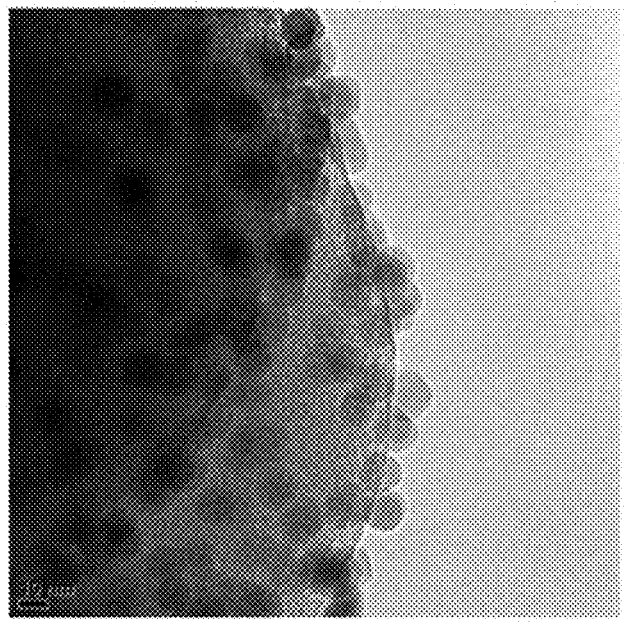
Figure 32C:
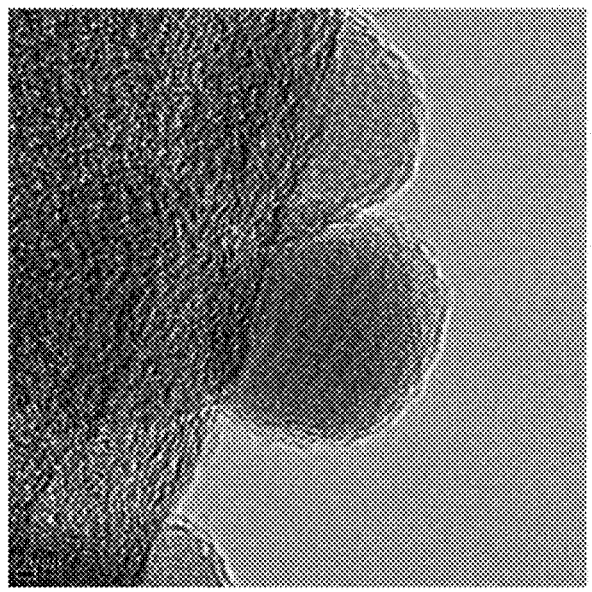
Figure 32D:
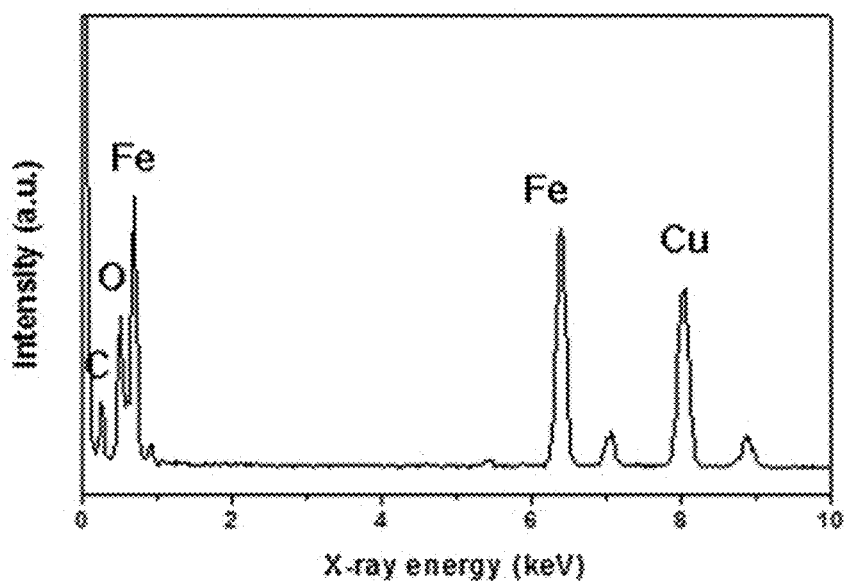

FIGS. 32A to 32D illustrate a catalyst structure acquired in Experimental Example 18-1. Specifically, FIG. 32A illustrates an STEM image of the acquired catalyst structure, FIG. 32B illustrates a TEM image of the acquired catalyst structure, and FIG. 32C illustrates an HRTEM image of the acquired catalyst structure. It was confirmed from FIGS. 32A to 32C that $Fe_3O_4$ nanoparticles having a size in the range from 5 nm to 10 nm were uniformly dispersed on surfaces of carbon spheres. FIG. 32D illustrates an EDX graph of the acquired catalyst structure, from which Fe and O peaks are identified, confirming that the nanoparticles illustrated in FIGS. 32A to 32D are $Fe_3O_4$ nanoparticles. Table 6 demonstrates measurement results of atomic ratios. Based on the measured atomic ratios, it can be deduced that the nanoparticles include $Fe_3O_4$ nanoparticles.

TABLE 6

| Element | Line Type | k factor | Absorption Correction | Wt % | Wt % Sigma | Atomic % |
|---|---|---|---|---|---|---|
| O | K series | 1.45493 | 1.00 | 26.13 | 1.26 | 55.25 |
| Fe | K series | 1.21448 | 1.00 | 73.87 | 1.26 | 44.75 |
| Total | | | | 100.00 | | 100.00 |

Figure 33A:
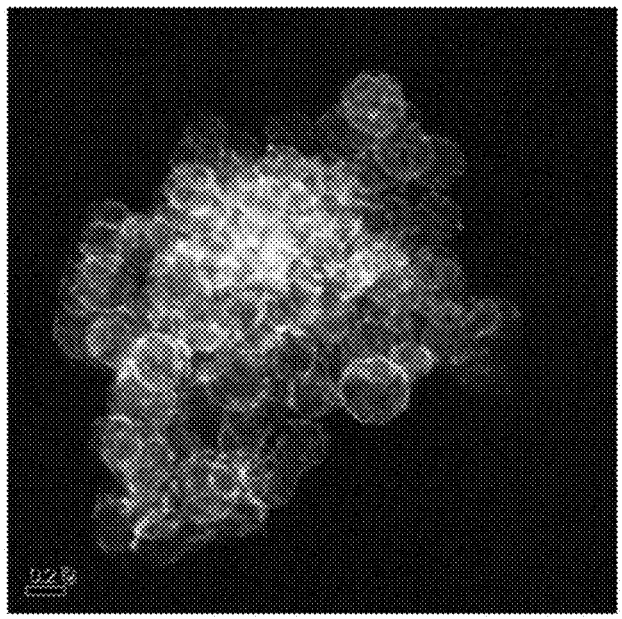
FIGS. 33A to 33D illustrate a catalyst structure acquired in Experimental Example 18-2, specifically illustrating an STEM image, a TEM image, an HRTEM image and an EDX graph of the acquired catalyst structure, respectively.
Figure 33B:
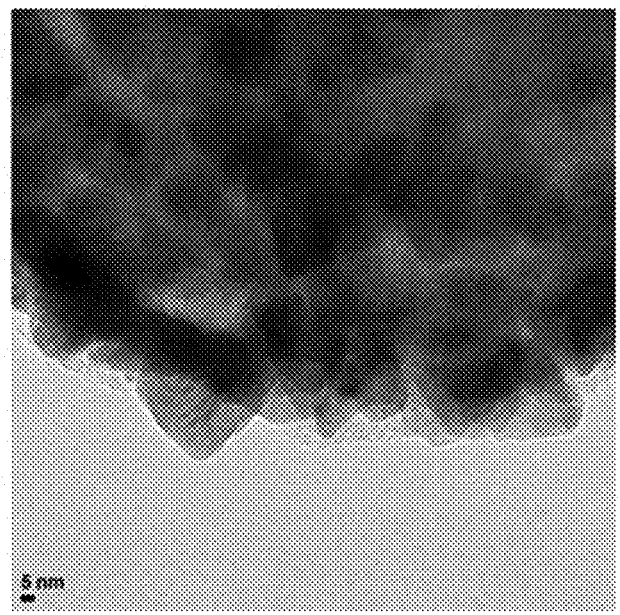
Figure 33C:
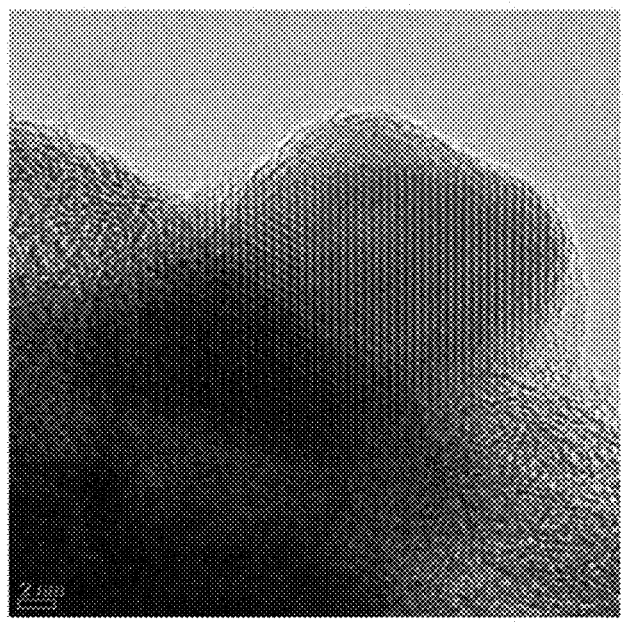
Figure 33D:
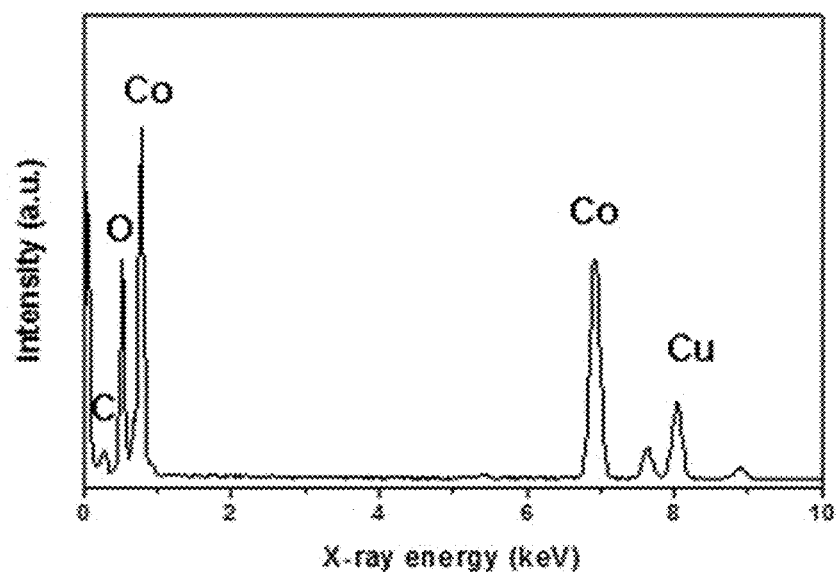

FIGS. 33A to 33D illustrate a catalyst structure acquired in Experimental Example 18-2. Specifically, FIG. 33A illustrates an STEM image of the acquired catalyst structure, FIG. 33B illustrates a TEM image of the acquired catalyst structure, and FIG. 33C illustrates an HRTEM image of the acquired catalyst structure. It was confirmed from FIGS. 33A to 33C that $Co_2O_3$ nanoparticles having sizes in the range of approximately 10 nm to approximately 40 nm are dispersed on surfaces of carbon spheres. FIG. 33D illustrates an EDX graph of the acquired catalyst structure. It is confirmed from Co and O peaks illustrated in FIG. 32D that the nanoparticles illustrated in FIGS. 33A to 33D include $Co_2O_3$ nanoparticles. Table 7 demonstrates measurement results of atomic ratios of the nanoparticles illustrated in FIGS. 33A to 33D. Based on the measured atomic ratios, it can be deduced that the nanoparticles illustrated in FIGS. 33A to 33D are $Co_2O_3$ nanoparticles.

TABLE 7

| Element | Line Type | k factor | Absorption Correction | Wt % | Wt % Sigma | Atomic % |
|---|---|---|---|---|---|---|
| O | K series | 1.45493 | 1.00 | 29.05 | 0.69 | 59.79 |
| Co | K series | 1.28630 | 1.00 | 70.95 | 0.69 | 40.21 |
| Total | | | | 100.00 | | 100.00 |

Figure 34A:
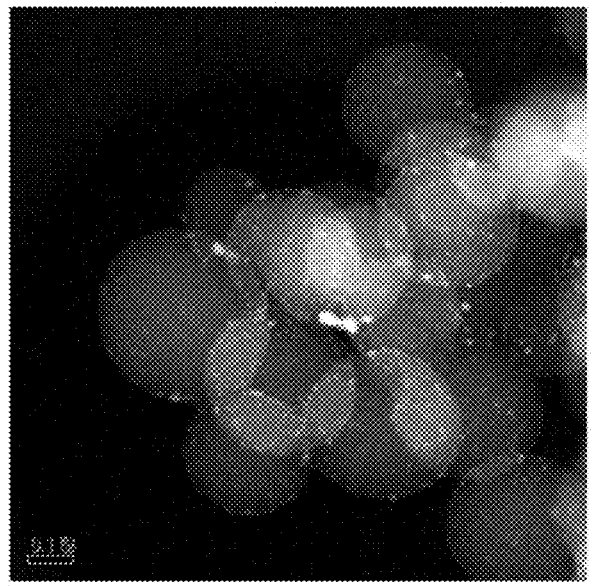
FIGS. 34A to 34C illustrate a catalyst structure acquired in Experimental Example 18-3, specifically illustrating an STEM image, a TEM image and an HRTEM image of the acquired catalyst structure, respectively.
Figure 34B:
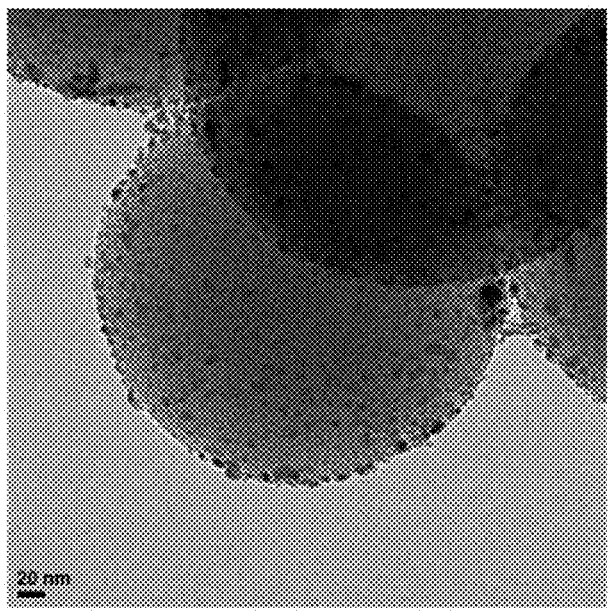
Figure 34C:
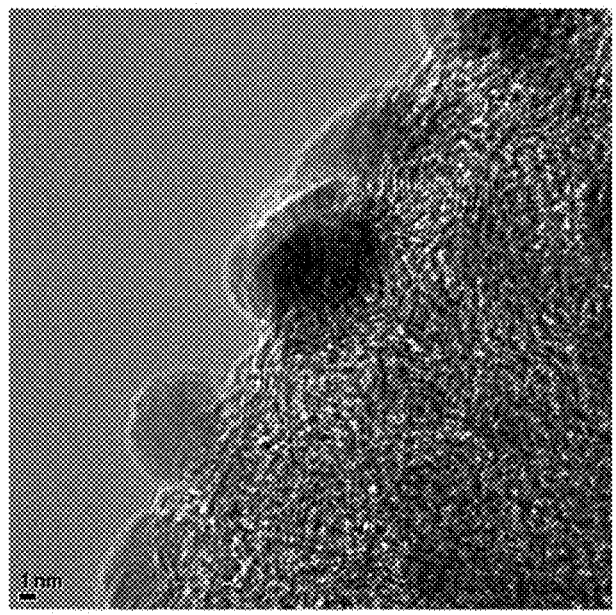

FIGS. 34A to 34C illustrate a catalyst structure acquired in Experimental Example 18-3. Specifically FIG. 34A illustrates an STEM image of the acquired catalyst structure, FIG. 34B illustrates a TEM image of the acquired catalyst structure, and FIG. 34C illustrates an HRTEM image of the acquired catalyst structure. It was confirmed from FIGS. 34A to 34C that NiO nanoparticles nanoparticles having a size in the range from 5 nm to 20 nm were uniformly dispersed on surfaces of carbon spheres. Table 8 demonstrates measurement results of atomic ratios. Based on the measured atomic ratios, it can be deduced that the nanoparticles include NiO nanoparticles.

TABLE 8

| Element | Line Type | k factor | Absorption Correction | Wt % | Wt % Sigma | Atomic % |
|---|---|---|---|---|---|---|
| O | K series | 1.45493 | 1.00 | 21.05 | 0.61 | 50.79 |
| Ni | K series | 1.29311 | 1.00 | 79.95 | 0.61 | 49.21 |
| Total | | | | 100.00 | | 100.00 |

Experimental Example 19

A catalyst structure having Pt based binary alloy nanostructured catalyst particles dispersed in a support was synthesized in the following manner. A glassy carbon sphere having a diameter of approximately 200 nm as a support and first and second catalyst sources as catalyst sources were supplied into a reactor under room temperature and atmospheric pressure conditions, as listed in Table 9. The reactor was perfectly sealed and the temperature of the reactor was elevated up to 350° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, the catalyst structure was acquired.

TABLE 9

| Experimental Example | First catalyst source (Metal content, wt %) | Second catalyst source (Metal content, wt %) |
|---|---|---|
| 19-1 | Ir catalyst source: (methylcyclopentadienyl (1,5-cyclooctadien)Ir) (10 wt %) | Pt based catalyst source: Trimethyl-(methylcyclopentadienyl)Pt (10 wt %) |
| 19-2 | Ru catalyst source: (Ru acetylacetonate) (10 wt %) | Pt based catalyst source: Trimethyl-(methylcyclopentadienyl)Pt (10 wt %) |
| 19-3 | Ru catalyst source: (Ru acetylacetonate) (20 wt %) | Pt based catalyst source: Pt acetylacetonate (15 wt %) |

Figure 35A:
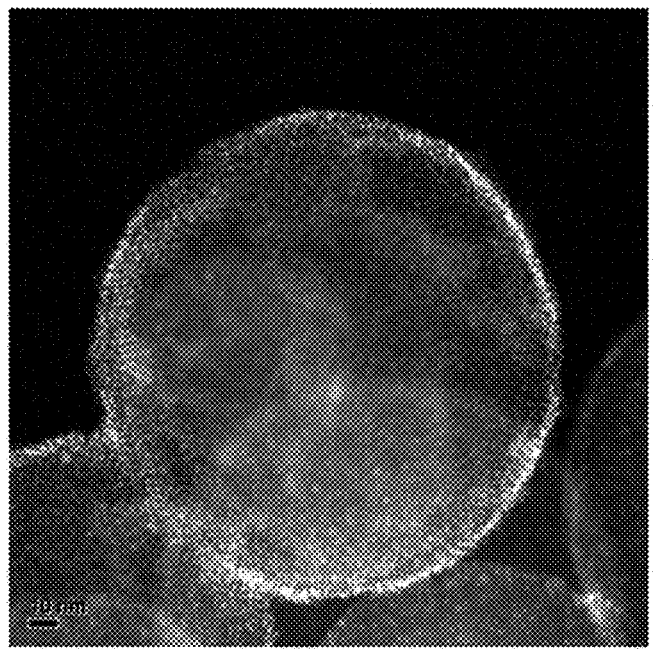
FIGS. 35A to 35C illustrate a catalyst structure acquired in Experimental Example 19-1, specifically illustrating an STEM image, an HRTEM image and an EDX graph of the acquired catalyst structure, respectively.
Figure 35B:
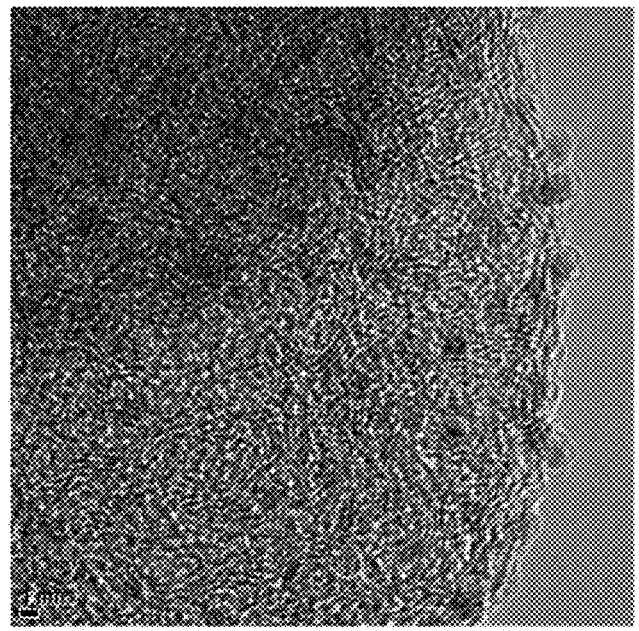
Figure 35C:
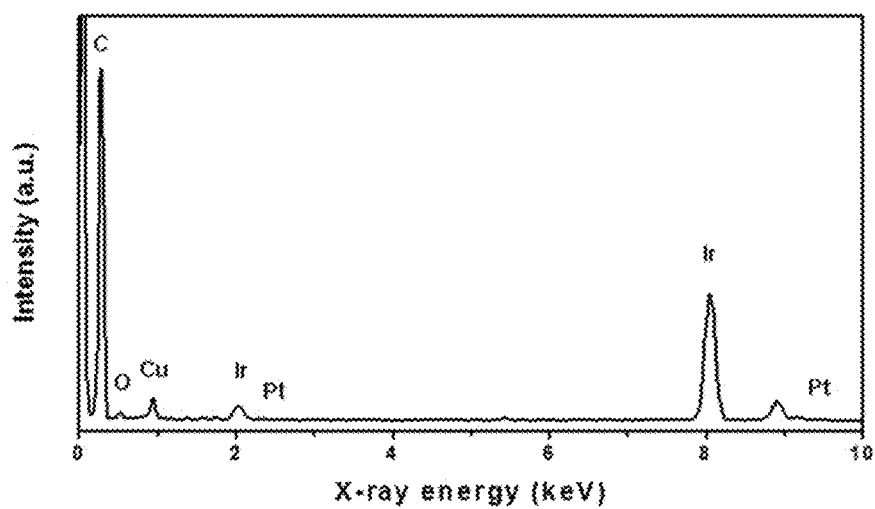

FIGS. 35A to 35C illustrate a catalyst structure acquired in Experimental Example 19-1. Specifically, FIG. 35A illustrates an STEM image and FIG. 35B illustrates an HRTEM image. It was confirmed from FIGS. 35A and 35B that 1 to 2 nm sized PtIr nanoparticles were uniformly dispersed on surfaces of carbon spheres. FIG. 35C illustrates an EDX graph, from which C, Ir and Pt peaks are identified, confirming that the nanoparticles illustrated in FIGS. 35A and 35B are PtIr nanoparticles.

Figure 36A:
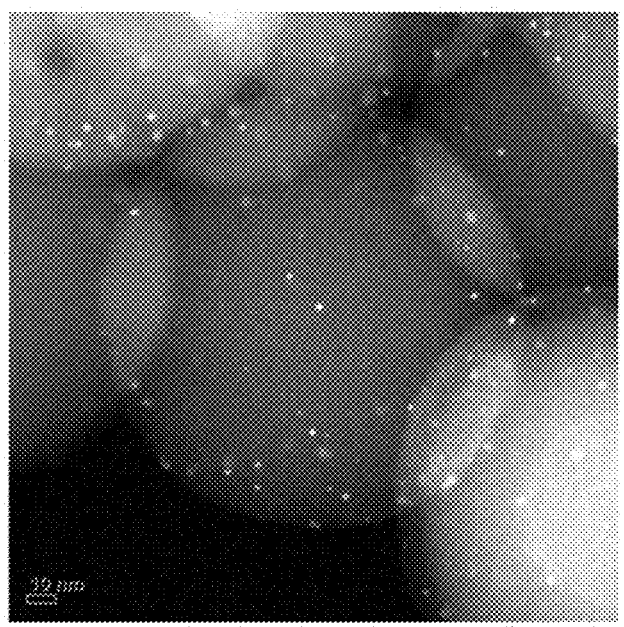
FIGS. 36A to 36F illustrate a catalyst structure acquired in Experimental Example 19-2, specifically illustrating an STEM image, an HRTEM image and EDX images of the acquired catalyst structure, respectively.
Figure 36B:
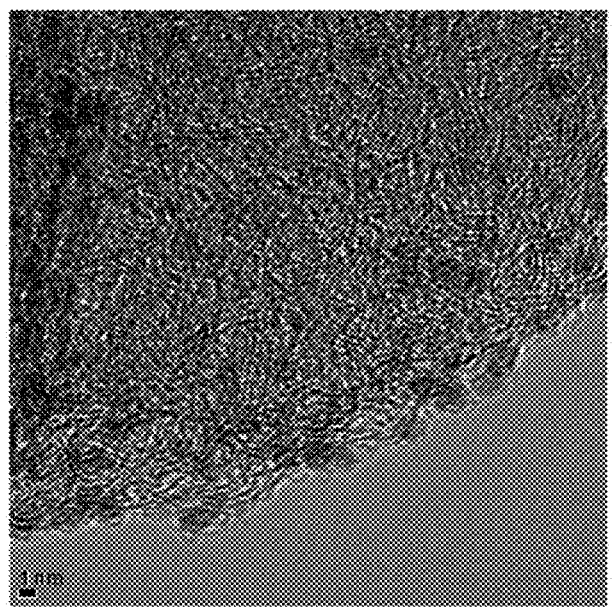
Figure 36C:
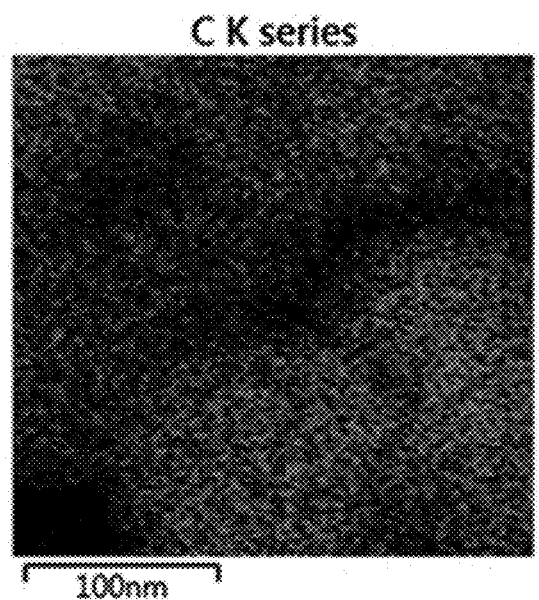
Figure 36D:
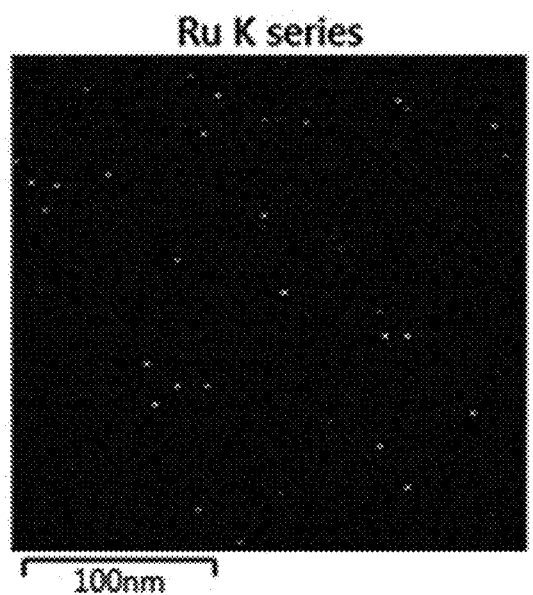
Figure 36E:
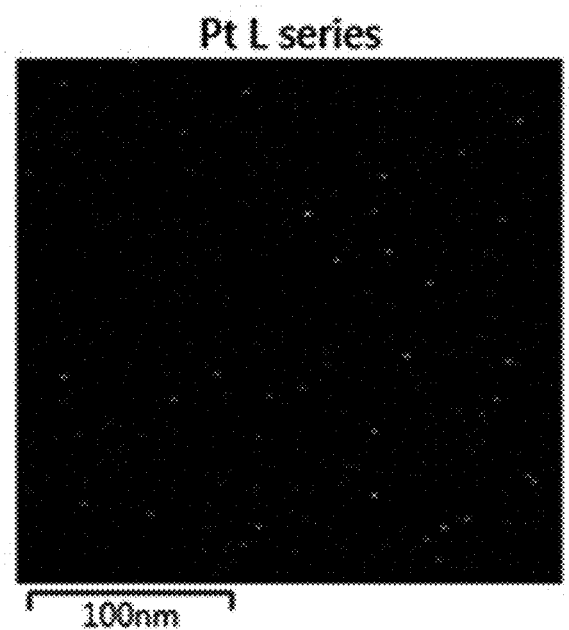
Figure 36F:
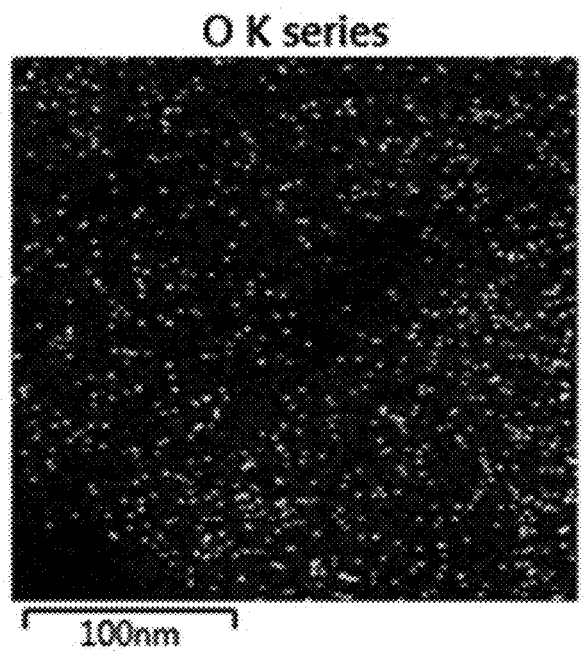

FIGS. 36A to 36F illustrate a catalyst structure acquired in Experimental Example 19-2. Specifically, FIG. 36A illustrates an STEM image and FIG. 36B illustrates an HRTEM image. It was confirmed from FIGS. 36A and 36B that 1 to 2 nm sized PtRu nanoparticles were uniformly dispersed on surfaces of carbon spheres. FIGS. 36C to 36F illustrate EDX images of the acquired catalyst structure. Specifically, distribution of C components of carbon spheres is illustrated in FIG. 36C, distribution of Ru nanoparticles is illustrated in FIG. 36D, distribution of Pt nanoparticles is illustrated in FIG. 36e, and a surface oxide layer of the final catalyst structure is illustrated in FIG. 36F, confirming the nanoparticles illustrated in FIGS. 36C to 36F are PtIr nanoparticles.

Figure 37A:
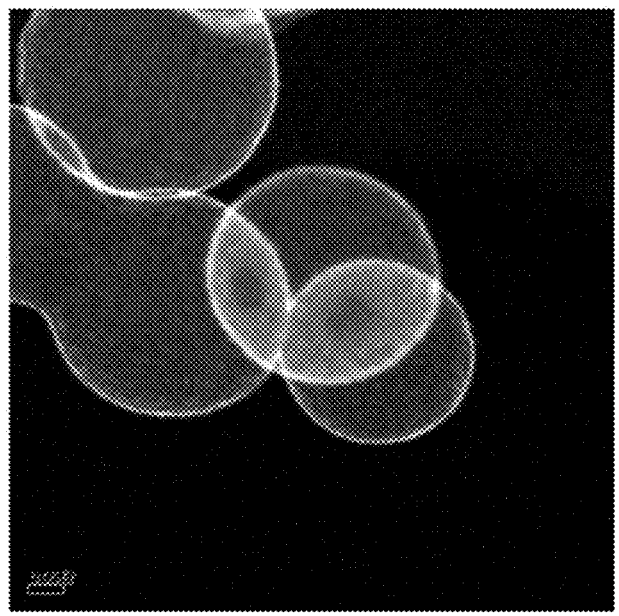
FIGS. 37A to 37D illustrate a catalyst structure acquired in Experimental Example 19-3, specifically illustrating an STEM image, a TEM image, an HRTEM image and an EDX graph of the acquired catalyst structure, respectively.
Figure 37B:
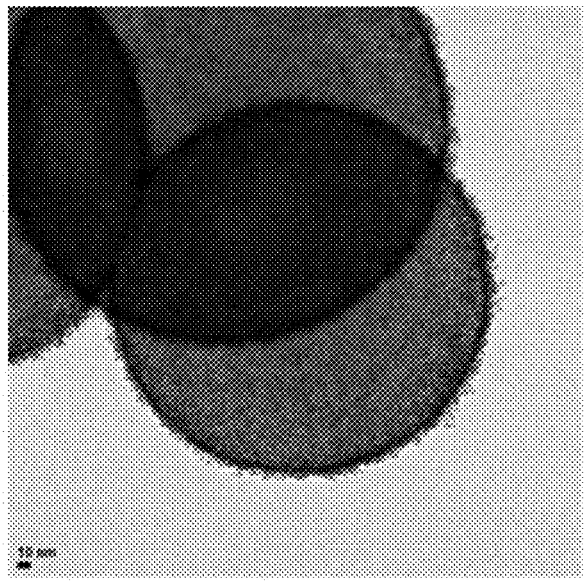
Figure 37C:
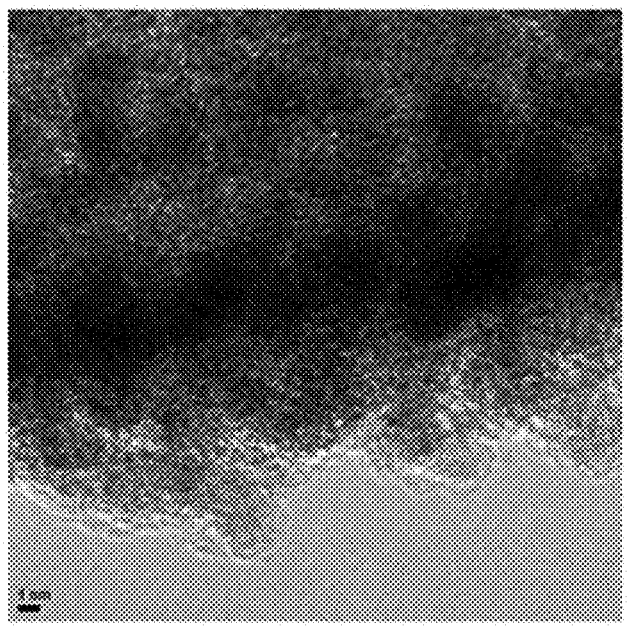
Figure 37D:
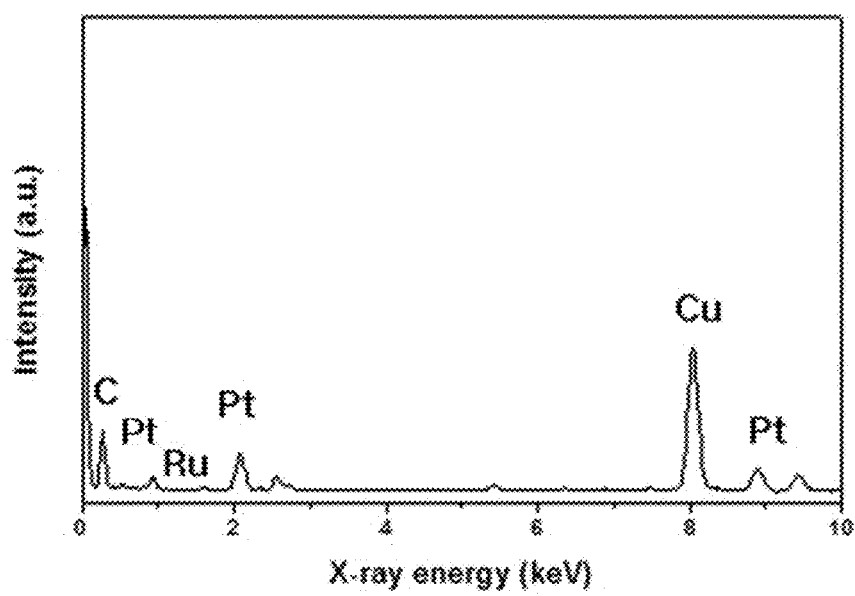

FIGS. 37A to 37D illustrate a catalyst structure acquired in Experimental Example 19-3. Specifically, FIG. 37A illustrates an STEM image, FIG. 37B illustrates a TEM image, and FIG. 37C illustrates an HRTEM image. It was confirmed from FIGS. 37A to 37C that approximately 2 nm sized PtRu nanoparticles were uniformly dispersed on surfaces of carbon spheres. FIG. 37D illustrates an EDX graph, from which C, Pt and Ru peaks are identified, confirming that the nanoparticles illustrated in FIGS. 37A to 37C are PtRu nanoparticles. Table 10 demonstrates measurement results of atomic ratios. Based on the measured atomic ratios, it can be deduced that the nanoparticles include PtRu nanoparticles.

TABLE 10

| Element | Line Type | k factor | Absorption Correction | Wt % | Wt % Sigma | Atomic % |
|---|---|---|---|---|---|---|
| Ru | K series | 10.71255 | 1.00 | 41.97 | 2.79 | 58.26 |
| Pt | L series | 2.75544 | 1.00 | 58.03 | 2.79 | 41.74 |
| Total | | | | 100.00 | | 100.00 |

Experimental Example 20

Figure 39A:
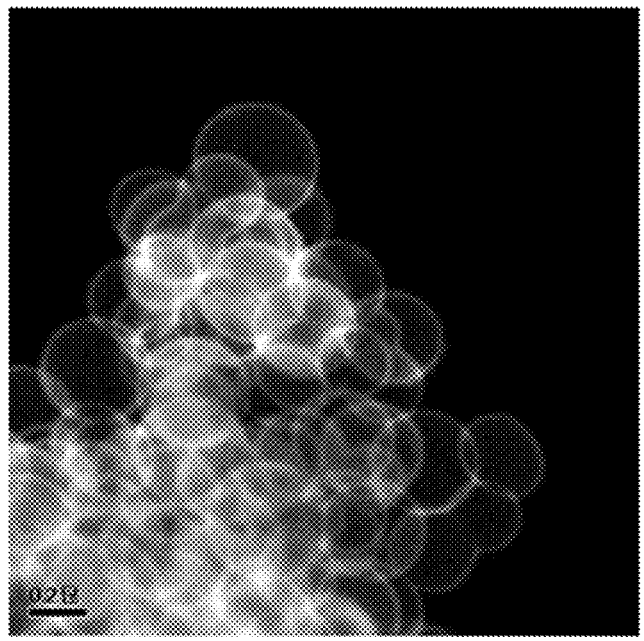
FIGS. 39A to 39D illustrate a catalyst structure acquired in Experimental Example 20-2, specifically illustrating an STEM image, a TEM image, an HRTEM image, and an EDX graph of the acquired catalyst structure, respectively.
Figure 39B:
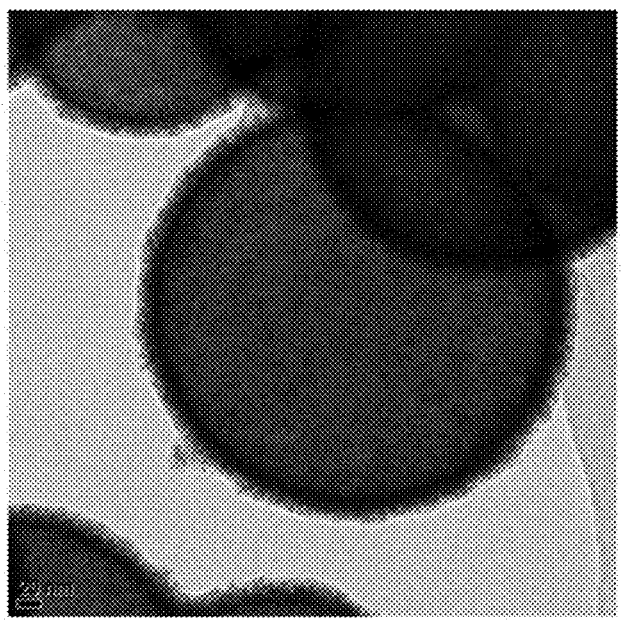
Figure 39C:
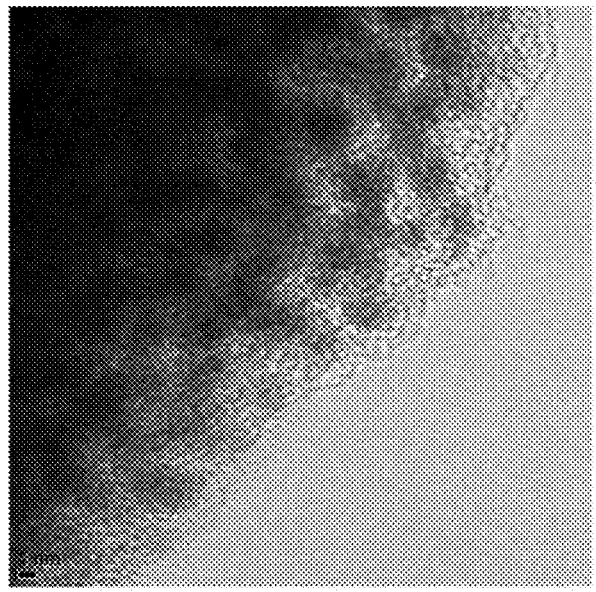
Figure 39D:
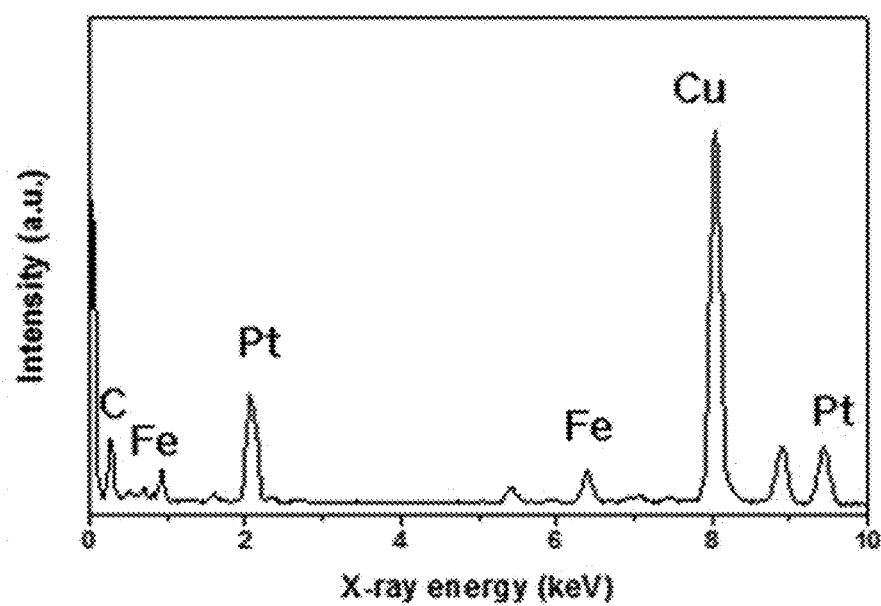

A catalyst structure having Pt based binary alloy nanostructured catalyst particles dispersed in the support was synthesized. A glassy carbon sphere having a diameter of approximately 200 nm as a support and first and second catalyst sources as catalyst sources were supplied into a reactor under room temperature and atmospheric pressure conditions, as listed in Table 11. The catalyst structure was basically synthesized by the same manner as described in Experimental Example 1 and the catalyst structure was acquired using different conditions listed in Table 11.

spheres are identified, confirming that 2 nm sized $FePt_3$ binary alloy nanoparticles were uniformly dispersed. FIG. 39D illustrates an EDX graph, from which C, Pt and Fe peaks are identified, confirming that the nanoparticles illustrated in FIGS. 39A to 39C are $FePt_3$ nanoparticles. Table 12 demonstrates measurement results of atomic ratios. Based on the measured atomic ratios, it can be deduced that the $FePt_3$ binary alloy nanoparticles.

TABLE 11

| Experimental Example | Support | First catalyst source (Metal content, wt %) | Second catalyst source (Metal content, wt %) | Synthesis temperature and time (° C., hr) |
|---|---|---|---|---|
| 20-1 | Multi-walled carbon nanotubes | Pt based catalyst source: trimethyl(methylcyclopentadienyl) Pt (10 wt %) | Fe catalyst source: Ferrocene (10 wt %) | 300° C., 1 hr |
| 20-2 | Carbon spheres | Pt based catalyst source: Pt acetylacetonate (18 wt %) | Fe catalyst source: Ferrocene (10 wt %) | 350° C., 1 hr |
| 20-3 | Carbon spheres | Pt based catalyst source: Pt acetylacetonate (18 wt %) | Fe catalyst source: Fe acetylacetonate (10 wt %) | 350° C., 1 hr |
| 20-4 | Multi-walled carbon nanotubes | Pt based catalyst source: trimethyl (methylcyclopentadienyl) Pt (10 wt %) | Co catalyst source: Cobaltocene (10 wt %) | 300° C., 1 hr |
| 20-5 | Carbon spheres | Pt based catalyst source: Pt acetylacetonate (18 wt %) | Co catalyst source: Cobaltocene (10 wt %) | 350° C., 1 hr |
| 20-6 | Carbon spheres | Pt based catalyst source: Pt acetylacetonate (18 wt %) | Co catalyst source: Co acetylacetonate (10 wt %) | 350° C., 1 hr |
| 20-7 | Multi-walled carbon nanotubes | Pt based catalyst source: Trimethyl (methylcyclopentadienyl) Pt (10 wt %) | Ni catalyst source: Nickelocene (10 wt %) | 300° C., 1 hr |
| 20-8 | Carbon spheres | Pt based catalyst source: Pt acetylacetonate (15 wt %) | Ni catalyst source: Nickelocene (15 wt %) | 350° C., 1 hr |
| 20-9 | Carbon spheres | Pt based catalyst source: Pt acetylacetonate (18 wt %) | Ni catalyst source: Ni acetylacetonate (10 wt %) | 350° C., 1 hr |
| 20-10 | Carbon spheres | Pt based catalyst source: Pt acetylacetonate (20 wt %) | Mn catalyst source: Mn acetylacetonate (3 wt %) | 350° C., 1 hr |
| 20-11 | Carbon spheres | Pt based catalyst source: Pt acetylacetonate (20 wt %) | Cu catalyst source: Cu acetylacetonate (18 wt %) | 350° C., 1 hr |
| 20-12 | Carbon spheres | Pt based catalyst source: Pt acetylacetonate (20 wt %) | Sn catalyst source: Sn acetylacetonate (3 wt %) | 350° C., 1 hr |
| 20-13 | Carbon spheres | Pt based catalyst source: Pt acetylacetonate (25 wt %) | Ga catalyst source: Ga acetylacetonate (5 wt %) | 350° C., 1 hr |

Figure 38A:
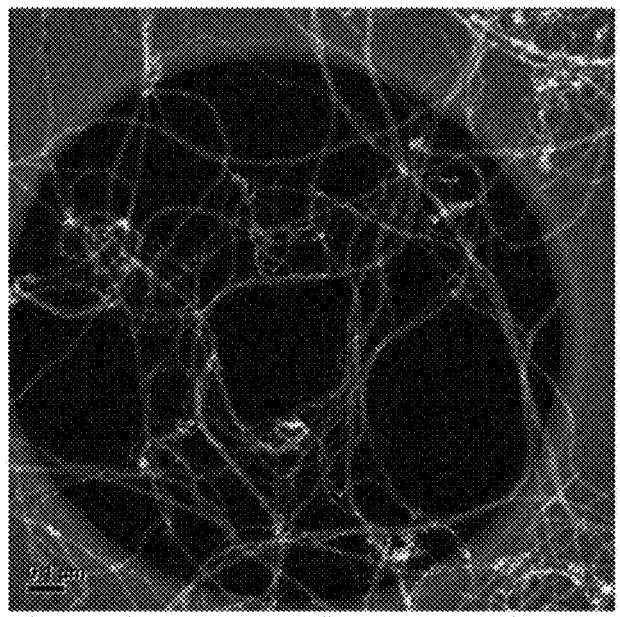
FIGS. 38A to 38C illustrate a catalyst structure acquired in Experimental Example 20-1, specifically illustrating an STEM image, an HRTEM image and an EDX graph of the acquired catalyst structure, respectively.
Figure 38B:
Figure 38C:
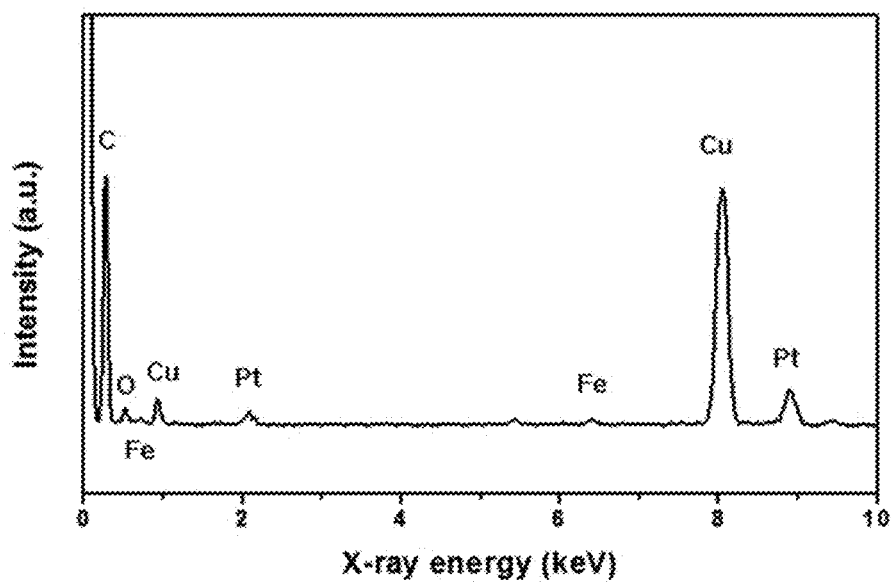

FIGS. 38A to 38C illustrate a catalyst structure acquired in Experimental Example 20-1. Specifically, FIG. 38A illustrates an STEM image STEM image of the catalyst structure and FIG. 38B illustrates an HRTEM image of the catalyst structure. It was confirmed from FIGS. 38A and 38C that 2 nm sized PtFe nanoparticles were uniformly dispersed on surfaces of multi-walled carbon nanotubes. FIG. 38C illustrates an EDX graph, from which C, Pt and Fe peaks are identified, confirming that the nanoparticles illustrated in FIGS. 38A and 38C are PtFe nanoparticles.

FIGS. 39A to 39C illustrate a catalyst structure acquired in Experimental Example 20-2. Specifically, FIG. 39A illustrates an STEM image of the catalyst structure, FIG. 39B illustrates a TEM image of the catalyst structure and FIG. 39C illustrates an HRTEM image of the catalyst structure. It was confirmed from FIGS. 39A to 39C that thin bands having a thickness of 20 nm coated on surfaces of carbon

TABLE 12

| Element | Line Type | k factor | Absorption Correction | Wt % | Wt % Sigma | Atomic % |
|---|---|---|---|---|---|---|
| Fe | K series | 1.21448 | 1.00 | 8.68 | 0.52 | 24.93 |
| Pt | L series | 2.75544 | 1.00 | 91.32 | 0.52 | 75.07 |
| Total | | | | 100.00 | | 100.00 |

Figure 40A:
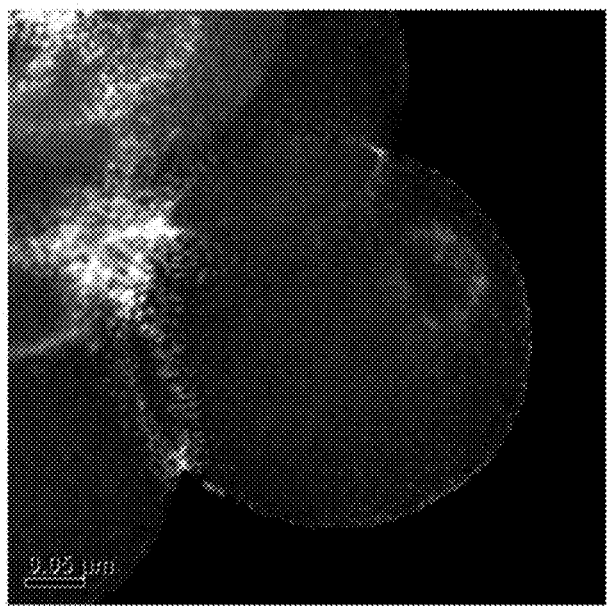
FIGS. 40A to 40C illustrate a catalyst structure acquired in Experimental Example 20-3, specifically illustrating an STEM image, an HRTEM image and an EDX graph of the acquired catalyst structure, respectively.
Figure 40B:
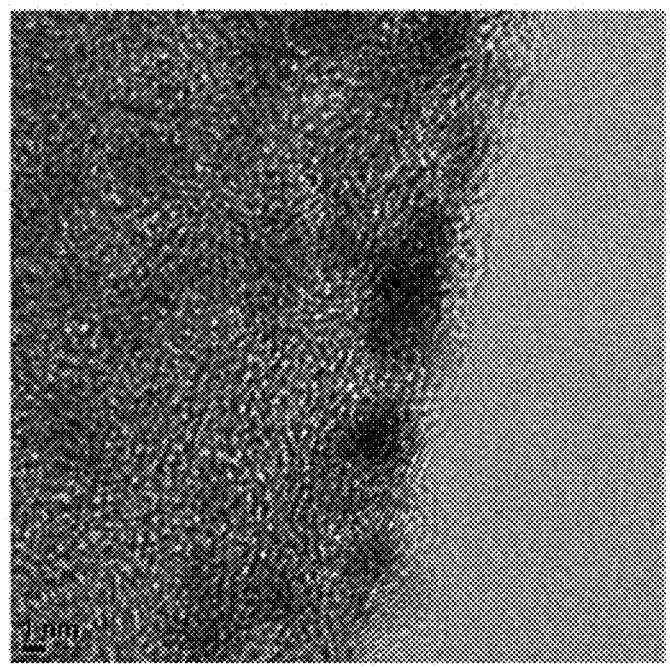
Figure 40C:
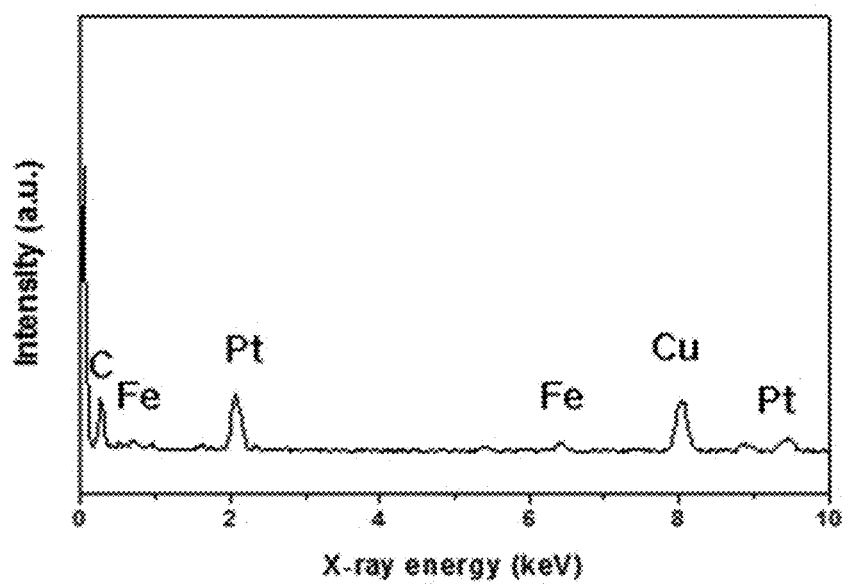

FIGS. 40A to 40C illustrate a catalyst structure acquired in Experimental Example 20-3. Specifically, FIG. 40A illustrates an STEM image of the catalyst structure and FIG. 40B illustrates an HRTEM image of the catalyst structure. It was confirmed from FIGS. 40A and 40B that thin bands having a thickness of 20 nm and coated on surfaces of carbon spheres are identified, confirming that 2 nm sized FePt$_3$ nanoparticles were uniformly dispersed. FIG. 40C illustrates an EDX graph, from which C, Pt and Fe peaks are identified, confirming that the nanoparticles illustrated in FIGS. 40A and 40C are FePt3 nanoparticles. Table 13 demonstrates measurement results of atomic ratios. Based on the measured atomic ratios, it can be deduced that the FePt$_3$ binary alloy nanoparticles.

TABLE 13

| Element | Line Type | k factor | Absorption Correction | Wt % | Wt % Sigma | Atomic % |
|---|---|---|---|---|---|---|
| Fe | K series | 1.21448 | 1.00 | 8.74 | 0.83 | 25.08 |
| Pt | L series | 2.75544 | 1.00 | 91.26 | 0.83 | 74.92 |
| Total | | | | 100.00 | | 100.00 |

Figure 41A:
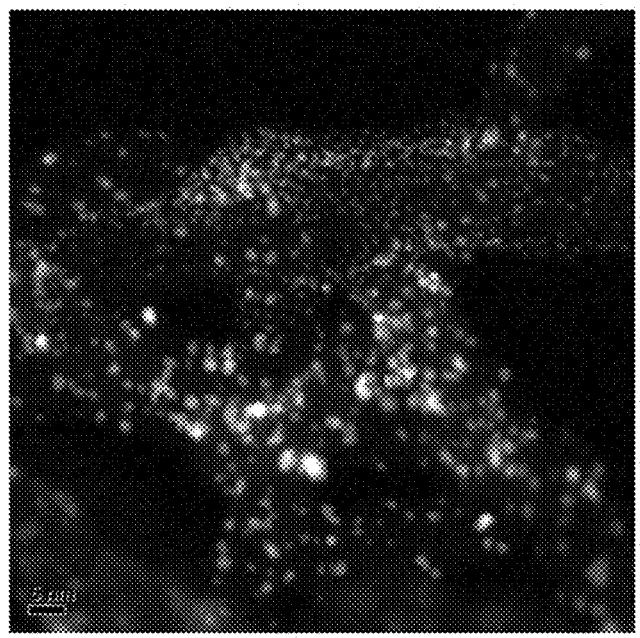
FIGS. 41A to 41C illustrate a catalyst structure acquired in Experimental Example 20-4, specifically illustrating an STEM image, an HRTEM image and an EDX graph of the acquired catalyst structure, respectively.
Figure 41B:
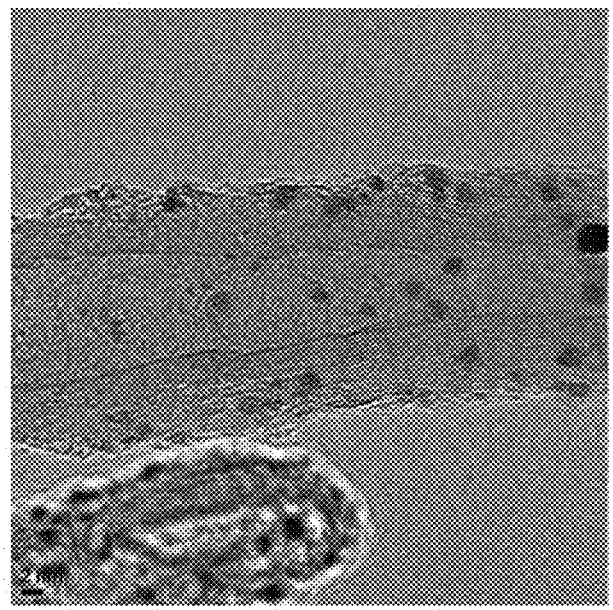
Figure 41C:
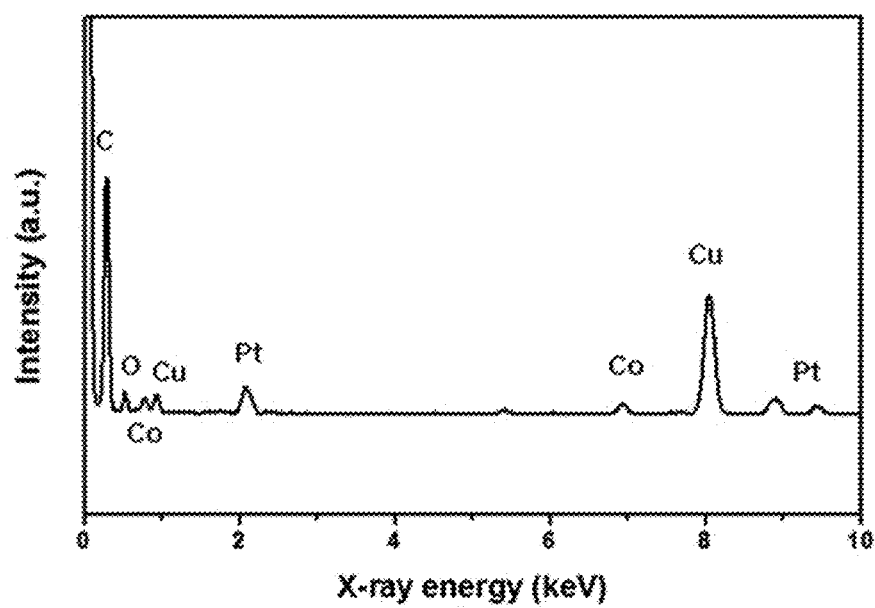

FIGS. 41A to 41C illustrate a catalyst structure acquired in Experimental Example 20-4. Specifically, FIG. 41A illustrates an STEM image of the catalyst structure and FIG. 41B illustrates an HRTEM image of the catalyst structure. It was confirmed from FIGS. 41A and 41B that 2 nm sized PtCo nanoparticles were uniformly dispersed on surfaces of carbon spheres. FIG. 41C is an EDX graph, from which C, Pt and Co peaks are identified, confirming that the nanoparticles illustrated in FIGS. 41A and 41B are PtCo nanoparticles.

Figure 42A:
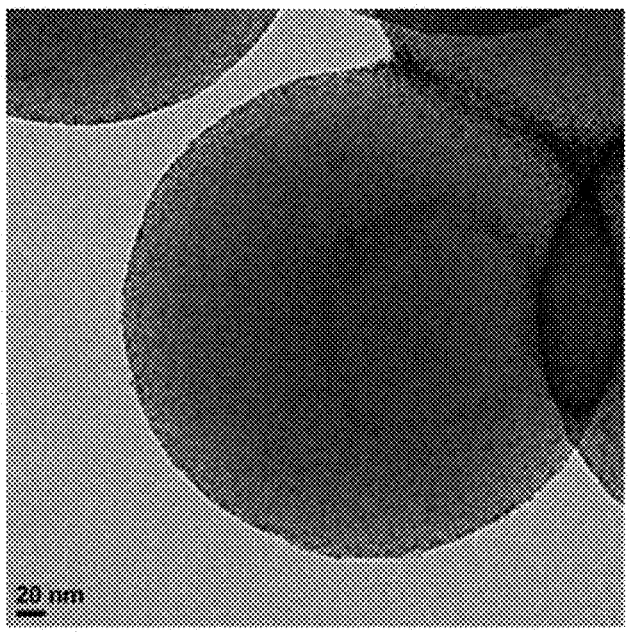
FIGS. 42A to 42C illustrate a catalyst structure acquired in Experimental Example 20-5, specifically FIG. 42A illustrating a TEM image.
Figure 42B:
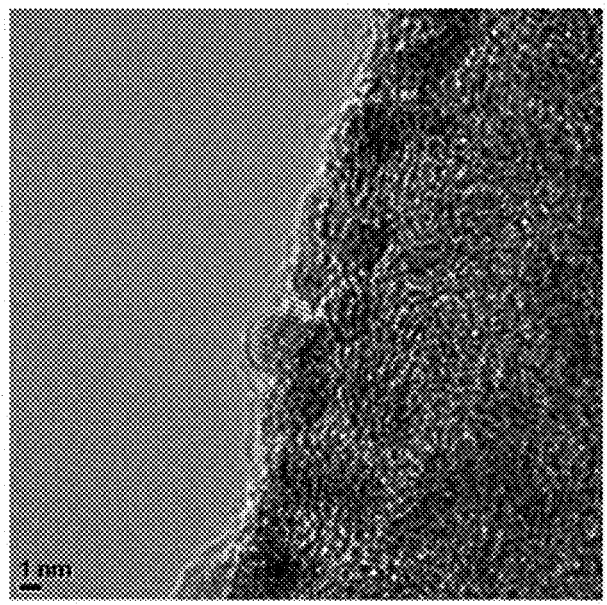
Figure 42C:
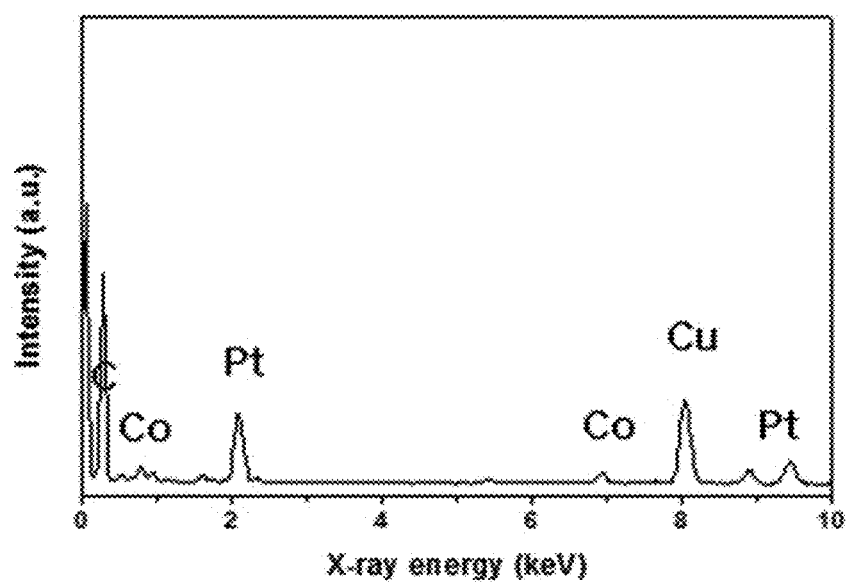

FIGS. 42A to 42C illustrate a catalyst structure acquired in Experimental Example 20-5. Specifically, FIG. 42A illustrates a TEM image of the catalyst structure and FIG. 42B illustrates an HRTEM image of the catalyst structure. It was confirmed from FIGS. 42A and 42B that 1 to 2 nm sized CoPt$_3$ nanoparticles were uniformly dispersed on surfaces of carbon spheres. FIG. 42C is an EDX graph, from which C, Pt and Co peaks are identified, confirming that the nanoparticles illustrated in FIGS. 42A and 42B are CoPt$_3$ nanoparticles. Table 14 demonstrates measurement results of atomic ratios. Based on the measured atomic ratios, it can be deduced that the CoPt$_3$ binary alloy nanoparticles.

TABLE 14

| Element | Line Type | k factor | Absorption Correction | Wt % | Wt % Sigma | Atomic % |
|---|---|---|---|---|---|---|
| Co | K series | 1.28630 | 1.00 | 9.63 | 0.71 | 26.07 |
| Pt | L series | 2.75544 | 1.00 | 90.37 | 0.71 | 73.93 |
| Total | | | | 100.00 | | 100.00 |

Figure 43A:
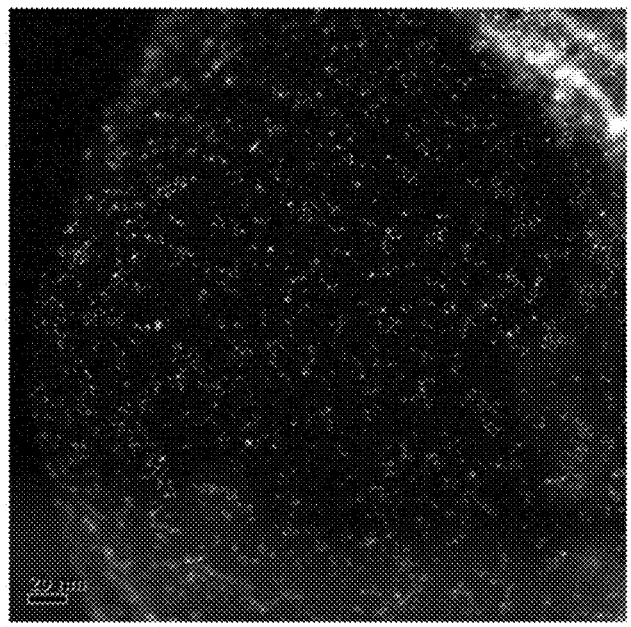
FIGS. 43A to 43C illustrate a catalyst structure acquired in Experimental Example 20-6, specifically illustrating an STEM image, an HRTEM image and an EDX graph of the acquired catalyst structure, respectively.
Figure 43B:
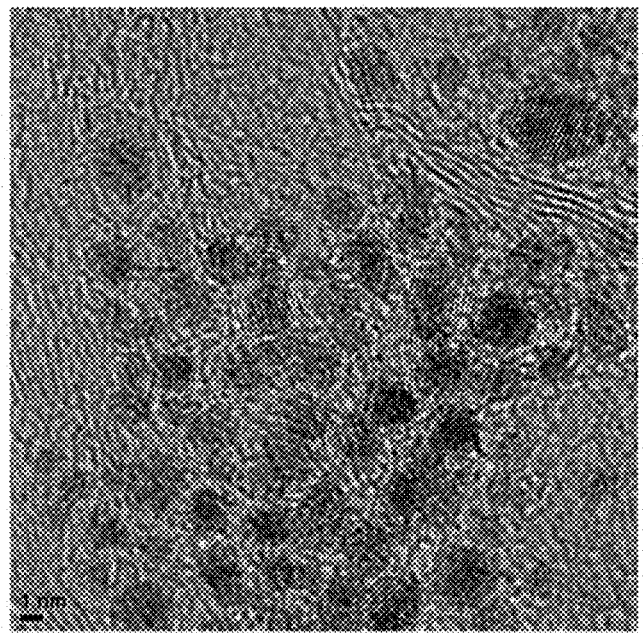
Figure 43C:
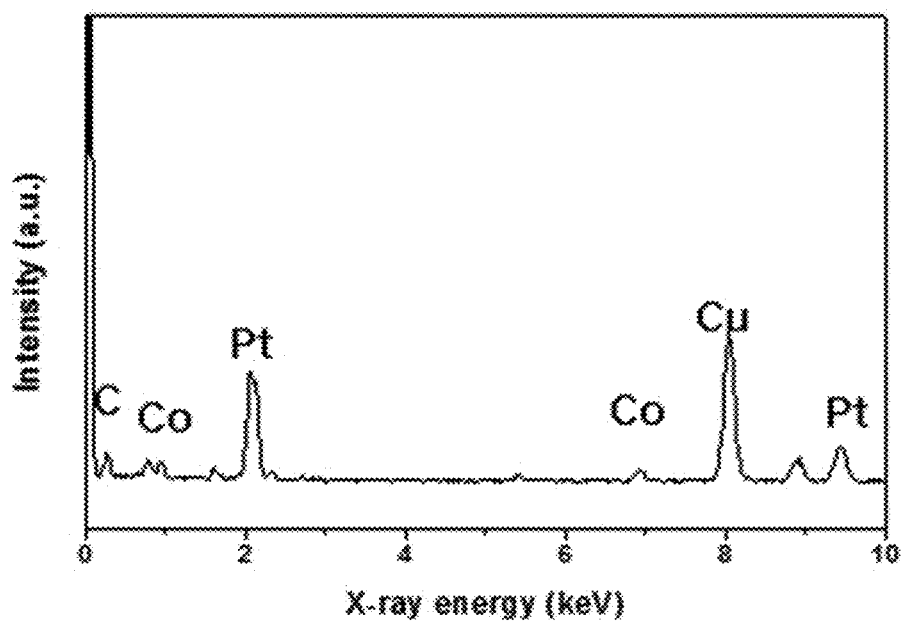

FIGS. 43A to 43F illustrate a catalyst structure acquired in Experimental Example 20-6. Specifically, FIG. 43A illustrates an STEM image of the catalyst structure and FIG. 43B illustrates an HRTEM image of the catalyst structure. It was confirmed from FIGS. 43A and 43B that 2 nm sized CoPt$_3$ nanoparticles were uniformly dispersed on surfaces of carbon spheres. FIG. 43C is an EDX graph, from which C, Pt and Co peaks are identified, confirming that the nanoparticles illustrated in FIGS. 43A and 43B are CoPt$_3$ nanoparticles. Table 15 demonstrates measurement results of atomic ratios. Based on the measured atomic ratios, it can be deduced that the CoPt$_3$ binary alloy nanoparticles.

TABLE 15

| Element | Line Type | k factor | Absorption Correction | Wt % | Wt % Sigma | Atomic % |
|---|---|---|---|---|---|---|
| Co | K series | 1.28630 | 1.00 | 8.32 | 0.99 | 23.11 |
| Pt | L series | 2.75544 | 1.00 | 91.68 | 0.99 | 76.89 |
| Total | | | | 100.00 | | 100.00 |

Figure 44A:
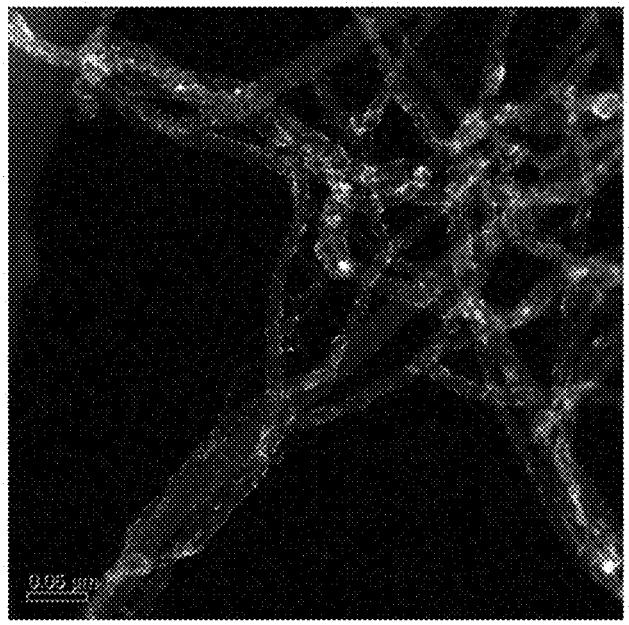
FIGS. 44A to 44F illustrate a catalyst structure acquired in Experimental Example 20-7, specifically illustrating an STEM image, an HRTEM image and EDX images of the acquired catalyst structure, respectively.
Figure 44B:
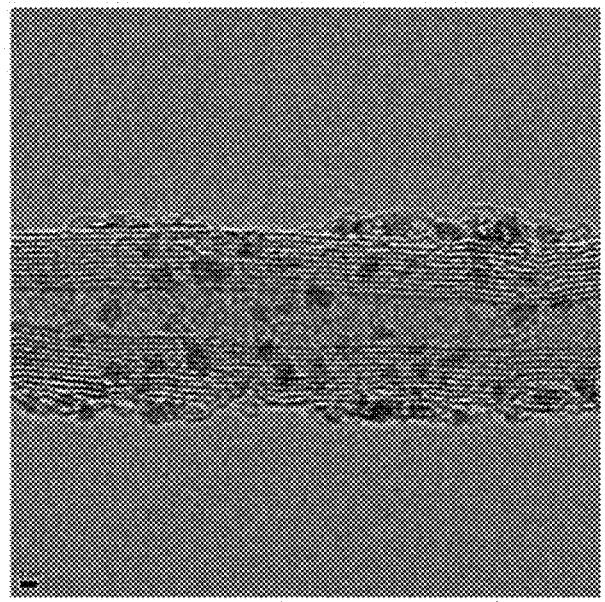
Figure 44C:
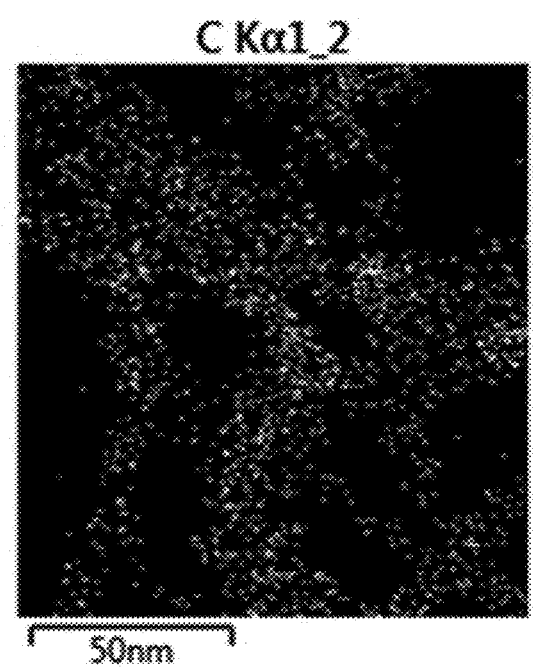
Figure 44D:
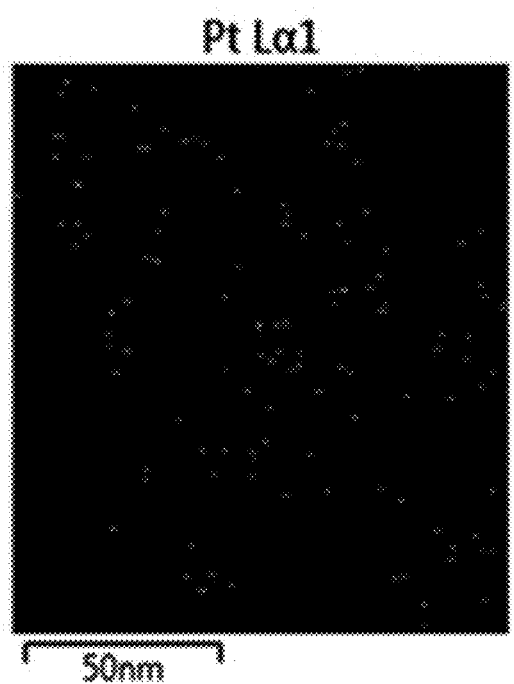
Figure 44E:
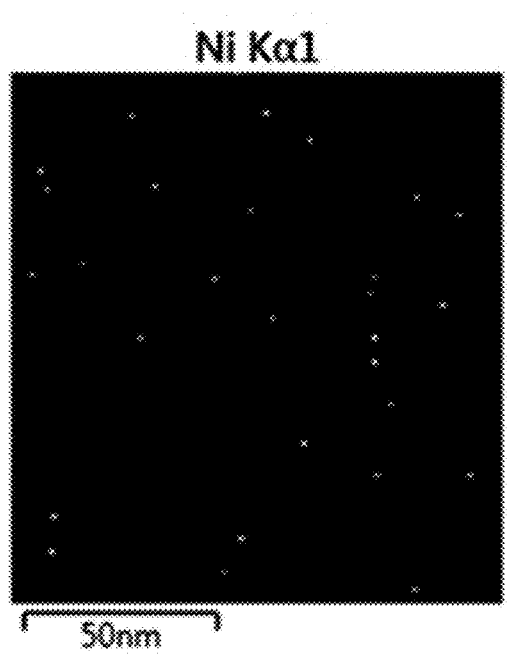
Figure 44F:
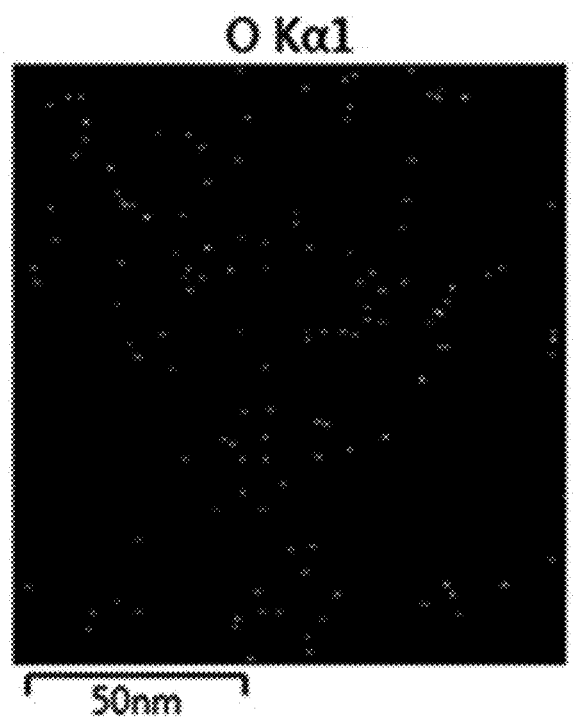

FIGS. 44A to 44F illustrate a catalyst structure acquired in Experimental Example 20-7. Specifically, FIG. 44A illustrates an STEM image of the catalyst structure and FIG. 44B illustrates an HRTEM image of the catalyst structure. It was confirmed from FIGS. 44A and 44B that PtNi nanoparticles having a particle size of 2 nm, which is slightly larger than Pt having a particle size of 1 to 1.5 nm, were uniformly dispersed on surfaces of carbon spheres. FIGS. 44C to 44F illustrate EDX images of the acquired catalyst structure. Specifically, distribution of C components of carbon nanotubes is illustrated in FIG. 44C, distribution of Pt nanoparticles is illustrated in FIG. 44D, distribution of Ni nanoparticles is illustrated in FIG. 44E, and a surface oxide layer of the final catalyst structure is illustrated in FIG. 44F.

Figure 45A:
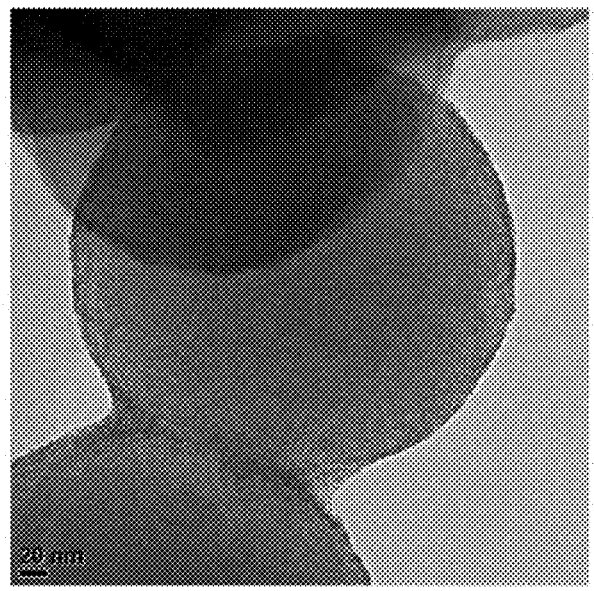
FIGS. 45A to 45C illustrate a catalyst structure acquired in Experimental Example 20-8, specifically illustrating a TEM image, an HRTEM image and an EDX graph of the acquired catalyst structure, respectively.
Figure 45B:
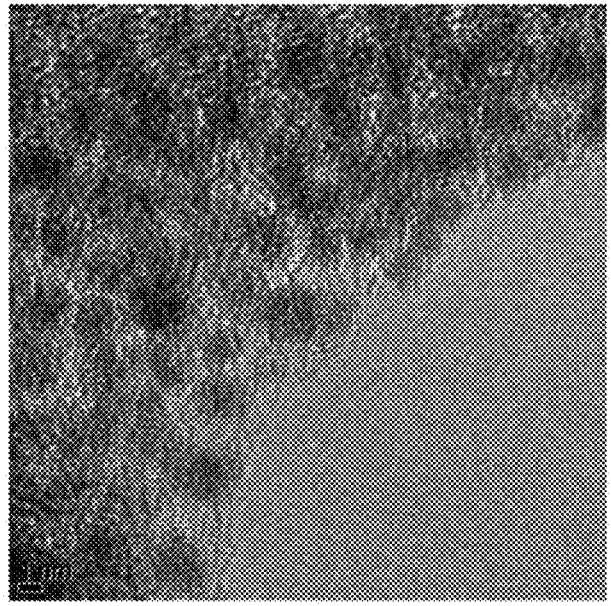
Figure 45C:
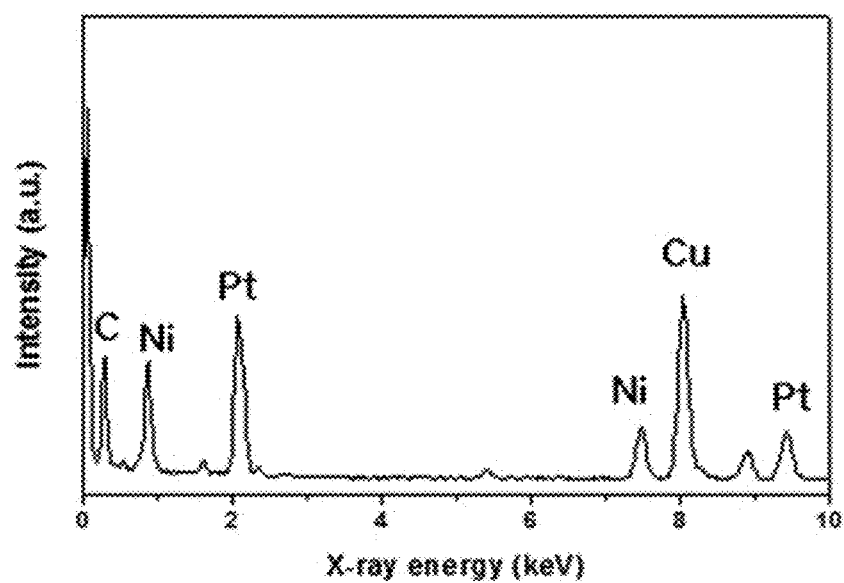

FIGS. 45A to 45C illustrate a catalyst structure acquired in Experimental Example 20-8. Specifically, FIG. 45A illustrates a TEM image of the catalyst structure and FIG. 45B illustrates an HRTEM image of the catalyst structure. It was confirmed from FIGS. 45A and 45B that NiPt$_3$ nanoparticles were uniformly dispersed on surfaces of carbon spheres. FIG. 45C illustrates an EDX images of the acquired catalyst structure, from which C, Pt and Ni peaks are identified, confirming that the nanoparticles illustrated in FIGS. 45A and 45B are NiPt$_3$ nanoparticles. Table 16 demonstrates measurement results of atomic ratios. Based on the measured atomic ratios, it can be deduced that the NiPt$_3$ binary alloy nanoparticles.

TABLE 16

| Element | Line Type | k factor | Absorption Correction | Wt % | Wt % Sigma | Atomic % |
|---|---|---|---|---|---|---|
| Ni | K series | 1.29311 | 1.00 | 19.01 | 0.73 | 43.83 |
| Pt | L series | 2.75544 | 1.00 | 80.99 | 0.73 | 56.17 |
| Total | | | | 100.00 | | 100.00 |

Figure 46A:
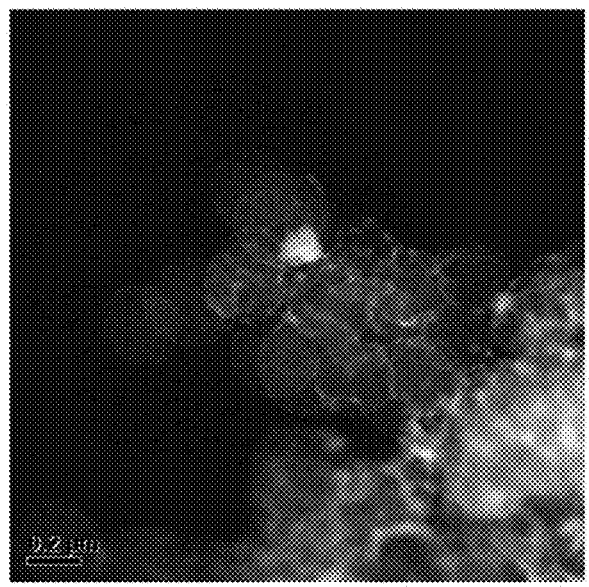
FIGS. 46A to 46C illustrate a catalyst structure acquired in Experimental Example 20-9, specifically illustrating an STEM image, an HRTEM image and an EDX graph of the acquired catalyst structure, respectively.
Figure 46B:
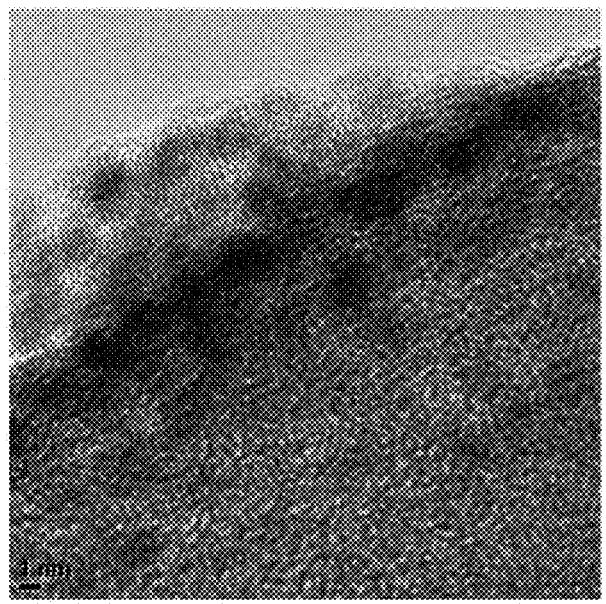
Figure 46C:
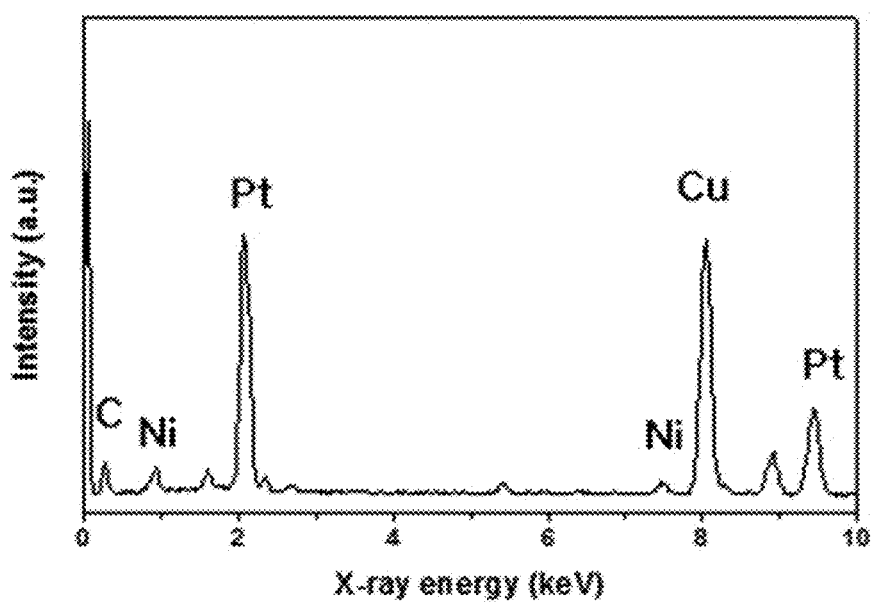

FIGS. 46A to 46C illustrate a catalyst structure acquired in Experimental Example 20-9. Specifically, FIG. 46A illustrates an STEM image of the catalyst structure and FIG. 46B illustrates an HRTEM image of the catalyst structure. It was confirmed from FIGS. 46A and 46B that 2 nm sized NiPt$_3$ nanoparticles were uniformly dispersed on surfaces of carbon spheres. FIG. 46C illustrates an EDX graph, from which C, Pt and Ni peaks are identified, confirming that the nanoparticles illustrated in FIGS. 46A and 46B are NiPt$_3$ nanoparticles. Table 17 demonstrates measurement results of atomic ratios. Based on the measured atomic ratios, it can be deduced that the nanoparticles illustrated in FIGS. 46A and 46B are NiPt$_3$ nanoparticles.

TABLE 17

| Element | Line Type | k factor | Absorption Correction | Wt % | Wt % Sigma | Atomic % |
|---|---|---|---|---|---|---|
| Ni | K series | 1.29311 | 1.00 | 14.49 | 0.99 | 36.02 |
| Pt | L series | 2.75544 | 1.00 | 85.51 | 0.99 | 63.98 |
| Total | | | | 100.00 | | 100.00 |

Figure 47A:
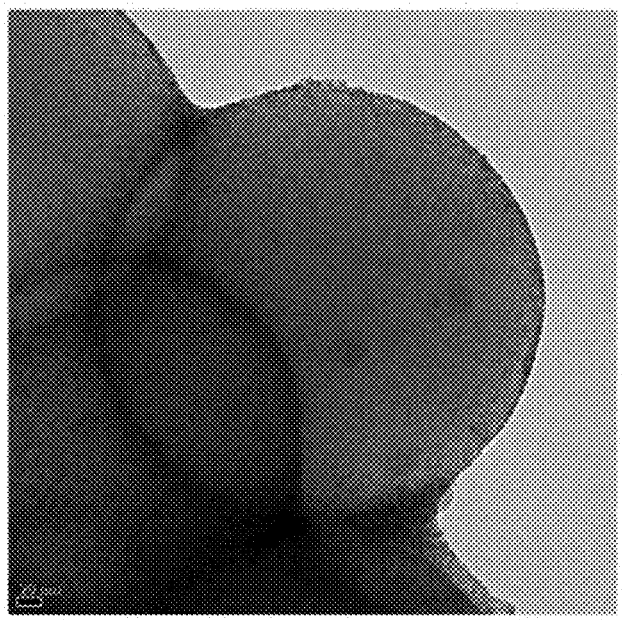
FIGS. 47A to 47C illustrate a catalyst structure acquired in Experimental Example 20-10, specifically illustrating a TEM image, an HRTEM image and an EDX graph of the acquired catalyst structure, respectively.
Figure 47B:
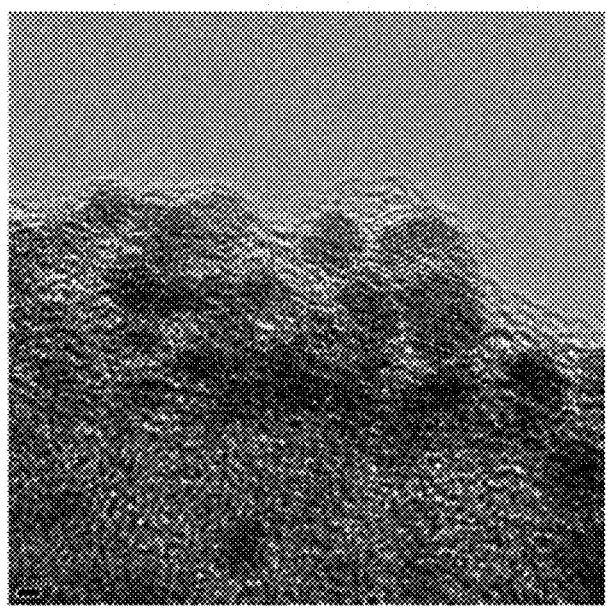
Figure 47C:
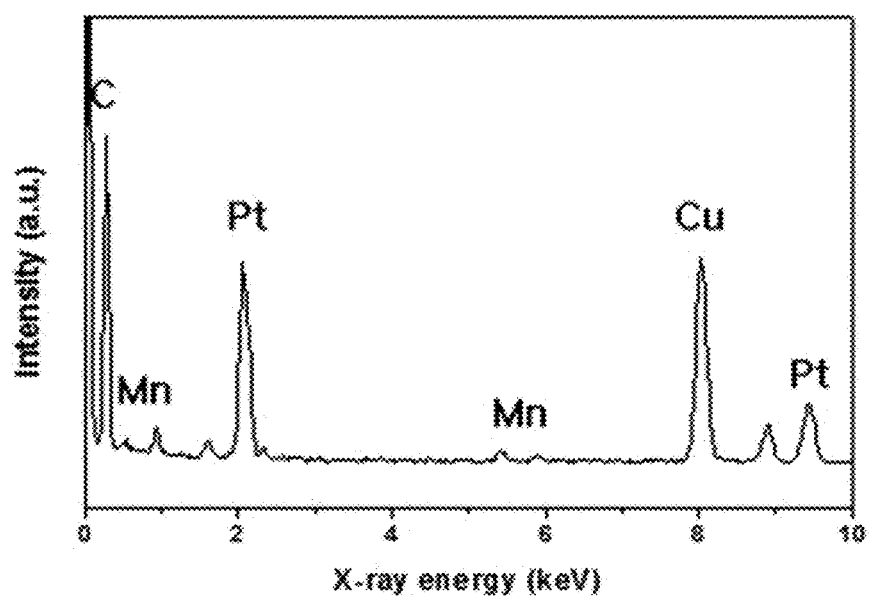

FIGS. 47A to 47C illustrate a catalyst structure acquired in Experimental Example 20-10. Specifically, FIG. 47A illustrates a TEM image of the catalyst structure and FIG. 47B illustrates an HRTEM image of the catalyst structure. It was confirmed from FIGS. 47A and 47B that 2 nm sized $MnPt_7$ nanoparticles were uniformly dispersed on surfaces of carbon spheres. FIG. 47C illustrates an EDX graph of the acquired catalyst structure, from which C, Pt and Mn peaks identified, confirming that the nanoparticles illustrated in FIGS. 47A and 47B are $MnPt_7$ nanoparticles. Table 18 demonstrates measurement results of atomic ratios. Based on the measured atomic ratios, it can be deduced that the nanoparticles illustrated in FIGS. 47A and 47B are $MnPt_7$ binary alloy nanoparticles.

TABLE 18

| Element | Line Type | k factor | Absorption Correction | Wt % | Wt % Sigma | Atomic % |
|---|---|---|---|---|---|---|
| Mn | K series | 1.19711 | 1.00 | 3.48 | 0.49 | 12.51 |
| Pt | L series | 2.75544 | 1.00 | 96.52 | 0.49 | 87.49 |
| Total | | | | 100.00 | | 100.00 |

Figure 48A:
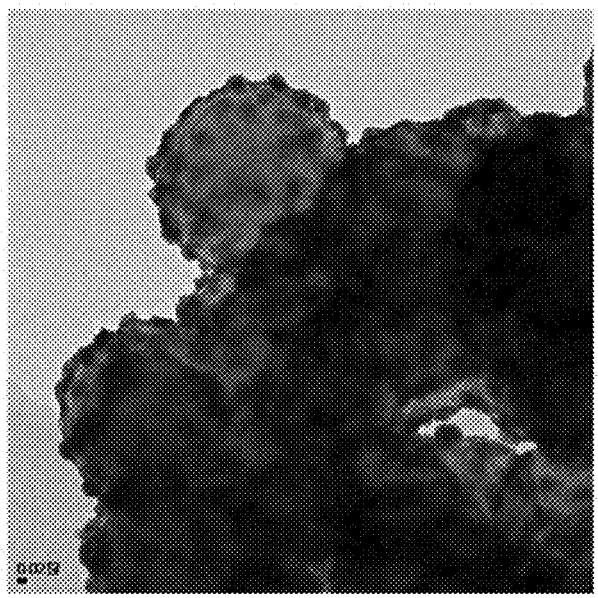
FIGS. 48A to 48C illustrate a catalyst structure acquired in Experimental Example 20-11, specifically illustrating a TEM image, an STEM image and an HRTEM image of the acquired catalyst structure, respectively.
Figure 48B:
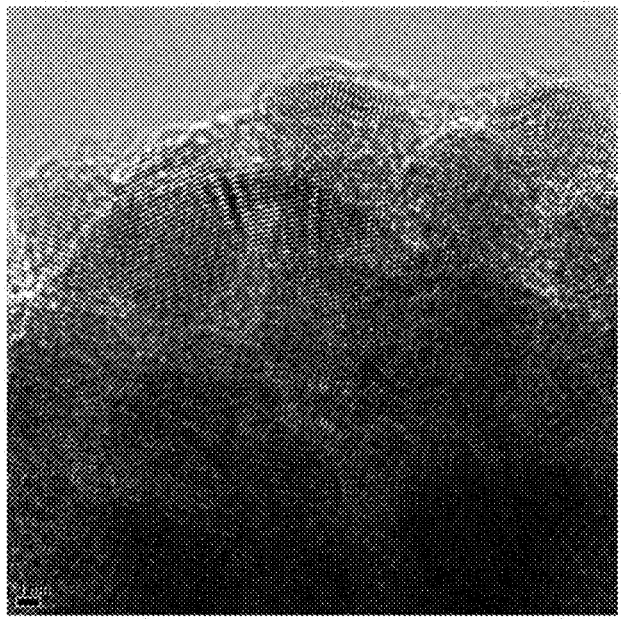
Figure 48C:
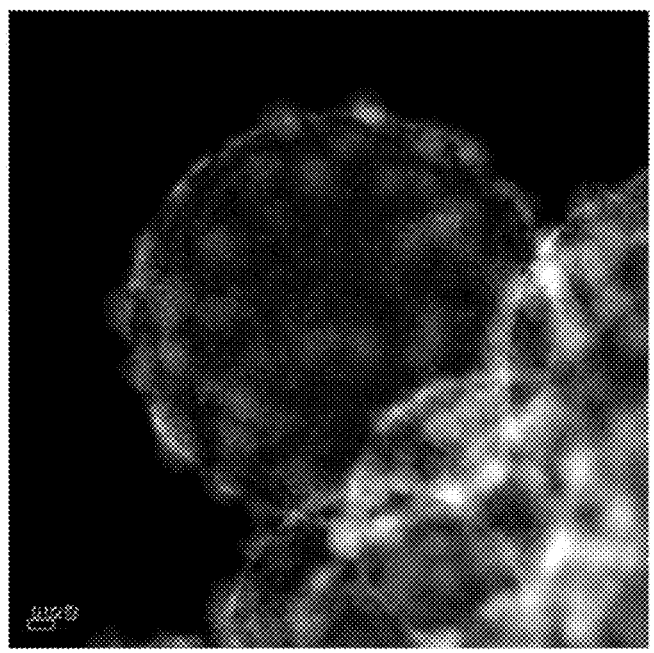

FIGS. 48A to 48C illustrate a catalyst structure acquired in Experimental Example 20-11, specifically illustrating a TEM image, an STEM image and an HRTEM image of the catalyst structure, respectively, the catalyst structure having $Cu_3Pt$ nanoparticles having particle sizes of 5 nm and 20 nm uniformly dispersed on surfaces of carbon spheres. Table 19 demonstrates measurement results of atomic ratios of 5 nm sized nanoparticles and Table 20 demonstrates measurement results of atomic ratios of 20 nm sized nanoparticles. Based on the measured atomic ratios, it can be deduced that the nanoparticles illustrated in FIGS. 48A and 48B are $Cu_3Pt$ binary alloy nanoparticles.

TABLE 19

| Element | Line Type | k factor | Absorption Correction | Wt % | Wt % Sigma | Atomic % |
|---|---|---|---|---|---|---|
| Cu | K series | 1.42103 | 1.00 | 51.86 | 0.71 | 76.78 |
| Pt | L series | 2.75544 | 1.00 | 48.14 | 0.71 | 23.22 |
| Total | | | | 100.00 | | 100.00 |

TABLE 20

| Element | Line Type | k factor | Absorption Correction | Wt % | Wt % Sigma | Atomic % |
|---|---|---|---|---|---|---|
| Cu | K series | 1.42103 | 1.00 | 61.11 | 0.84 | 82.83 |
| Pt | L series | 2.75544 | 1.00 | 38.89 | 0.84 | 17.17 |
| Total | | | | 100.00 | | 100.00 |

Figure 49A:
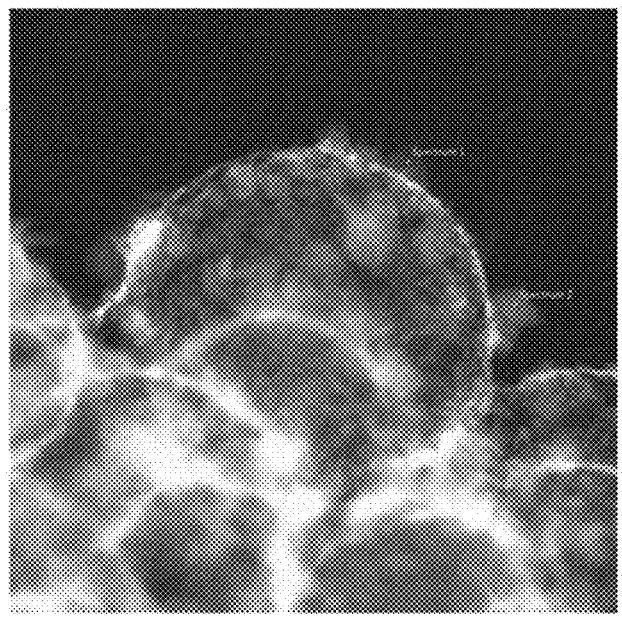
FIGS. 49A and 49B illustrate a catalyst structure acquired in Experimental Example 20-12, specifically illustrating an STEM image and an HRTEM image of the acquired catalyst structure, respectively.
Figure 49B:
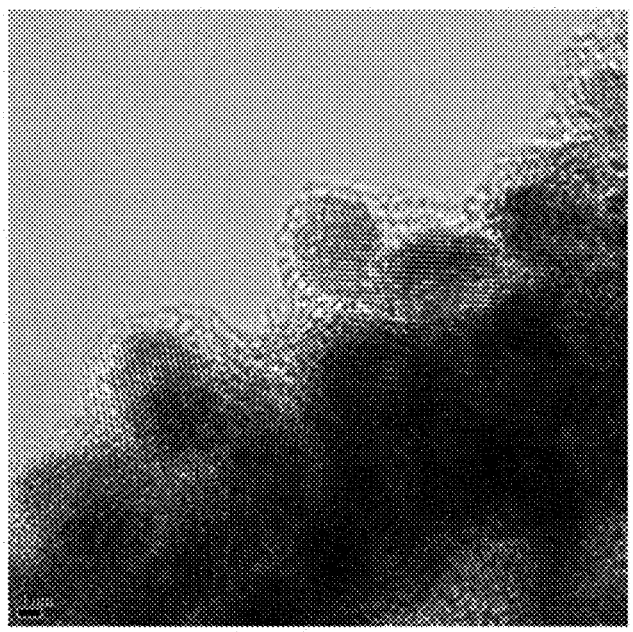

FIGS. 49A and 49B illustrate a catalyst structure acquired in Experimental Example 20-12. Specifically, FIG. 49A illustrates an STEM image of the catalyst structure and FIG. 49B illustrates an HRTEM image of the catalyst structure. It was confirmed from FIGS. 49A and 49B that 2 nm sized nanoparticles were uniformly coated on surfaces of carbon spheres and that 2 nm sized nanoparticles and amorphous nanostructures of less than 50 nm sized particles are simultaneously synthesized on carbon spheres. Table 21 demonstrates measurement results of atomic ratios of 2 nm sized nanoparticles and Table 20 demonstrates measurement results of atomic ratios of 50 nm sized nanoparticles. Based on the measured atomic ratios, it can be deduced that the 2 nm sized nanoparticles include $Cu_3Pt$ binary alloy nanoparticles and less than 50 nm sized nanoparticles include pure Sn nanoparticles.

TABLE 21

| Element | Line Type | k factor | Absorption Correction | Wt % | Wt % Sigma | Atomic % |
|---|---|---|---|---|---|---|
| Sn | K series | 33.89798 | 1.00 | 4.34 | 8.44 | 6.94 |
| Pt | L series | 2.75544 | 1.00 | 95.66 | 8.44 | 93.06 |
| Total | | | | 100.00 | | 100.00 |

TABLE 22

| Element | Line Type | k factor | Absorption Correction | Wt % | Wt % Sigma | Atomic % |
|---|---|---|---|---|---|---|
| Sn | K series | 33.89798 | 1.00 | 100.00 | 0.00 | 100.00 |
| Total | | | | 100.00 | | 100.00 |

Figure 50A:
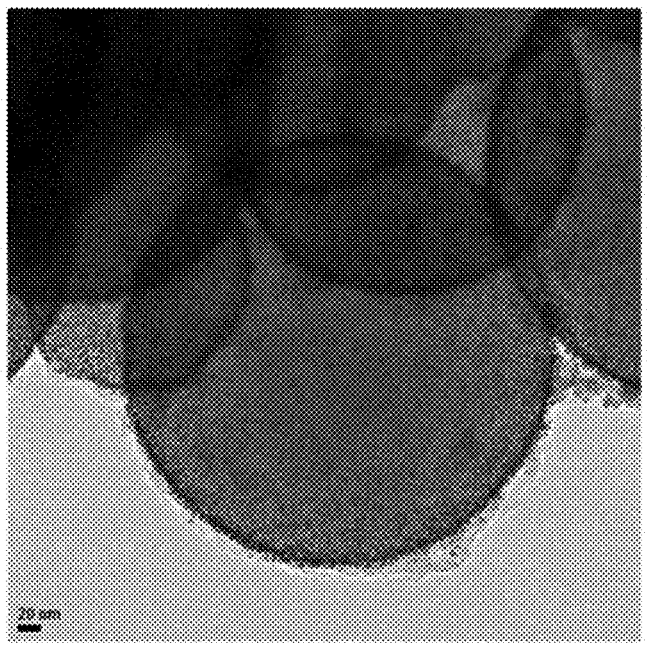
FIGS. 50A to 50C illustrate a catalyst structure acquired in Experimental Example 20-13, specifically illustrating an STEM image, an HRTEM image and an EDX graph of the acquired catalyst structure, respectively.
Figure 50B:
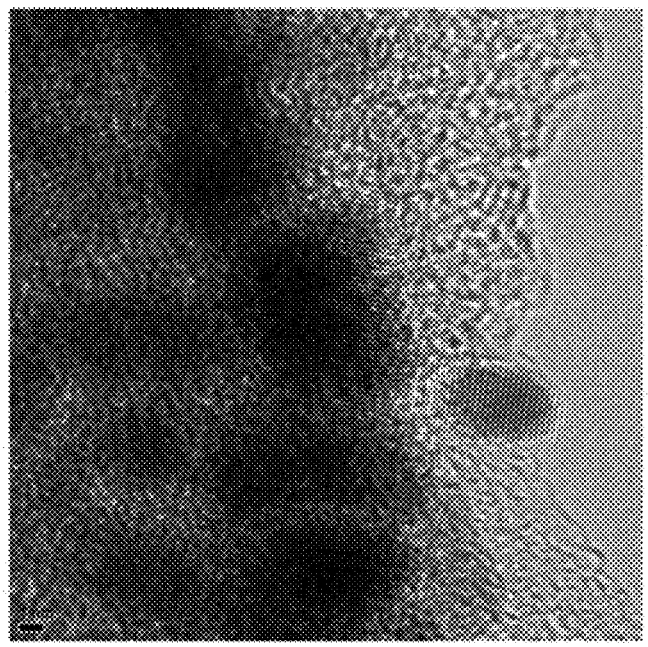
Figure 50C:
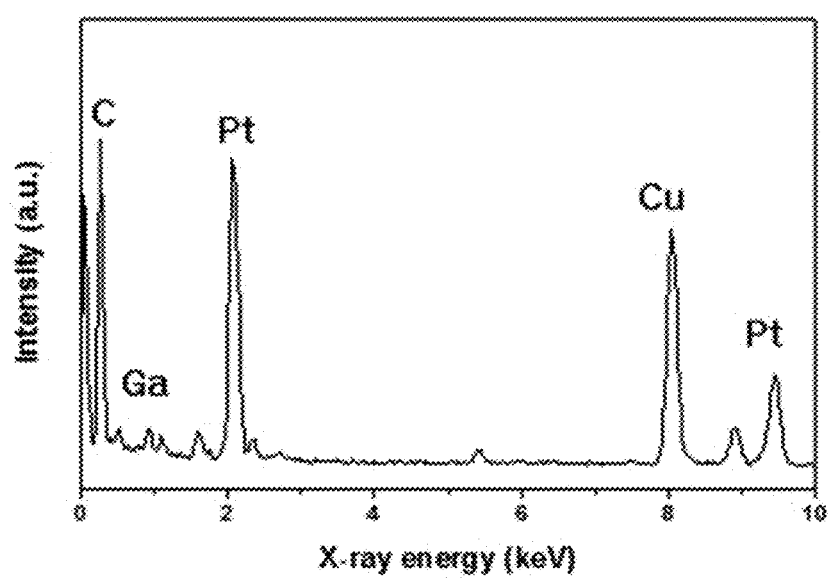

FIGS. 50A to 50C illustrate a catalyst structure acquired in Experimental Example 20-13. Specifically, FIG. 50A illustrates a TEM image of the catalyst structure and FIG. 50B illustrates an HRTEM image. It was confirmed from FIGS. 50A and 50B that 2 nm sized nanoparticles were uniformly coated on surfaces of carbon spheres. FIG. 50C illustrates an EDX graph of the acquired catalyst structure, from which C, Pt and Ga peaks identified, confirming that the nanoparticles illustrated in FIGS. 50A and 50B are $GaPt_9$ nanoparticles. Table 23 demonstrates measurement results of atomic ratios of 2 nm sized nanoparticles. Based on the measured atomic ratios, it can be deduced that the nanoparticles illustrated in FIGS. 50A and 50B are $GaPt_9$ binary alloy nanoparticles.

TABLE 23

| Element | Line Type | k factor | Absorption Correction | Wt % | Wt % Sigma | Atomic % |
|---|---|---|---|---|---|---|
| Ga | K series | 1.64918 | 1.00 | 3.45 | 0.68 | 9.10 |
| Pt | L series | 2.75544 | 1.00 | 96.55 | 0.68 | 90.90 |
| Total | | | | 100.00 | | 100.00 |

Experimental Example 21

Catalyst structures having multi-component alloy nanostructured catalyst particles dispersed in a support were synthesized in the following manner. The catalyst structures are basically synthesized in substantially the same manner as in Experimental Example 1 using various catalyst sources under different conditions listed in Table 24.

TABLE 24

| Experimental Example | Catalyst source (Metal content, wt %) |
|---|---|
| 21-1 | Pt acetylacetonate (85 wt %) |
| | Fe acetylacetonate (7 wt %) |
| | Co acetylacetonate (3 wt %) |
| | Ni acetylacetonate (5 wt %) |

TABLE 24-continued

| Experimental Example | Catalyst source (Metal content, wt %) |
|---|---|
| 21-2 | Pt acetylacetonate (87 wt %) |
|  | Ferrocene (5 wt %) |
|  | Co acetylacetonate (4 wt %) |
|  | Ni acetylacetonate (5 wt %) |
| 21-3 | Pt acetylacetonate (35 wt %) |
|  | Co acetylacetonate (40 wt %) |
|  | Cr acetylacetonate (25 wt %) |
| 21-4 | Pt acetylacetonate (45 wt %) |
|  | Co acetylacetonate (39 wt %) |
|  | V acetylacetonate (16 wt %) |
| 21-5 | Pt acetylacetonate (75 wt %) |
|  | Co acetylacetonate (20 wt %) |
|  | Ni acetylacetonate (5 wt %) |
| 21-6 | Pt acetylacetonate (85 wt %) |
|  | Fe acetylacetonate (7 wt %) |
|  | Co acetylacetonate (3 wt %) |
| 21-7 | Pt acetylacetonate (85 wt %) |
|  | Fe acetylacetonate (7 wt %) |
|  | Ni acetylacetonate (5 wt %) |

Figure 51A:
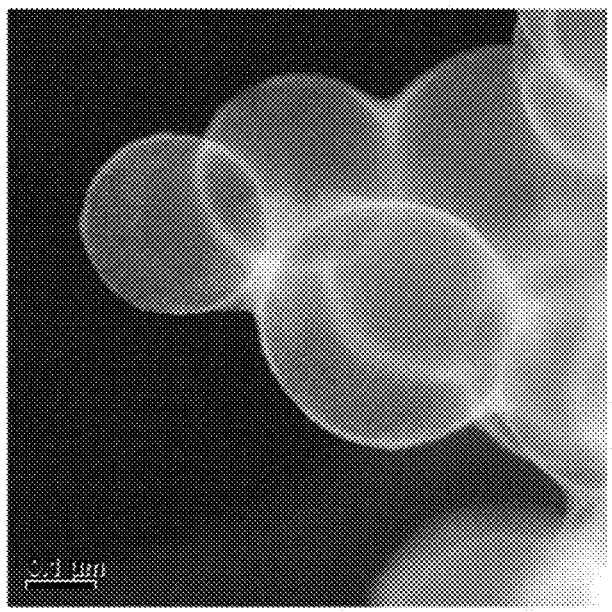
FIGS. 51A to 51C illustrate a catalyst structure acquired in Experimental Example 21-1, specifically FIG. 51A illustrating an STEM image, FIG. 51B illustrating an HRTEM image, and FIG. 51C illustrating an EDX graph.
Figure 51B:
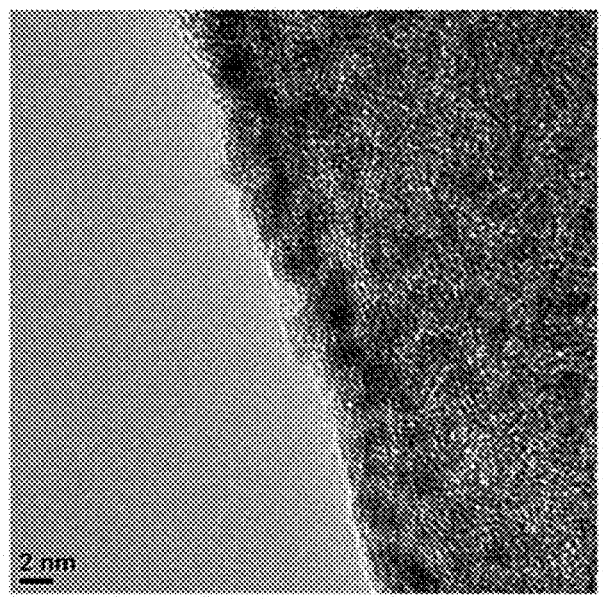
Figure 51C:
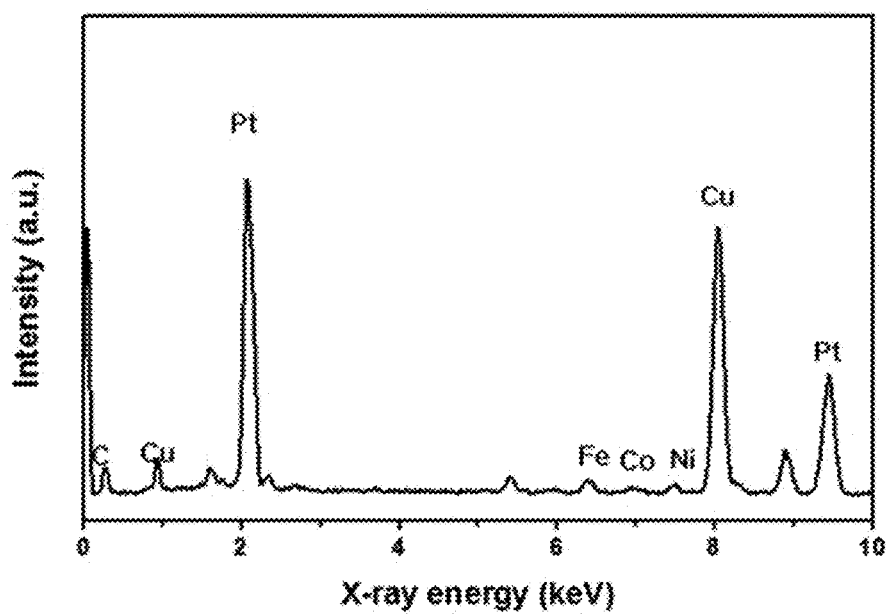

FIGS. 51A to 51C illustrate a catalyst structure acquired in Experimental Example 21-1. Specifically, FIG. 51A illustrates an STEM image of the catalyst structure and FIG. 51B illustrates an HRTEM image of the catalyst structure. It was confirmed from FIGS. 51A and 51B that 2 nm sized nanoparticles were uniformly coated on surfaces of carbon spheres. FIG. 51C illustrates an EDX graph of the acquired catalyst structure, from which C, Pt, Fe, Co and Ni peaks are identified, confirming that the nanoparticles illustrated in FIGS. 51A and 51B are $Pt_{85}Fe_7Co_3Ni_5$ nanoparticles.

Figure 52A:
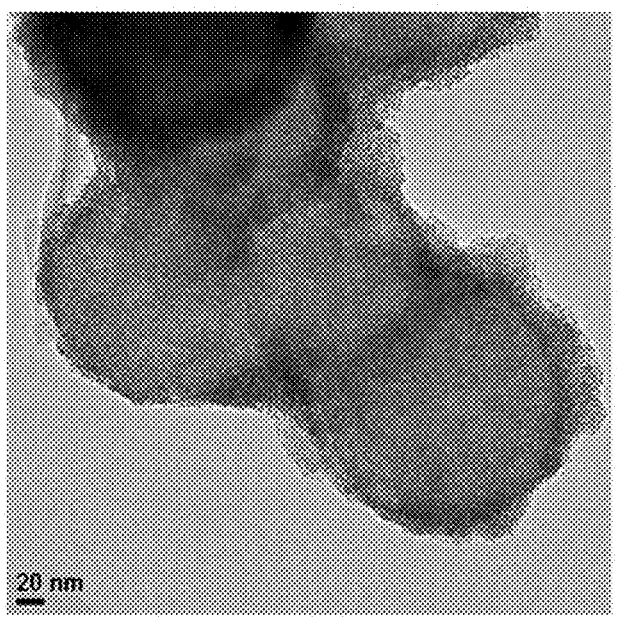
FIGS. 52A to 52C illustrate a catalyst structure acquired in Experimental Example 21-2, specifically illustrating an STEM image, an HRTEM image and an EDX graph of the acquired catalyst structure, respectively.
Figure 52B:
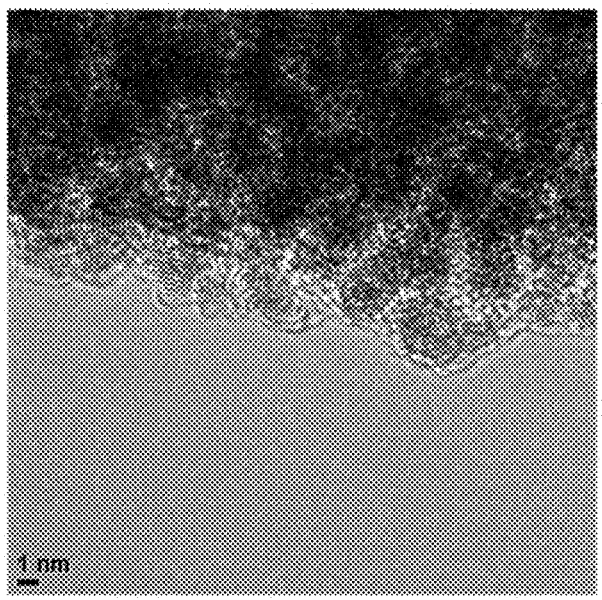
Figure 52C:
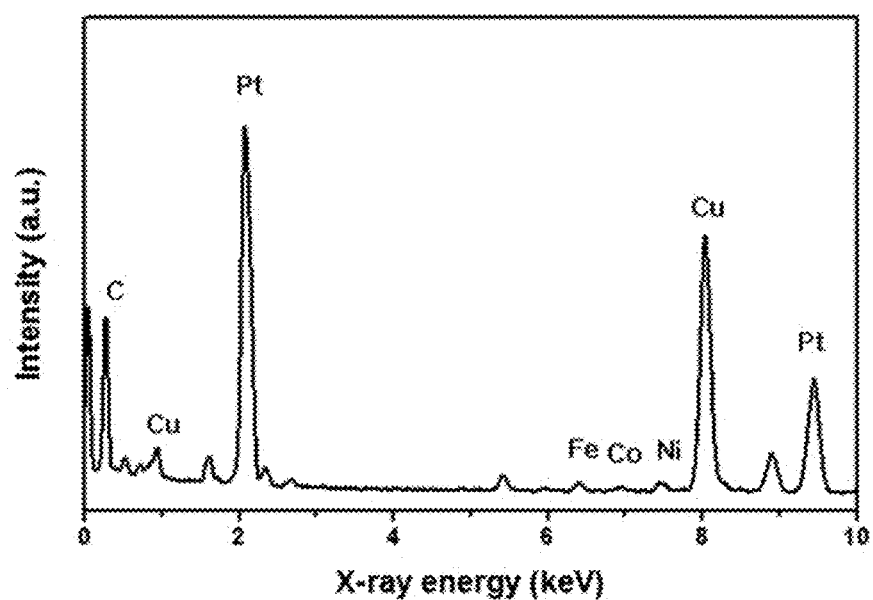

FIGS. 52A to 52C illustrate a catalyst structure acquired in Experimental Example 21-2. Specifically, FIG. 52A illustrates an STEM image of the catalyst structure and FIG. 52B illustrates an HRTEM image of the catalyst structure. It was confirmed from FIGS. 52A and 52B that 2 nm sized nanoparticles were uniformly coated on surfaces of carbon spheres. FIG. 52C illustrates an EDX graph of the acquired catalyst structure, from which C, Pt, Fe, Co and Ni peaks are identified, confirming that the nanoparticles illustrated in FIGS. 52A and 52B are $Pt_{87}Fe_5Co_4Ni_5$ nanoparticles.

Figure 53A:
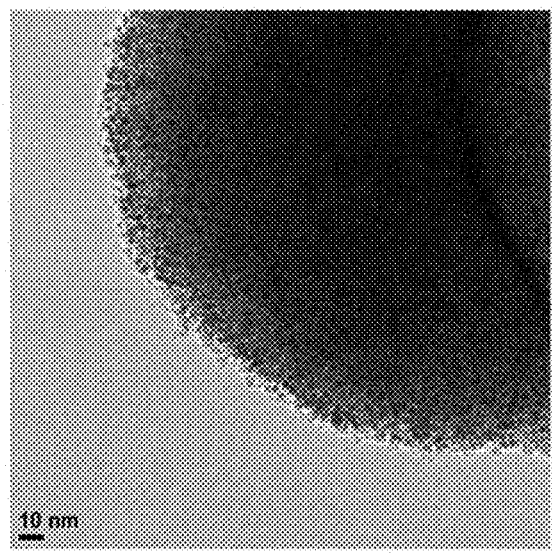
FIGS. 53A to 53C illustrate a catalyst structure acquired in Experimental Example 21-3, specifically illustrating an STEM image, an HRTEM image and an EDX graph of the acquired catalyst structure, respectively.
Figure 53B:
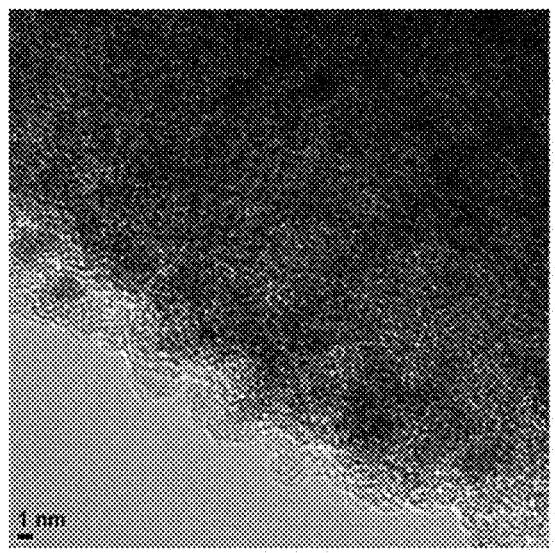
Figure 53C:
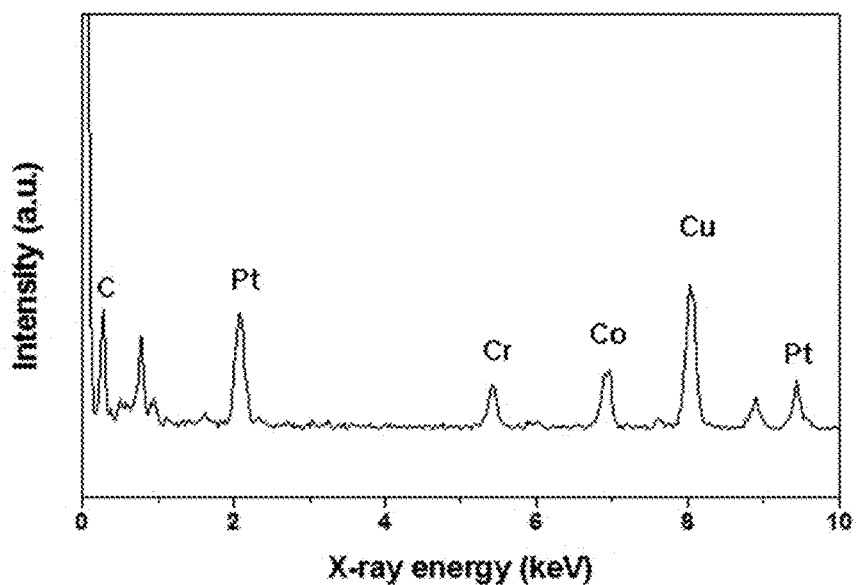

FIGS. 53A to 53C illustrate a catalyst structure acquired in Experimental Example 21-3. Specifically, FIG. 53A illustrates an STEM image of the catalyst structure and FIG. 53B illustrates an HRTEM image of the catalyst structure. It was confirmed from FIGS. 53A and 53B that 2 nm sized nanoparticles were uniformly coated on surfaces of carbon spheres. FIG. 52C is an EDX graph of the acquired catalyst structure, from which C, Pt, Cr and Co peaks are identified, confirming that the nanoparticles illustrated in FIGS. 53A and 53B are $Pt_{35}Co_{40}Cr_{25}$ nanoparticles.

Figure 54A:
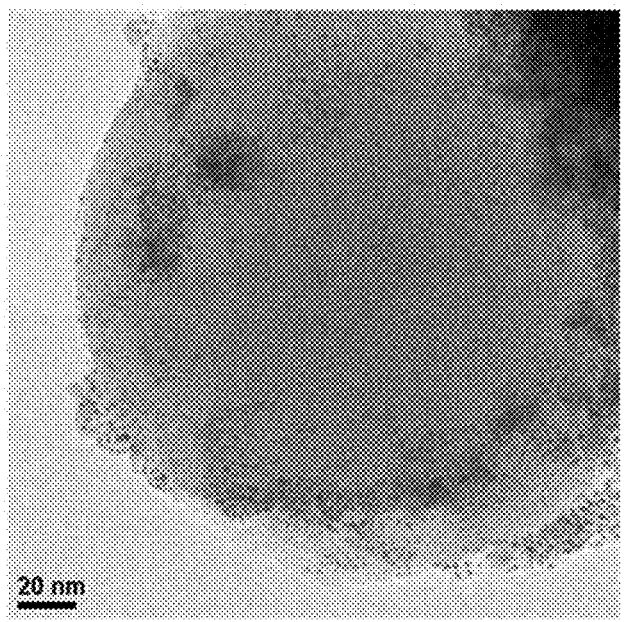
FIGS. 54A to 54C illustrate a catalyst structure acquired in Experimental Example 21-4, specifically illustrating an STEM image, an HRTEM image and an EDX graph of the acquired catalyst structure, respectively.
Figure 54B:
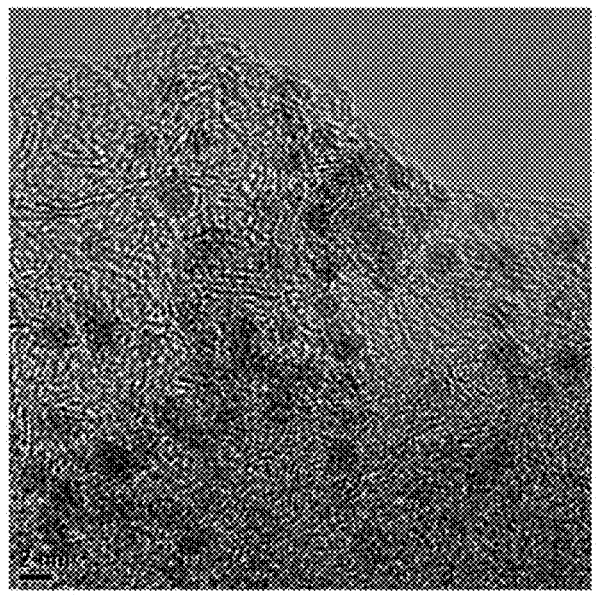
Figure 54C:
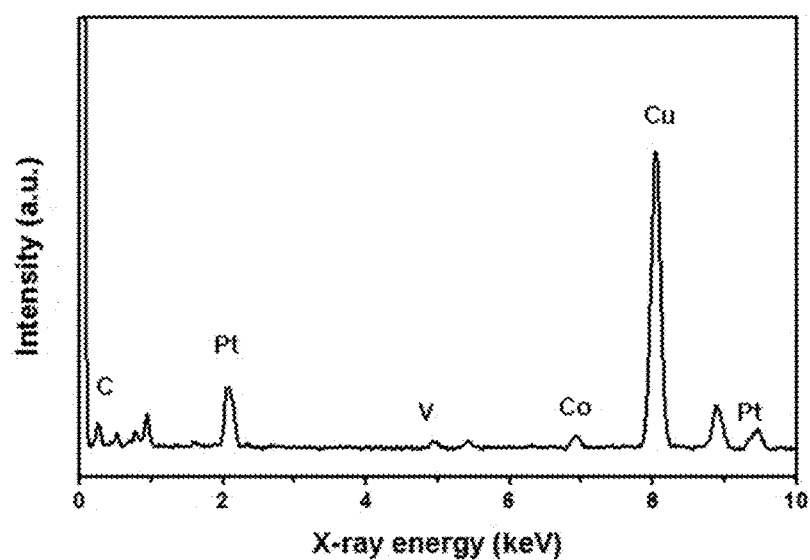

FIGS. 54A to 54C illustrate a catalyst structure acquired in Experimental Example 21-4. Specifically, FIG. 54A illustrates an STEM image of the catalyst structure and FIG. 54B illustrates an HRTEM image of the catalyst structure. It was confirmed from FIGS. 54A and 54B that 2 nm sized nanoparticles were uniformly coated on surfaces of carbon spheres. FIG. 54C is an EDX graph of the acquired catalyst structure, from which C, Pt, Co and V peaks are identified, confirming that the nanoparticles illustrated in FIGS. 54A and 54B are $Pt_{45}Co_{39}V_{15}$ nanoparticles.

Figure 55A:
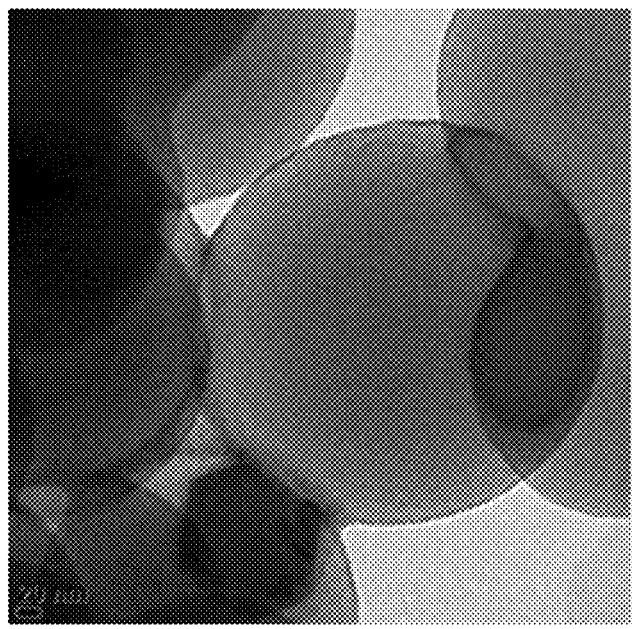
FIGS. 55A to 55C illustrate a catalyst structure acquired in Experimental Example 21-5, specifically illustrating an STEM image, an HRTEM image and an EDX graph of the acquired catalyst structure, respectively.
Figure 55B:
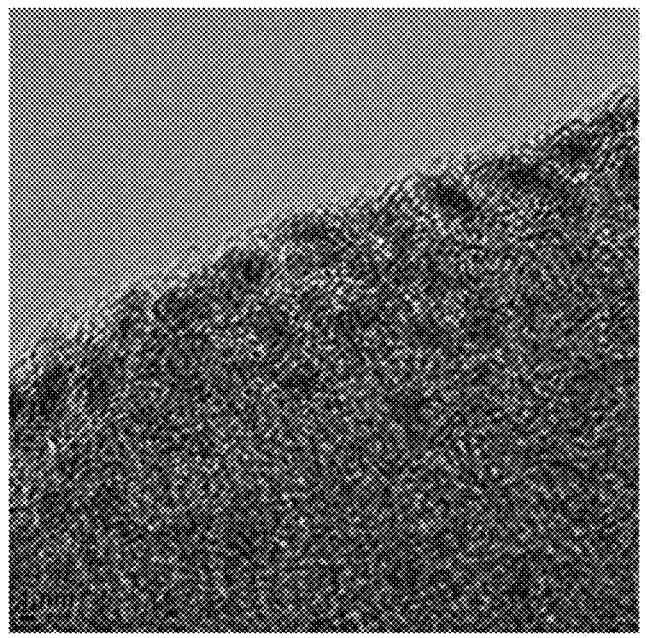
Figure 55C:
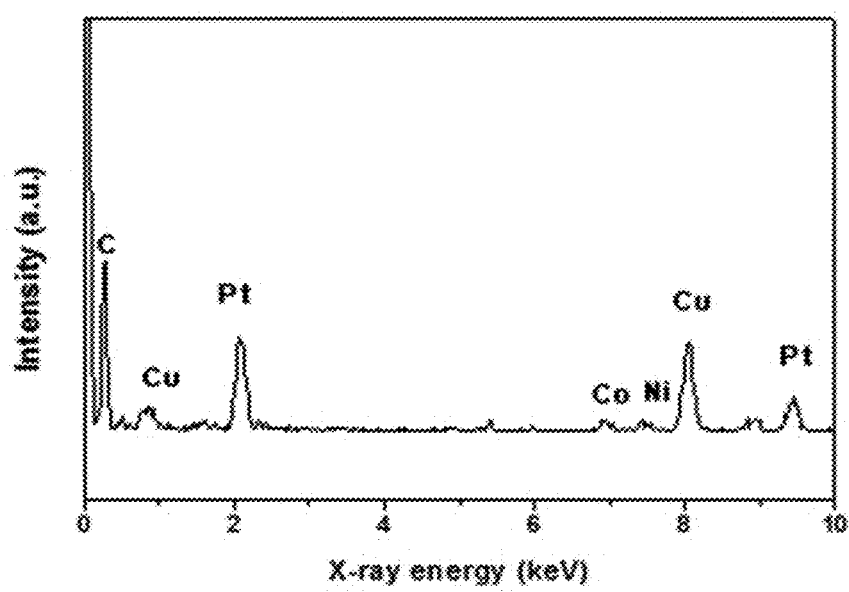

FIGS. 55A to 55C illustrate a catalyst structure acquired in Experimental Example 21-5. Specifically, FIG. 55A illustrates an STEM image of the catalyst structure and FIG. 55B illustrates an HRTEM image of the catalyst structure. It was confirmed from FIGS. 55A and 55B that 2 nm sized nanoparticles were uniformly coated on surfaces of carbon spheres. FIG. 55C is an EDX graph of the acquired catalyst structure, from which C, Pt, Co and Ni peaks are identified, confirming that the nanoparticles illustrated in FIGS. 55A and 55B are $Pt_{75}Co_{20}Ni_5$ nanoparticles.

Figure 56A:
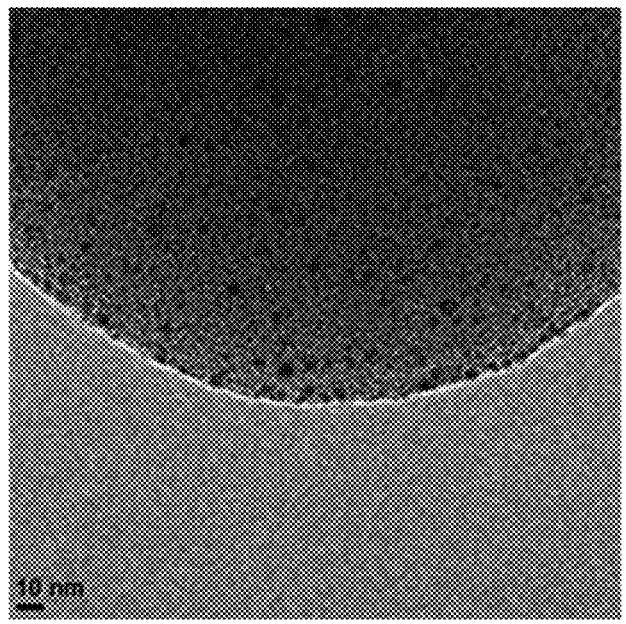
FIGS. 56A to 56C illustrate a catalyst structure acquired in Experimental Example 21-5, specifically illustrating an STEM image, an HRTEM image and an EDX graph of the acquired catalyst structure, respectively.
Figure 56B:
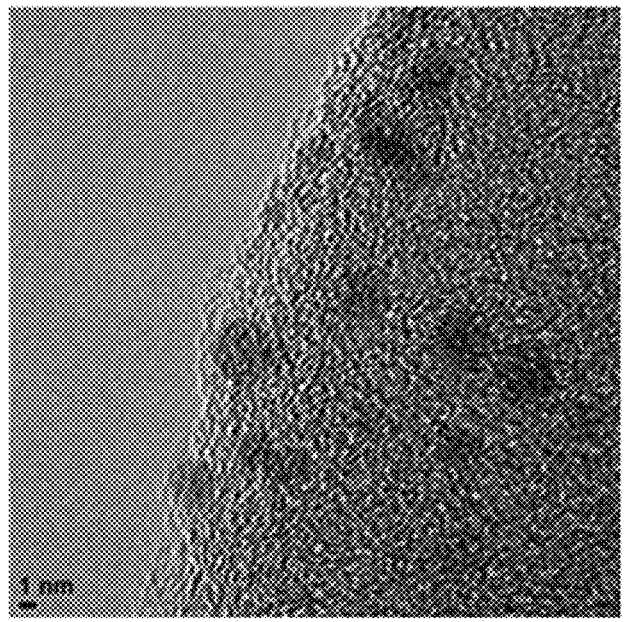
Figure 56C:
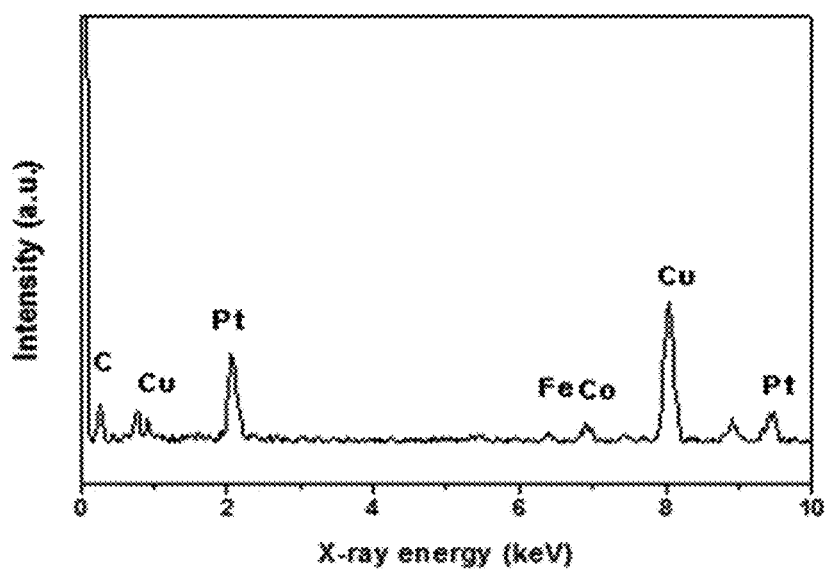

FIGS. 56A to 56C illustrate a catalyst structure acquired in Experimental Example 21-6. Specifically, FIG. 56A illustrates an STEM image of the catalyst structure and FIG. 56B illustrates an HRTEM image of the catalyst structure. It was confirmed from FIGS. 56A and 56B that 2 nm sized nanoparticles were uniformly coated on surfaces of carbon spheres. FIG. 56C is an EDX graph of the acquired catalyst structure, from which C, Pt, Fe and Co peaks are identified, confirming that the nanoparticles illustrated in FIGS. 56A and 56B are $Pt_{75}Fe_{20}Co_5$ nanoparticles.

Figure 57A:
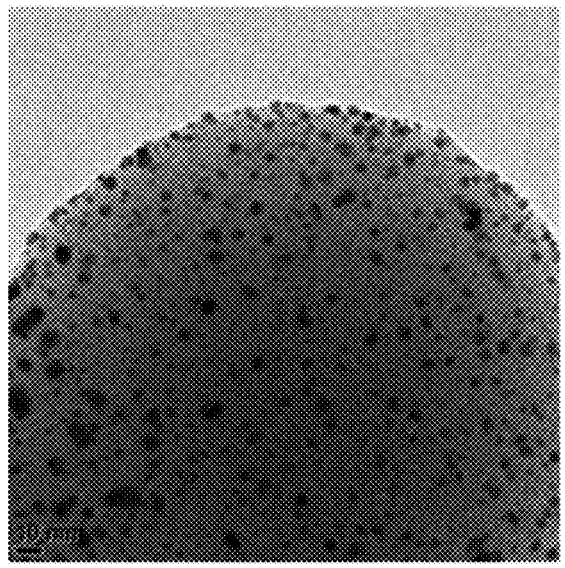
FIGS. 57A to 57C illustrate a catalyst structure acquired in Experimental Example 21-5, specifically illustrating an STEM image, an HRTEM image and an EDX graph of the acquired catalyst structure, respectively.
Figure 57B:
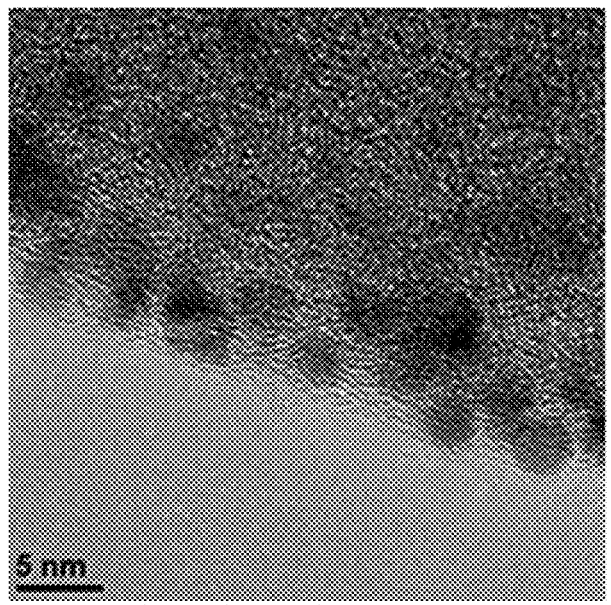
Figure 57C:
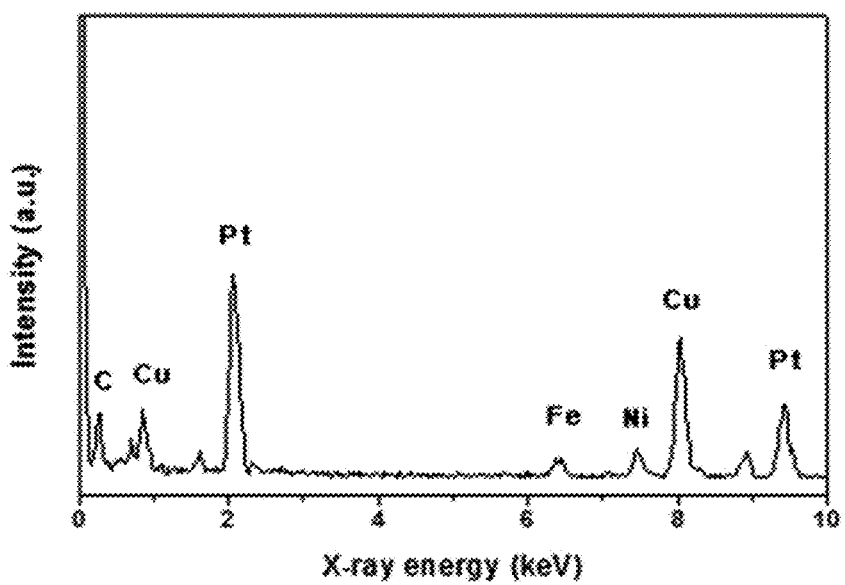

FIGS. 57A to 57C illustrate a catalyst structure acquired in Experimental Example 21-7. Specifically, FIG. 57A illustrates an STEM image of the catalyst structure and FIG. 57B illustrates an HRTEM image of the catalyst structure. It was confirmed from FIGS. 57A and 57A that 2 nm sized nanoparticles were uniformly coated on surfaces of carbon spheres. FIG. 57C is an EDX graph of the acquired catalyst structure, from which C, Pt, Fe and Ni peaks are identified, confirming that the nanoparticles illustrated in FIGS. 57A and 57B are $Pt_{75}Fe_{20}Ni_5$ nanoparticles.

Experimental Example 22

Catalyst structures having organometallic nanostructured catalyst particles dispersed in the support were synthesized in the following manner. The catalyst structures were basically synthesized by the same manner as described in Experimental Example 2 in which multi-walled carbon nanotubes were used. Here, the catalyst structures were acquired using different catalyst sources listed in Table 25 at a reaction temperature of 450° C. for 1 hour.

TABLE 25

| Experimental Example | Catalyst source (Metal content, wt %) |
|---|---|
| 22-1 | Iron (II) phthalocyanine, $C_{32}H_{16}FeN_8$) (10 wt %) |
| 22-2 | Cobalt (II) phthalocyanine ($C_{32}H_{16}CoN_8$) (10 wt %) |
| 22-3 | Manganese (II) phthalocyanine ($C_{32}H_{16}MnN_8$) (10 wt %) |

Figure 58A:
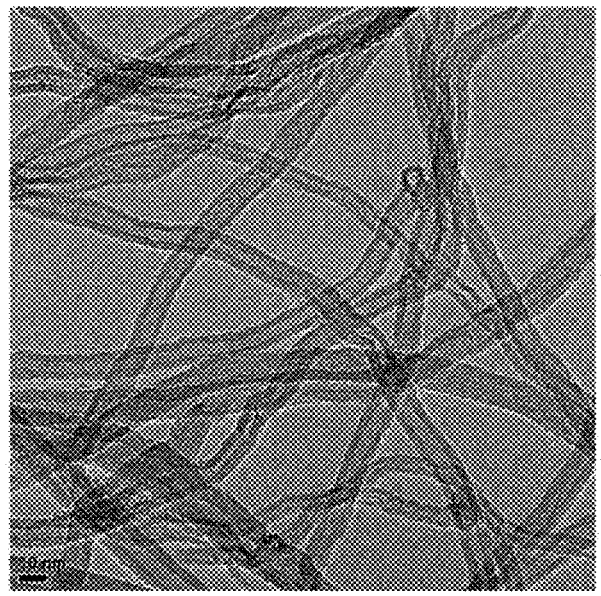
FIGS. 58A to 58F illustrate a catalyst structure acquired in Experimental Example 22-1, specifically illustrating a TEM image, an HRTEM image and EDX images of the acquired catalyst structure, respectively.
Figure 58B:
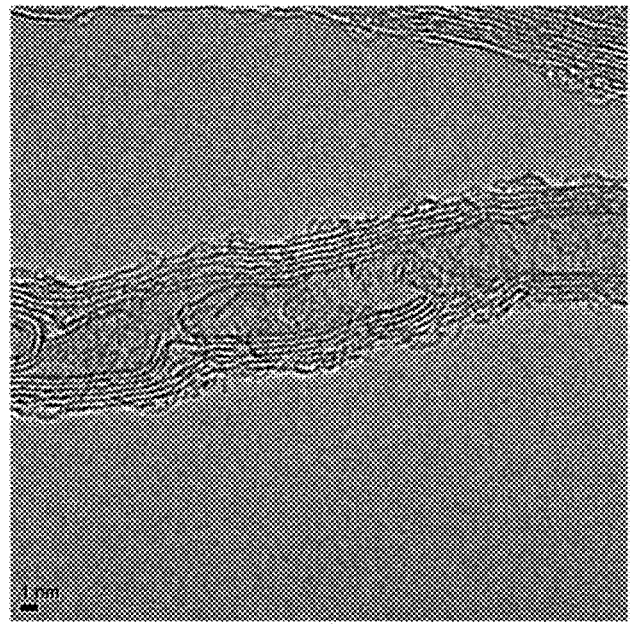
Figure 58C:
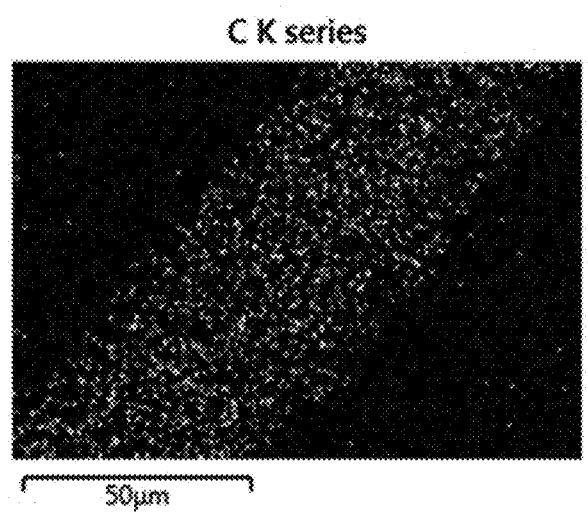
Figure 58D:
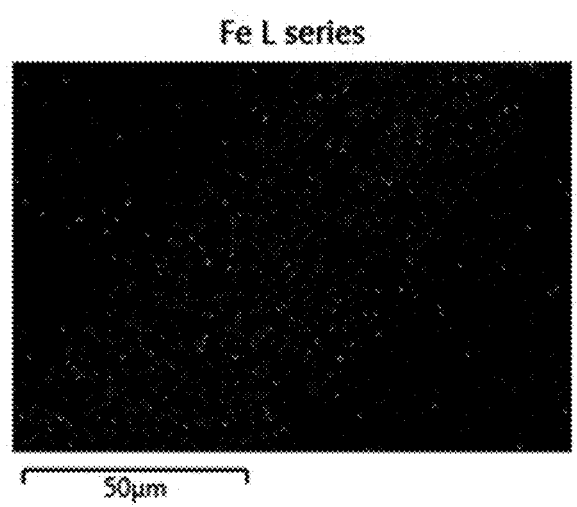
Figure 58E:
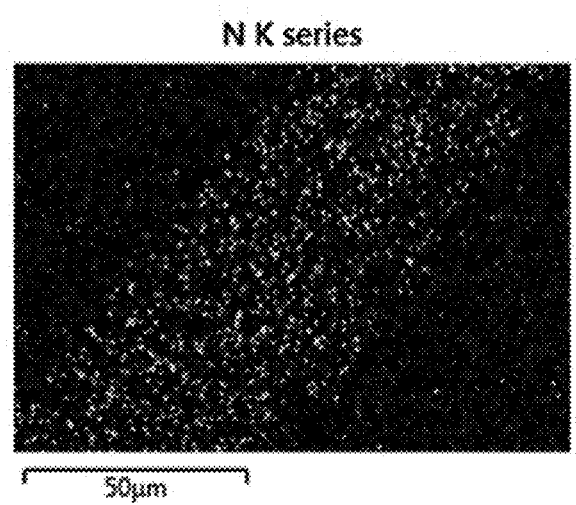
Figure 58F:
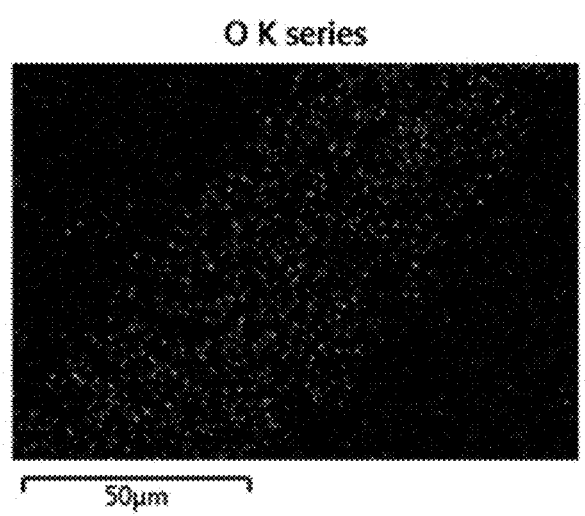

FIGS. 58A to 58F illustrate a catalyst structure acquired in Experimental Example 22-1. Specifically, FIGS. 58A and 58B illustrate TEM and HRTEM images of the catalyst structure. It was confirmed from FIGS. 58A and 58B that Fe—N—C nanoparticles were uniformly dispersed on surfaces of carbon nanotubes. FIGS. 58C to 58F are EDX graphs. Specifically, distribution of C components of the carbon nanotubes is illustrated in FIG. 58C, distribution of Fe nanoparticles is illustrated in FIG. 58D, distribution of N nanoparticles is illustrated in FIG. 58e, and a surface oxide layer of the final catalyst structure is illustrated in FIG. 58F.

Figure 59A:
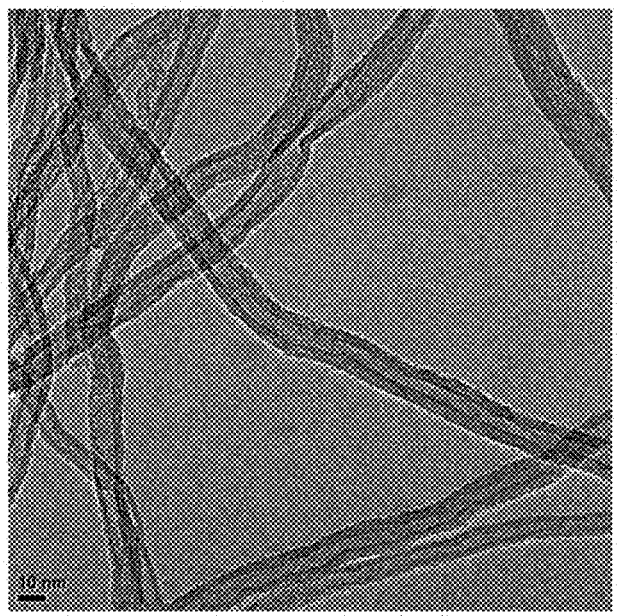
FIGS. 59A to 59F illustrate a catalyst structure acquired in Experimental Example 22-2, specifically illustrating a TEM image, an HRTEM image and EDX images of the acquired catalyst structure, respectively.
Figure 59B:
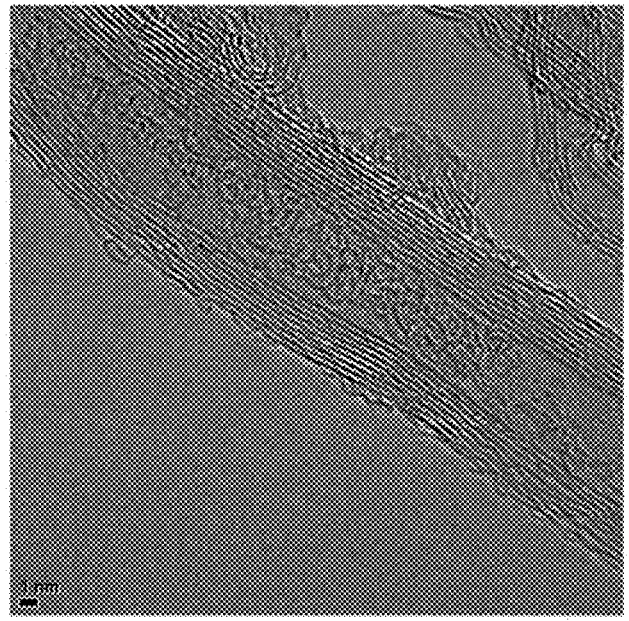
Figure 59C:
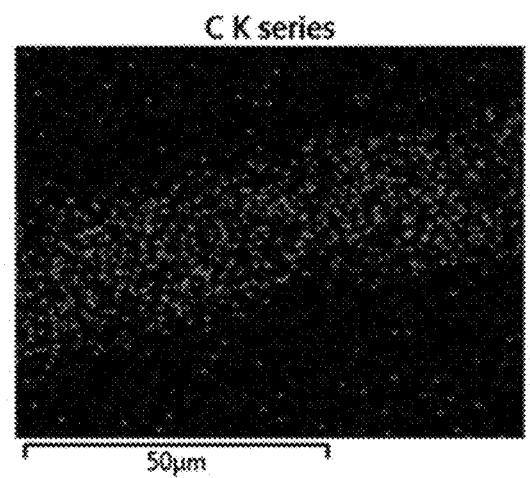
Figure 59D:
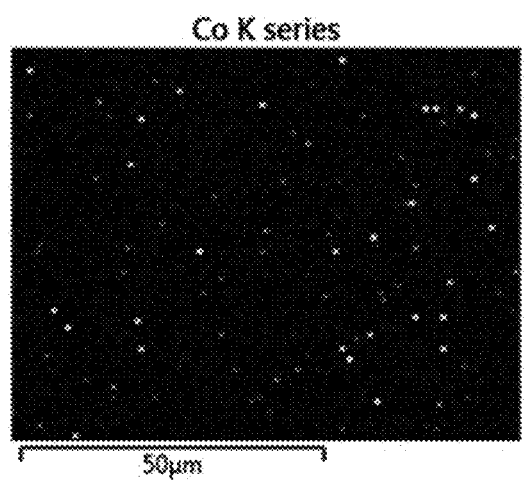
Figure 59E:
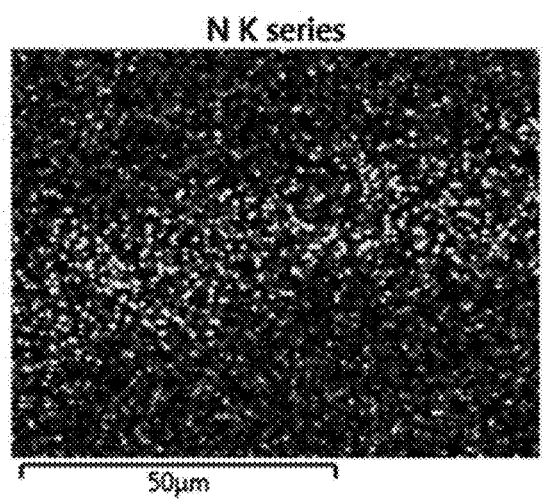
Figure 59F:
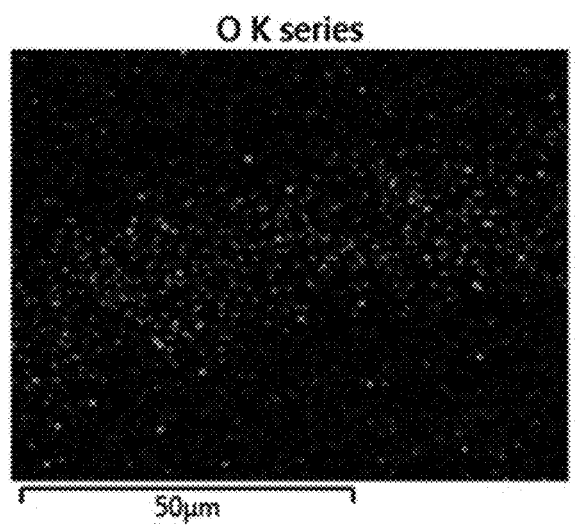

FIGS. 59A to 59F illustrate a catalyst structure acquired in Experimental Example 22-2. Specifically, FIGS. 59A and 59B illustrate TEM and HRTEM images of the catalyst structure. It was confirmed from FIGS. 59A and 59B that Co—N—C nanoparticles were uniformly dispersed on surfaces of the carbon nanotubes. FIGS. 59C to 59F illustrate EDX graphs. Specifically, distribution of C components of the carbon nanotubes is illustrated in FIG. 59C, distribution of Co nanoparticles is illustrated in FIG. 59D, distribution of N nanoparticles is illustrated in FIG. 59E, and a surface oxide layer of the final catalyst structure is illustrated in FIG. 59F.

Figure 60A:
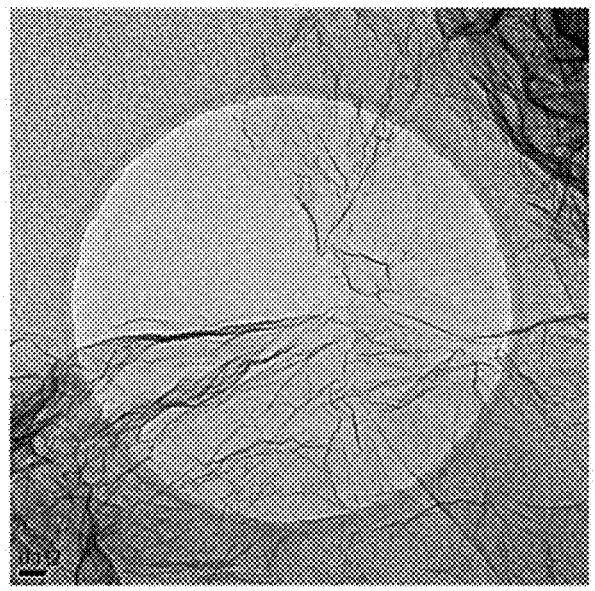
FIGS. 60A to 60F illustrate a catalyst structure acquired in Experimental Example 22-3, specifically illustrating a TEM image, an HRTEM image and EDX images of the acquired catalyst structure, respectively.
Figure 60B:
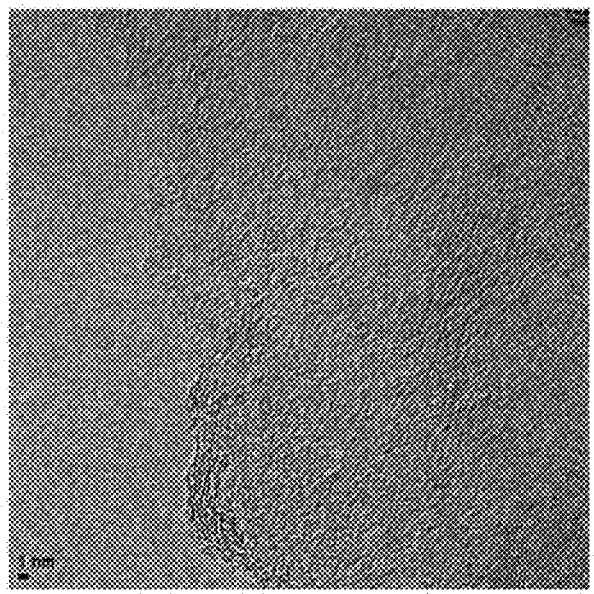
Figure 60C:
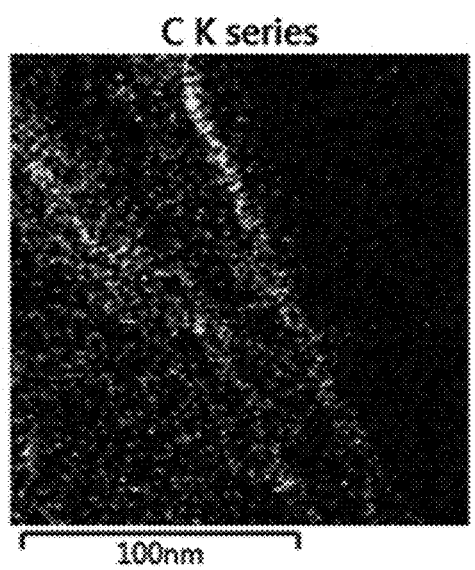
Figure 60D:
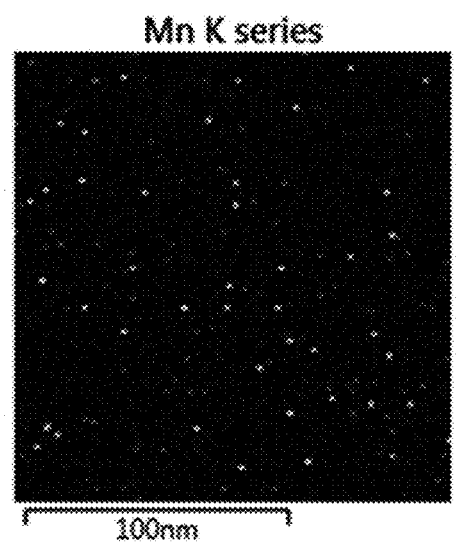
Figure 60E:
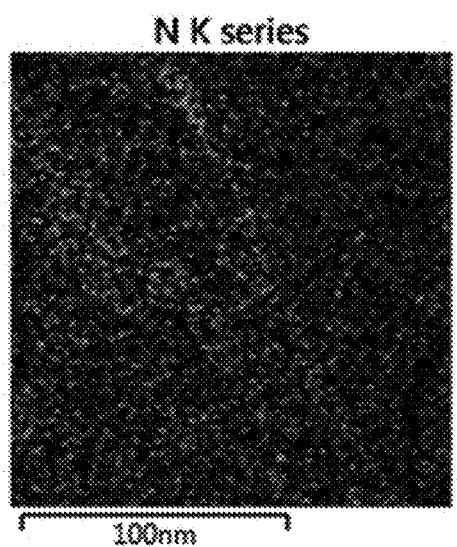
Figure 60F:
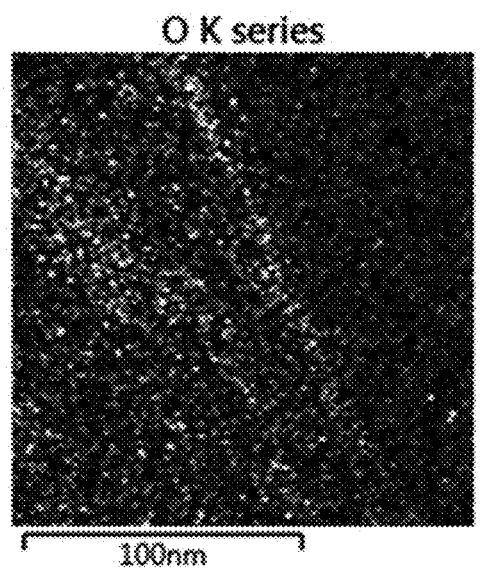

FIGS. 60A to 60F illustrate a catalyst structure acquired in Experimental Example 22-3. Specifically, FIGS. 60A and 60B illustrate TEM and HRTEM images of the catalyst structure. It was confirmed from FIGS. 60A and 60B that Mn—N—C nanoparticles were uniformly dispersed on surfaces of carbon nanotubes. FIGS. 60C to 60F illustrate EDX graphs. Specifically, distribution of C components of the carbon nanotubes is illustrated in FIG. 60C, distribution of Mn nanoparticles is illustrated in FIG. 60D, distribution of N nanoparticles is illustrated in FIG. 60E, and a surface oxide layer of the final catalyst structure is illustrated in FIG. 60F.

Experimental Example 23

Carbon nanotubes having a diameter of approximately 10 nm to approximately 20 nm and a length of 5 µm coated with Fe—N doped carbon as a support and trimethyl(methylcyclopentadienyl)Pt(IV) (C5H4CH3Pt(CH3)3) as a Pt based catalyst source (precursor) were supplied into a reactor under room temperature and atmospheric pressure conditions, such that Pt metal content became 10 wt %, based on the total weight of the catalyst structure. The carbon nanotubes coated with Fe—N coped carbon were prepared by thermally treating the multi-walled carbon nanotubes treated with iron phorphyrine (C20H14FeN4) at 900° C. The reactor was perfectly sealed and the temperature of the reactor was elevated up to 300° C., followed by allowing the reaction to take place for 1 hour. After the reaction was completed, the reactor was cooled back to room temperature. If the temperature of the reactor is cooled down to room temperature, a pressure control valve was slowly opened to reduce the internal pressure of the reactor to room temperature. Thereafter, a catalyst structure having Pt nanostructured catalyst particles dispersed in the carbon nanotube support was acquired.

Figure 61A:
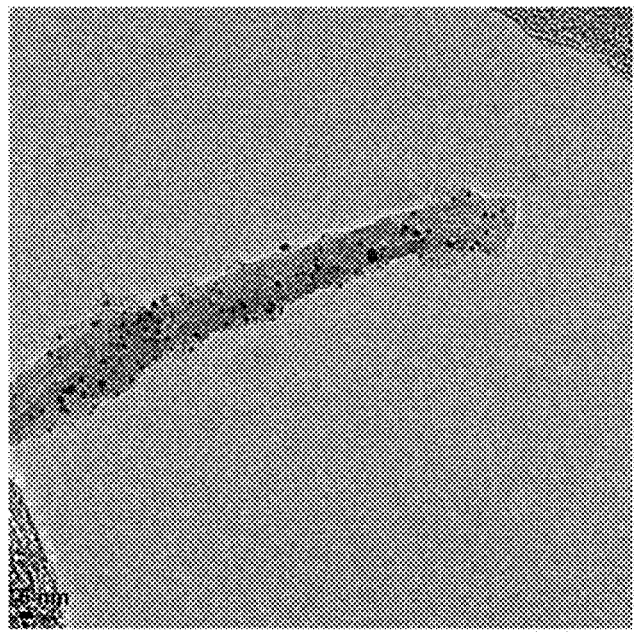
FIGS. 61A to 61G illustrate a catalyst structure acquired in Experimental Example 23, specifically illustrating a TEM image, an HRTEM image and EDX graphs of the acquired catalyst structure, respectively.
Figure 61B:
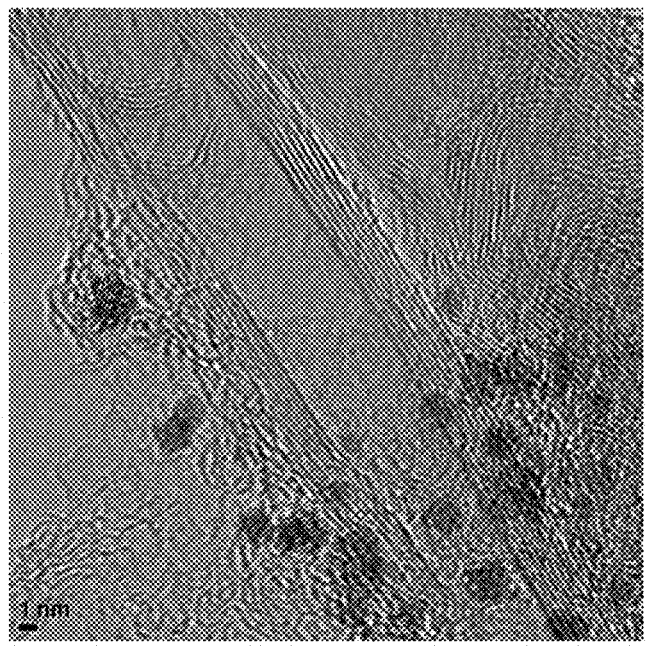
Figure 61C:
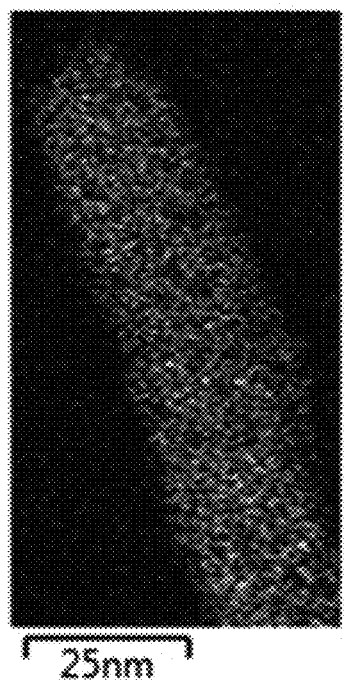
Figure 61D:
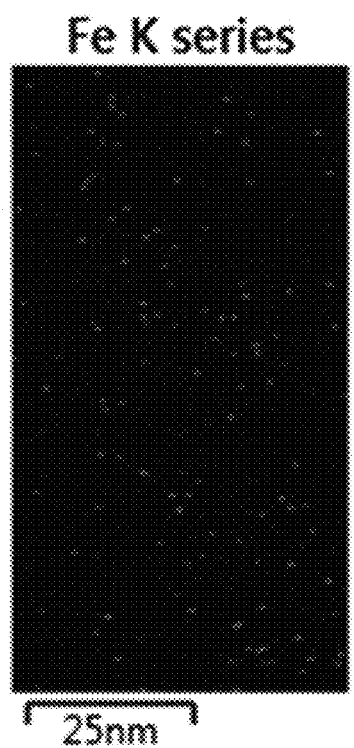
Figure 61E:
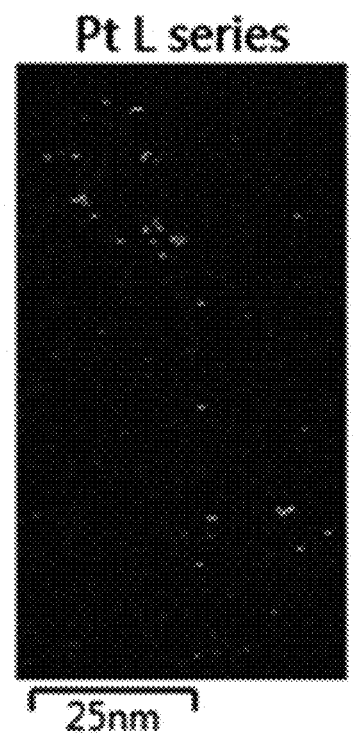
Figure 61F:
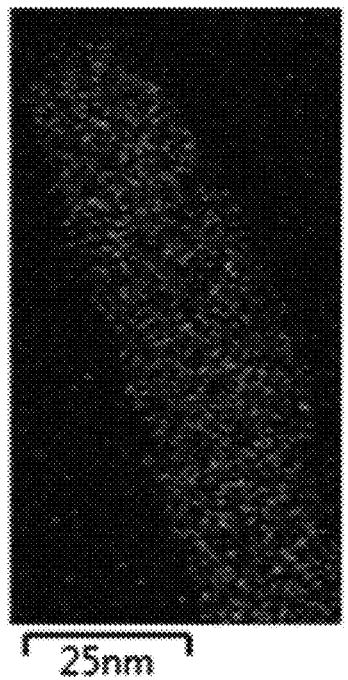
Figure 61G:
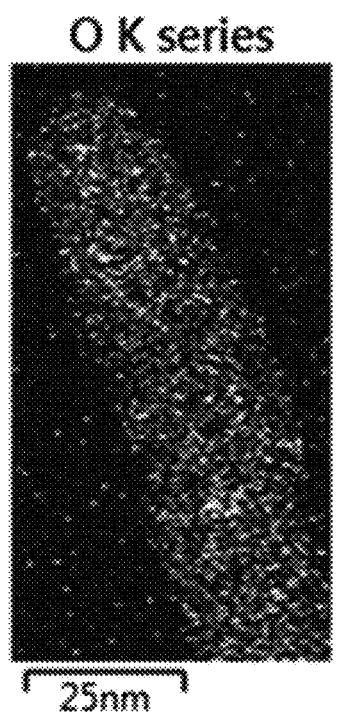

FIGS. 61A to 61G illustrate a hybrid catalyst of Fe—N doped carbon/Pt nanoparticles, acquired in Experimental Example 23. Specifically, FIGS. 61A and 61B illustrate TEM and HRTEM images of the hybrid catalyst. It was confirmed from FIGS. 61A and 61B that Pt nanoparticles were uniformly dispersed on surfaces of the carbon nanotubes coated with Fe—N doped carbon. FIGS. 61C to 61G illustrate EDX graphs. Specifically, distribution of C components of the carbon nanotubes is illustrated in FIG. 61C, distribution of Fe nanoparticles is illustrated in FIG. 61D, distribution of Pt nanoparticles is illustrated in FIG. 61E, distribution of N nanoparticles is illustrated in FIG. 61F, and a surface oxide layer of the final catalyst structure is illustrated in FIG. 61G.

Experimental Example 24

As a catalyst structure having nanostructured catalyst particles dispersed in the support was synthesized using non-carbon based supports. The catalyst structure was basically synthesized by the same manner as described in Experimental Example 1 in which trimethyl(methylcyclopentadienyl)Pt was used as a Pt based catalyst source. Here, the catalyst structure was acquired using different supports and different conditions listed in Table 26.

TABLE 26

| Experimental Example | Support | Catalyst source (Metal content, wt %) | Synthesis temperature and time (° C., hr) |
|---|---|---|---|
| 24-1 | Al2O3 particles (Diameter: 50~100 nm) | 15 wt % | 350° C., 1 hr |
| 24-2 | CaAl2O4 particles (Diameter: 1~2 µm) | 40 wt % | 300° C., 1 hr |
| 24-3 | Si particles | 20 wt % | 350° C., 1 hr |
| 24-4 | Apatite nanoparticles | 20 wt % | 350° C., 1 hr |

Figure 62A:
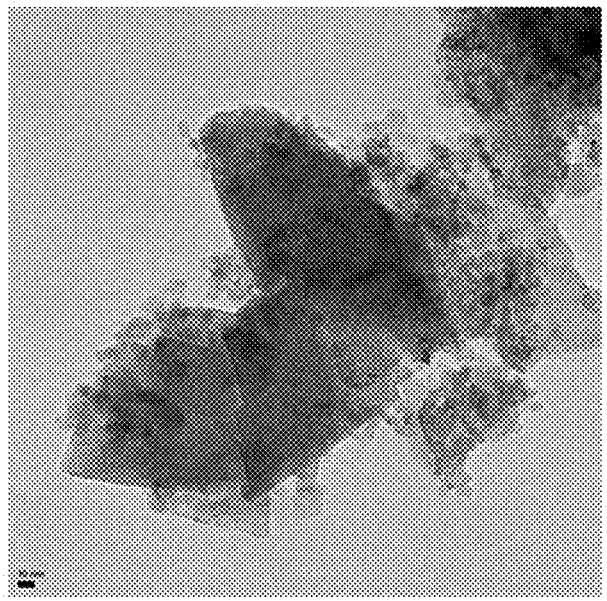
FIGS. 62A to 62E illustrate a catalyst structure acquired in Experimental Example 24-1, specifically illustrating a TEM image, an HRTEM image and EDX images of the acquired catalyst structure, respectively.
Figure 62B:
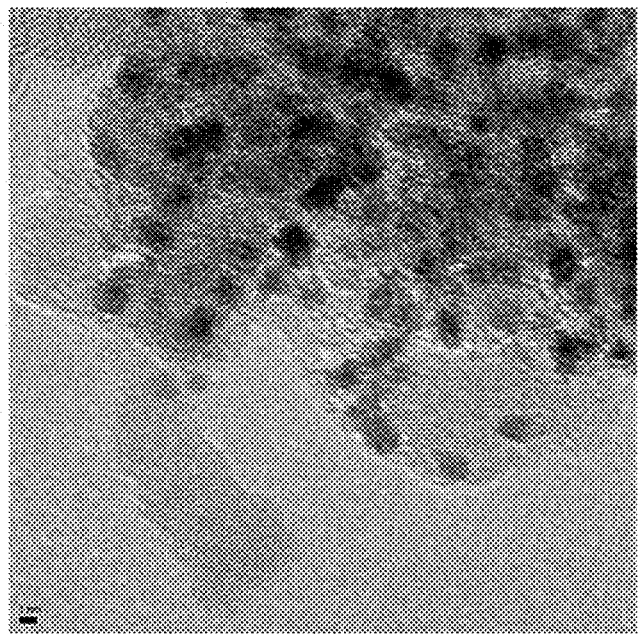
Figure 62C:
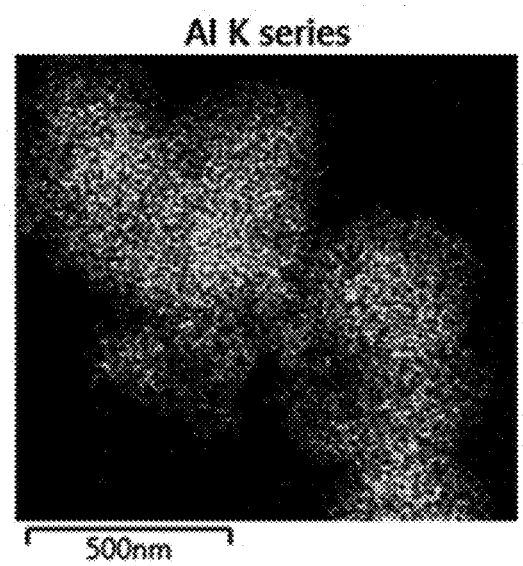
Figure 62D:
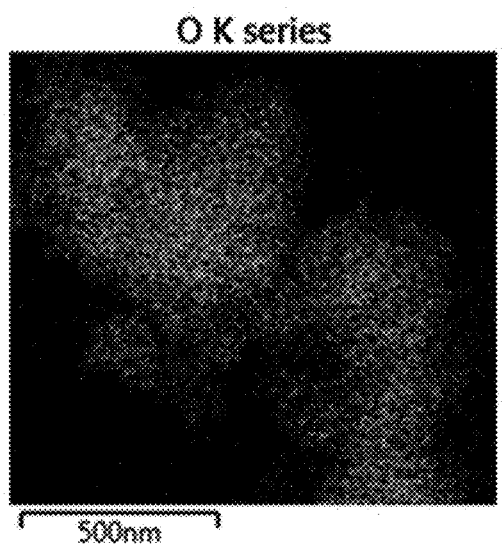
Figure 62E:
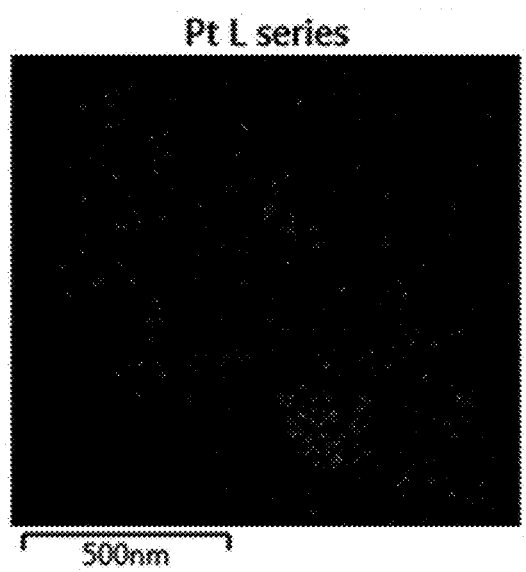

FIGS. 62A to 62E illustrate a catalyst structure acquired in Experimental Example 24-1, specifically illustrating TEM and HRTEM images of the catalyst structure. It was confirmed from FIGS. 62A and 62B that Pt nanoparticles having a diameter of approximately 2 nm were uniformly dispersed on surfaces of Al2O3 nanoparticles. FIGS. 62C to 62E illustrate EDX graphs. Specifically, distribution of Al components illustrated in FIG. 62C, distribution of O components is illustrated in FIG. 62D, and distribution of Pt nanoparticles is illustrated in FIG. 62E.

Figure 63A:
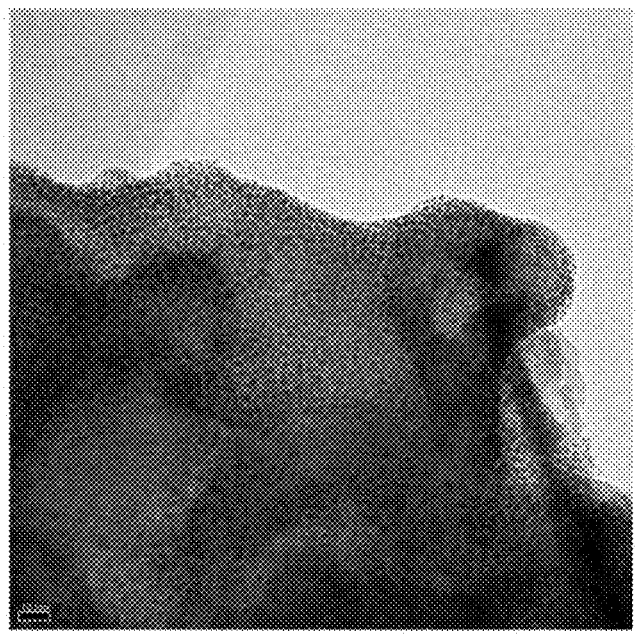
FIGS. 63A to 63F illustrate a catalyst structure acquired in Experimental Example 24-2, specifically illustrating a TEM image, an HRTEM image and EDX images of the acquired catalyst structure, respectively.
Figure 63B:
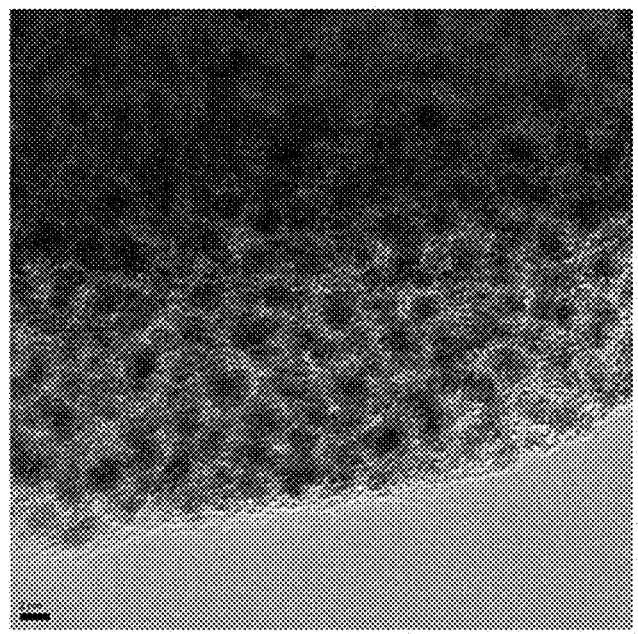
Figure 63C:
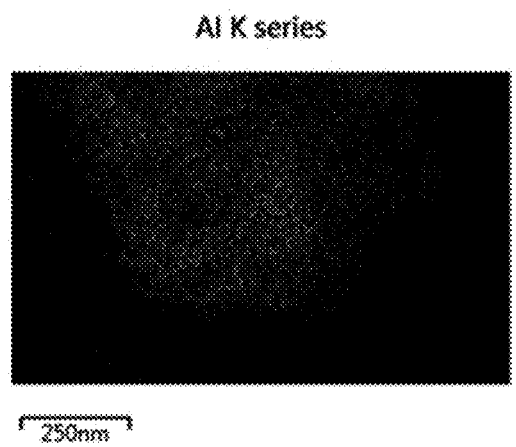
Figure 63D:
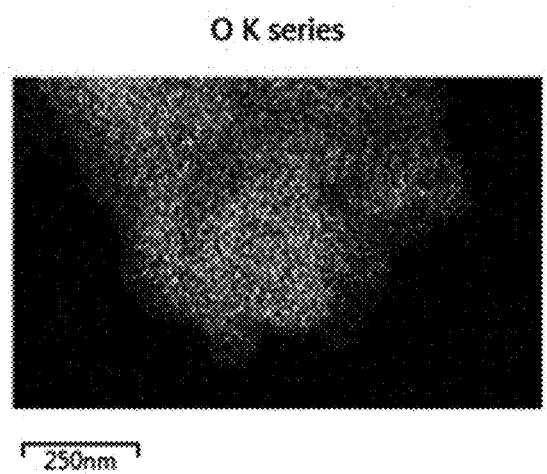
Figure 63E:
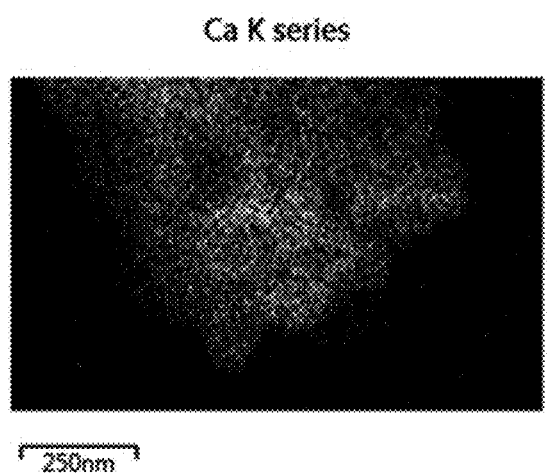
Figure 63F:

FIGS. 63A to 63F illustrate a catalyst structure acquired in Experimental Example 24-2, specifically FIGS. 63A and 63B illustrating TEM and HRTEM images of the catalyst structure. It was confirmed from FIGS. 63A and 63B that Pt nanoparticles having a diameter of approximately 2 nm were uniformly dispersed on surfaces of CaAl2O4 nanoparticles. FIGS. 63C to 63F are EDX graphs. Specifically, distribution of Al components illustrated in FIG. 63C, distribution of O components is illustrated in FIG. 63D, distribution of Ca components is illustrated in FIG. 63e, and distribution of Pt nanoparticles is illustrated in FIG. 63F.

Figure 64A:
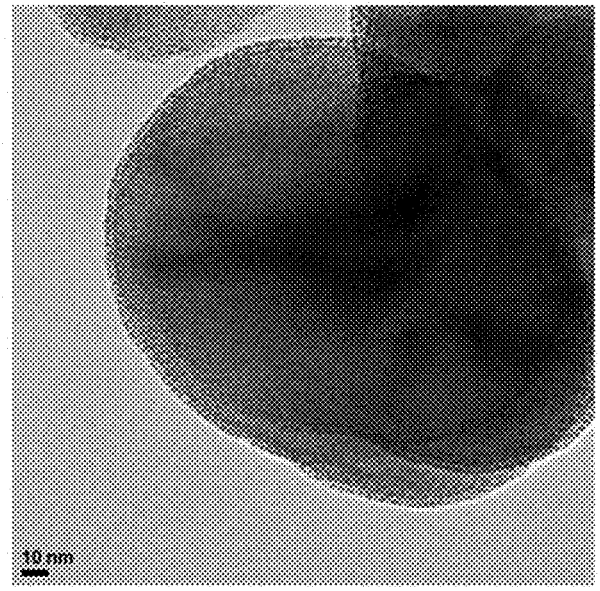
FIGS. 64A to 64C illustrate a catalyst structure acquired in Experimental Example 24-3, specifically illustrating a TEM image, an HRTEM image and an EDX graph of the acquired catalyst structure, respectively.
Figure 64B:
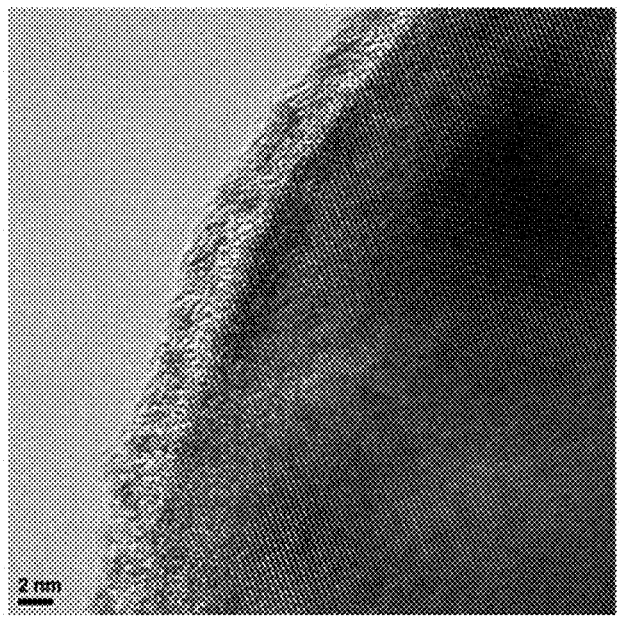
Figure 64C:
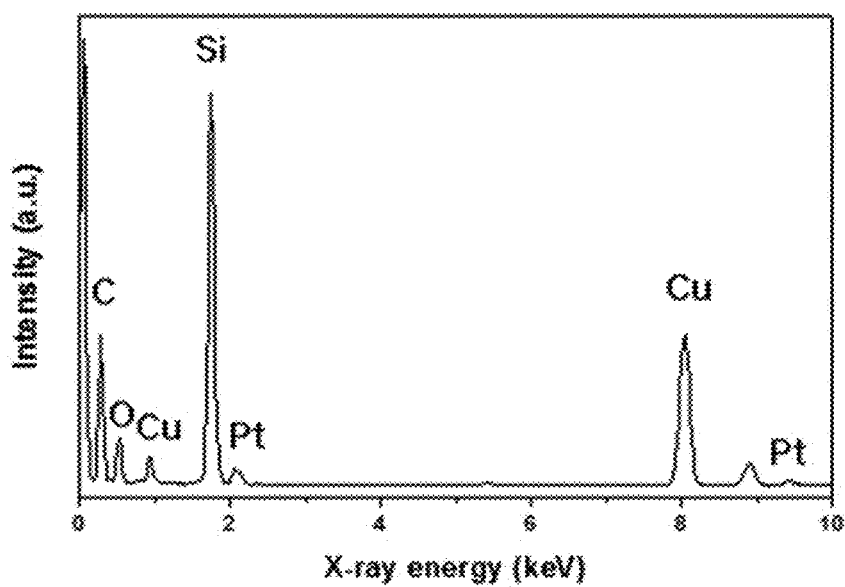

FIGS. 64A to 64C illustrate a catalyst structure acquired in Experimental Example 24-3, specifically illustrating TEM and HRTEM images of the catalyst structure. It was confirmed from FIGS. 64A and 64B that approximately 1 to 1.5 nm sized Pt nanoparticles were uniformly dispersed on surfaces of Si nanoparticles. FIG. 64C illustrates an EDX graph of the acquired catalyst structure, from which Si and Pt peaks are identified, confirming that the catalyst structures illustrated in FIGS. 64A and 64B are catalysts including Pt nanoparticles formed on Si supports. In FIG. 64C, O indicates peaks identified from the surface oxide layer and Cu and C indicate TEM grid values.

Figure 65A:
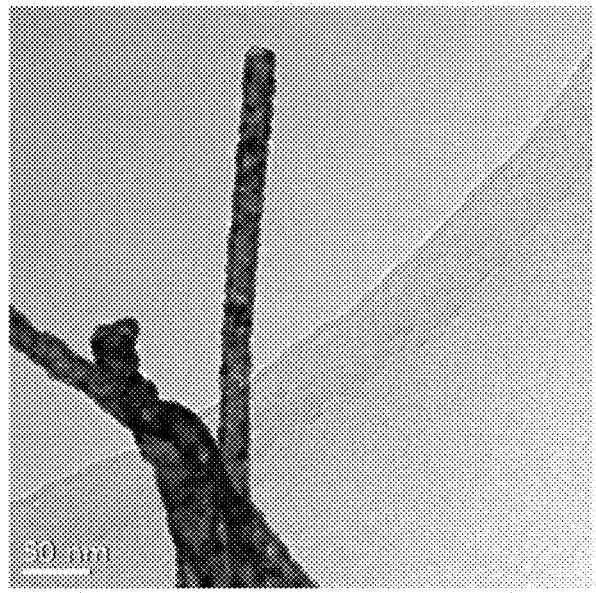
FIGS. 65A to 65C illustrate a catalyst structure acquired in Experimental Example 24-4, specifically illustrating a TEM image, an HRTEM image and an EDX graph of the acquired catalyst structure, respectively.
Figure 65B:
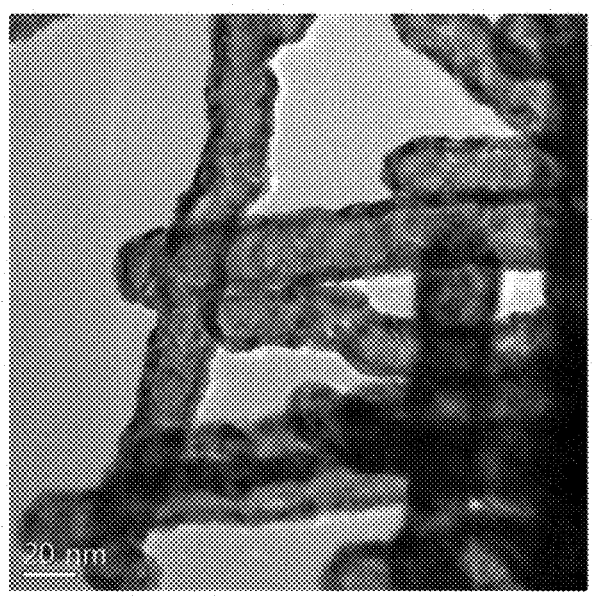
Figure 65C:
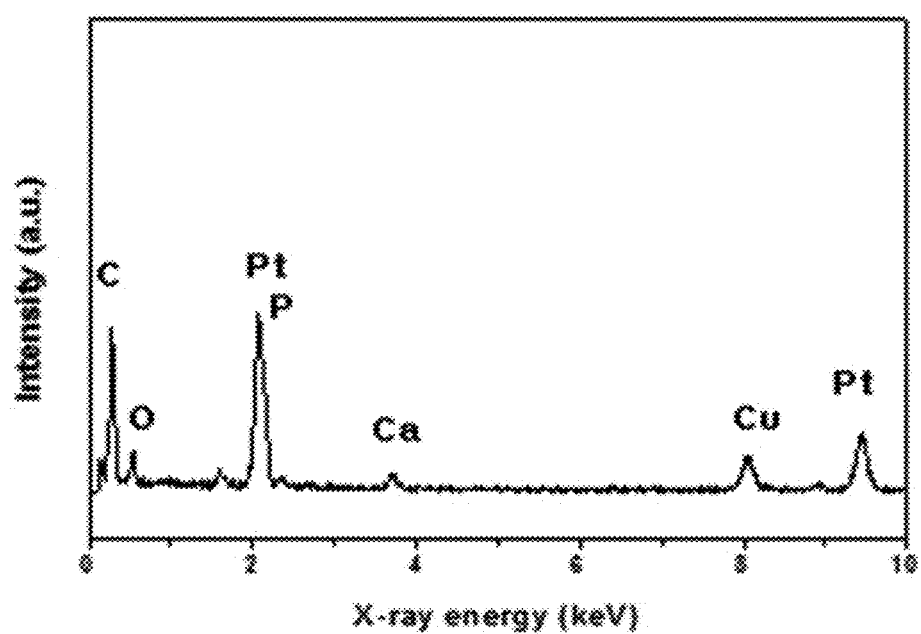

FIGS. 65A to 65C illustrate a catalyst structure acquired in Experimental Example 24-4, specifically FIGS. 65A and 65B illustrating TEM and HRTEM images of the catalyst structure. It was confirmed from FIGS. 65A and 65B that approximately 2 nm sized Pt nanoparticles were uniformly dispersed on surfaces of apatite nanoparticles. FIG. 65C illustrates an EDX graph of the acquired catalyst structure, from which C, Pt, P, Ca, and O peaks are identified, confirming that the catalyst structures illustrated in FIGS. 65A and 65B are catalysts including Pt nanoparticles formed on apatite supports.

Experimental Example 25

A catalyst structure having Pt-transition metal based binary alloy nanostructured catalyst particles dispersed in the support was synthesized using non-carbon based supports. The catalyst structure was basically synthesized by the same manner as described in Experimental Example 1 in which trimethyl(methylcyclopentadienyl)Pt was used as a Pt based catalyst source. Here, the catalyst structure was acquired using different conditions listed in Table 27.

TABLE 27

| Experimental Example | Support | First catalyst source (Metal content, wt %) | Second catalyst source (Metal content, wt %) | Synthesis temperature and time (° C., hr) |
|---|---|---|---|---|
| 25-1 | $Al_2O_3$ particles (Diameter: 10 nm) | Pt based catalyst source: Pt acetylacetonate (18 wt %) | Fe catalyst source: Ferrocene (10 wt %) | 350° C., 1 hr |
| 25-2 | $SiO_2$ particles (Diameter: 20 nm) | Pt based catalyst source: Pt acetylacetonate (18 wt %) | Fe catalyst source: Ferrocene (10 wt %) | 350° C., 1 hr |
| 25-3 | $CeO_2$ particles (Diameter: 50 nm) | Pt based catalyst source: Pt acetylacetonate (18 wt %) | Fe catalyst source: Fe acetylacetonate (10 wt %) | 350° C., 1 hr |
| 25-4 | $SnO_2$ particles (Diameter >100 nm) | Pt based catalyst source: Pt acetylacetonate (18 wt %) | Fe catalyst source: Fe acetylacetonate (10 wt %) | 350° C., 1 hr |
| 25-5 | ZnO particles (Diameter >100 nm) | Pt based catalyst source: Pt acetylacetonate (18 wt %) | Fe catalyst source: Ferrocene (10 wt %) | 350° C., 1 hr |

Figure 66A:
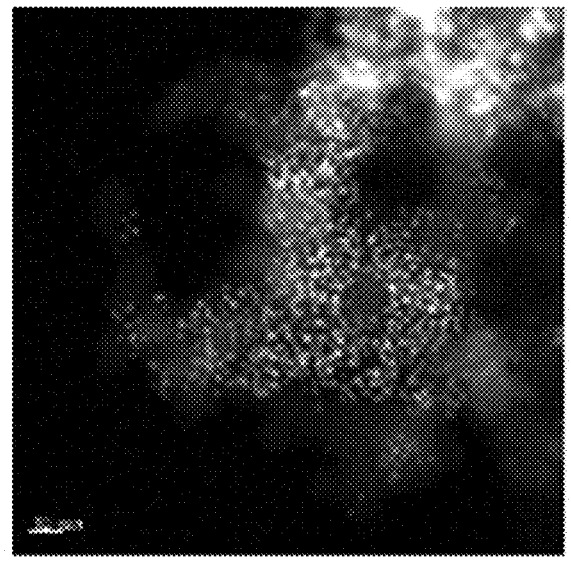
FIGS. 66A to 66D illustrate a catalyst structure acquired in Experimental Example 25-1, specifically illustrating a TEM image, an HRTEM image an EDX graph representing FePt3 nanoparticles, and an EDX graph representing Al2O3 nanoparticles, respectively.
Figure 66B:
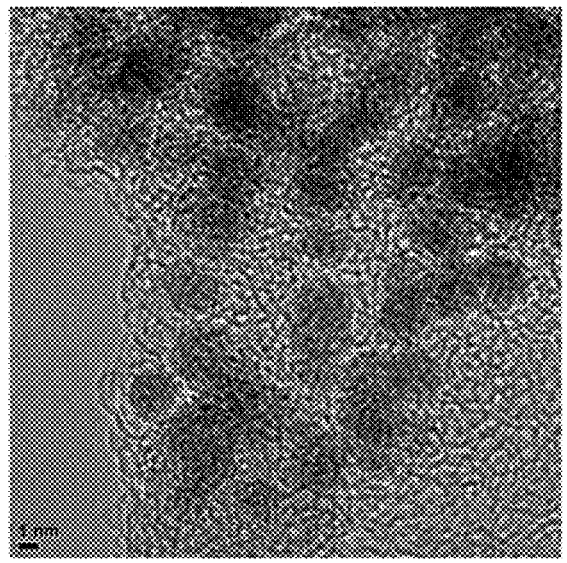
Figure 66C:
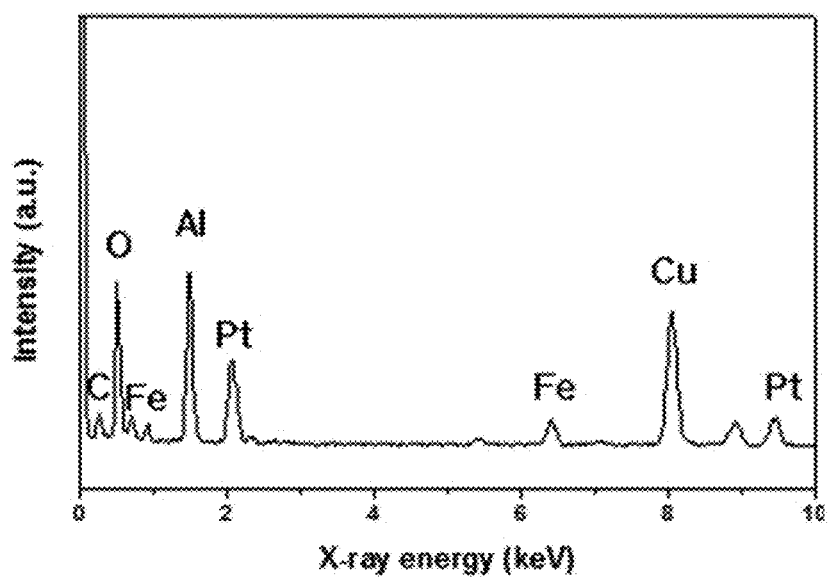
Figure 66D:
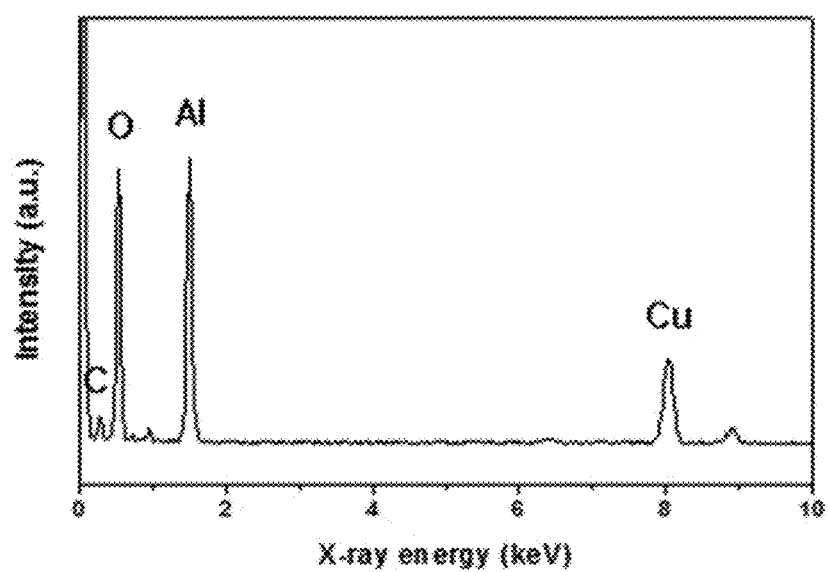

FIGS. 66A to 66D illustrate a catalyst structure acquired in Experimental Example 25-1, specifically illustrating TEM and HRTEM images of the catalyst structure. It was confirmed from FIGS. 66A and 66B that approximately 2 nm sized FePt3 nanoparticles were uniformly dispersed on surfaces of Al2O3 nanoparticles. FIG. 66C illustrates an EDX graph for FePt3 nanoparticles and FIG. 66C illustrates an EDX graph for Al2O3. It was confirmed from FIGS. 66C and 66D that FePt3 nanoparticles are formed on the Al2O3 support.

Figure 67A:
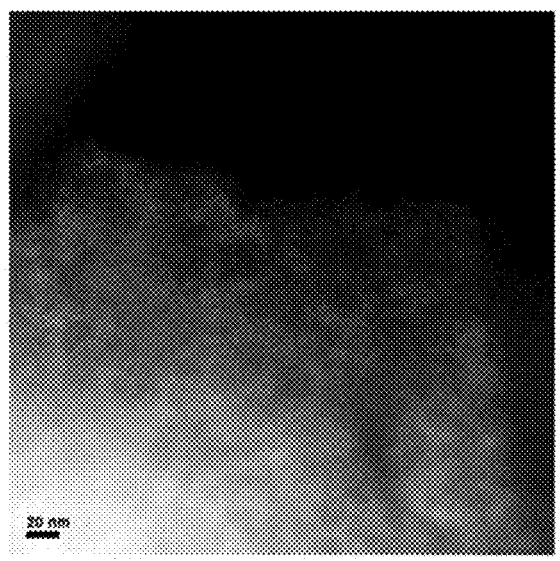
FIGS. 67A to 67C illustrate a catalyst structure acquired in Experimental Example 25-2, specifically illustrating an STEM image, an HRTEM image and an EDX graph, respectively.
Figure 67B:
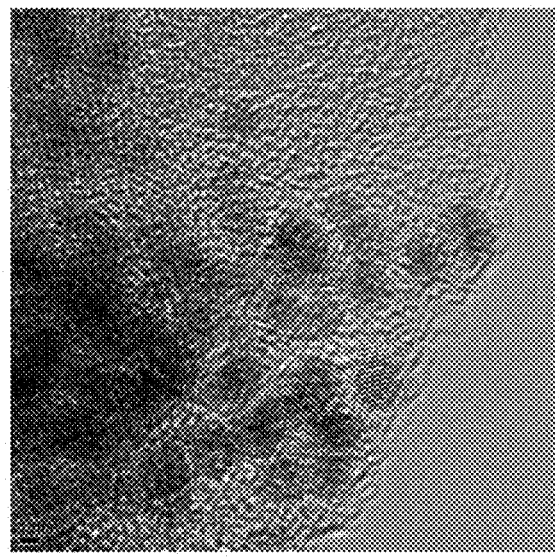
Figure 67C:
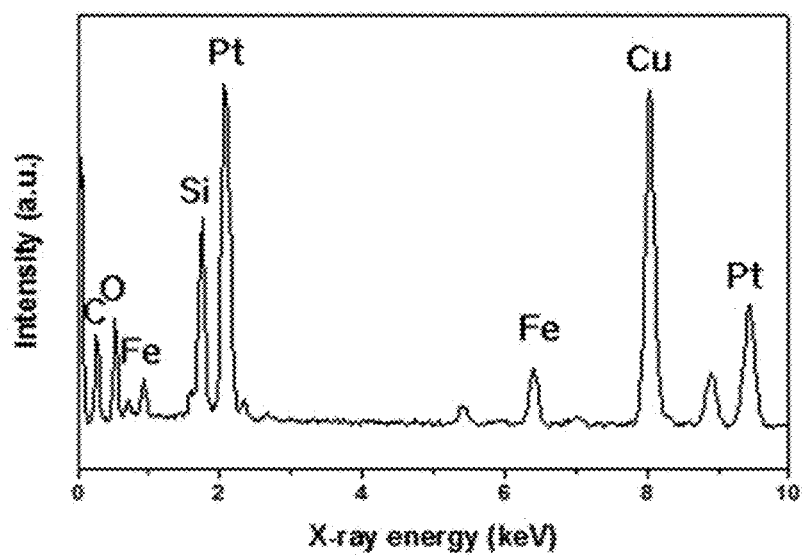

FIGS. 67A to 67C illustrate a catalyst structure acquired in Experimental Example 25-2. Specifically, FIGS. 67A and 67B illustrate STEM and HRTEM images of the catalyst structure. It was confirmed from FIGS. 67A and 67B that approximately 2 nm sized FePt3 nanoparticles were uniformly dispersed on surfaces of SiO2 nanoparticles. FIG. 67C illustrates an EDX graph, from which C, Pt, Fe, Si, and O peaks are identified, confirming that the nanoparticles illustrated in FIGS. 67A and 67B are FePt3 nanoparticles formed on the surfaces of SiO2 nanoparticles. Based on atomic ratios listed in Table 28 below, it can be confirmed that the FePt3 nanoparticles are formed on the surfaces of SiO2 nanoparticles.

TABLE 28

| Element | Line Type | k factor | Absorption Correction | Wt % | Wt % Sigma | Atomic % |
|---|---|---|---|---|---|---|
| O | K series | 1.45493 | 1.00 | 6.96 | 0.42 | 31.71 |
| Si | K series | 1.00000 | 1.00 | 12.09 | 0.52 | 31.37 |
| Fe | K series | 1.21448 | 1.00 | 7.15 | 0.40 | 9.34 |
| Pt | L series | 2.75544 | 1.00 | 73.80 | 0.82 | 27.57 |
| Total | | | | 100.00 | | 100.00 |

Figure 68A:
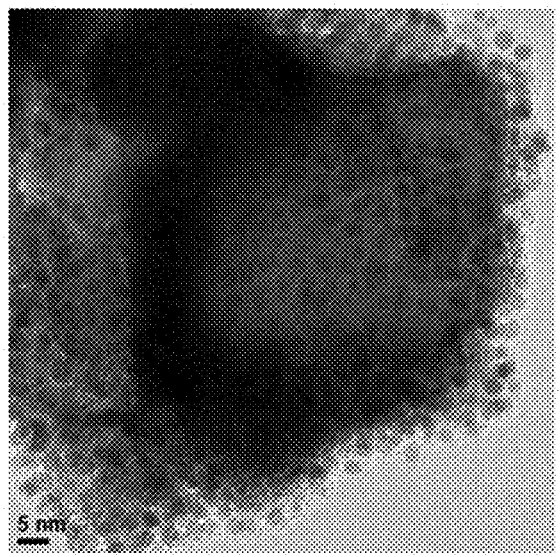
FIGS. 68A to 68C illustrate a catalyst structure acquired in Experimental Example 25-3, specifically illustrating an STEM image, an HRTEM image and an EDX graph, respectively.
Figure 68B:
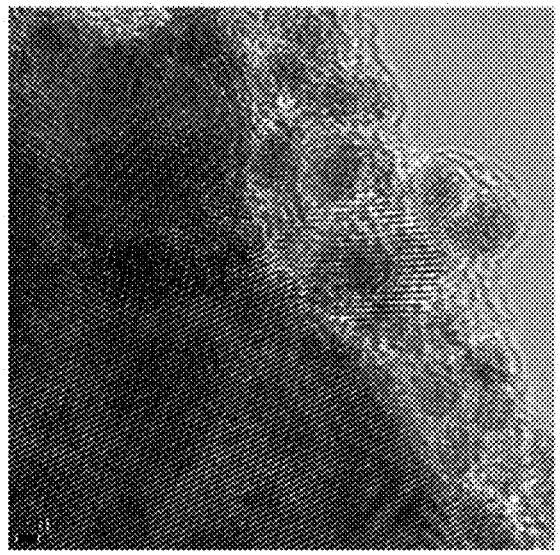
Figure 68C:
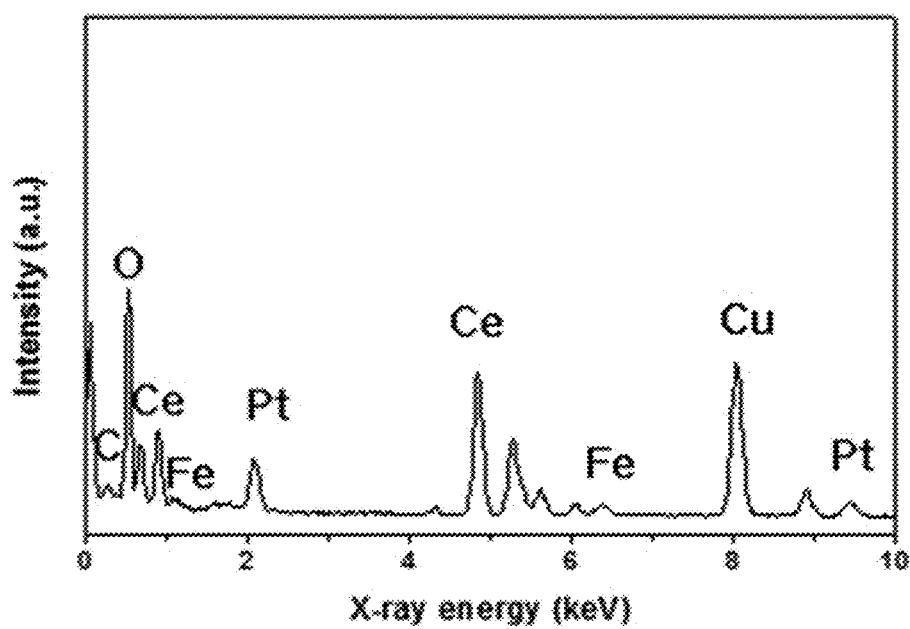

FIGS. 68A to 68C illustrate a catalyst structure acquired in Experimental Example 25-3. Specifically, FIGS. 68A and 68B illustrate STEM and HRTEM images of the catalyst structure. It was confirmed from FIGS. 68A and 68B that approximately 2 nm sized FePt3 nanoparticles were uniformly dispersed on surfaces of CeO2 nanoparticles. FIG. 68C illustrates an EDX graph, from which C, Pt, Fe, Ce, and O peaks are identified, confirming that the nanoparticles illustrated in FIGS. 68A and 68B are FePt3 nanoparticles formed on the surfaces of CeO2 nanoparticles. Based on atomic ratios listed in Table 29 below, it can be deduced that the nanoparticles illustrated in FIGS. 68A and 68B are the FePt3 nanoparticles formed on the surfaces of CeO2 nanoparticles.

TABLE 29

| Element | Line Type | k factor | Absorption Correction | Wt % | Wt % Sigma | Atomic % |
|---|---|---|---|---|---|---|
| C | K series | 3.11489 | 1.00 | 2.59 | 0.57 | 11.20 |
| O | K series | 1.45493 | 1.00 | 18.53 | 0.52 | 60.12 |
| Fe | K series | 1.21448 | 1.00 | 1.27 | 0.18 | 1.18 |
| Ce | L series | 2.06031 | 1.00 | 65.74 | 0.84 | 24.35 |
| Pt | L series | 2.75544 | 1.00 | 11.87 | 0.71 | 3.16 |
| Total | | | | 100.00 | | 100.00 |

Figure 69A:
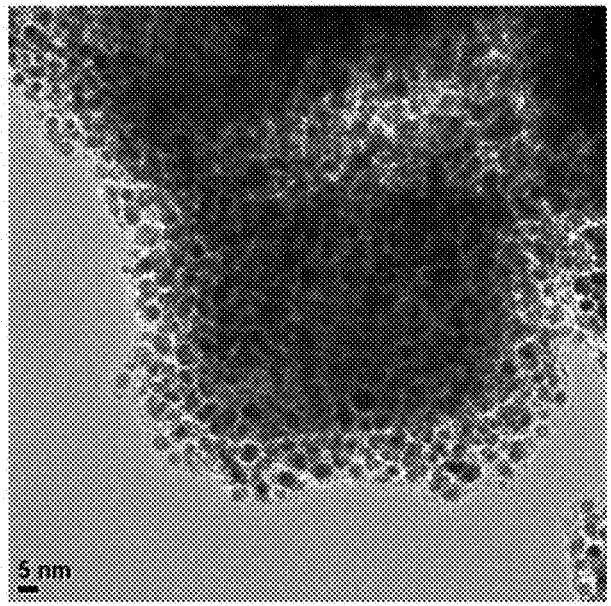
FIGS. 69A to 69C illustrate a catalyst structure acquired in Experimental Example 25-4, specifically illustrating a TEM image, an HRTEM image and an EDX graph, respectively.
Figure 69B:
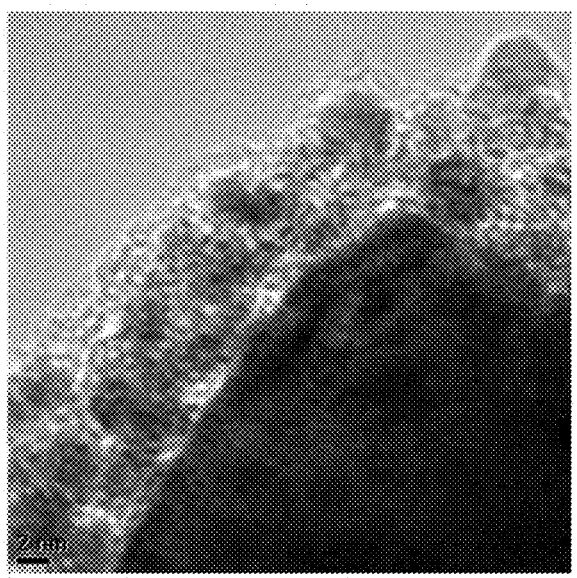
Figure 69C:
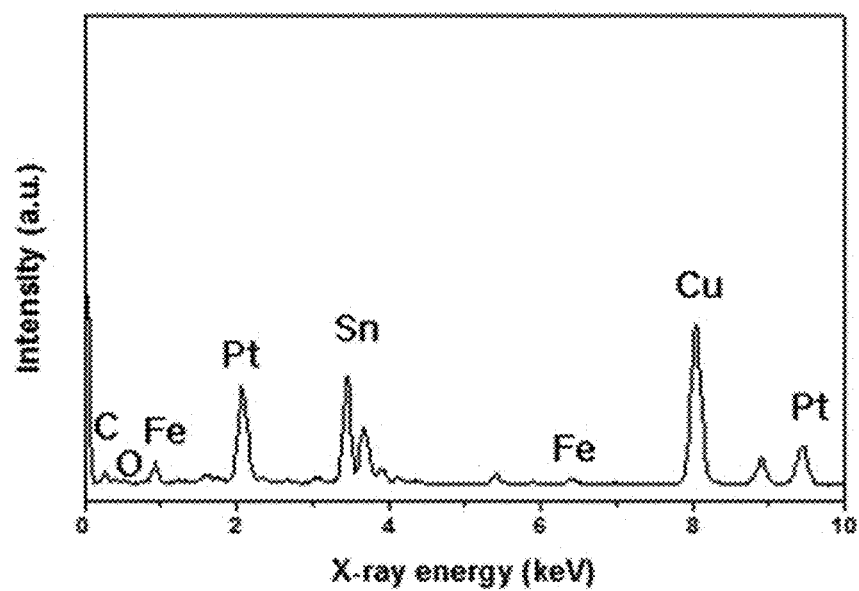

FIGS. 69A to 69C illustrate a catalyst structure acquired in Experimental Example 25-4, specifically illustrating TEM and HRTEM images of the catalyst structure. It was confirmed from FIGS. 69A and 69B that approximately 2 nm sized FePt3 nanoparticles were uniformly dispersed on surfaces of SnO2 nanoparticles. FIG. 69C illustrates an EDX graph, from which C, Pt, Fe, and Sn peaks are identified, confirming that the nanoparticles include FePt3 nanoparticles formed on the surfaces of CeO2 nanoparticles. Based on atomic ratios listed in Table 29 below, it can be deduced that the nanoparticles illustrated in FIGS. 69A and 69B include FePt3 nanoparticles formed on the surfaces of CeO2 nanoparticles. O components identified from the EDX graph are presumably formed from a reduction reaction taking place while FePt3 nanoparticles include formed on the surfaces of SnO2 nanoparticles. Based on atomic ratios listed in Table 30 below, it can be deduced that the FePt3 nanoparticles are formed on the surfaces of the SnO2 nanoparticles.

TABLE 30

| Element | Line Type | k factor | Absorption Correction | Wt % | Wt % Sigma | Atomic % |
|---|---|---|---|---|---|---|
| C | K series | 3.11489 | 1.00 | 3.21 | 0.46 | 27.65 |
| O | K series | 1.45493 | 1.00 | 0.38 | 0.16 | 2.44 |

TABLE 30-continued

| Element | Line Type | k factor | Absorption Correction | Wt % | Wt % Sigma | Atomic % |
|---|---|---|---|---|---|---|
| Fe | K series | 1.21448 | 1.00 | 1.13 | 0.20 | 2.09 |
| Sn | K series | 33.89798 | 1.00 | 50.48 | 3.26 | 44.04 |
| Pt | L series | 2.75544 | 1.00 | 44.80 | 2.99 | 23.78 |
| Total: | | | | 100.00 | | 100.00 |

Figure 70A:
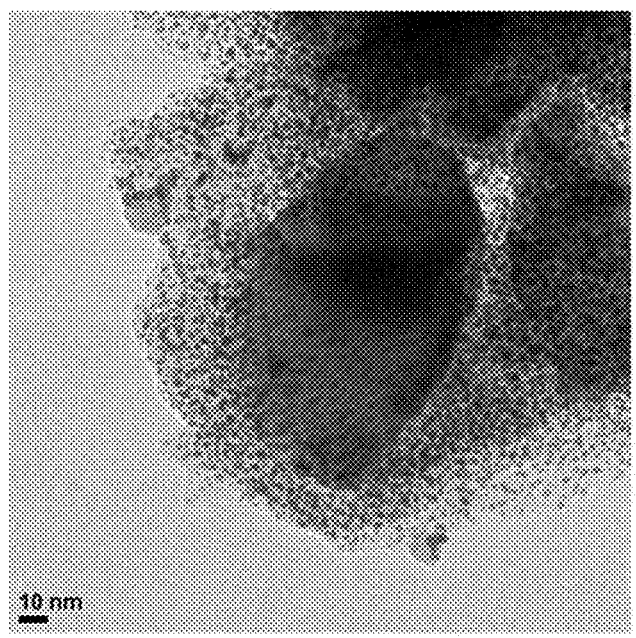
FIGS. 70A to 70C illustrate a catalyst structure acquired in Experimental Example 25-5, specifically illustrating a TEM image, an HRTEM image and an EDX graph, respectively.
Figure 70B:
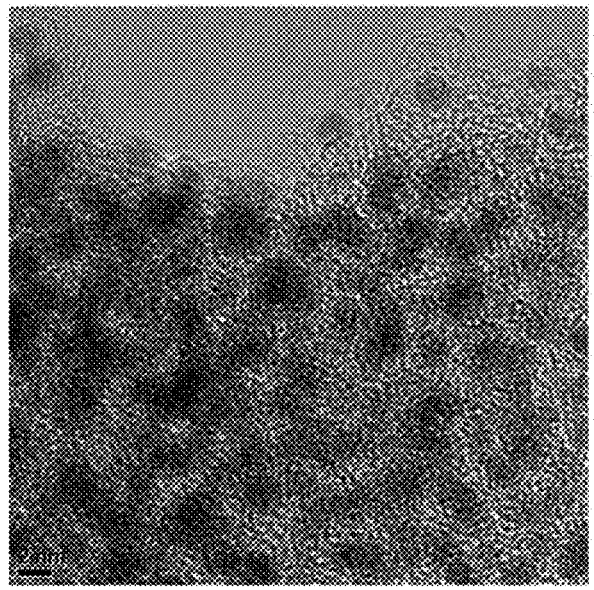
Figure 70C:
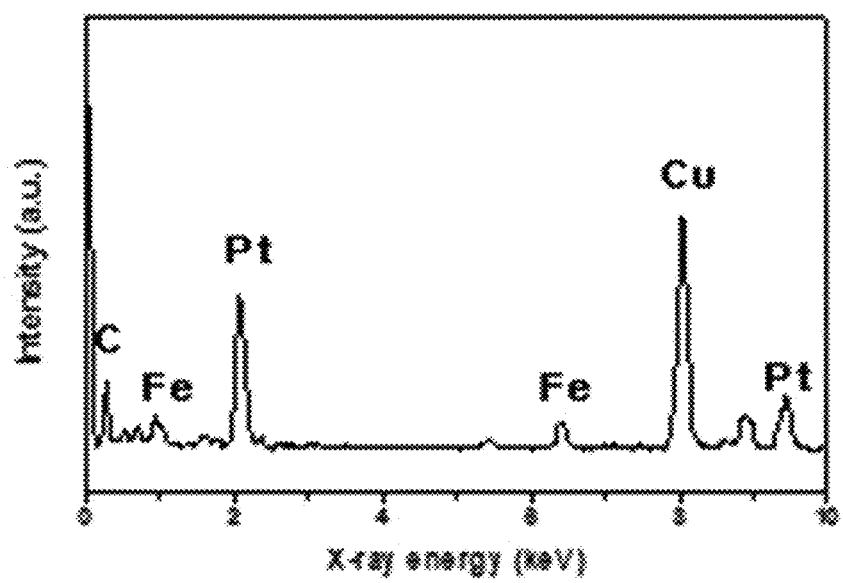

FIGS. 70A to 70C illustrate a catalyst structure acquired in Experimental Example 25-5. Specifically, FIGS. 70A and 70B illustrate TEM and HRTEM images of the catalyst structure. It was confirmed from FIGS. 70A and 70B that approximately 2 nm sized FePt3 nanoparticles were uniformly dispersed on surfaces of ZnO nanoparticles. FIG. 70C illustrates an EDX graph for nanoparticles coated on ZnO, from which C, Pt, and Fe peaks are identified, confirming that the nanoparticles illustrated in FIGS. 70A and 70B are FePt3 nanoparticles formed on the surfaces of ZnO. Based on atomic ratios listed in Table 31 below, it can be deduced that the FePt3 nanoparticles are formed on the surfaces of the ZnO nanoparticles.

TABLE 31

| Element | Line Type | k factor | Absorption Correction | Wt % | Wt % Sigma | Atomic % |
|---|---|---|---|---|---|---|
| Fe | K series | 1.21448 | 1.00 | 9.88 | 0.84 | 27.69 |
| Pt | L series | 2.75544 | 1.00 | 90.12 | 0.84 | 72.31 |
| Total: | — | — | — | 100.00 | — | 100.00 |

Experimental Example 26

Figure 71A:
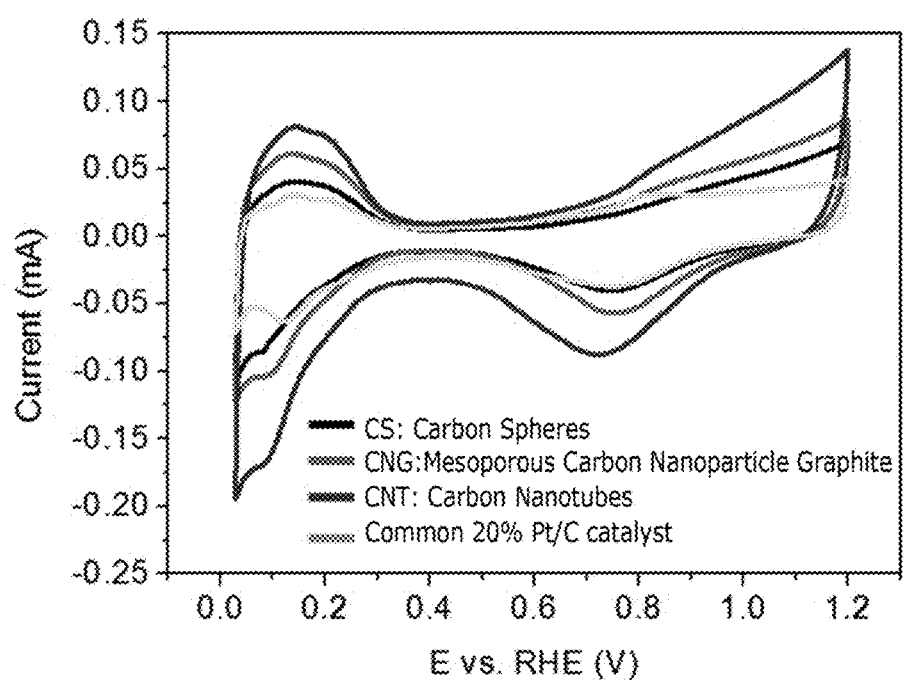
FIGS. 71A and 71B are graphs illustrating measurement results of oxygen reduction reaction (ORR) performance of various catalyst structures produced in Examples of the present invention using Pt/C catalysts with 20% Pt loaded.
Figure 71B:
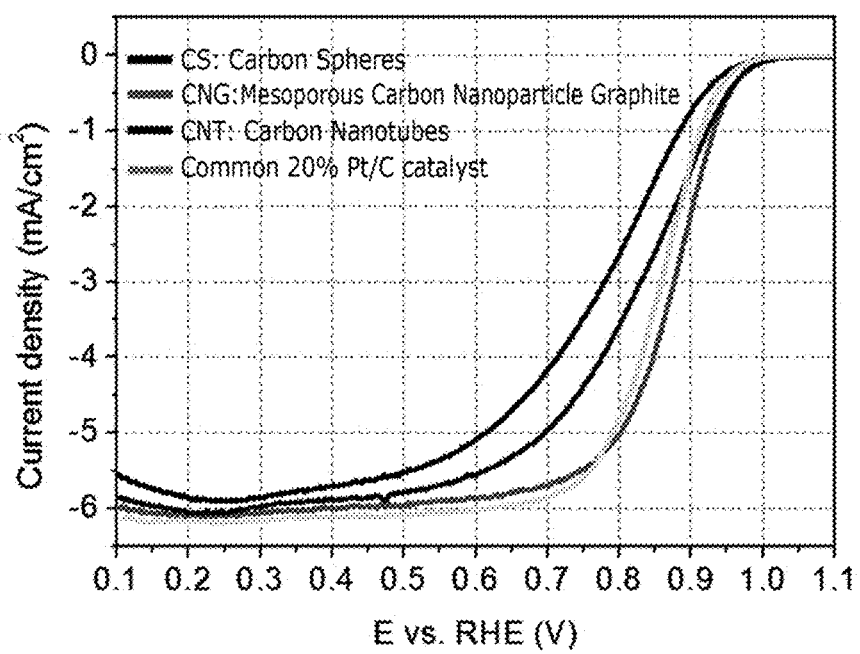

FIGS. 71A and 71B illustrate oxygen reduction reaction (ORR) results of various catalyst structures produced in Examples of the present invention using Pt/C catalysts with 20% Pt loaded. Table 32 demonstrates measurement results of electrochemical properties of the respective catalysts.

In order to measure ORR performance and electrochemical properties, approximately 1 to 2 mg of a catalyst was immersed in a solution of NAFION (trade name by DuPont) mixed with alcohol to then be ultrasonically dispersed. Ink was prepared and coated on a surface of a glassy carbon (GC) support using a pipette. A catalyst electrode was prepared and dried using an infrared (IR) lamp. Electrochemical properties of the catalysts were measured using a potentiostat. The ORR measurement was carried out in a 0.1M $HClO_4$ solution at 1,600 rpm. ORR polarization curves were measured at an anodic sweep rate of 10 mV/s in a specific electric potential range of 0.0 V to 1.2 V (versus a reverse hydrogen electrode (RHE)). The measurement was carried out at room temperature.

TABLE 32

| Catalyst | Pt loading ($ug/cm^2$) | ECSA ($m^2/g_{Pt}$) | $I_k$ @ 0.9 ($mA/cm^2$) | Specific Activity ($uA/cm^2$) | Mass Activity ($A/mg_{Pt}$) | $E_{1/2}$ (mV) |
|---|---|---|---|---|---|---|
| CS300 | 15 | 165.51 | 0.852 | 100.9 | 0.03 | 789 |
| CNT300 | 15 | 322.84 | 1.986 | 120.6 | 0.08 | 833 |
| CNG300 | 15 | 248.29 | 3.132 | 247.2 | 0.13 | 877 |
| Common 20% Pt/C | 20 | 107.97 | 1.447 | 262.7 | 0.07 | 857 |

In Table 32, CS300 refers to a catalyst having Pt nanoparticles dispersed in a carbon sphere support, CNT300 refers to a catalyst having Pt nanoparticles dispersed in a carbon nanotube support, and CNG300 refers to a catalyst having Pt nanoparticles dispersed in a graphitized mesoporous carbon nanoparticle support.

As confirmed from the graphs illustrated in FIGS. 71A and 71B and the results listed in Table 32, even if the content of the Pt catalyst to be contained in the catalyst structure was reduced to 15%, the catalysts according to the embodiments of the present invention demonstrated higher ORR performance of than the common 20% Pt/C. In particular, the catalyst CNG300 having Pt nanoparticles dispersed in graphitized mesoporous carbon nanoparticles (CNG) had the highest electrochemical surface area (ECSA) and mass activity, respectively, i.e., about two times those of the common catalyst (e.g., common 20% Pt/C), and the catalyst CNT300 having Pt nanoparticles dispersed in a carbon nanotube support and the catalyst CS300 having Pt nanoparticles dispersed in a carbon sphere support had the next higher levels of ECSA and mass activity, confirming that higher crstallinity of a carbon support increases the ORR performance. A catalytic activity may be affected by weakened bondability between the catalyst and the support due to surface oxidation of the carbon support, which may occur during an electrochemical reaction. However, the catalytic activity may be less affected by the higher crystallinity. The ORR performance was considerably affected by the catalytic activity. Even if the content of Pt contained in the catalyst was reduced to 15%, which is lower than 20% of the common catalyst, almost similar $E_{1/2}$ values were demonstrated.

Experimental Example 27

Figure 72A:
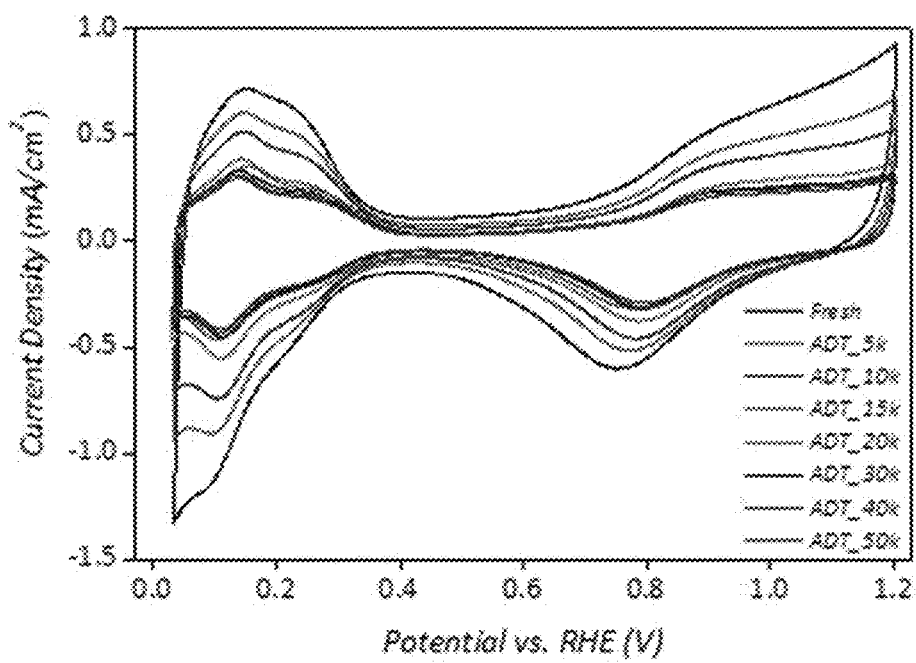
FIGS. 72A and 72B are graphs illustrating measurement results of oxygen reduction reaction (ORR) performance of various catalyst structures produced in Examples of the present invention using Pt/C catalysts with loading of 37% Pt.
Figure 72B:
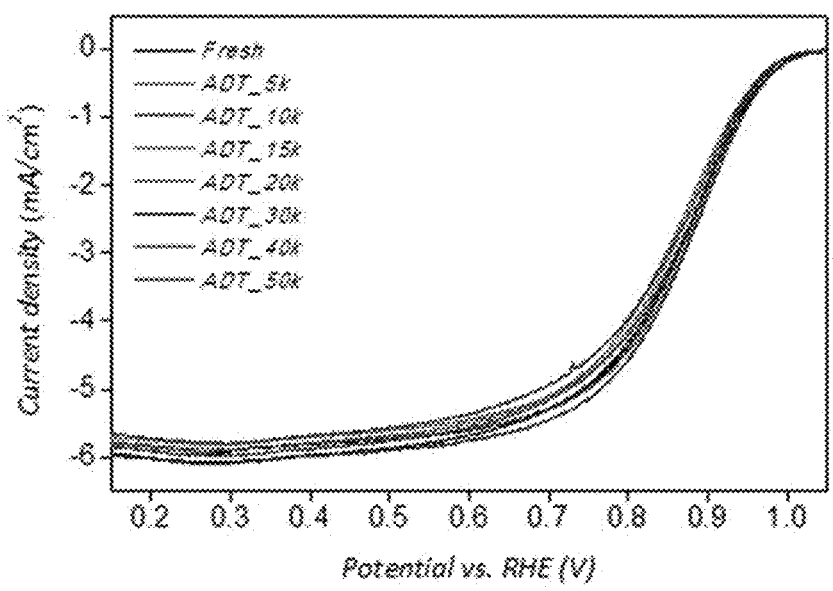

In this embodiment, ORR performance and electrochemical properties of Pt/carbon sphere catalysts with loading of 37% Pt were measured. Measurement results of long-term oxygen reduction reaction (ORR) performance of the Pt based catalysts including carbon spheres are shown in FIGS. 72A and 72B. FIGS. 72A and 72B are graphs illustrating measurement results of oxygen reduction reaction (ORR) performance of various catalyst structures produced in Examples of the present invention using Pt/C catalysts with loading of 37% Pt. Table 33 demonstrates measurement results of electrochemical properties of the respective catalysts. The ORR performance and electrochemical properties were measured in the same manner as in Example 26.

TABLE 33

| Accelerated Durability Test (ADT) | CS loading (ug/cm²) | Pt loading (ug/cm²) | Surface Area (m²/g$_{Pt}$) | @ 0.9 V (mA/cm²) | Specific Activity (uA/cm²) | Mass Activity (A/mg$_{Pt}$) | /2 (V) |
|---|---|---|---|---|---|---|---|
| Fresh | 10 | 3.7 | 152 | 03 | 5 | 16 | 868 |
| k cycles (0.6-1.0 V) | | | 34 | 33 | 1 | 18 | 873 |
| 0k cycles (0.6-1.0 V) | | | 16 | 34 | 3 | 18 | 871 |
| 5k cycles (0.3-1.0 V) | | | 8 | 57 | 4 | 14 | 860 |
| 0k cycles (0.6-1.0 V) | | | 7 | 36 | 3 | 12 | 853 |
| 0k cycles (0.6-1.0 V) | | | 3 | 80 | 4 | 15 | 862 |
| 0k cycles (0.6-1.0 V) | | | 9 | 86 | 0 | 15 | 863 |
| 0k cycles (0.6-1.0 V) | | | 6 | 62 | 9 | 14 | 858 |

In Table 33, "Fresh" indicates initial catalytic performance, "ADT_5 k" indicates catalytic performance after 5,000 cycles and "ADT_50 k" indicates catalytic performance after 50,000 cycles, in accelerated durability tests.

The graphs illustrated in FIGS. 72A and 72B and the results listed in Table 33 demonstrated that the catalytic performance after 50,000 cycles was reduced by approximately 1% based on the fresh performance, as indicated by $E_{1/2}$ value). The catalytic performance of 40 wt. % common Pt containing Pt/C catalyst was generally reduced by approximately 7-10% after 30,000 cycles, suggesting that the durability is considerably improved. In addition, as confirmed from FIG. 72A, there was no reduction in the catalytic performance due to agglomeration of catalyst particles even with an increased number of cycles (that is, the sharpness in the graph for each cycle was not reduced at approximately 0.1 V of the X axis). These results confirm that the catalyst structures according to the present invention are superior in view of catalytic performance and durability.

Experimental Example 28

The dispersion density was measured from the TEM and STEM results and calculated by measuring the number of nanoparticles coated per 100 nm². As illustrated, the reactions were carried out at temperatures in the range of 200° C. to 600° C. and catalyst sources were supplied such that the Pt metal content became approximately 10 wt %, 20 wt %, 30 wt %, 40 wt %, and 50 wt %. Average particle sizes of Pt nanoparticles were 1.0 nm, 1.25 nm, 1.5 nm, 1.75 nm, and 2.0 nm at temperatures of 200° C., 300° C., 400° C., 500° C., and 600° C., respectively.

Figure 73:
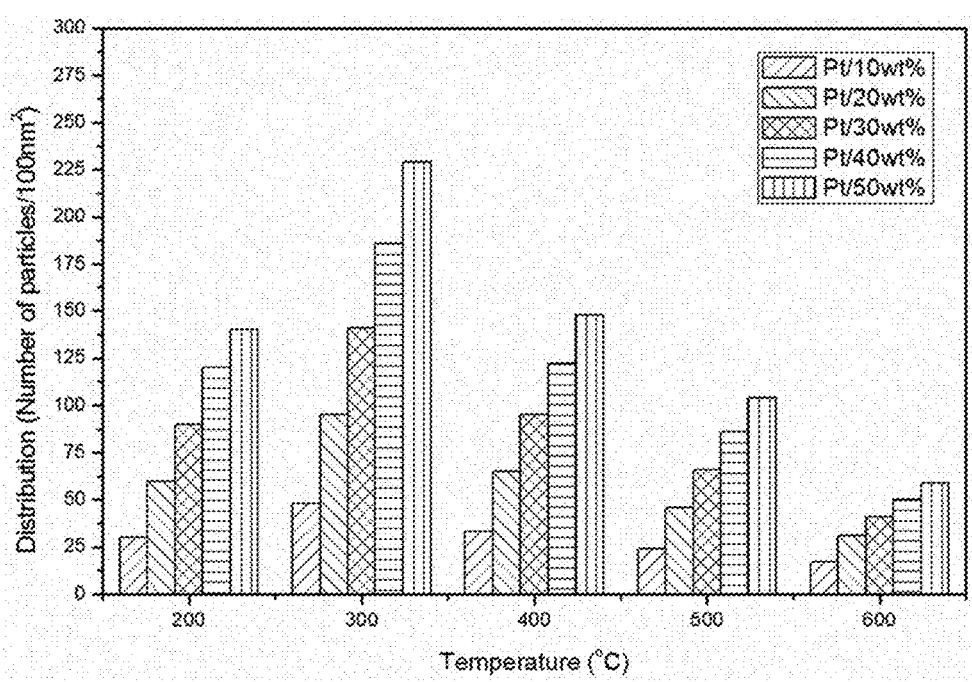
FIG. 73 is a graph illustrating dispersion densities (numbers of particles/100 nm$^2$) measured at different temperatures and different Pt metal contents.
Figure 74A:
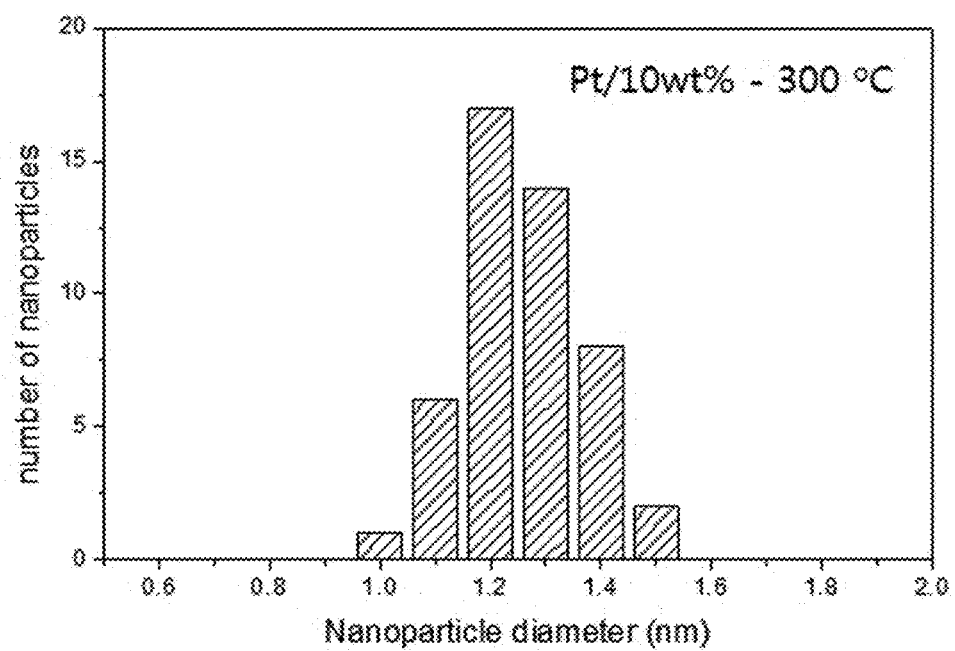
FIGS. 74A to 74D illustrate measurement results of average particle sizes of various Pt nanostructured catalyst structures synthesized at different temperatures.
Figure 74B:
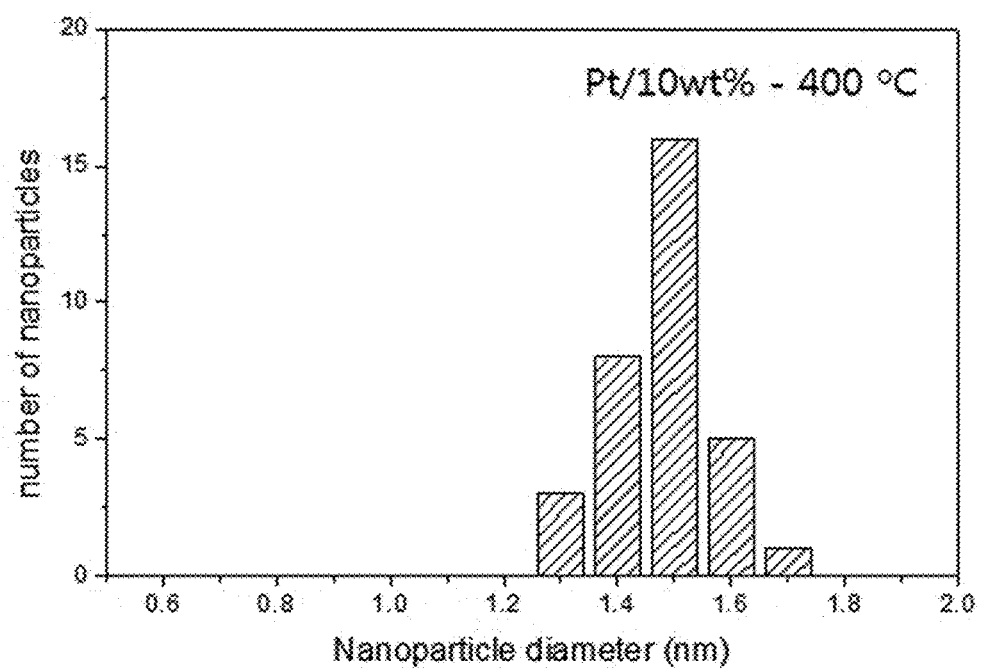
Figure 74C:
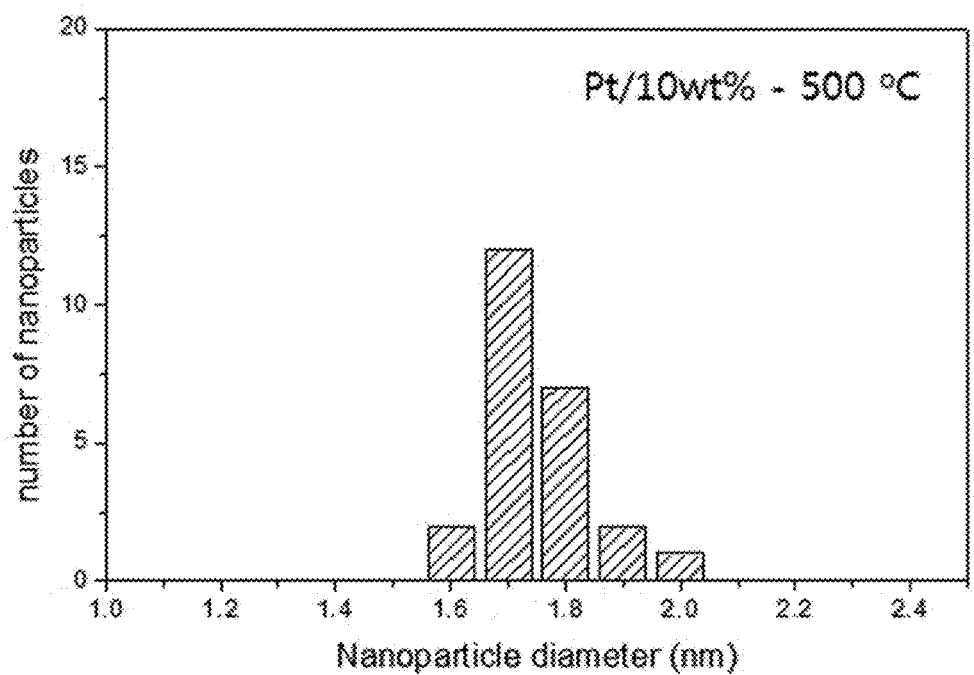
Figure 74D:
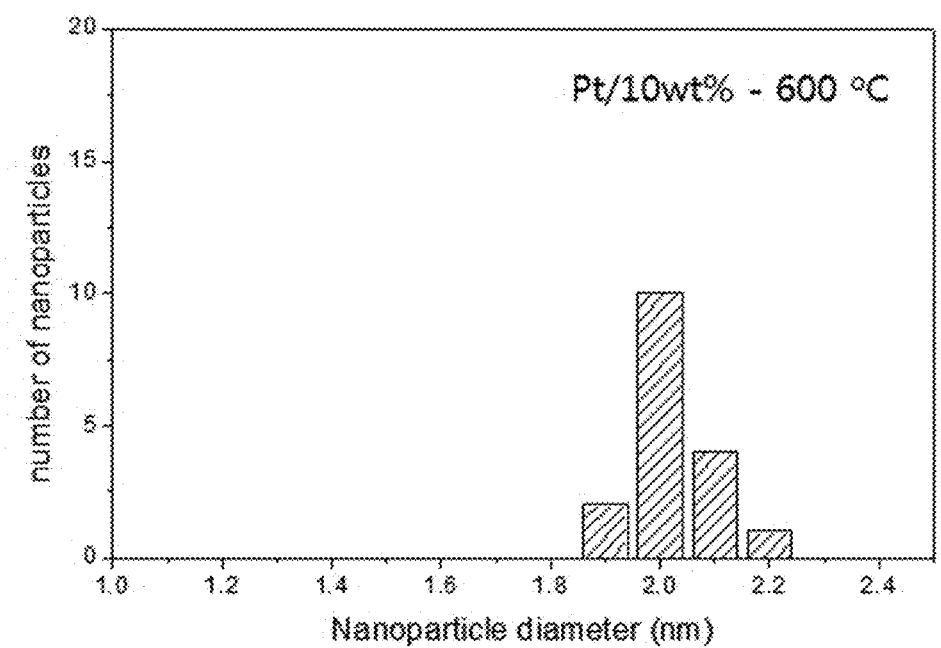

FIG. 73 is a graph illustrating dispersion densities (numbers of particles/100 nm²) measured at different temperatures and different Pt metal contents. Referring to FIG. 73, the dispersion densities are 10 particles/100 nm² or more at all of the different temperatures and in the Pt metal contents of 10 wt % or greater, more preferably, 25 particles/100 nm² or more, and most preferably 45 particles/100 nm².

When the synthesis temperature is 300° C., the dispersion density of 1.25 nm sized Pt nanoparticles for the surface area (SA) of the support will now be described. That is to say, the coating areas of Pt nanoparticles corresponding to approximately 10% or greater of the surface area of the support for all of the contents are calculated. In more detail, when the Pt metal content is 10 wt %, the coating area of Pt nanoparticles corresponding to approximately 62% of the surface area of the support is calculated. When the Pt metal content is 20 wt %, the coating area of Pt nanoparticles corresponding to a relatively large area, e.g., approximately 115% of the surface area of the support, is calculated. When the Pt metal content is in the maximum level, i.e., 50 wt %, the coating area of Pt nanoparticles corresponding to an area of 2.8 times the surface area of the support, is calculated. This means that Pt nanoparticles are stacked on carbon shells and then coated while being continuously stacked on the surface of the support without agglomeration, as confirmed from the TEM or STEM images in various embodiments of the present invention.

Experimental Example 29

Sizes of the nanostructured catalyst particles were calculated by measuring diameters of nanoparticles based on measurement results by TEM and STEM. That is to say, the sizes of the nanostructured catalyst particles were calculated by measuring the number of nanoparticles corresponding to the diameters of Pt nanoparticles coated on carbon spheres. The reaction temperatures were varied to 300° C., 400° C., 500° C., and 600° C., and catalyst sources were supplied such that the Pt metal content became approximately 10 wt %. FIG. 73A illustrates dispersion densities of Pt nanoparticles synthesized at 300° C. The measured sizes of the nanostructured catalyst particles were mostly distributed to be in the range between 1.2 nm and 1.3 nm. The average particle size of the nanostructured catalyst particles was 1.260 nm. Size distributions of the nanostructured catalyst particles synthesized in the same manner at 400° C., 500° C., and 600° C. are illustrated in FIGS. 74A to 74D, and average particle sizes of the nanostructured catalyst particles synthesized at the respective temperatures were 1.260, 1.485, 1.75, and 2.02 nm, respectively.

Experimental Example 30

Carbon black having a diameter of approximately 50 nm a support, platinum (II) acetylacetonate ($PtC_{10}H_{14}O_4$) as a Pt based catalyst source (precursor) and cobalt (II) acetylacetonate ($CoC_{10}H_{14}O_4$) as a Co based catalyst source (precursor) were supplied into a reactor under room temperature and atmospheric pressure conditions, such that Pt metal content and Co metal content become 40 wt % and 5 wt %, respectively, based on the total weight of the catalyst structure. The reactor was perfectly sealed and the temperature of the reactor was elevated up to 350° C., followed by allowing the reaction to take place for 30 minutes. After the reaction was completed, the internal pressure of the reactor was eliminated and the reaction was stabilized while supplying an inert gas to then remove unreacted materials and byproducts from the reactor (S7). Thereafter, in order to remove impurities remaining on surfaces of nanoparticles, oxidation treatment was first performed at the same temperature as the elevated reaction temperature (i.e., 350° C.) and reduction treatment was then performed (S9). Finally, the temperature was lowered to room temperature under an inert gas atmosphere, acquiring a sample (S10).

Figure 75A:
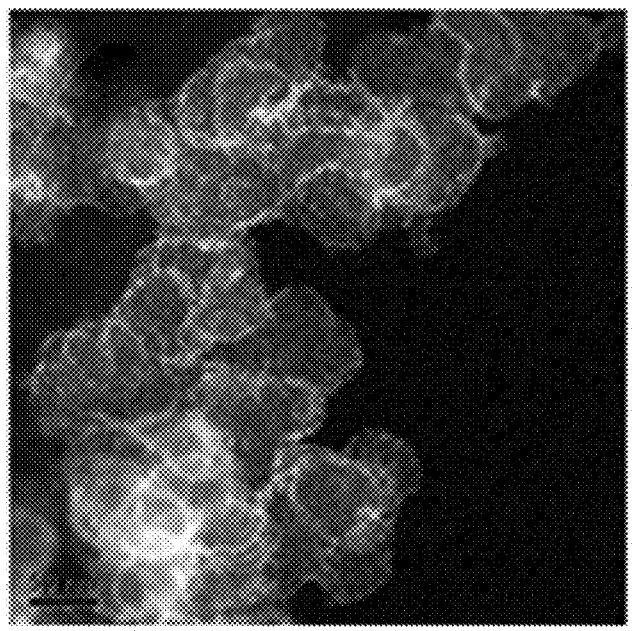
FIGS. 75A and 75B illustrate a catalyst structure acquired in Experimental Example 30, specifically FIGS. 75A and 75B illustrating TEM and HRTEM images of the acquired catalyst structure (an example of adopting sealing followed by post treatment of oxidation and reduction)
Figure 75B:
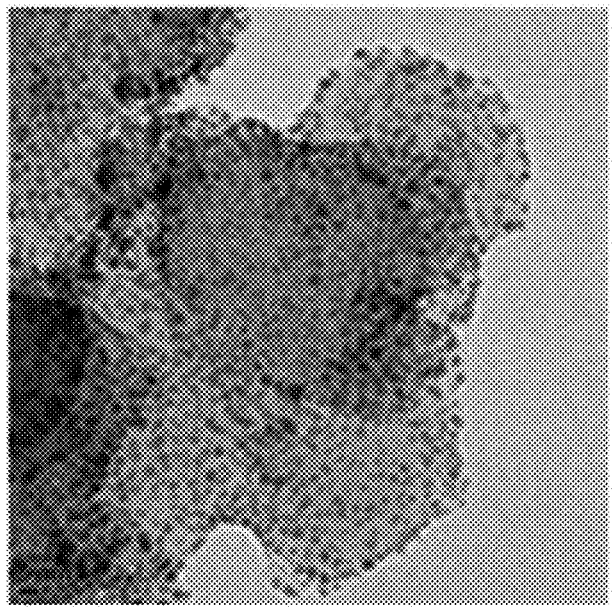

FIGS. 75A and 75B illustrate a catalyst structure acquired in Experimental Example 30, specifically FIGS. 75A and 75B illustrating TEM and HRTEM images of the acquired catalyst structure. It was confirmed from FIGS. 75A and 75B that 1.5 to 2.5 nm sized Pt- and Co-based catalyst nanoparticles were uniformly dispersed on a surface of a carbon black support.

Table 34 demonstrates measurement results of atomic ratios of the acquired catalyst structure, as analyzed by EDX. Based on the measured atomic ratios, it can be deduced that the nanoparticles include $Pt_3Co$ nanoparticles. It is also confirmed that XRD analysis results of crystallographic structures are identical with EDX analysis results.

TABLE 34

| Element | Line Type | k factor | Absorption Correction | Wt % | Wt % Sigma | Atomic % |
|---|---|---|---|---|---|---|
| Co | K series | 1.28630 | 1.00 | 8.41 | 1.52 | 23.31 |
| Pt | L series | 2.75544 | 1.00 | 91.59 | 1.52 | 76.69 |
| Total | — | | | 100.00 | | 100.00 |

Experimental Example 31

Figure 76A:
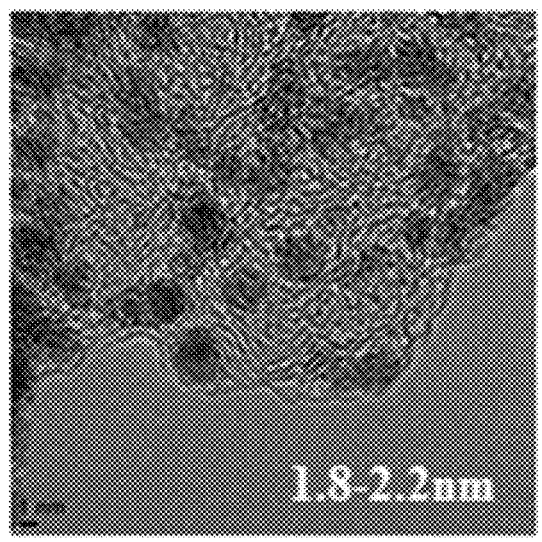
FIGS. 76A to 76C illustrate catalyst structures synthesized at different post treatment temperatures of 350° C., 450° C. and 550° C. in Experimental Example 31, specifically FIGS. 76A to 76C illustrating TEM and HRTEM images of the acquired catalyst structure (an example of adopting sealing followed by post treatment of oxidation and reduction with oxidation temperatures varied during the post treatment)
Figure 76B:
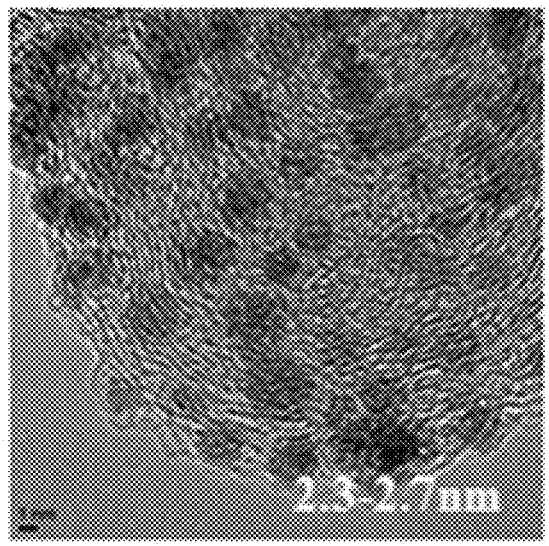
Figure 76C:
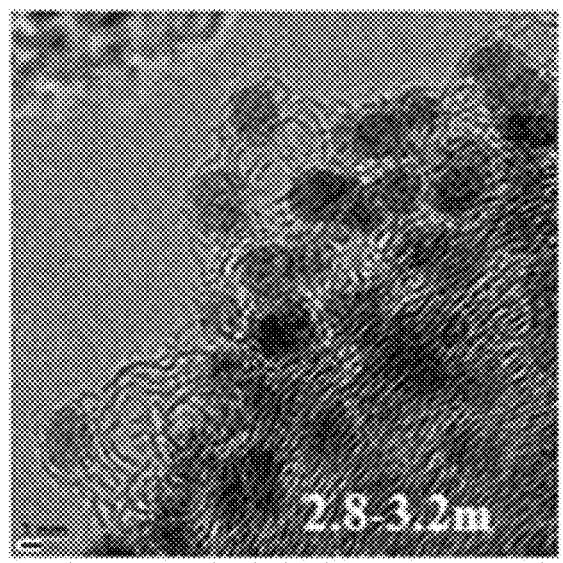

A catalyst structure was synthesized at different post treatment temperatures of oxidation/reduction treatment, corresponding to S9, that is, 350° C., 450° C. and 550° C., while maintaining the precursor and support used and other reaction steps to be same as in Experimental Example 30. The measurement results are illustrated in FIGS. 76A to 76C.

When the acquired catalyst structure was synthesized at 350° C., 1.8 to 2.2 nm sized catalyst nanoparticles were identified, and when the acquired catalyst structure was synthesized at 450° C., 2.3 to 2.7 nm sized catalyst nanoparticles were identified, from which it was confirmed that sizes of the catalyst nanoparticles were gradually increased as the reaction temperature was elevated.

Experimental Example 32

A catalyst structure was synthesized using the same precursor and support as in Experimental Example 30, except for reaction steps. That is to say, after the reactor was perfectly sealed and the reaction temperature was elevated to reach 350° C., the reaction was allowed to be carried out for 30 minutes. After the reaction was completed, the internal pressure of the reactor was eliminated and the reaction was stabilized while supplying an inert gas to then remove unreacted materials and byproducts from the reactor (S7) and the reactor was cooled to room temperature. Thereafter, the temperature of the reactor was again elevated up to 350° C. and oxidation treatment was then performed while maintaining the reactor temperature at 350° C. Then, the reactor temperature was further elevated up to 700° C. and reduction treatment was then performed while maintaining the reactor temperature at 700° C. Finally, the temperature was lowered to room temperature under an inert gas atmosphere, acquiring a sample. The measurement results are illustrated in FIGS. 77A and 77B.

Figure 77A:
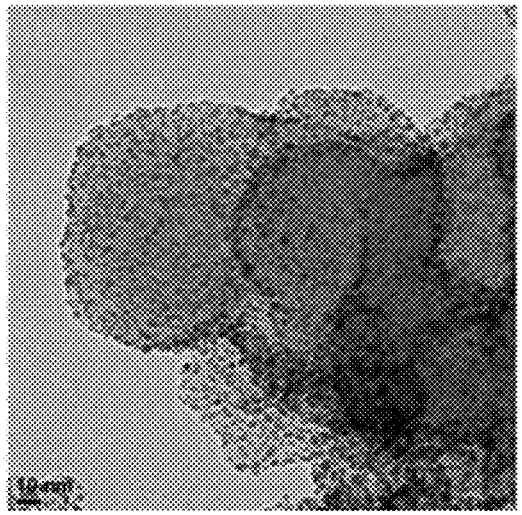
FIGS. 77A and 77B illustrate a catalyst structure acquired in Experimental Example 32, specifically FIGS. 77A and 77B illustrating TEM and HRTEM images of (an example of adopting sealing followed by post treatment of oxidation and reduction and acquiring a sample)
Figure 77B:
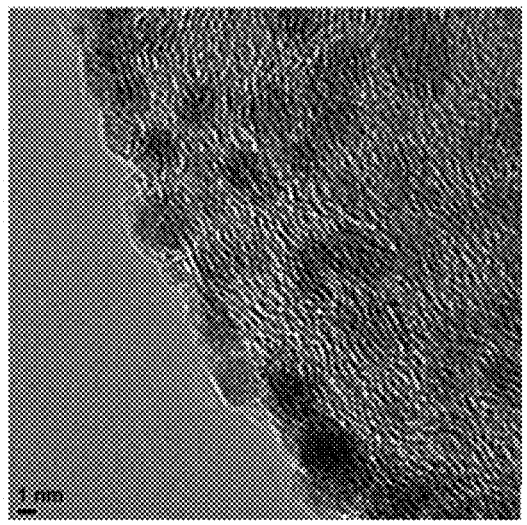

FIGS. 77A and 77B illustrate TEM and HRTEM images of a catalyst structure acquired in Experimental Example 32. confirming that 3 to 4 nm sized catalyst nanoparticles were very uniformly dispersed on a surface of a carbon black support. When post treatment was performed while elevating again the temperature after cooling, sizes of the catalyst nanoparticles were increased by approximately 1 to 2 nm.

Table 35 demonstrates measurement results of atomic ratios of the acquired catalyst structure, as analyzed by EDX. Based on the measured atomic ratios, it can be deduced that the nanoparticles include $Pt_3Co$ nanoparticles. It is also confirmed that XRD analysis results of crystallographic structures are identical with EDX analysis results.

TABLE 35

| Element | Line Type | k factor | Absorption Correction | Wt % | Wt % Sigma | Atomic % |
|---|---|---|---|---|---|---|
| Co | K series | 1.28630 | 1.00 | 8.08 | 0.18 | 22.54 |
| Pt | L series | 2.75544 | 1.00 | 91.92 | 0.18 | 77.46 |
| Total | — | | | 100.00 | | 100.00 |

Experimental Example 33

A catalyst structure was synthesized using the same precursor and support as in Experimental Example 30, except for internal atmosphere conditions of a reactor that has yet to be sealed. That is to say, the catalyst structure was acquired under different internal atmosphere conditions of the reactor, as listed in Table 36 below. The measurement results are illustrated in FIGS. 78A to 78C.

TABLE 36

| FIG. 78 | Internal atmosphere conditions of a reactor that has yet to be sealed (4 atm) |
|---|---|
| (a) | 100% oxygen |
| (b) | 5% oxygen contained in argon gas |
| (c) | 100% argon |

Figure 78A:
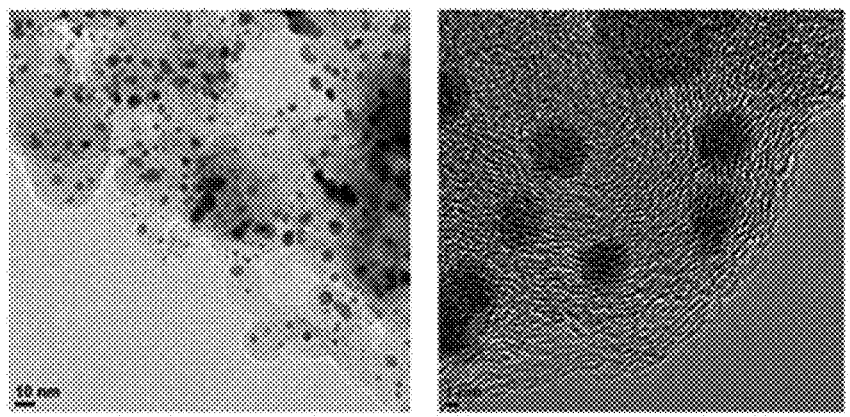
FIGS. 78A to 78C illustrate a catalyst structures synthesized in Experimental Example 33, specifically FIGS. 78A to 78C illustrating TEM and HRTEM images of the acquired catalyst structure (an example of adopting varying atmosphere gases of reactor followed by sealing)
Figure 78B:
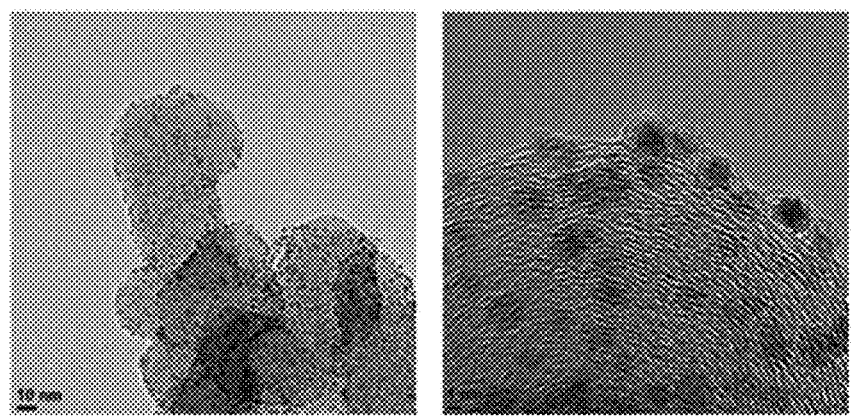
Figure 78C:
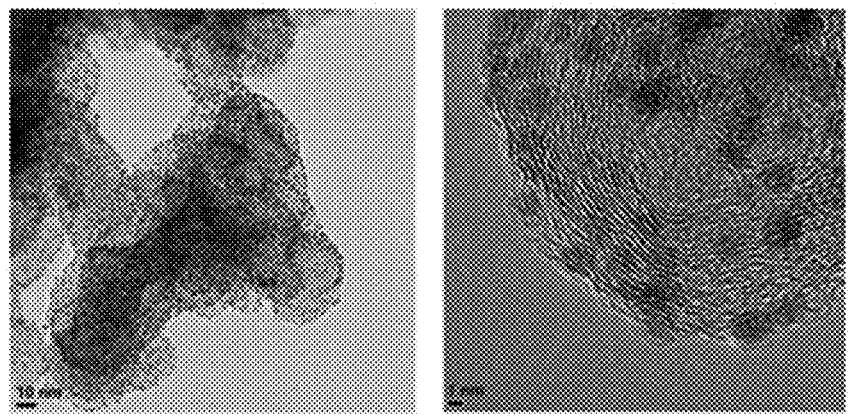

FIGS. 78A to 78C illustrate TEM and HRTEM images of the catalyst structures synthesized in Experimental Example 33. It was confirmed from FIGS. 78A to 78C that when the internal gas condition of the reactor was 100% oxygen, the acquired catalyst structure had approximately 10 nm sized nanoparticles, nanoparticle sizes were gradually reduced as the content of oxygen present in the reactor is reduced, and when the internal gas condition of the reactor was 100% argon that is an inert gas, the acquired catalyst structure had approximately 1 to 2 nm sized nanoparticles. These results confirm that the nanoparticle sizes, dispersion density and doping of trace elements can be controlled by controlling reaction atmosphere gases before sealing the reactor. Here, not only an oxygen gas but also a hydrogen gas for reduction of an oxide during the reaction and an ammonium gas for nitrogen doping of a reactant can be used as the reaction atmosphere gases.

Experimental Example 34

A catalyst structure was synthesized using the same precursor and support as in Experimental Example 30, while supplying platinum (II) acetylacetonate ($PtC_{10}H_{14}O_4$) as a Pt based catalyst source (precursor) and ruthenium (III) acetylacetonate ($Ru(C_5H_7O_2)_3$) as a Ru based catalyst source (precursor).

Figure 79A:
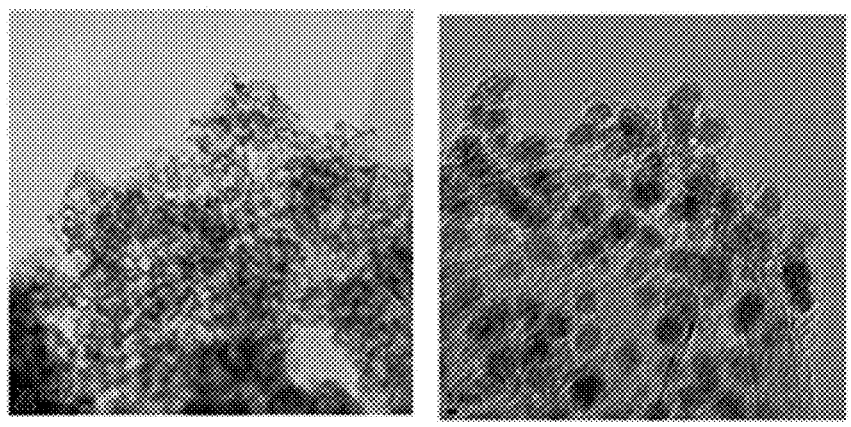
FIGS. 79A and 79B illustrate a catalyst structure acquired in Experimental Example 34, specifically FIGS. 79A and 79B illustrating TEM and HRTEM images of the acquired catalyst structure having 50 wt % and 75 wt % in total metal content, respectively (an example of adopting sealing followed by post treatment of oxidation and reduction-controlling amounts of metal catalysts coated)
Figure 79B:
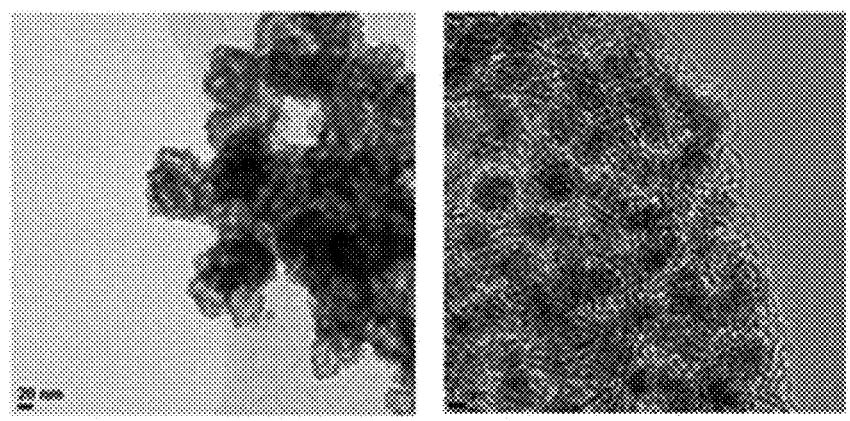

FIGS. 79A and 79B illustrate a catalyst structure acquired in Experimental Example 34, specifically illustrating TEM and HRTEM images of the acquired catalyst structure having 50 wt % and 75 wt % in total metal content, respectively. It was confirmed from FIGS. 79A and 79B that 1.5 to 2.5 nm sized PtRu nanostructured catalyst particles were very uniformly distributed on a surface of a carbon black support.

Experimental Example 35

Carbon black having a diameter of approximately 50 nm as a support, platinum (II) acetylacetonate ($PtC_{10}H_{14}O_4$) as a Pt based catalyst source (precursor), cobalt (III) acetylacetonate ($Co(C_5H_7O_2)_3$) as a Co based catalyst source (precursor), and bis(acetylacetonato) dioxomolybdenum(VI) ($[CH_3COCH=C(O-)CH_3]_2MoO_2$) as a Mo based catalyst source (precursor) were supplied into a reactor under room temperature and atmospheric pressure conditions, such that Pt, Co and Mo metal contents became 40 wt %, 5 wt % and 0.5 wt %, respectively, based on the total weight of the catalyst structure. The reactor was perfectly sealed and the temperature of the reactor was elevated up to 350° C., followed by allowing the reaction to take place for 30 minutes. After the reaction was completed, the internal pressure of the reactor was eliminated and the reaction was stabilized while supplying an inert gas to then remove unreacted materials and byproducts from the reactor. Thereafter, oxidation treatment was first performed at the same temperature as the elevated reaction temperature (i.e., 350° C.) and reduction treatment was then performed. Finally, the temperature was lowered to room temperature under an inert gas atmosphere, acquiring a sample.

Figure 80A:
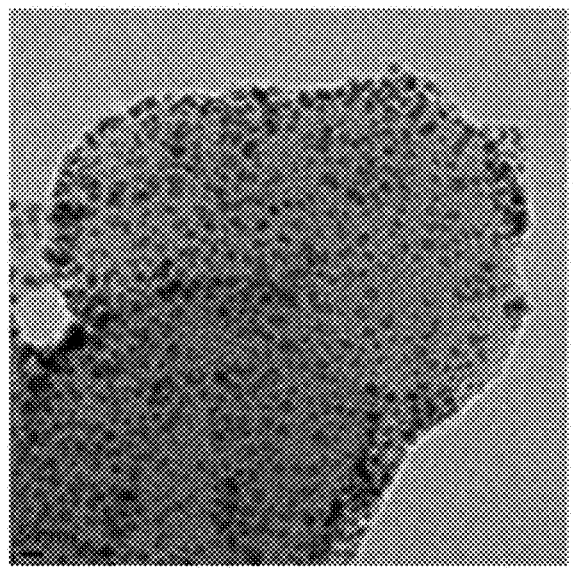
FIGS. 80A and 80B illustrates a catalyst structure acquired in Experimental Example 35, specifically FIGS. 80A and 80B illustrating TEM and HRTEM images of the acquired catalyst structure, respectively (an example of adopting sealing followed by post treatment of oxidation and reduction-synthesizing Mo based tertiary alloy nanoparticles)
Figure 80B:
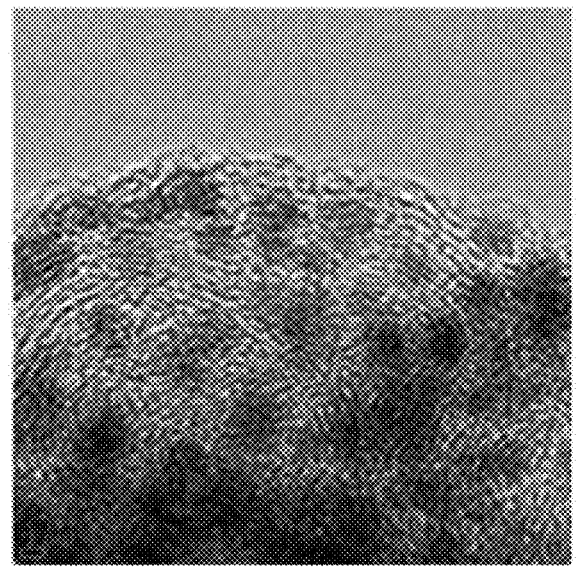

FIGS. 80A and 80B illustrate a catalyst structure acquired in Experimental Example 35, specifically illustrating TEM and HRTEM images of the acquired catalyst structure, respectively. It was confirmed from FIGS. 80A and 80B that 1.5 to 2.5 nm sized Pt nanostructured catalyst particles were very uniformly distributed on the surface of the carbon black support.

Table 37 demonstrates measurement results of atomic ratios of the acquired catalyst structure, as analyzed by EDX. Based on the measured atomic ratios, it can be deduced that the nanoparticles include $Pt_3CoMo_{0.2}$ nanoparticles.

TABLE 37

| Element | Line Type | k factor | Absorption Correction | Wt % | Wt % Sigma | Atomic % |
|---|---|---|---|---|---|---|
| Co | K series | 1.28630 | 1.00 | 9.82 | 0.28 | 25.95 |
| Mo | K series | 7.38599 | 1.00 | 2.50 | 0.56 | 4.05 |
| Pt | L series | 2.75544 | 1.00 | 87.68 | 0.58 | 70.00 |
| Total | — | | | 100.00 | | 100.00 |

Experimental Example 36

Carbon black having a diameter of approximately 50 nm as a support, platinum (II) acetylacetonate ($PtC_{10}H_{14}O_4$) as a Pt based catalyst source (precursor) and cobalt (II) acetylacetonate ($CoC_{10}H_{14}O_4$) as a Co based catalyst source (precursor) were supplied into a reactor under room temperature and atmospheric pressure conditions, such that Pt and Co metal contents became 40 wt % and 5 wt %, respectively, based on the total weight of the catalyst structure. The reactor was perfectly sealed and the temperature of the reactor was elevated up to 350° C., followed by allowing the reaction to take place for 30 minutes. After the reaction was completed, the internal pressure of the reactor was eliminated and the reaction was stabilized while supplying an inert gas to then remove unreacted materials and byproducts from the reactor. Thereafter, oxidation treatment was first performed at the same temperature as the elevated reaction temperature (i.e., 350° C.) and reduction treatment was then performed. Finally, the temperature was lowered to room temperature under an inert gas atmosphere, acquiring a sample.

Figure 81A:
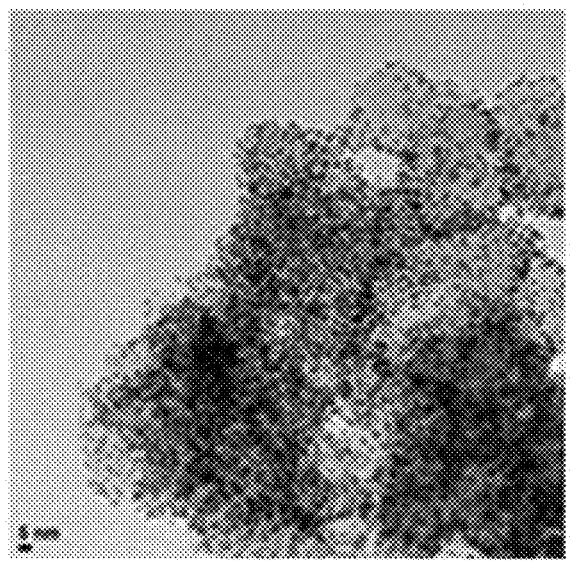
FIGS. 81A and 81B illustrate a catalyst structure acquired in Experimental Example 36, specifically FIGS. 81A and 81B illustrating a TEM image and an HRTEM image of the acquired catalyst structure, respectively (an example of adopting sealing followed by post treatment of oxidation and reduction: Mo doping)
Figure 81B:
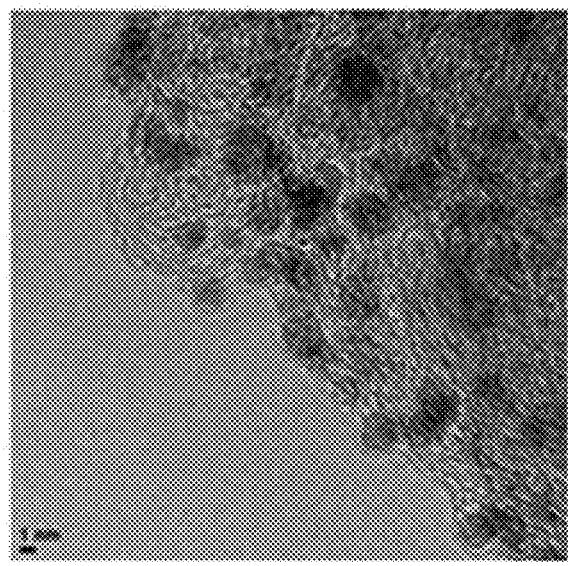

Next, hexacarboxyl molybdenum ($Mo(CO)_6$) as a Mo based catalyst source (precursor) and a Pt based catalyst precursor were supplied into a closed reactor together with the acquired sample for further performing a sealing reaction. As the result, as illustrated in FIGS. 81A and 81B, the catalyst structure including Mo-doped CoPt3 nanoparticles dispersed in the carbon black support was acquired.

Table 38 demonstrates measurement results of atomic ratios of the acquired catalyst structure, as analyzed by EDX. Based on the measured atomic ratios, it can be deduced that the nanoparticles include $Pt_3CoMo_{0.2}$ nanoparticles.

TABLE 38

| Element | Line Type | k factor | Absorption Correction | Wt % | Wt % Sigma | Atomic % |
|---|---|---|---|---|---|---|
| Co | K series | 1.28630 | 1.00 | 8.92 | 0.24 | 24.45 |
| Mo | K series | 7.38599 | 1.00 | 0.12 | 0.42 | 0.21 |
| Pt | L series | 2.75544 | 1.00 | 90.96 | 0.44 | 75.34 |
| Total | — | | | 100.00 | | 100.00 |

Experimental Example 37

Carbon black as a carbon support and hexacarboxyl molybdenum ($Mo(CO)_6$) and sulfur as a Mo based catalyst source (precursor) were supplied into a reactor, such that $MoS_2$ content became 30 wt %, based on the total weight of the catalyst structure. The reactor was perfectly sealed and the temperature of the reactor was elevated up to 550° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, reaction temperature was lowered to room temperature, acquiring a catalyst structure including $MoS_2$ nanoparticles dispersed in the carbon black support.

Figure 82A:
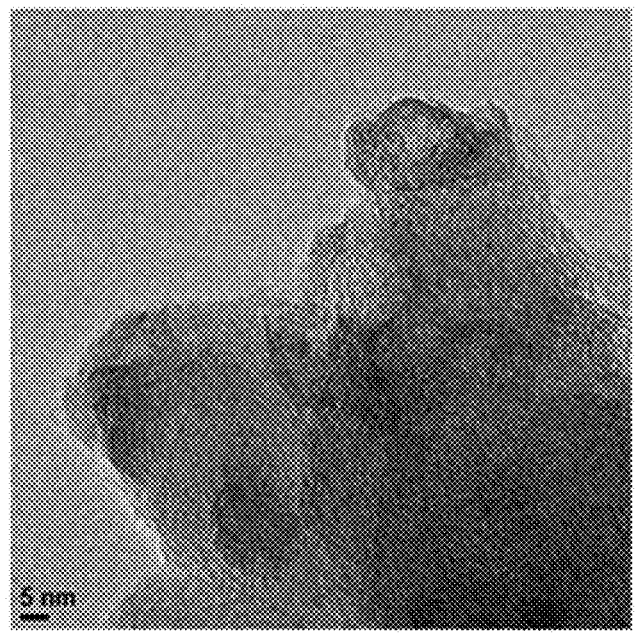
FIGS. 82A to 82C illustrate a catalyst structure acquired in Experimental Example 37, specifically FIGS. 82A to 82C illustrating a TEM image, an HRTEM image and an XRD graph of the acquired catalyst structure, respectively (an example of adopting coating $MoS_2$ as a non-Pt catalyst on a surface of a carbon support)
Figure 82B:
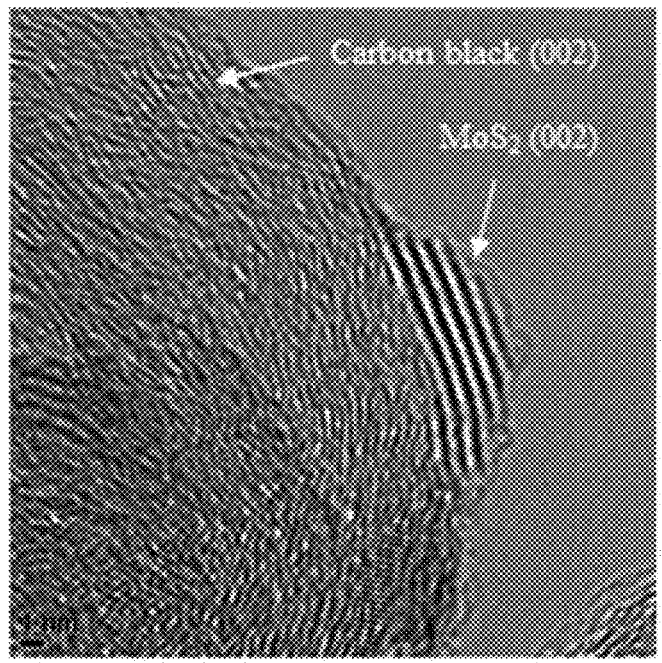
Figure 82C:
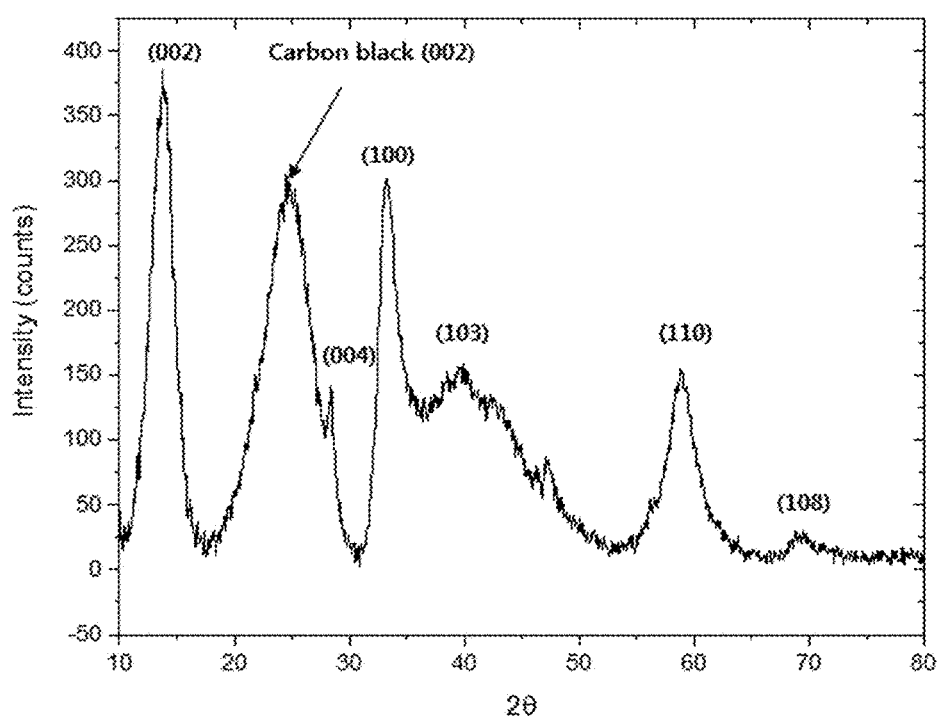

FIGS. 82A and 82B illustrate a catalyst structure acquired in Experimental Example 37, specifically illustrating TEM and HRTEM images of the acquired catalyst structure, respectively. A nanostructure having a 0.65 nm crystallographic plane was synthesized on a surface of the carbon black support. As illustrated in FIG. 82C, the acquired catalyst structure had a $MoS_2$ crystal structure, as identified by XRD analysis.

Experimental Example 38

Figure 83A:
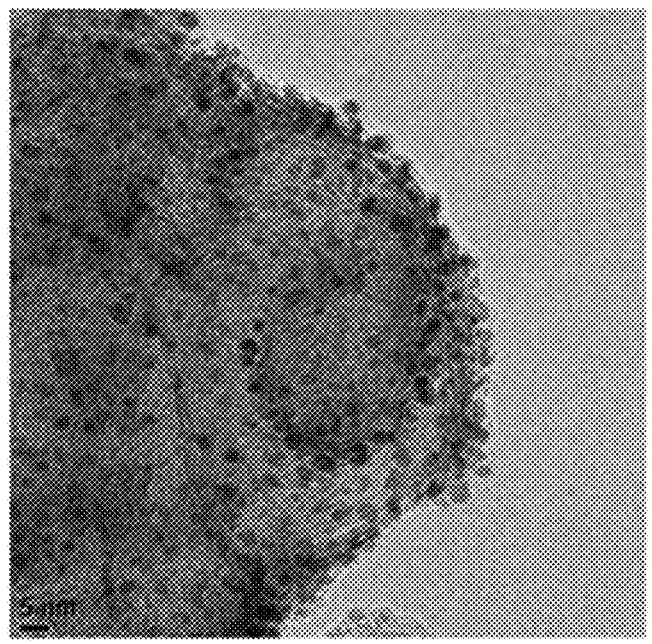
FIGS. 83A to 83C illustrate a catalyst structure acquired in Experimental Example 38, specifically FIGS. 83A to 83C illustrating a TEM image, an HRTEM image and an XRD graph of the acquired catalyst structure, respectively (an example of adopting multi-coating $MoS_2$ as a non-Pt catalyst and $Pt_3Mo$ as a Pt alloy catalyst on a surface of a carbon support)
Figure 83B:
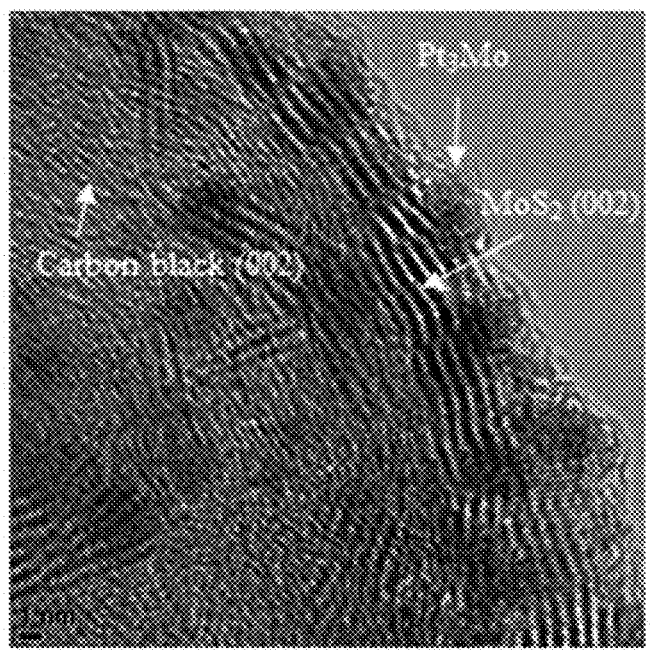
Figure 83C:
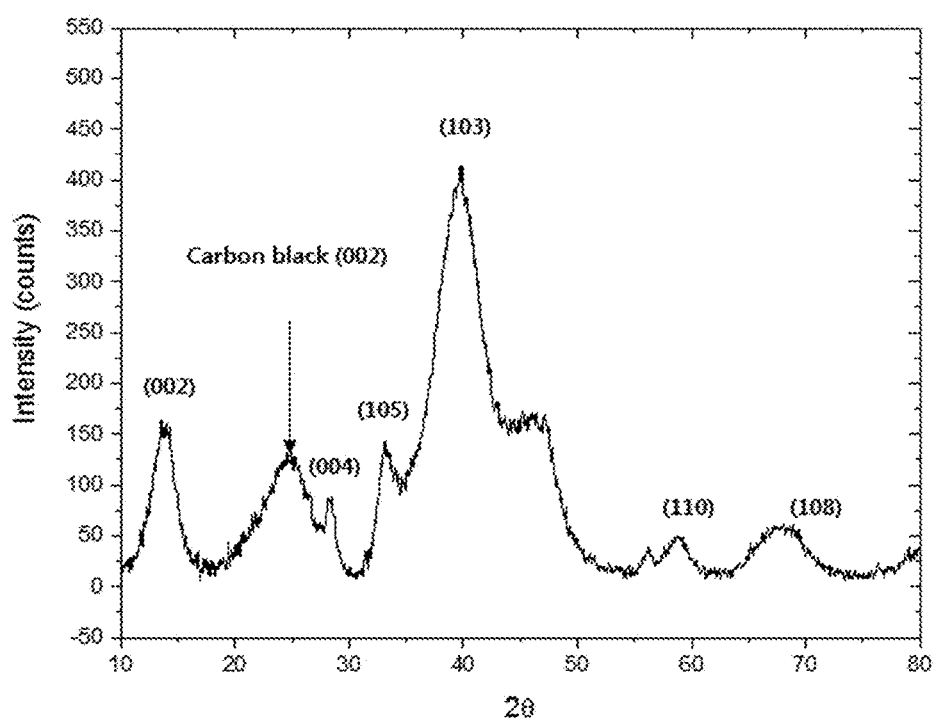

The catalyst structure acquired in Experimental Example 37 was put into a closed reactor and trimethyl(methylcyclopentadiel) platinum (IV) ($C_5H_4CH_3Pt(CH_3)_3$) as a Pt precursor was added to the closed reactor, such that Pt content became 50 wt %, based on the total weight of the catalyst structure, for further performing a sealing reaction. Here, the reaction was allowed to take place for 30 minutes. After the reaction was completed, the internal pressure of the reactor was eliminated and the reaction was stabilized while supplying an inert gas to then remove unreacted materials and byproducts from the reactor. Thereafter, reaction temperature was lowered to room temperature, acquiring a catalyst structure As the result, as illustrated in FIGS. 83A and 83B, the catalyst structure having a 0.65 nm crystallographic plane formed on a surface of a carbon black support and approximately 2 nm sized nanoparticles were synthesized. As illustrated in FIG. 83C, the acquired catalyst structure had a $MoS_2$ crystal structure and Pt3Mo nanostructured catalyst synthesized at the same time, as identified by XRD analysis.

Experimental Example 39

Titanium (Ti) nanoparticles having a diameter of approximately 80 nm as a support and trimethyl(methylcyclopentadiel) platinum (IV) ($C_5H_4CH_3Pt(CH_3)_3$) as a Pt based catalyst source (precursor) were supplied into a reactor under room temperature and atmospheric pressure conditions, such that Pt content became 30 wt %, based on the total weight of the catalyst structure. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 84A:
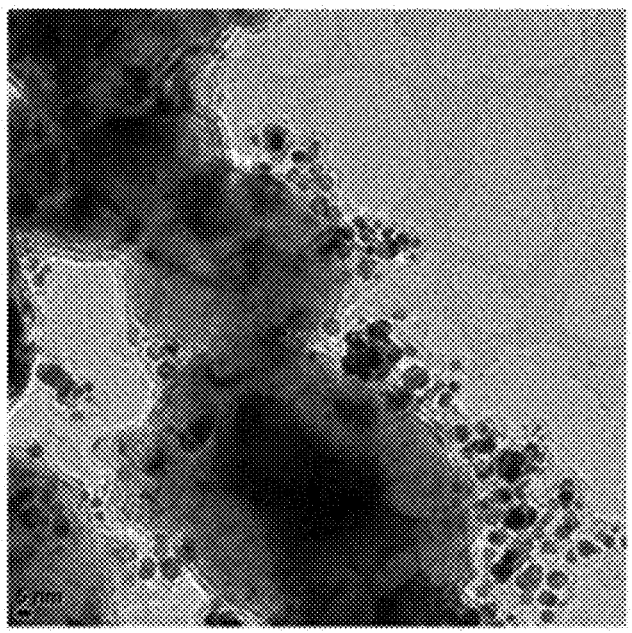
FIGS. 84A and 84B illustrate a catalyst structure acquired in Experimental Example 39, specifically FIGS. 84A and 84B illustrating a TEM image and an HRTEM image of the acquired catalyst structure, respectively (an example of adopting coating Pt on a surface of a Ti support)
Figure 84B:
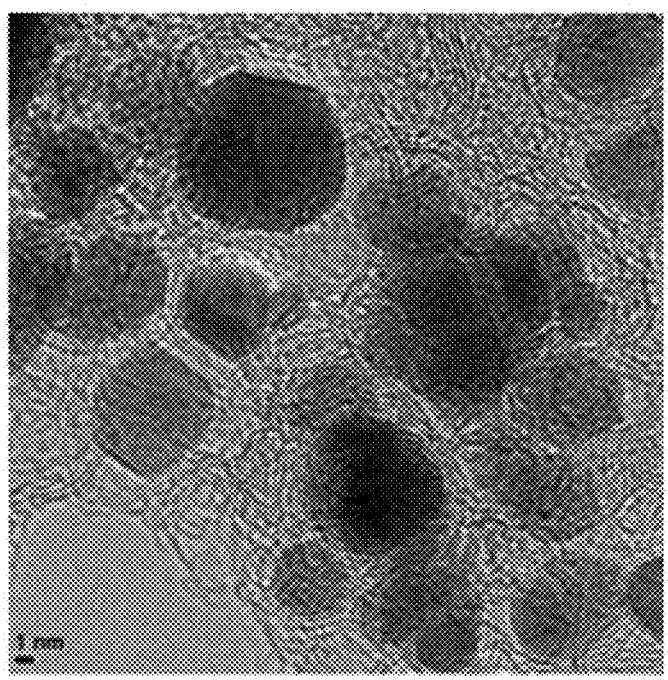

As illustrated in FIGS. 84A and 84B, the catalyst structure including Pt nanoparticles dispersed in the Ti nanoparticle support was acquired.

Table 39 demonstrates measurement results of atomic ratios of the acquired catalyst structure, as analyzed by EDX. Based on the measured atomic ratios, it can be deduced that the nanoparticles include Pt nanoparticles.

TABLE 39

| Element | Line Type | k factor | Absorption Correction | Wt % | Wt % Sigma | Atomic % |
|---|---|---|---|---|---|---|
| Ti | K series | 1.09006 | 1.00 | 0.66 | 0.12 | 2.64 |
| Pt | L series | 2.75544 | 1.00 | 99.34 | 0.12 | 97.36 |
| Total | — | | | 100.00 | | 100.00 |

Experimental Example 40

Titanium (Ti) nanoparticles having a diameter of approximately 80 nm as a support, trimethyl(methylcyclopentadiel) platinum (IV) ($C_5H_4CH_3Pt(CH_3)_3$) as a Pt based catalyst source (precursor) and bis(ethylcyclopentadienyl) ruthenium (II) ($C_7H_9RuC_7H_9$) as a Ru based catalyst source (precursor) were supplied into a reactor under room temperature and atmospheric pressure conditions, such that total catalyst content became 30 wt %. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 85A:
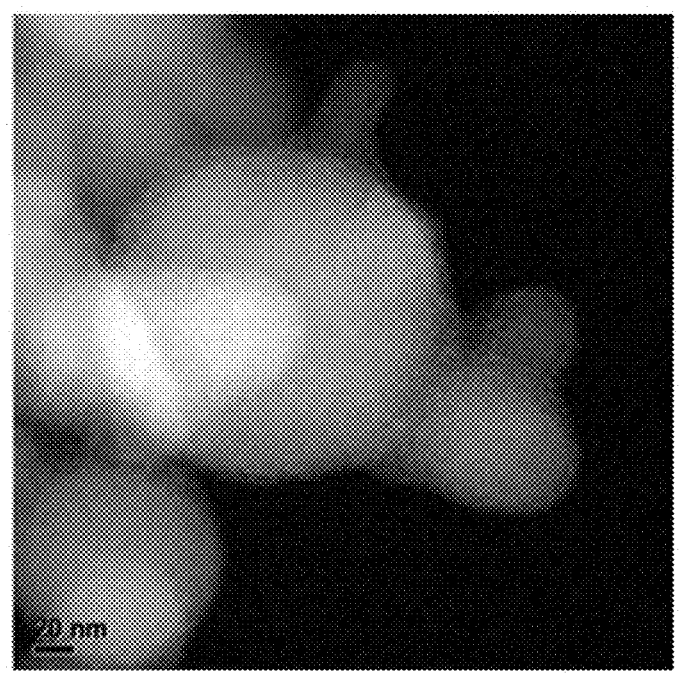
FIGS. 85A and 85B illustrate a catalyst structure acquired in Experimental Example 40, specifically FIGS. 85A and 85B illustrating a TEM image and an HRTEM image of the acquired catalyst structure, respectively (an example of adopting coating $Pt_3Ru$ on a surface of a Ti support)
Figure 85B:
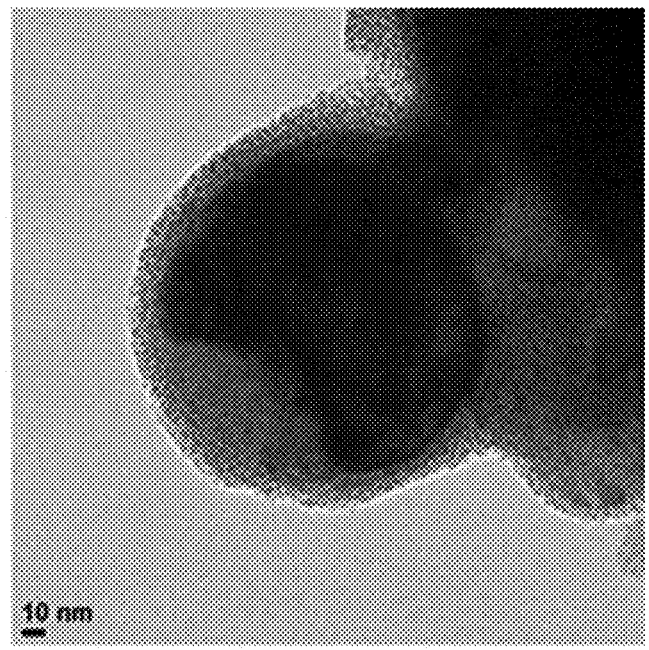

As illustrated in FIGS. 85A and 85B, the catalyst structure including PtRu nanoparticles dispersed in the Ti nanoparticle support was acquired.

Table 40 demonstrates measurement results of atomic ratios of the acquired catalyst structure, as analyzed by EDX. Based on the measured atomic ratios, it can be deduced that the $Pt_3Ru$ nanoparticles.

TABLE 40

| Element | Line Type | k factor | Absorption Correction | Wt % | Wt % Sigma | Atomic % |
|---|---|---|---|---|---|---|
| Ru | K series | 10.71255 | 1.00 | 15.07 | 6.04 | 25.52 |
| Pt | L series | 2.75544 | 1.00 | 84.93 | 6.04 | 74.08 |
| Total | — | | | 100.00 | | 100.00 |

Experimental Example 41

Titanium (Ti) nanoparticles having a diameter of approximately 80 nm as a support, trimethyl(methylcyclopentadiel) platinum (IV) ($C_5H_4CH_3Pt(CH_3)_3$) as a Pt based catalyst source (precursor) and bis(ehtylcyclopentadiel) cobalt (II) ($C_7H_9CoC_7H_9$) as a Co based catalyst source (precursor) were supplied into a reactor under room temperature and atmospheric pressure conditions, such that total catalyst content became 30 were supplied into a reactor under room temperature and atmospheric pressure conditions, such that total catalyst content became 30 wt %. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 86A:
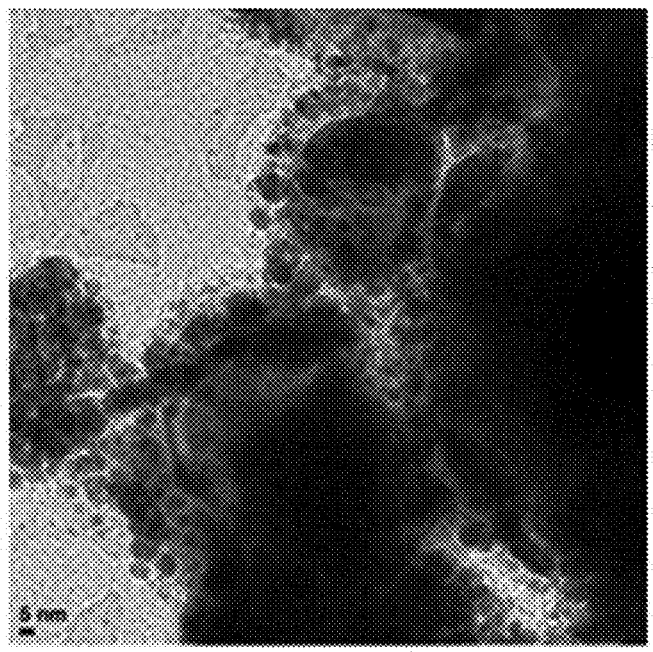
FIGS. 86A and 86B illustrate a catalyst structure acquired in Experimental Example 41, specifically FIGS. 86A and 86B illustrating a TEM image and an HRTEM image of the acquired catalyst structure, respectively (an example of adopting coating $Pt_3Co$ on a surface of a Ti support)
Figure 86B:
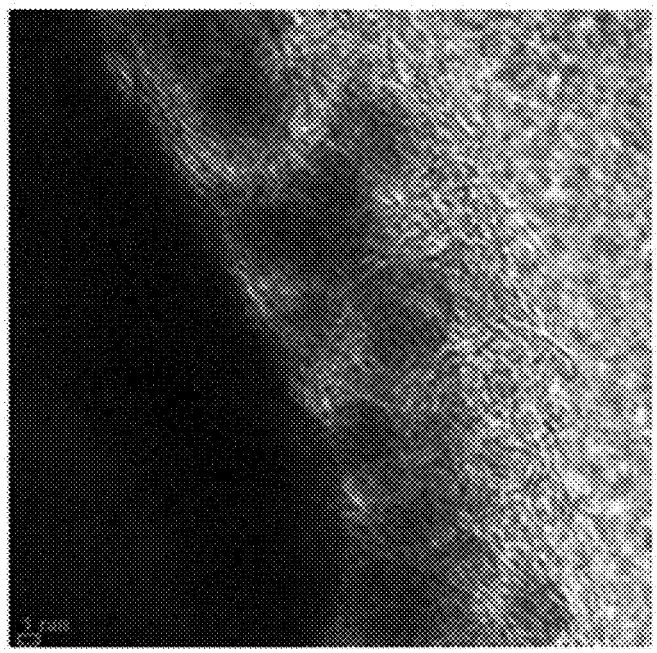

As illustrated in FIGS. 86A and 86B, the catalyst structure including $Pt_3Co$ nanoparticles dispersed in the Ti nanoparticle support was acquired.

Table 41 demonstrates measurement results of atomic ratios of the acquired catalyst structure, as analyzed by EDX. Based on the measured atomic ratios, it can be deduced that the nanoparticles include 5 nm sized $Pt_3Co$ nanoparticles.

TABLE 41

| Element | Line Type | k factor | Absorption Correction | Wt % | Wt % Sigma | Atomic % |
|---|---|---|---|---|---|---|
| Ti | K series | 1.28630 | 1.00 | 3.77 | 0.09 | 11.62 |
| Co | K series | 1.28630 | 1.00 | 8.92 | 0.13 | 22.42 |
| Pt | L series | 2.75544 | 1.00 | 87.27 | 0.16 | 65.96 |
| Total | — | | | 100.00 | | 100.00 |

Experimental Example 42

Silicon (Si) nanoparticles having a diameter of approximately 80 nm as a support and trimethyl(methylcyclopentadiel) platinum (IV) ($C_5H_4CH_3Pt(CH_3)_3$) as a Pt based catalyst source (precursor) were supplied into a reactor under room temperature and atmospheric pressure conditions, such that Pt content became 30 wt %, based on the total weight of the catalyst structure. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 87A:
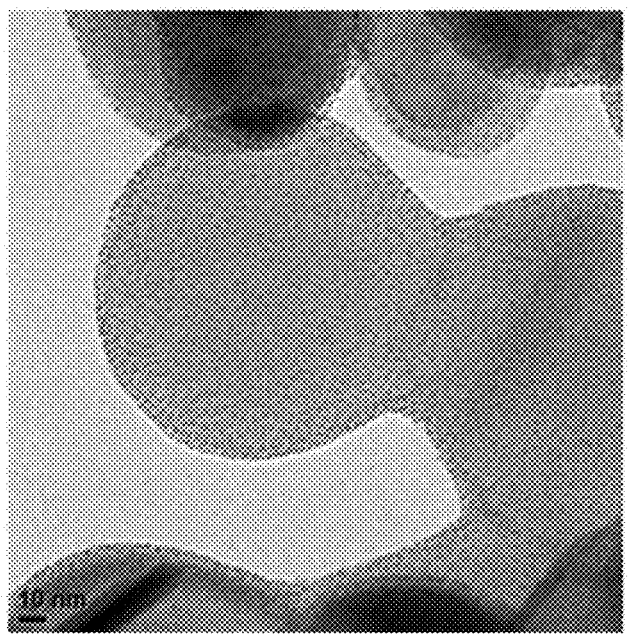
FIGS. 87A and 87B illustrate a catalyst structure acquired in Experimental Example 42, specifically FIGS. 87A and 87B illustrating a TEM image and an HRTEM image of the acquired catalyst structure, respectively (an example of adopting coating Pt on a surface of a Si support)
Figure 87B:
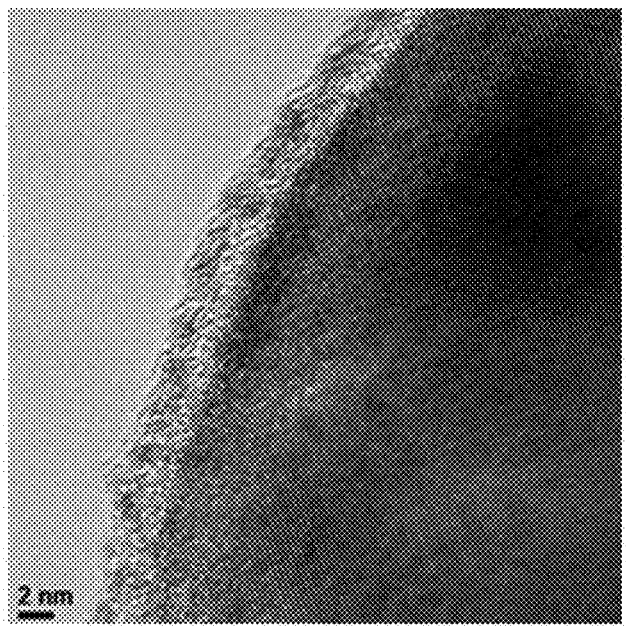

As illustrated in FIGS. 87A and 87B of, the catalyst structure including Pt nanoparticles dispersed in the Si nanoparticle support was acquired.

Table 42 demonstrates measurement results of atomic ratios of the acquired catalyst structure, as analyzed by EDX. Based on the measured atomic ratios, it can be deduced that the nanoparticles include Pt nanoparticles.

TABLE 42

| Element | Line Type | k factor | Absorption Correction | Wt % | Wt % Sigma | Atomic % |
|---|---|---|---|---|---|---|
| Si | K series | 1.00000 | 1.00 | 80.04 | 0.90 | 80.81 |
| O | K series | 1.45493 | 1.00 | 10.01 | 0.49 | 17.74 |
| Pt | L series | 2.75544 | 1.00 | 9.95 | 0.88 | 1.45 |
| Total | — | | | 100.00 | | 100.00 |

Experimental Example 43

Silicon (Si) nanoparticles having a diameter of approximately 80 nm as a support, trimethyl(methylcyclopentadiel) platinum (IV) ($C_5H_4CH_3Pt(CH_3)_3$) as a Pt based catalyst source (precursor) and cobaltocene ($C_{10}H_{10}Co$) as a Co based catalyst source (precursor) were supplied into a reactor under room temperature and atmospheric pressure conditions, such that Pt content became 30 wt %, based on the total weight of the catalyst structure. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 88A:
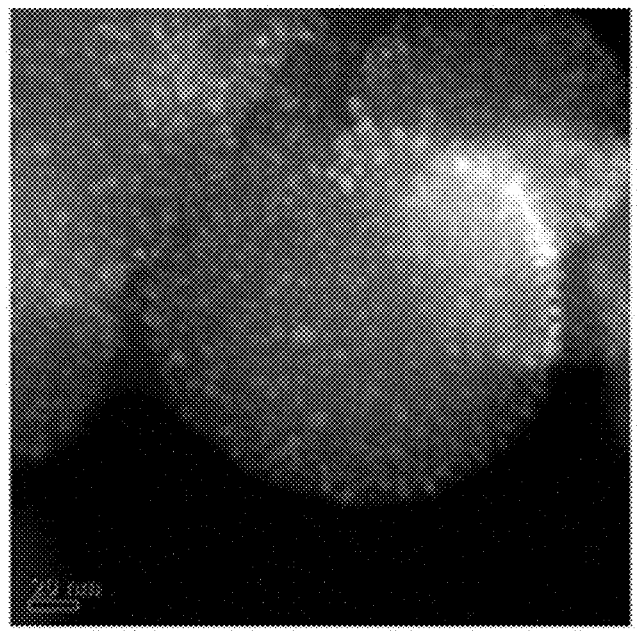
FIGS. 88A to 88C illustrate a catalyst structure acquired in Experimental Example 43, specifically FIGS. 88A to 88C illustrating a TEM image, an HRTEM image and an XRD graph of the acquired catalyst structure, respectively (an example of adopting coating Co nanoparticles on a surface of a Si support)
Figure 88B:
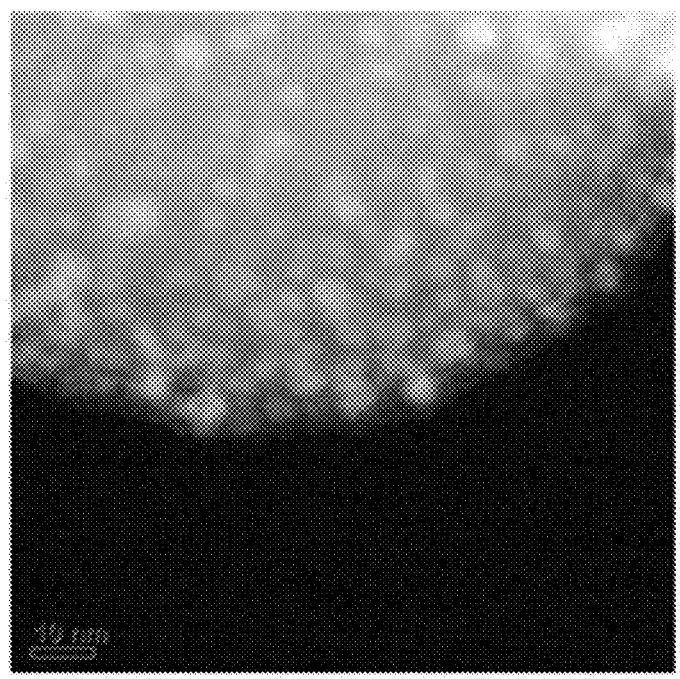
Figure 88C:
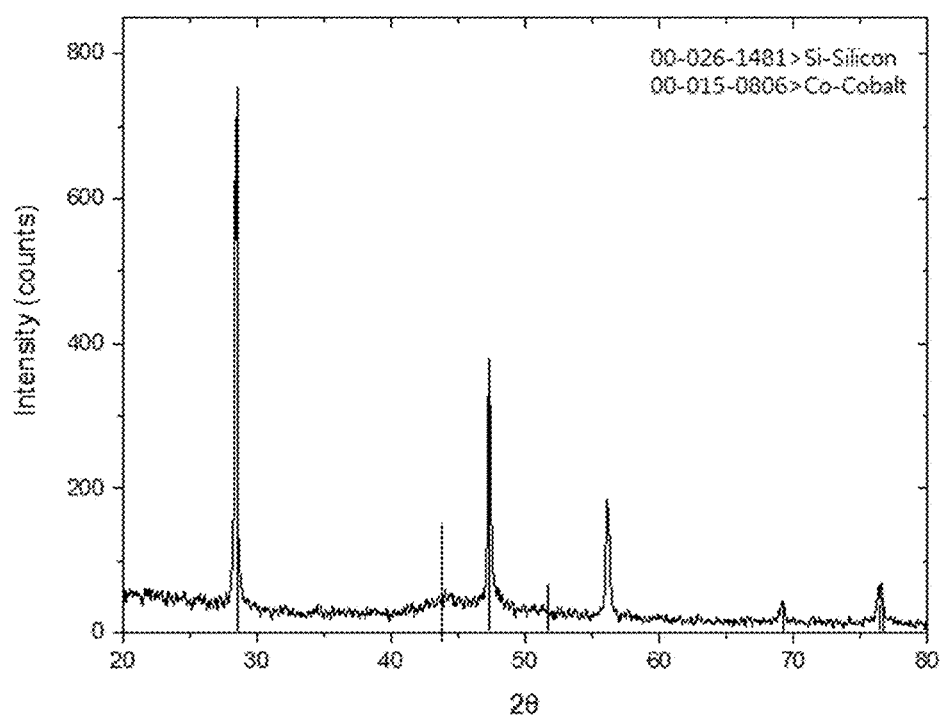

As illustrated in FIGS. 88A and 88B, the catalyst structure including Co nanoparticles dispersed in the Si nanoparticle support was acquired. It was confirmed from FIG. 88C that the nanoparticles had a pure cobalt crystal structure, as identified by XRD analysis.

Experimental Example 44

A catalyst structure was synthesized in the same manner as in Experimental Example 43 in view of the support used and reaction conditions while supplying cobalt (II) acetylacetonate ($CoC_{10}H_{14}O_4$) as a Co based catalyst source (precursor), such that Co metal content became 30 wt %, based on the total weight of the catalyst structure.

Figure 89A:
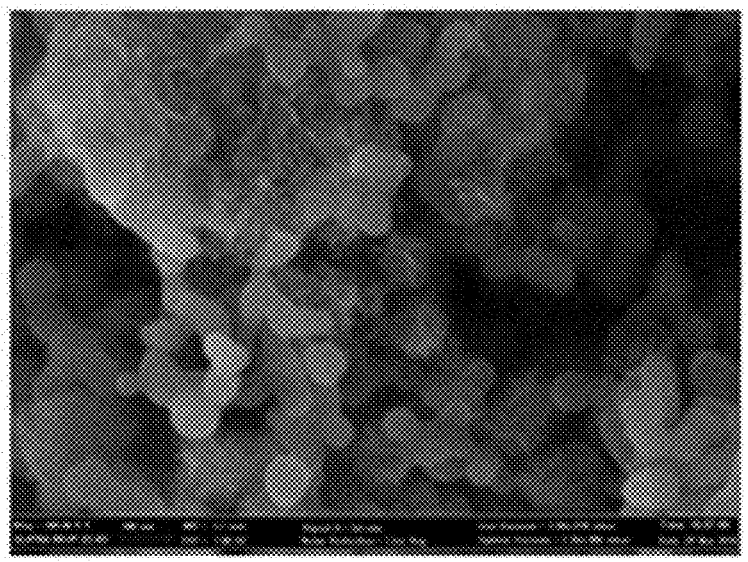
FIGS. 89A to 89F illustrate a catalyst structure acquired in Experimental Example 44, specifically FIGS. 89A to 89F illustrating an SEM image, an STEM image, a TEM image, an HRTEM image, an EDX mapping image and an XRD graph of the acquired catalyst structure, respectively (an example of adopting coating Co nanoflower on a surface of a Si support)
Figure 89B:
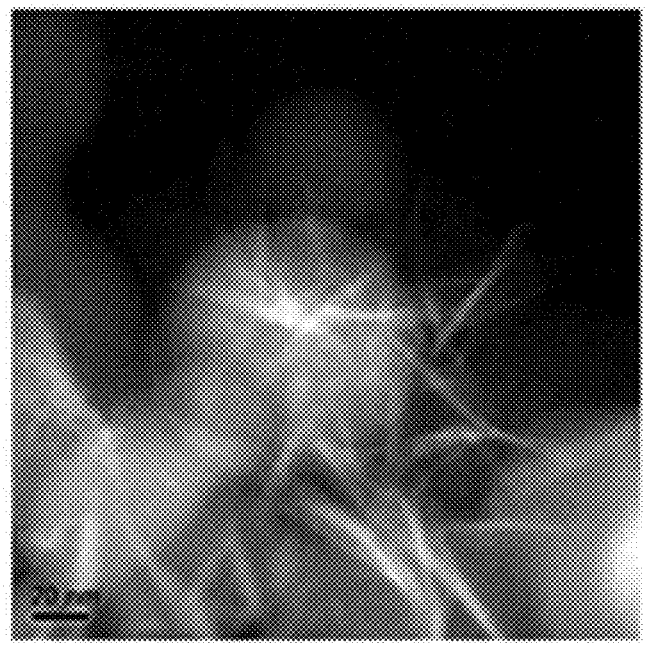
Figure 89C:
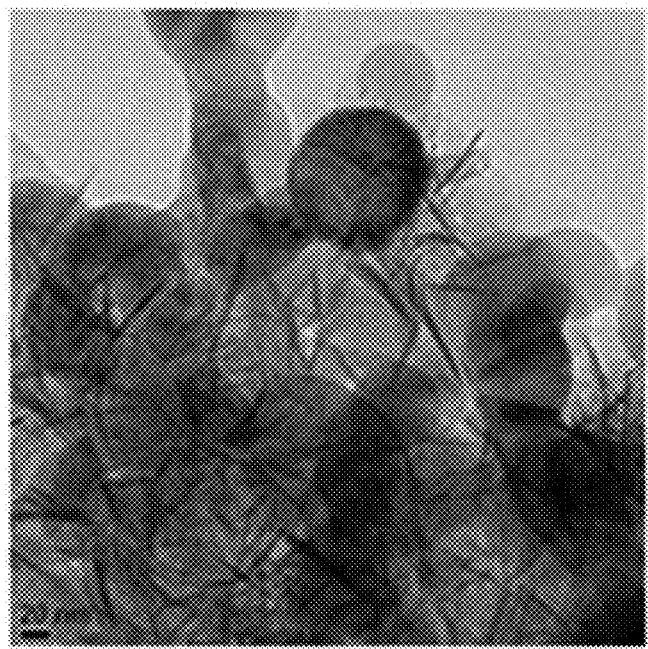
Figure 89D:
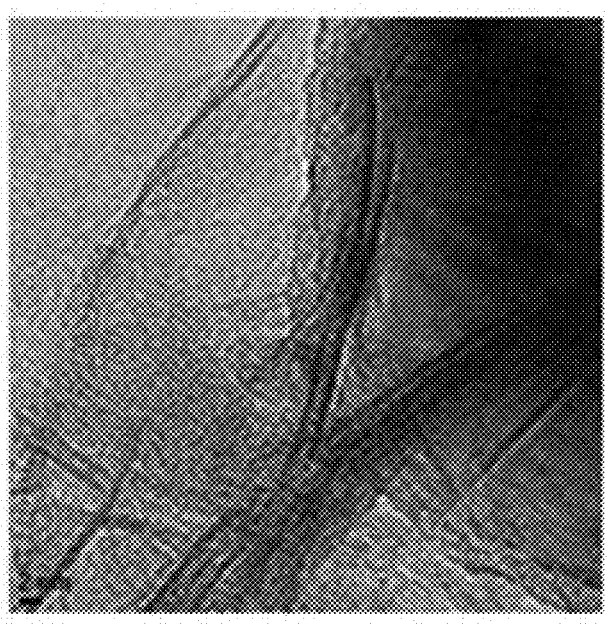
Figure 89E:
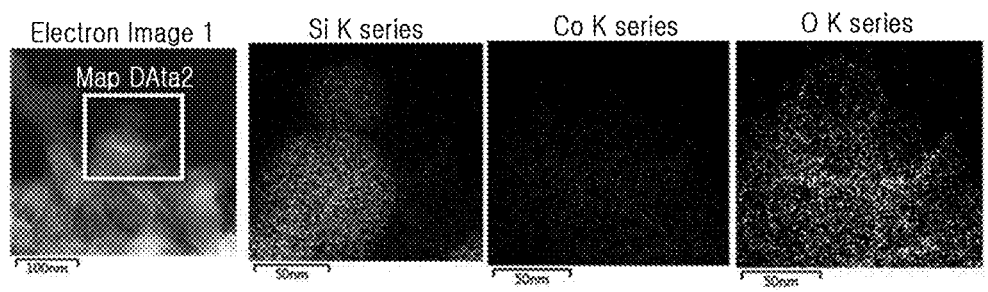
Figure 89F:
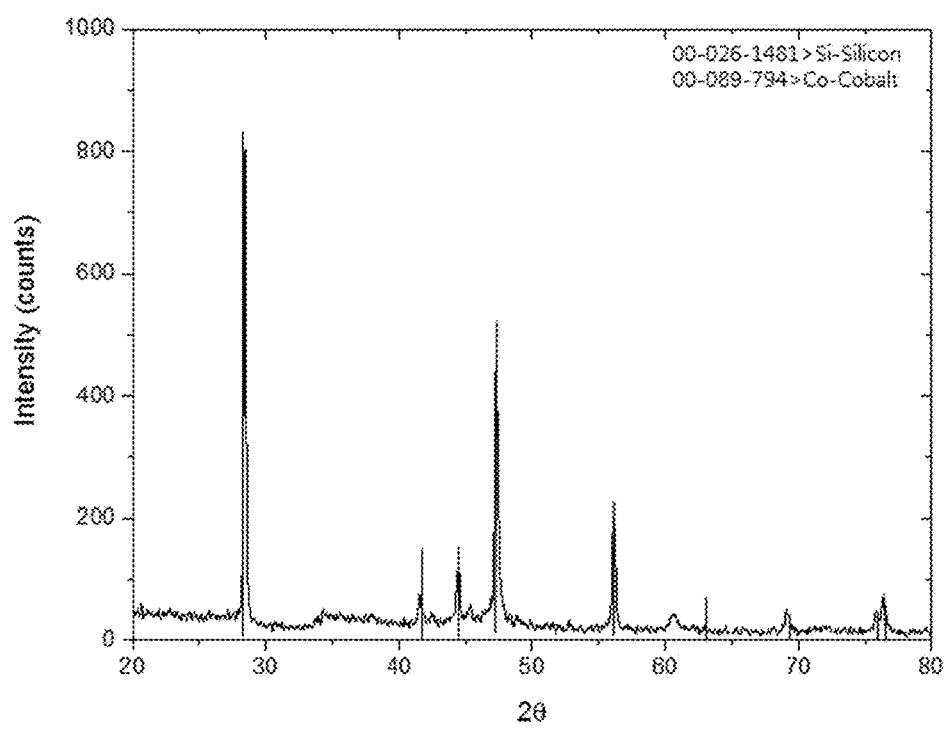

As illustrated in FIGS. 89A to 89D, the catalyst structure including nanoflower-like sheet formed on a Si nanoparticle support was identified. It was confirmed that the nanoparticles had a cobalt crystal structure, as analyzed by EDX illustrated in FIG. 89E, and oxygen present on a surface of the Si nanoparticle support, as analyzed by XRD illustrated in FIG. 89F.

Experimental Example 45

Figure 90A:
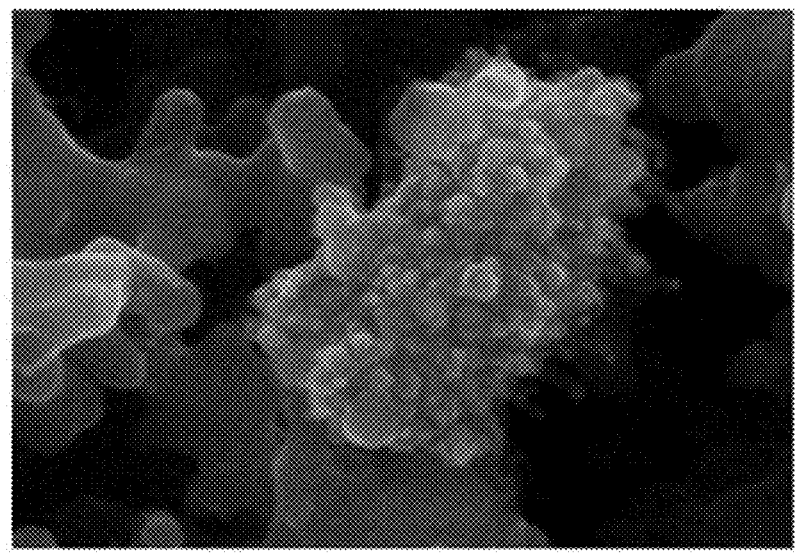
FIGS. 90A to 90D illustrate a catalyst structure acquired in Experimental Example 45, specifically FIGS. 90A to 90D illustrating SEM images of the catalyst structures synthesized at 450° C., 550° C., 650° C. and 750° C., respectively, and FIGS. 90E and 90F illustrating TEM and HRTEM images of the catalyst structure, respectively (an example of adopting multi-coating Co and carbon nanotubes on a surface of a Si support)
Figure 90B:
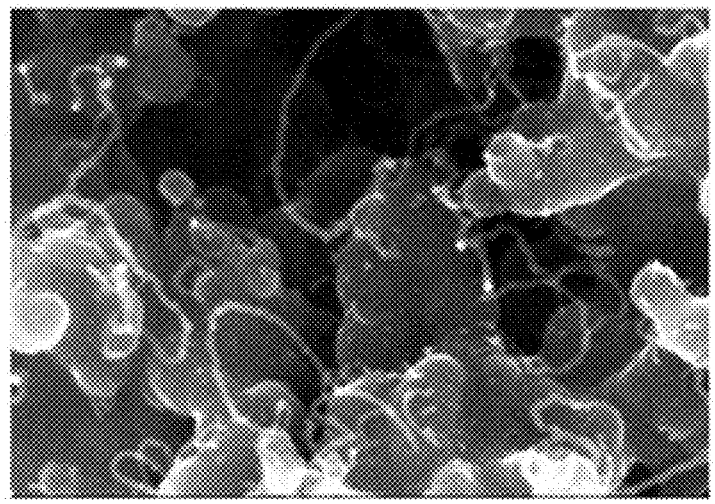
Figure 90C:
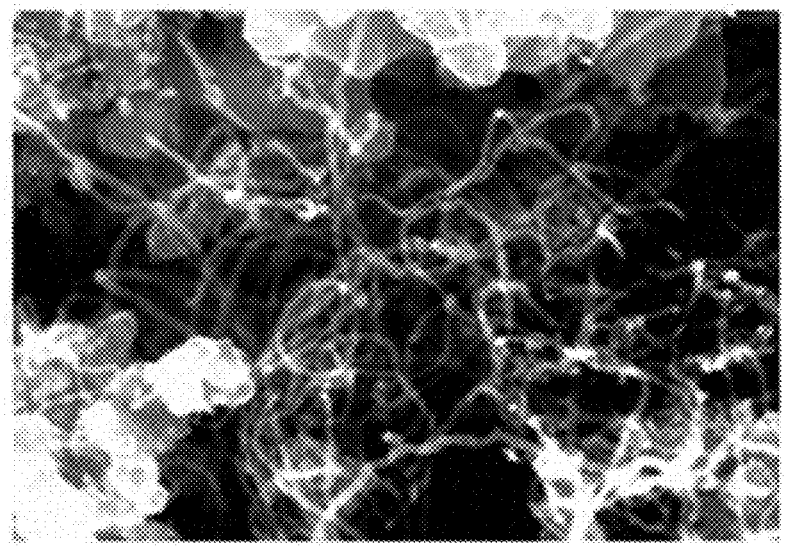
Figure 90D:
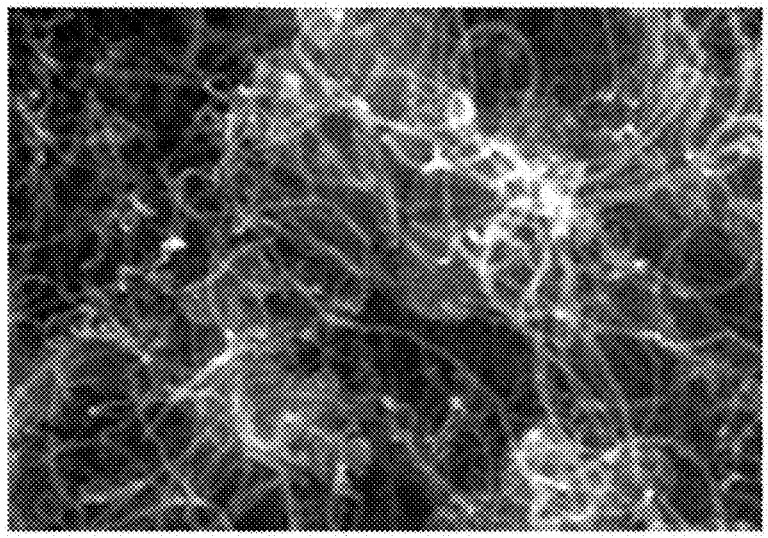

Silicon (Si) nanoparticles having a diameter of approximately 80 nm as a support and cobaltocene ($C_{10}H_{10}Co$) as a Co based catalyst source (precursor) were supplied into a reactor under room temperature and atmospheric pressure conditions, such that Co content became 30 wt %, based on the total weight of the catalyst structure. The reactor was perfectly sealed and the temperature of the reactor was elevated up to 450° C. (FIG. 90A), 550° C. (FIG. 90B), 650° C. (FIG. 90C), and 750° C. (FIG. 90D), followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 90E:
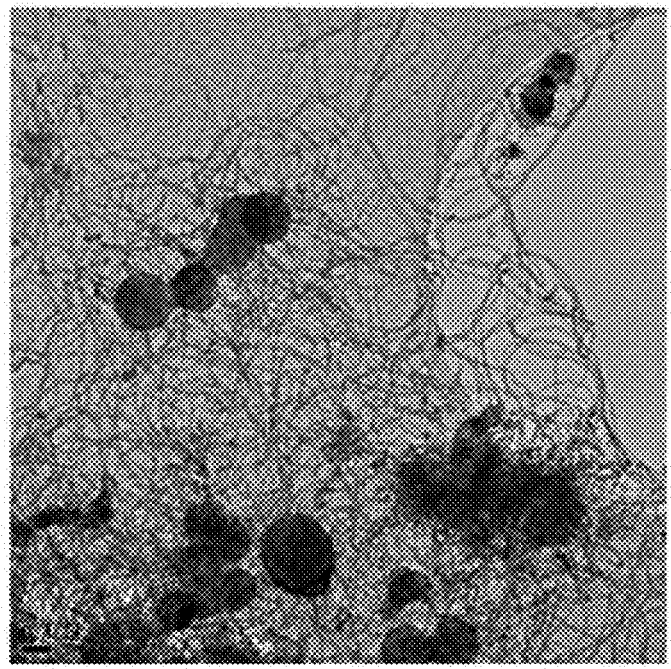
Figure 90F:
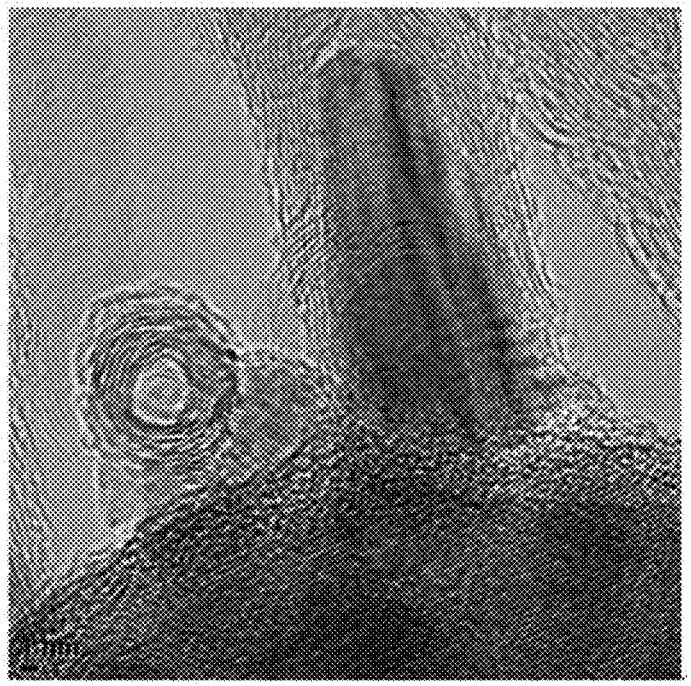

As illustrated in FIGS. 90A to 90D, it was confirmed from SEM images that carbon nanotubes grew on the Si nanoparticle support. It was also identified that growth of carbon nanotubes was facilitated as the temperature was increased. TEM images illustrated in FIGS. 90E and 90F confirmed that the acquired catalyst structure had a combined structure of cobalt nanoparticles and carbon nanotubes grown on the Si nanoparticle support.

Experimental Example 46

Zinc nanoparticles having a diameter of approximately 300 nm as a support, platinum (II) acetylacetonate ($PtC_{10}H_{14}O_4$) as a Pt based catalyst source (precursor) and ferrocene ($C_{10}H_{10}Fe$) as a Fe based catalyst source (precursor) were supplied into a reactor under room temperature and atmospheric pressure conditions, such that metal contents became 30 wt %, based on the total weight of the catalyst structure. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 91A:
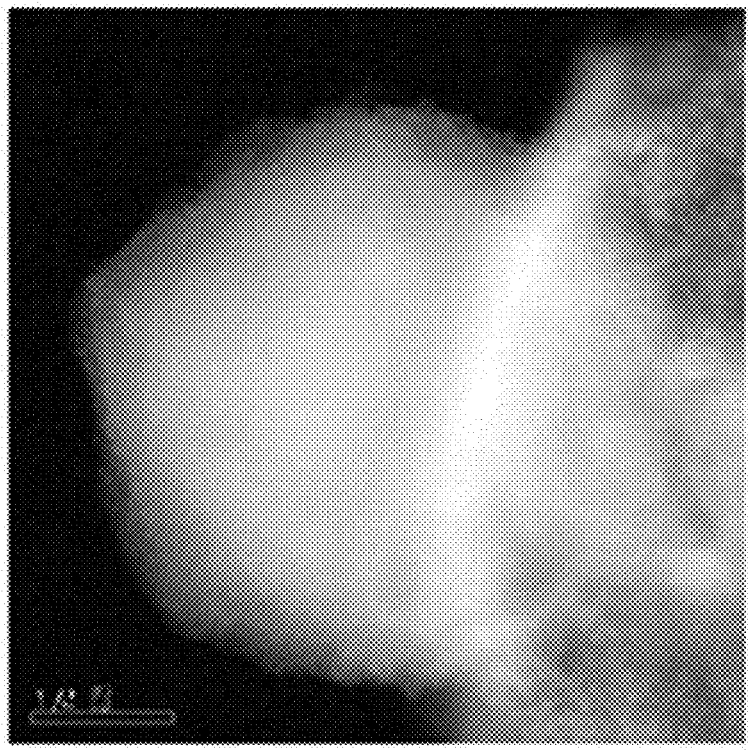
FIGS. 91A to 91C illustrate a catalyst structure acquired in Experimental Example 46, specifically FIGS. 91A to 91C illustrating an STEM image, an HRTEM image and an EDX mapping image of the acquired catalyst structure, respectively (an example of adopting coating $Pt_3Fe$ nanoparticles on a surface of a Zn support)
Figure 91B:
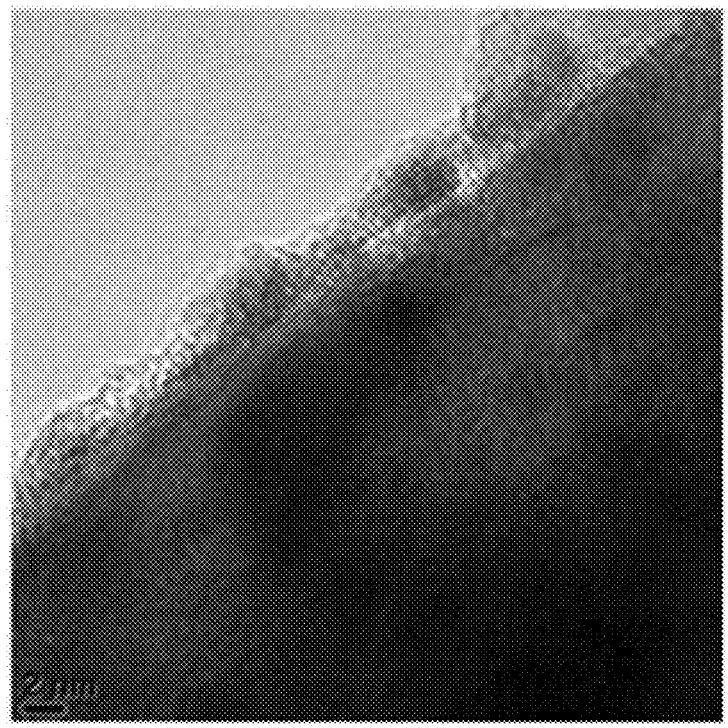
Figure 91C:
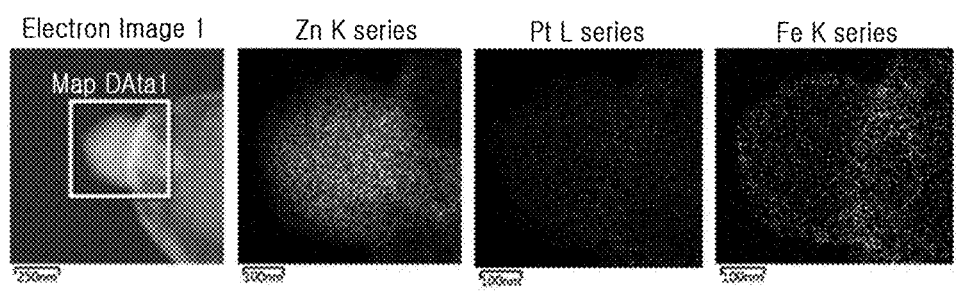

As illustrated in FIGS. 91A and 91B, the catalyst structure including 1 to 2 nm sized $Pt_3Fe$ nanoparticles dispersed in the zinc nanoparticle support was acquired, as confirmed by EDX illustrated in FIG. 91C.

Experimental Example 47

Carbon sphere nanoparticles having a diameter of approximately 200 nm as a support and trimethyl(methylcyclopentadiel) platinum (IV) ($C_5H_4CH_3Pt(CH_3)_3$) as a Pt based catalyst source (precursor) were supplied into a reactor under room temperature and atmospheric pressure conditions, such that Pt content became 40 wt %, based on the total weight of the catalyst structure. The reactor was perfectly sealed and the temperature of the reactor was elevated up to 350° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the reaction temperature was lowered to room temperature, acquiring a sample.

Figure 92A:
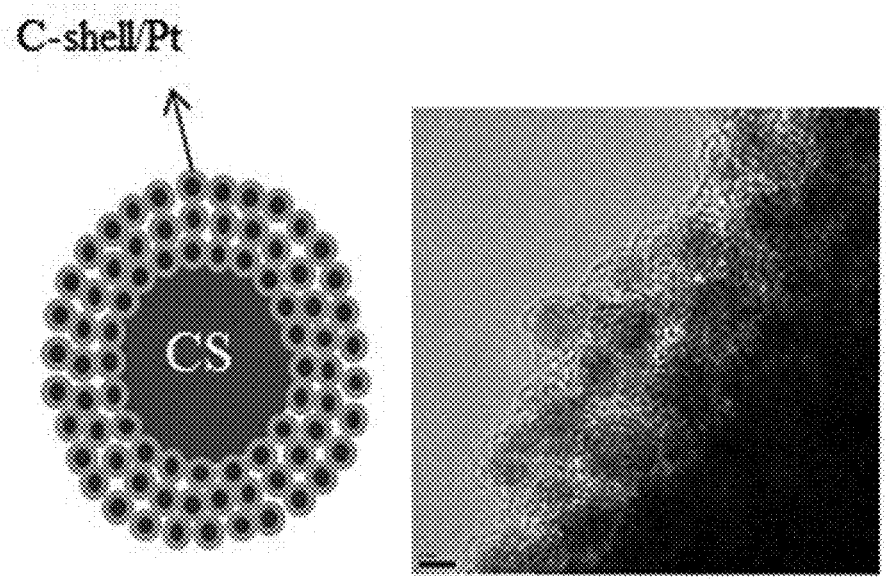
FIGS. 92A to 92C illustrate a catalyst structure acquired in Experimental Example 47, specifically FIGS. 92A to 92C illustrating an HRTEM image, an SEM image and an EDX graph of the acquired catalyst structure, respectively (an example of adopting laminar-coating Pt nanoparticles on a carbon shell)
Figure 92B:
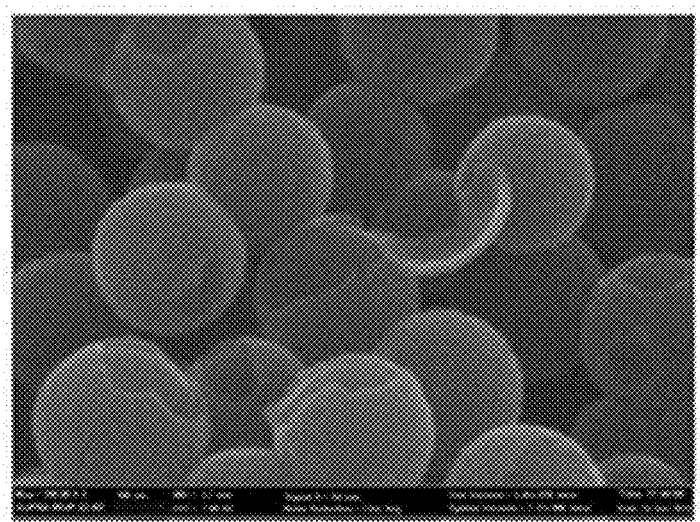
Figure 92C:
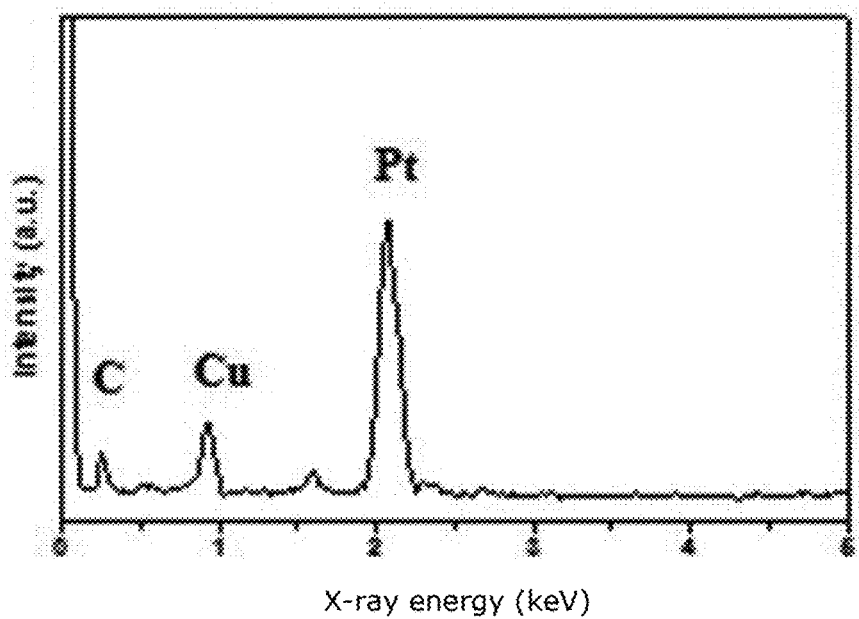

As illustrated in FIGS. 92A and 92B, the catalyst structure including 2 nm sized Pt nanoparticles dispersed in the carbon sphere nanoparticle support was acquired. The Pt nanoparticles are stacked by thin carbon shells, forming a laminar structure. The EDX analysis result is confirmed from FIG. 92C.

Experimental Example 48

A catalyst structure was synthesized using the same support, catalyst precursor and reaction conditions as in Experimental Example 47, while additionally supplying UREA ($CH_4N_2O$) for nitrogen (N) doping.

Figure 93A:
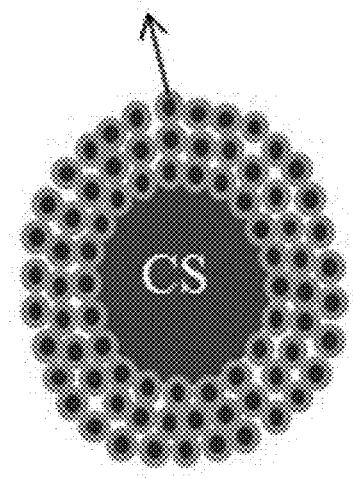
FIGS. 93A to 93C illustrate a catalyst structure acquired in Experimental Example 48, specifically FIGS. 93A to 93C illustrating an STEM image, an SEM image and an EDX graph of the acquired catalyst structure, respectively (an example of adopting laminar-coating Pt nanoparticles on a nitrogen doped carbon shell)
Figure 93A:
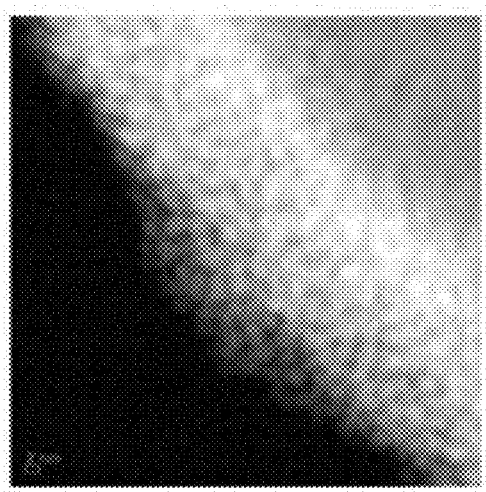
Figure 93B:
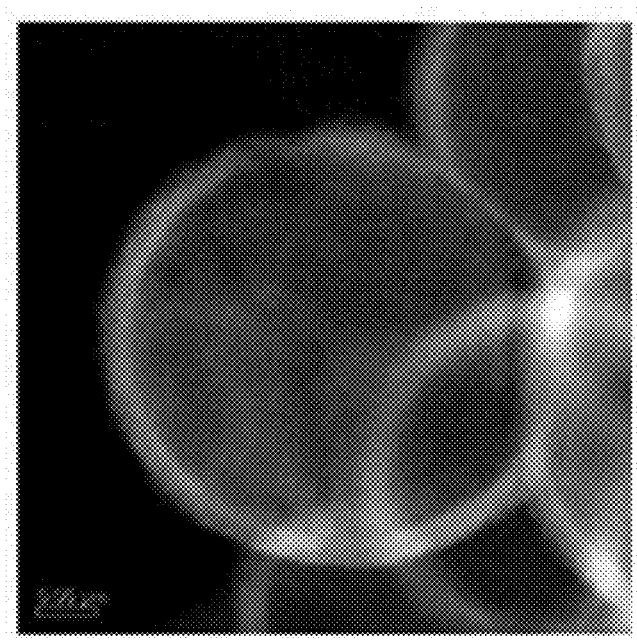
Figure 93C:
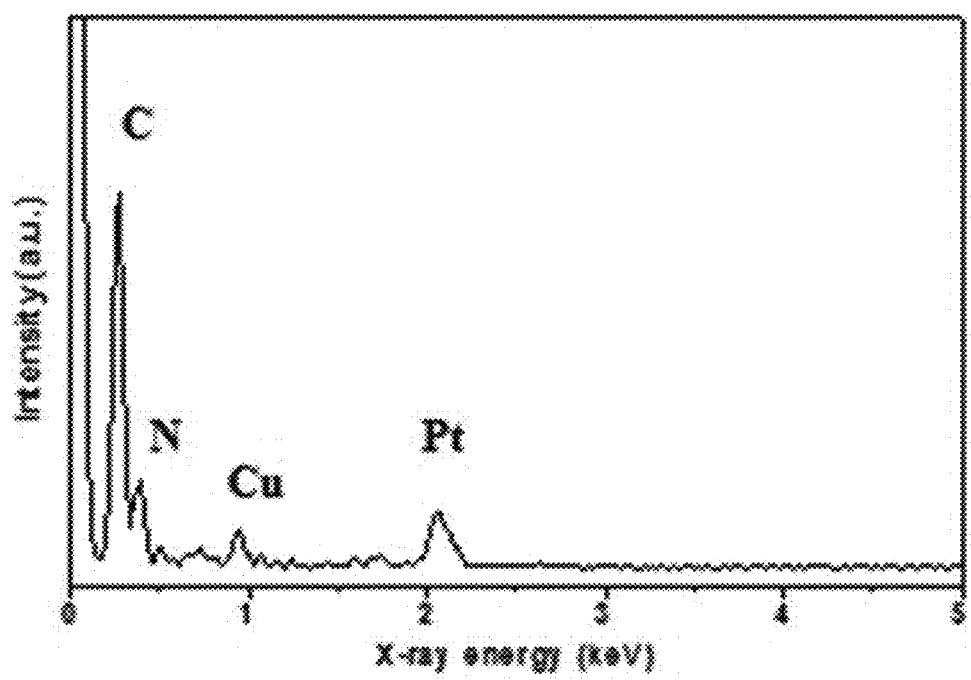

As illustrated in FIGS. 93A and 93B, the catalyst structure including 2 nm sized Pt nanoparticles dispersed in a carbon sphere nanoparticle support was acquired. The Pt nanoparticles are stacked by a thin carbon shell, forming a laminar structure. The EDX analysis result illustrated in FIG. 93C showed that the carbon shell was doped with nitrogen (N).

Experimental Example 49

A catalyst structure was synthesized using the same support and reaction conditions as in Experimental Example 47, while supplying platinum (II) acetylacetonate ($PtC_{10}H_{14}O_4$) as a Pt based catalyst source (precursor) and ferrocene ($C_{10}H_{10}Fe$) as a Fe based catalyst source (precursor), such that Pt and Fe metal contents became 18 wt % and 10 wt %, respectively, based on the total weight of the catalyst structure.

Figure 94A:
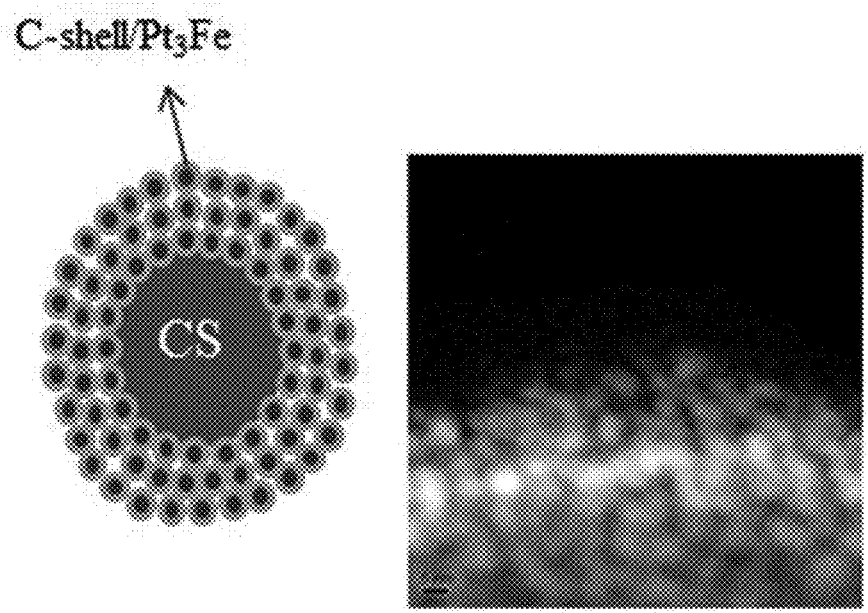
FIGS. 94A to 94C illustrate a catalyst structure acquired in Experimental Example 49, specifically FIGS. 94A to 94C illustrating an STEM image, a TEM image and an EDX graph of the acquired catalyst structure, respectively (an example of adopting laminar-coating $Pt_3Fe$ nanoparticles on a carbon shell)
Figure 94B:
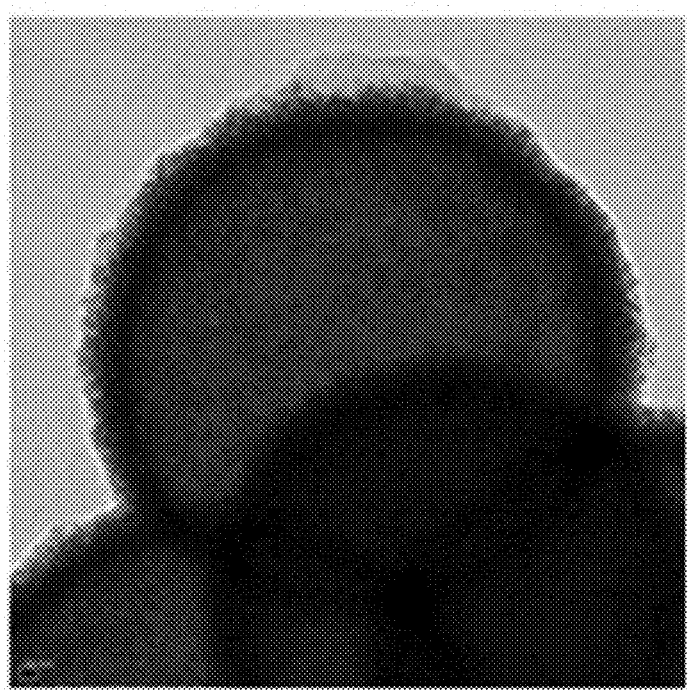
Figure 94C:
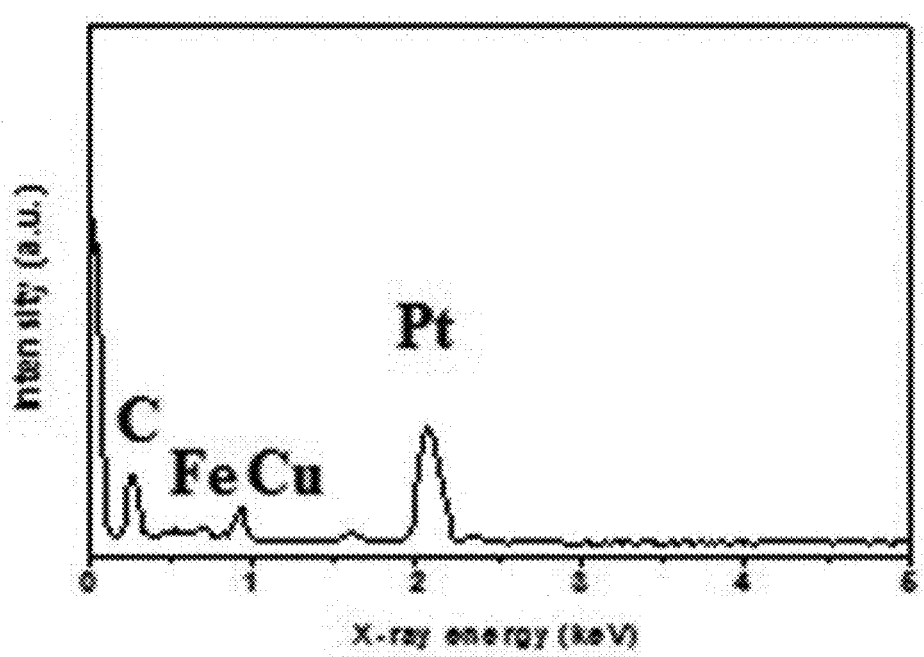

As illustrated in FIGS. 94A and 94B, the catalyst structure including 2 nm sized $Pt_3Fe$ nanoparticles stacked by thin carbon shells, forming a laminar structure. The EDX analysis result is confirmed from FIG. 94C.

Experimental Example 50

A catalyst structure was synthesized using the same support and reaction conditions as in Experimental Example 47, while supplying platinum (II) acetylacetonate ($PtC_{10}H_{14}O_4$) as a Pt based catalyst source (precursor) and cobaltocene ($C_{10}H_{10}Co$) as a Co based catalyst source (precursor), such that Pt and Co metal contents became 18 wt % and 10 wt %, respectively, based on the total weight of the catalyst structure.

Figure 95A:
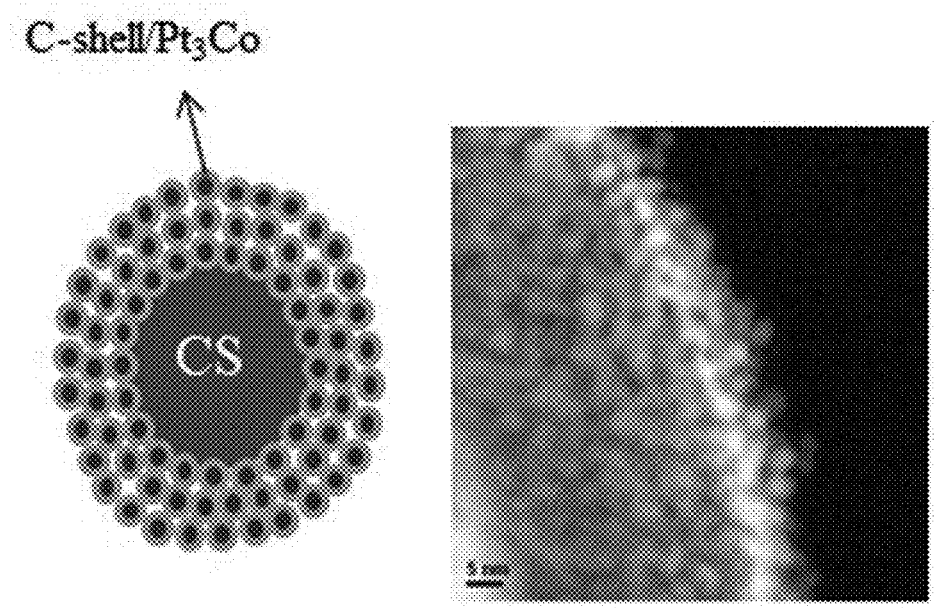
FIGS. 95A to 95C illustrate a catalyst structure acquired in Experimental Example 50, specifically FIGS. 95A to 95C illustrating an STEM image, a TEM image and an EDX graph of the acquired catalyst structure, respectively (an example of adopting laminar-coating $Pt_3Co$ nanoparticles on a carbon shell)
Figure 95B:
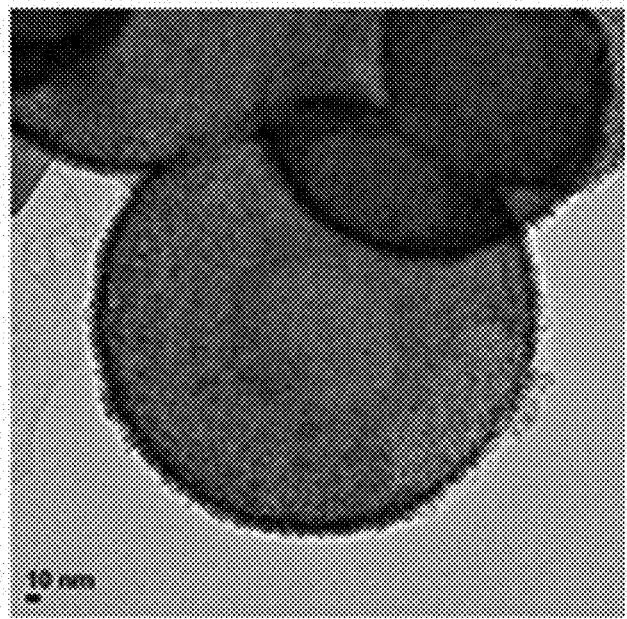
Figure 95C:
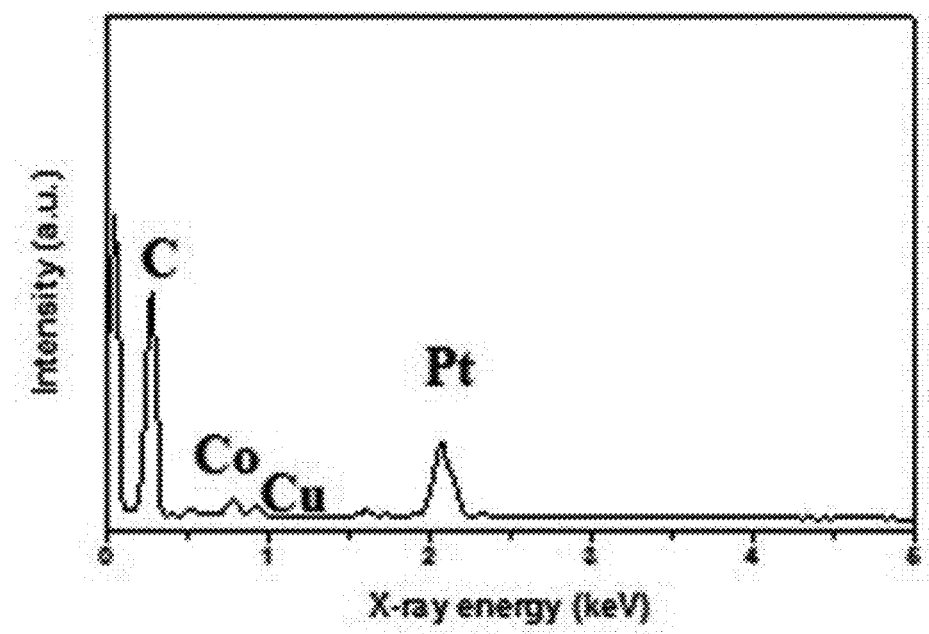

As illustrated in FIGS. 95A and 95B, the catalyst structure including 2 nm sized $Pt_3Co$ nanoparticles stacked by thin carbon shells, forming a laminar structure. The EDX analysis result is confirmed from FIG. 95C.

Experimental Example 51

A catalyst structure was synthesized using the same support and reaction conditions as in Experimental Example 47, while supplying platinum (II) acetylacetonate ($PtC_{10}H_{14}O_4$) as a Pt based catalyst source (precursor) and nickel (II) acetylacetonate ($NiC_{10}H_{14}O_4$), such that Pt and Co metal contents became 18 wt % and 10 wt %, respectively, based on the total weight of the catalyst structure.

Figure 96A:
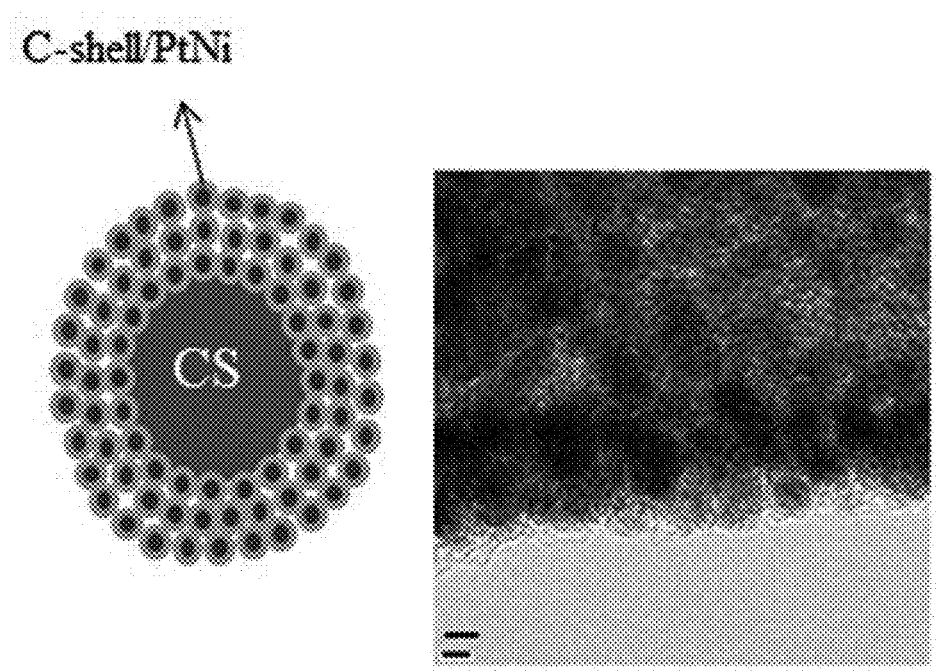
FIGS. 96A to 96C illustrate a catalyst structure acquired in Experimental Example 51, specifically FIGS. 96A to 96C illustrating an STEM image, a TEM image and an EDX graph of the acquired catalyst structure, respectively (an example of adopting laminar-coating PtNi nanoparticles on a carbon shell)
Figure 96B:
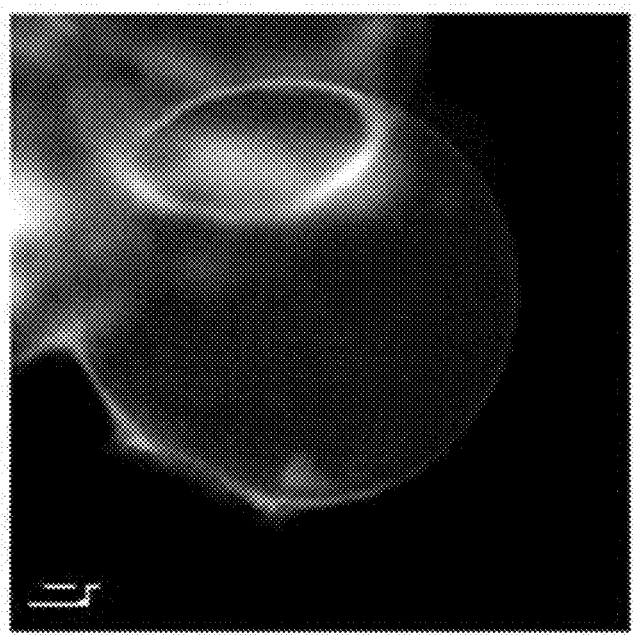
Figure 96C:
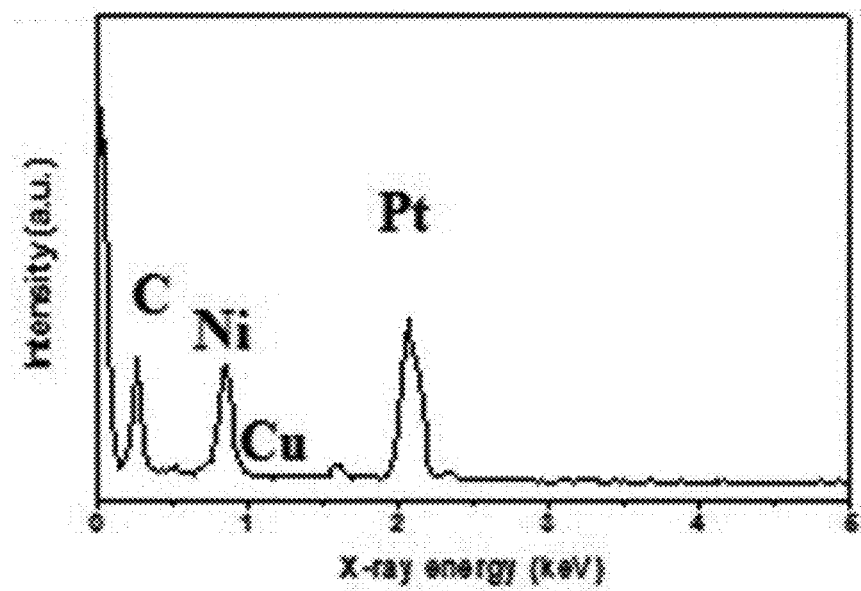

As illustrated in FIGS. 96A and 96B, the catalyst structure including 2 nm sized PtNi nanoparticles stacked by thin carbon shells, forming a laminar structure. The EDX analysis result is confirmed from FIG. 96C.

Experimental Example 52

A catalyst structure was synthesized using the same support and reaction conditions as in Experimental Example 47, while supplying platinum (II) acetylacetonate ($PtC_{10}H_{14}O_4$) as a Pt based catalyst source (precursor), ferrocene ($C_{10}H_{10}Fe$) as a Fe based catalyst source (precursor), cobalt (II) acetylacetonate ($CoC_{10}H_{14}O_4$) as a Co based catalyst source (precursor), and nickel (II) acetylacetonate ($NiC_{10}H_{14}O_4$), such that Pt and Co metal contents became 18 wt % and 10 wt %, respectively, based on the total weight of the catalyst structure.

Figure 97A:
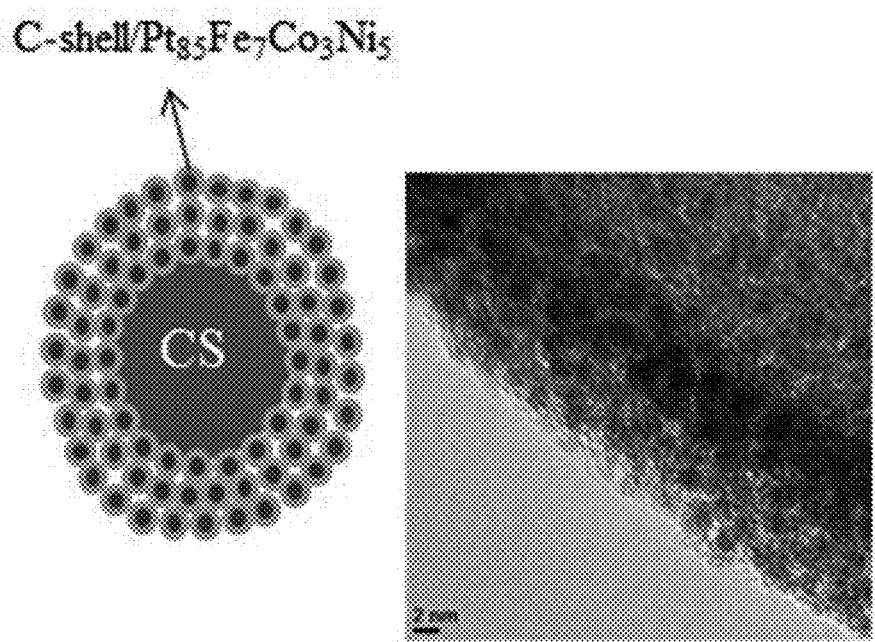
FIGS. 97A to 97C illustrate a catalyst structure acquired in Experimental Example 52, specifically FIGS. 97A to 97C illustrating an STEM image, a TEM image and an EDX graph of the acquired catalyst structure, respectively (an example of adopting laminar-coating $Pt_{85}Fe_7Co_3Ni_5$ nanoparticles on a carbon shell)
Figure 97B:
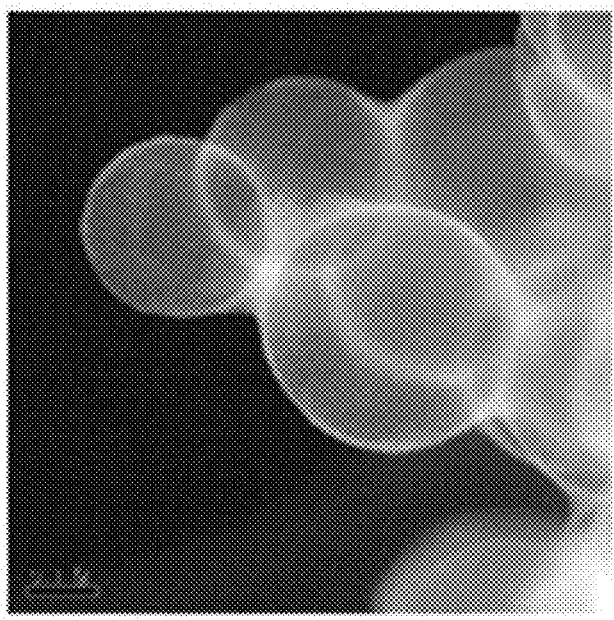
Figure 97C:
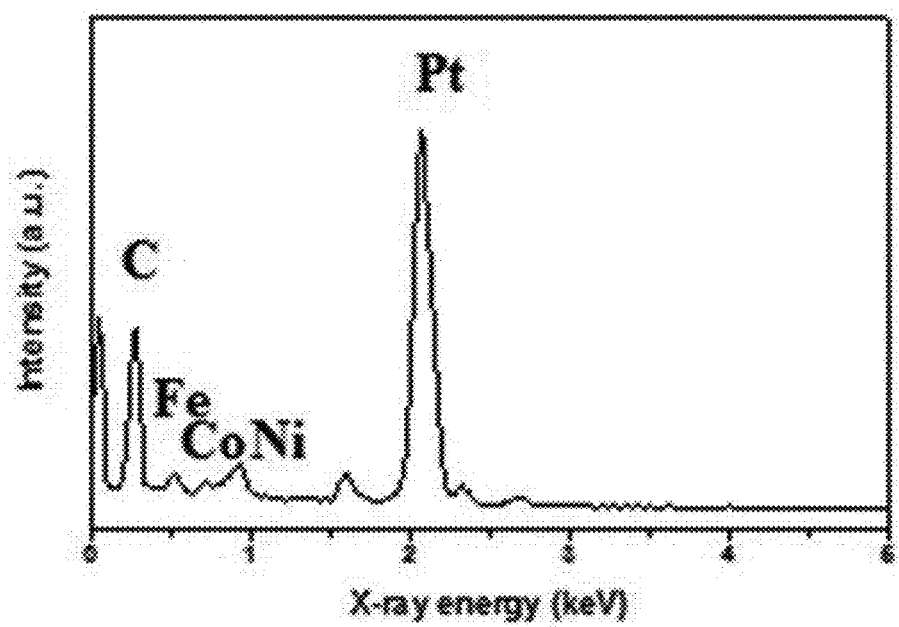

As illustrated in FIGS. 97A and 97B, the catalyst structure including 2 nm sized $Pt_{85}Fe_7Co_3Ni_5$ nanoparticles dispersed in a carbon sphere nanoparticle support. The $Pt_{85}Fe_7Co_3Ni_5$ nanoparticles are stacked by thin carbon shells, forming a laminar structure. The EDX analysis result is confirmed from FIG. 97C.

Experimental Example 53

A catalyst structure was synthesized using the same support and reaction conditions as in Experimental Example 52 using platinum (II) acetylacetonate ($PtC_{10}H_{14}O_4$) as a Pt based catalyst source (precursor), ferrocene ($C_{10}H_{10}Fe$) as a Fe based catalyst source (precursor), cobalt (II) acetylacetonate ($CoC_{10}H_{14}O_4$) as a Co based catalyst source (precursor), and nickel (II) acetylacetonate ($NiC_{10}H_{14}O_4$). In detail, a sealing reaction was carried out using Pt and Fe precursors, acquiring a sample. The Pt and Fe precursors were supplied to the sample for additionally performing a sealing reaction. Thereafter, Pt and Ni precursors were supplied to a closed reactor together with the acquired sample to cause a reaction, thereby finally obtaining a sample.

Figure 98A:
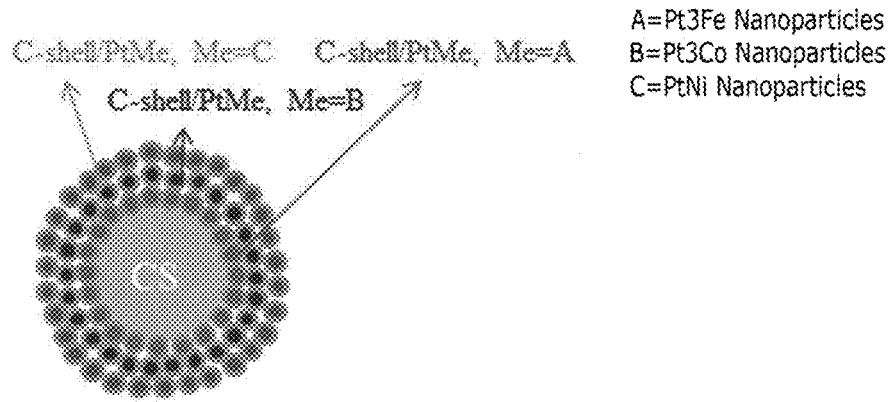
FIGS. 98A to 98C illustrate a catalyst structure acquired in Experimental Example 53, specifically FIGS. 98A to 98c illustrating a TEM image, STEM image, and EDX image of the acquired catalyst structure, respectively (an example of adopting laminar-coating Pt$_3$Fe/Pt$_3$Co/PtNi nanoparticles on a carbon shell)
Figure 98B:
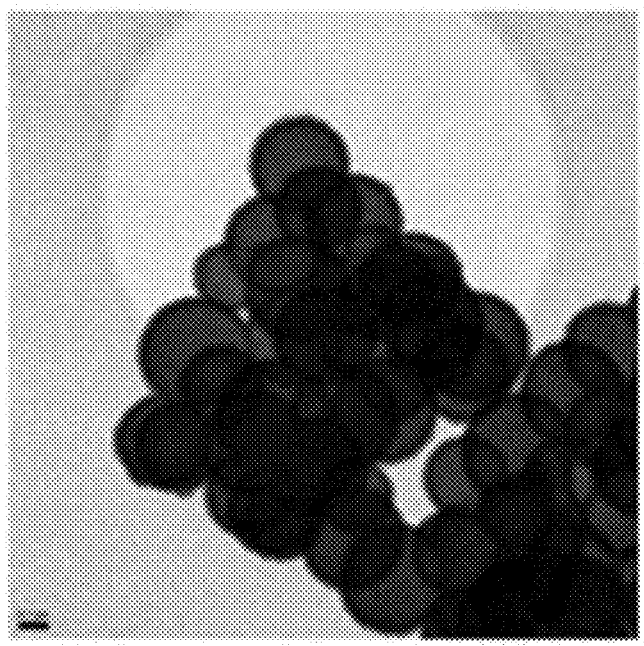
Figure 98C:
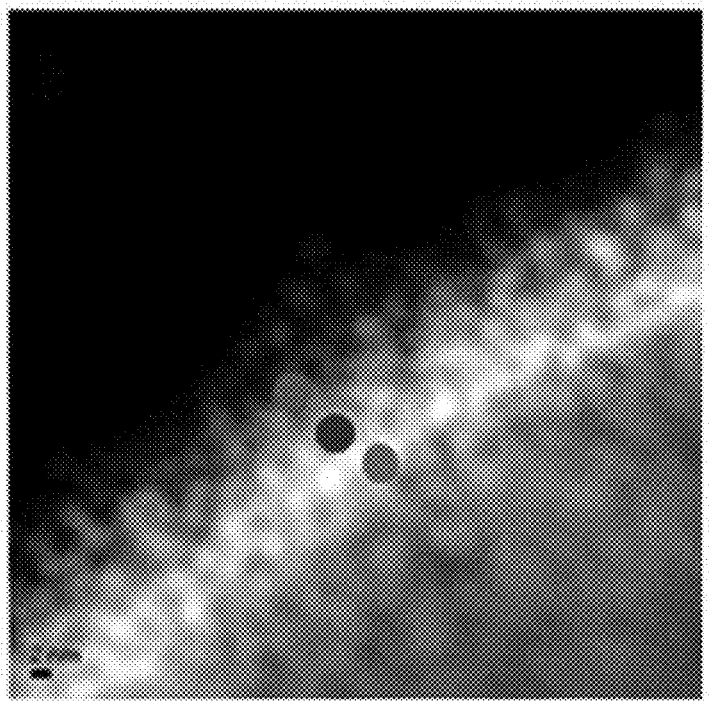

As illustrated in FIGS. 98A and 98B, the catalyst structure including 2 nm sized $Pt_3Fe$, $Pt_3Co$ and PtNi nanoparticles coated on a carbon sphere nanoparticle support in a layered manner was acquired. The $Pt_3Fe$, $Pt_3Co$ and PtNi nanoparticles indicated by red, blue and green dots in FIG. 98C are analyzed by EDX. The EDX analysis results are listed in Tables 43, 44 and 45.

TABLE 43

| | (Red) | | | | | |
| --- | --- | --- | --- | --- | --- | --- |
| Element | Line Type | k factor | Absorption Correction | Wt % | Wt % Sigma | Atomic % |
| Fe | K series | 1.21448 | 1.00 | 68.46 | 8.53 | 70.58 |
| Co | K series | 1.28630 | 1.00 | 15.34 | 8.53 | 14.42 |
| Ni | K series | 1.29311 | 1.00 | 16.30 | 0.00 | 15.58 |
| Total | — | | | 100.00 | | 100.00 |

TABLE 44

(Blue)

| Element | Line Type | k factor | Absorption Correction | Wt % | Wt % Sigma | Atomic % |
|---|---|---|---|---|---|---|
| Fe | K series | 1.21448 | 1.00 | 2.03 | 8.53 | 2.20 |
| Co | K series | 1.28630 | 1.00 | 68.43 | 8.53 | 69.33 |
| Ni | K series | 1.29311 | 1.00 | 29.54 | 0.00 | 28.47 |
| Total | — | | | 100.00 | | 100.00 |

TABLE 45

(Green)

| Element | Line Type | k factor | Absorption Correction | Wt % | Wt % Sigma | Atomic % |
|---|---|---|---|---|---|---|
| Fe | K series | 1.21448 | 1.00 | 0.00 | 0.00 | 0.00 |
| Co | K series | 1.28630 | 1.00 | 1.41 | 8.53 | 1.90 |
| Ni | K series | 1.29311 | 1.00 | 98.59 | 8.53 | 98.10 |
| Total | — | | | 100.00 | | 100.00 |

Figure 99:
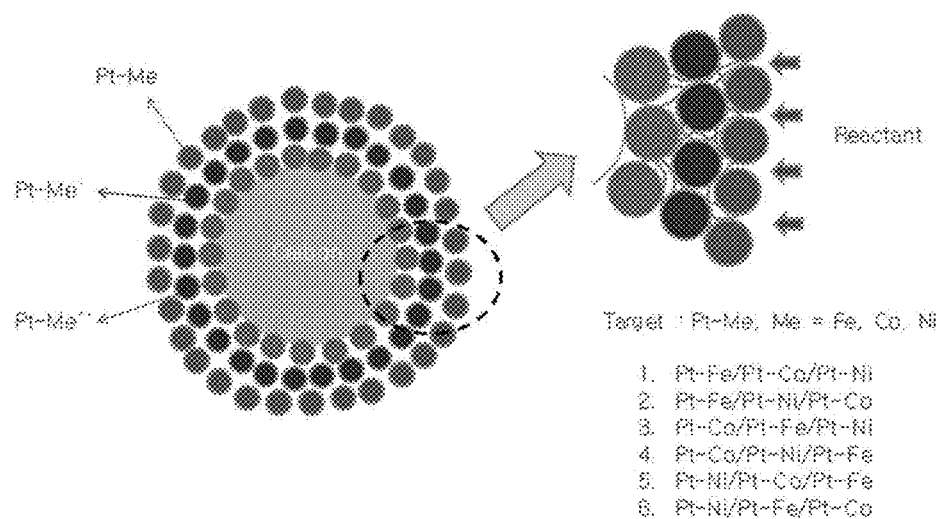
FIG. 99 illustrates a concept of a laminar structure of clad Pt alloy catalysts in Experimental Example 53 and all possible combinations of laminar structures.

FIG. 99 illustrates a general concept of a laminar structure. In a case where Fe, Co and Ni are used as Me elements, there are 6 possible combinations of laminar structures.

Experimental Example 54

In order to investigate whether catalyst nanoparticles dispersed in other types of supports can be synthesized, catalyst structures were acquired under various conditions listed in Table 46 below.

Not only a carbon felt but also fiber paper, a foam or a foil can be used as a carbon support.

Any material selected from Cu, Ti and SUS can be used as a metal element for a foil and may be in a foam type or a wire type.

Figure 100A:
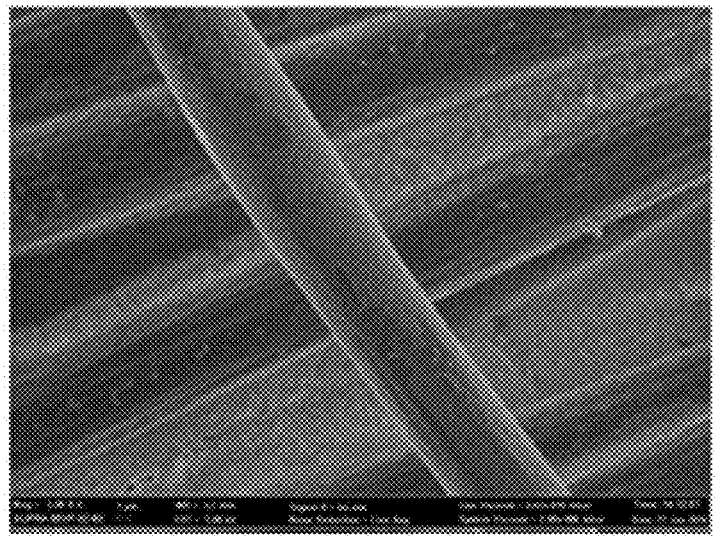
FIGS. 100A and 100B illustrate a catalyst structure acquired in Experimental Example 54, specifically FIGS. 100A and 100B illustrating a low-power SEM image and a high-power SEM image of a non-powder support (e.g., a carbon felt) used in the acquired catalyst structure.
Figure 100B:
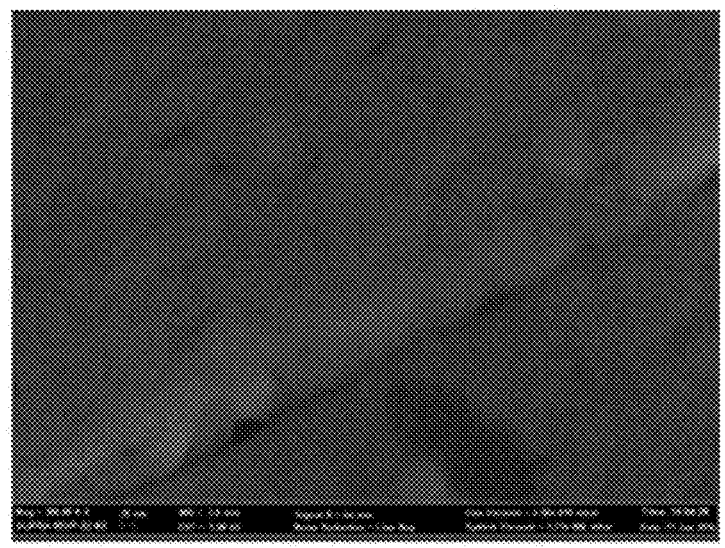

In FIGS. 100A and 100B, Pt nanoparticles are densely coated on a surface of a carbon felt as a support.

Figure 101A:
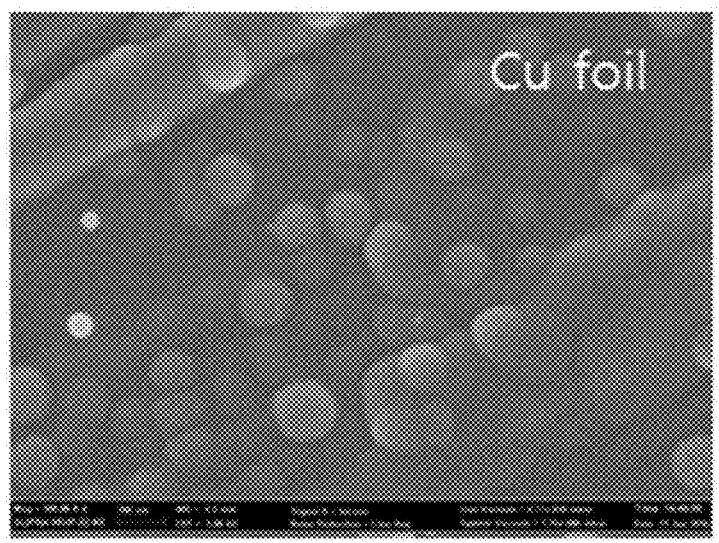
FIGS. 101A to 101C illustrate a catalyst structure acquired in Experimental Example 54, specifically FIGS. 101A to 101C illustrating SEM images of non-powder supports (e.g., metal foils) used in the acquired catalyst structure, exemplified by a Cu foil, a Ti foil and a stainless steel (SUS) foil, respectively.
Figure 101B:
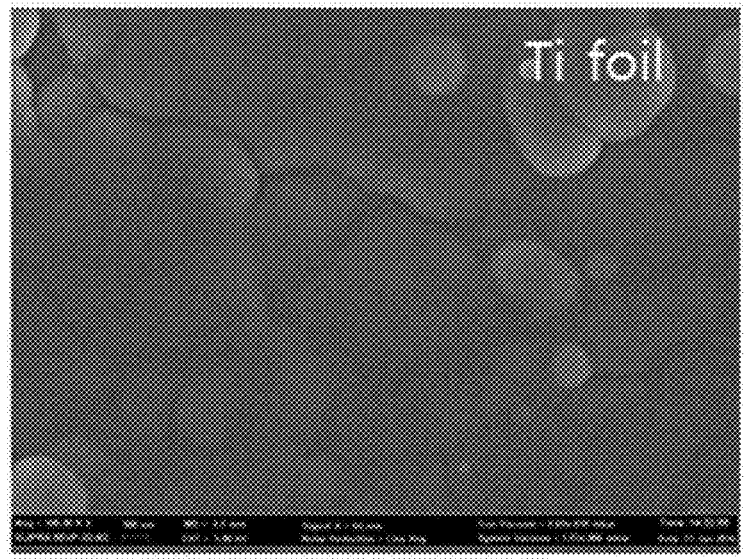
Figure 101C:
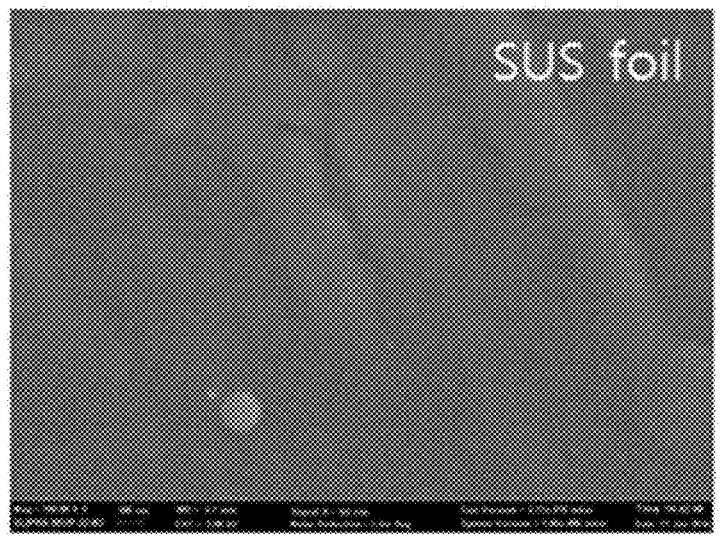

In FIGS. 101A to 101C, Pt nanoparticles are coated on a Cu foil (FIG. 101A), a Ti foil (FIG. 101B) and a stainless steel (SUS) foil (FIG. 101C), respectively.

Figure 102A:
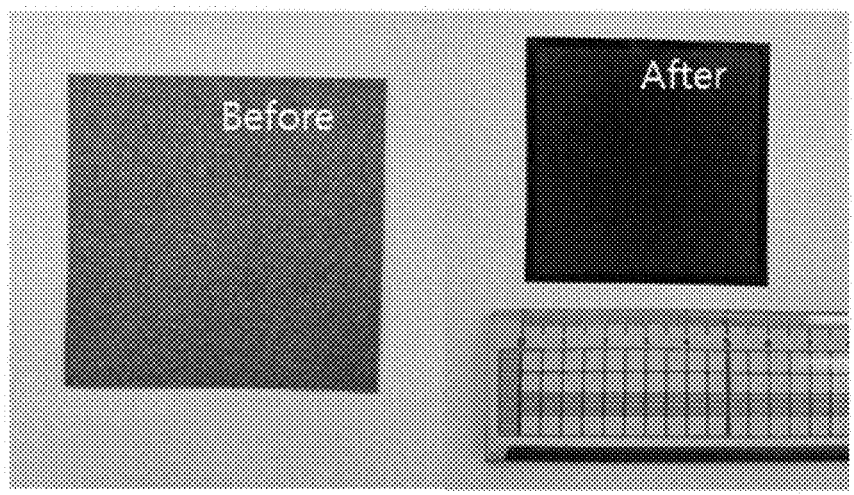
FIGS. 102A and 102B illustrate a catalyst structure acquired in Experimental Example 54, specifically FIGS. 102A and 102B illustrating a photograph and a high-power SEM image of a non-powder support (e.g., a Ti foam) used in the acquired catalyst structure before and after coating.
Figure 102B:
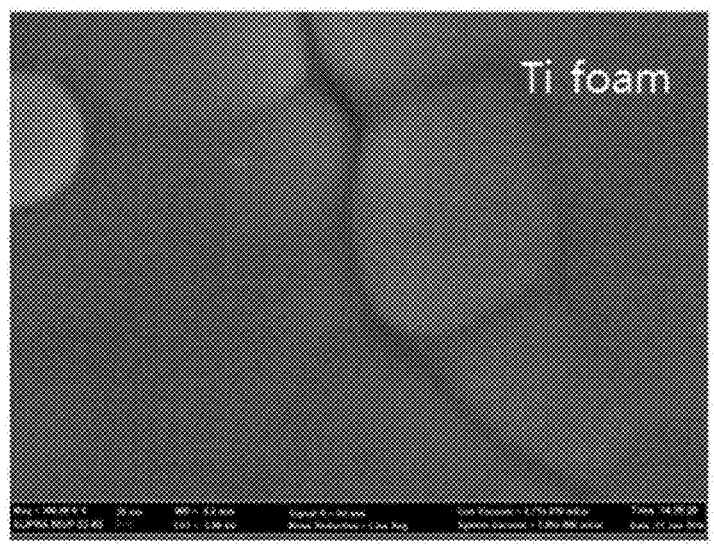

FIG. 102A illustrates a photograph of a Ti foam before and after coating PtRu catalyst nanoparticles thereon. Before the Ti foam was coated with the PtRu catalyst nanoparticles, it was silver in color. Then, after the Ti foam was coated with the PtRu catalyst nanoparticles, it turned black. FIG. 102B illustrates nanoparticles coated on a surface of the Ti foam.

Figure 103:
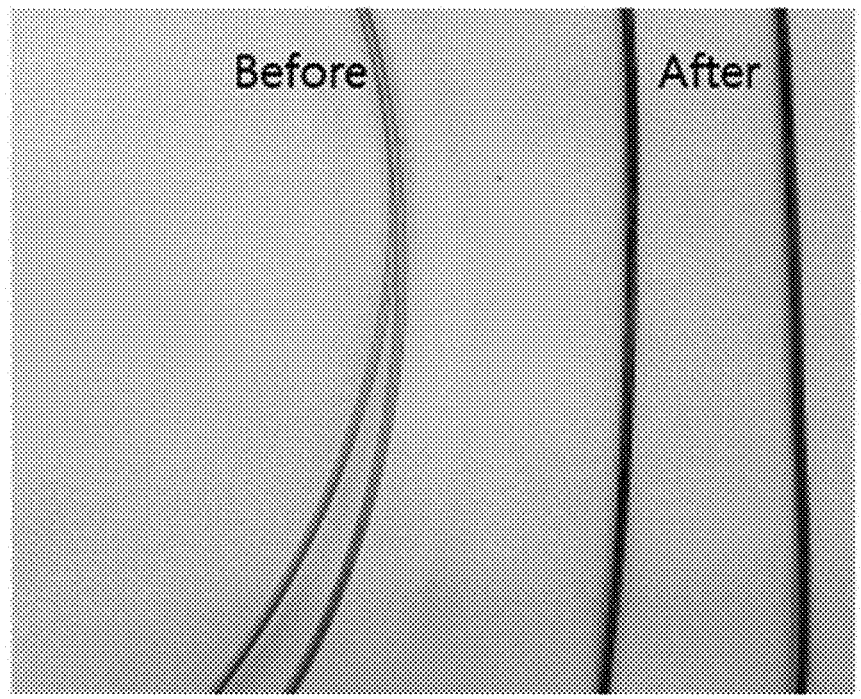
FIG. 103 illustrates a catalyst structure acquired in Experimental Example 54, specifically illustrating a photograph of a non-powder support (e.g., a Ti wire) used in the acquired catalyst structure before and after coating.

FIG. 103 illustrates a photograph of a Ti wire before and after coating $MoS_2$ catalyst nanoparticles thereon. Before the Ti wire was coated with the $MoS_2$ catalyst nanoparticles, it was silver in color. Then, after the Ti wire was coated with the $MoS_2$ catalyst nanoparticles, it turned dark gray.

Figure 104A:
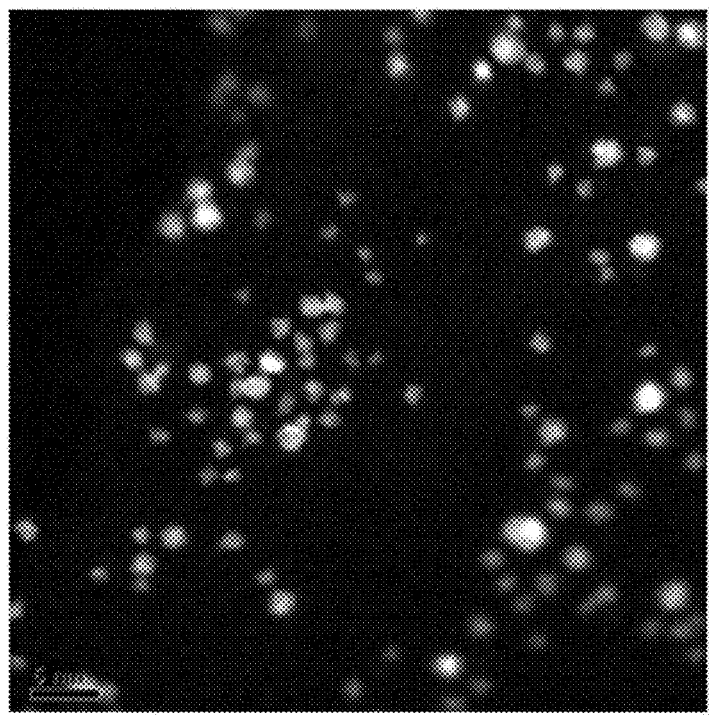
FIGS. 104A and 104B illustrate a catalyst structure acquired in Experimental Example 54, specifically FIGS. 104A and 104B illustrating an STEM image and an HRTEM image of a non-powder support (e.g., a hexagonal fluoronitride) used in the acquired catalyst structure.
Figure 104B:
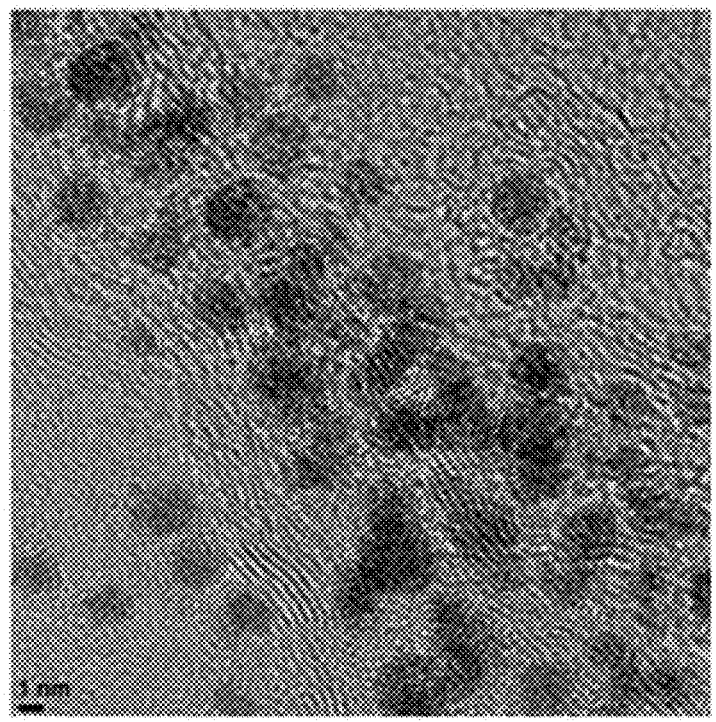
Figure 105A:
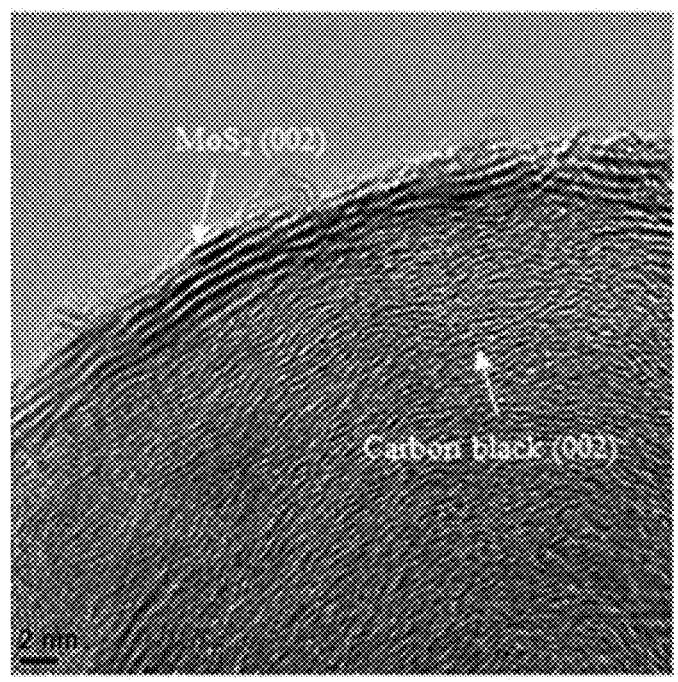
FIGS. 105A to 105F illustrate a catalyst structure acquired in Experimental Example 55, specifically FIGS. 105A to 105F illustrating and an HRTEM image of the acquired catalyst structure. The used supports is as follows: 105A illustrate carbon black nanoparticle support, 105B illustrate graphitized nanoparticles support, 105C illustrate carbon nanosphere support, 105D illustrate carbon nanotubes support, 105E illustrate single-layered graphene support, and 105F illustrate single-layed N-doped graphene support.
Figure 105B:
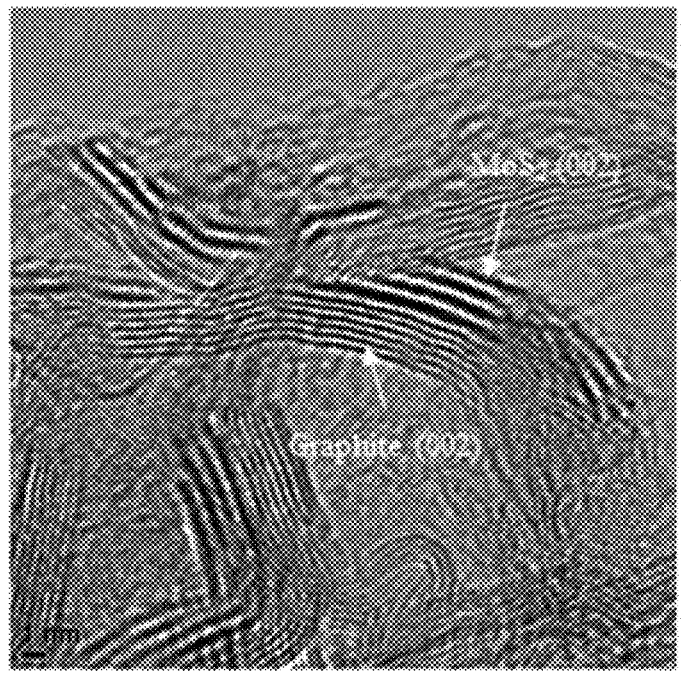
Figure 105C:
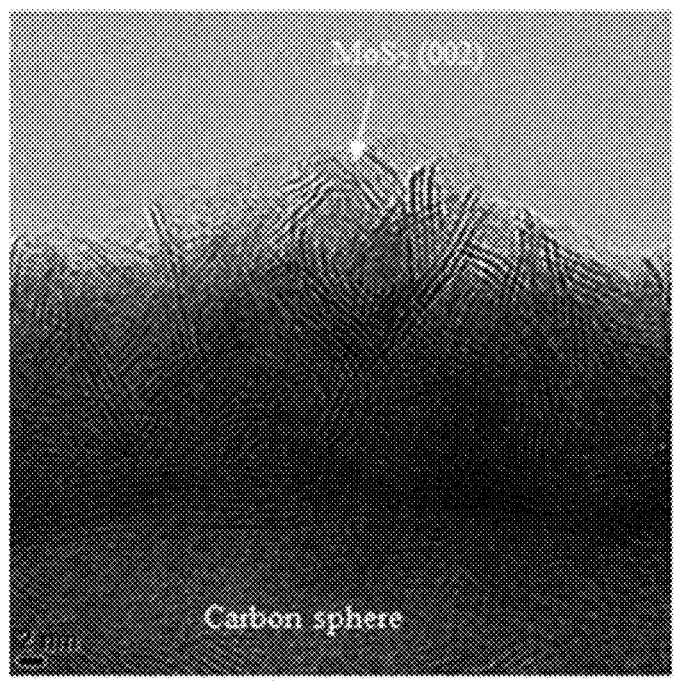
Figure 105D:
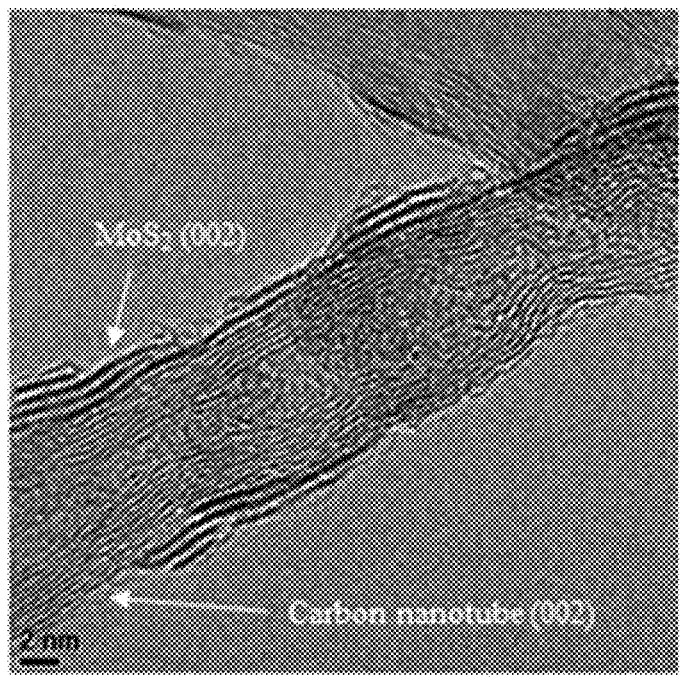
Figure 105E:
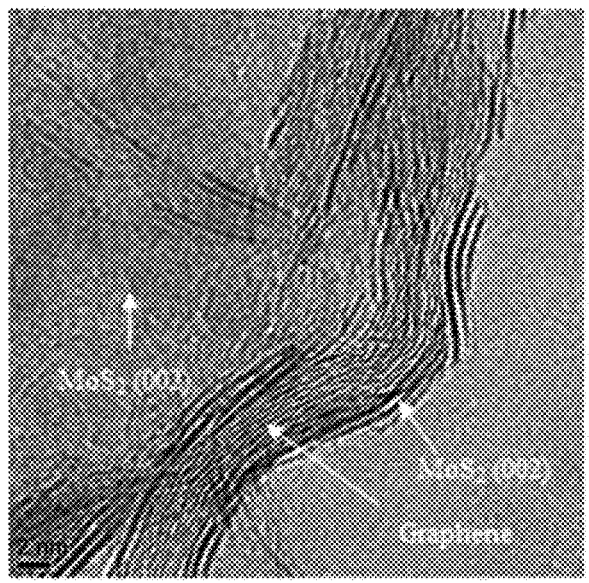
Figure 105F:
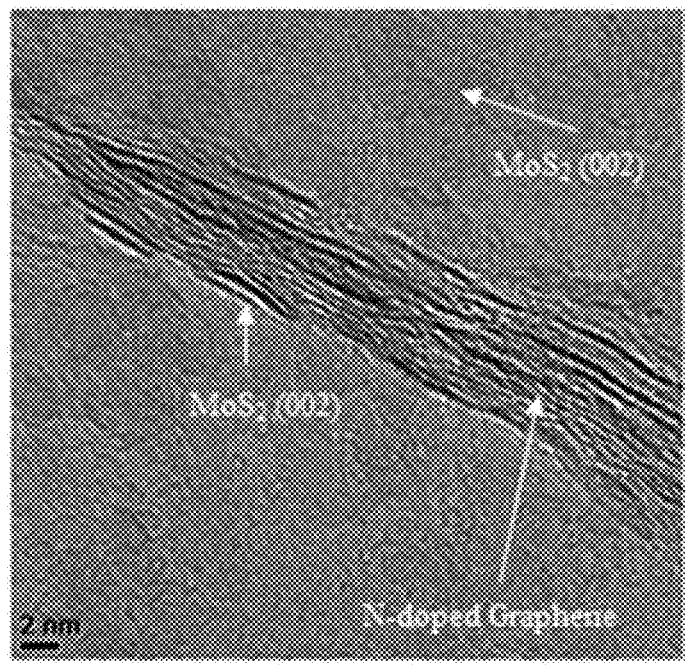

FIGS. 104A and 104B illustrate a photograph of a hexagonal boron nitride before and after coating $Pt_3Co$ catalyst nanoparticles thereon. Approximately 2 nm sized $Pt_3Co$ catalyst nanoparticles were coated.

Experimental Example 55

Carbon black nanoparticles (a), graphite nanoparticles (b), carbon sphere nanoparticles (c), carbon nanotubes (d), graphene (e), N-doped graphene (f) as carbon supports and hexacarboxyl molybdenum ($Mo(CO)_6$) and sulfur as Mo based catalyst sources were supplied into a reactor, such that

TABLE 46

| Exp. Example | Support | First catalyst source | Second catalyst source | Total catalyst content | Synthesis temperature (° C.) and reaction time (hr) | Post treatment |
|---|---|---|---|---|---|---|
| 54-1 | Carbon felt | $C_5H_4CH_3Pt(CH_3)_3$ | | 20 wt % | 350° C., 1 hr | Inert gas supply stabilization |
| 54-2 | Metal (Cu, Ti, SUS) foil | $C_5H_4CH_3Pt(CH_3)_3$ | | 20 wt % | 350° C., 1 hr | Inert gas supply stabilization |
| 54-3 | Metal (Ti) foam | $PtC_{10}H_{14}O_4$ | $RuC_{15}H_{21}O_6$ | 30 wt % | 350° C., 1 hr | Inert gas supply stabilization |
| 54-4 | Metal (Ti) wire | $Mo(Co)_6$ | S (sulfur) | 30 wt % | 550° C., 1 hr | Inert gas supply stabilization |
| 54-5 | Hexagonal boron nitride (hBN) | $PtC_{10}H_{14}O_4$ | $CoC_{10}H_{14}O_4$ | 30 wt % | 350° C., 1 hr | 1) Inert gas supply stabilization  2) Oxidation treatment at 350° C. while supplying inert gas and oxygen  3) Reduction treatment while supplying inert gas and hydrogen  4) Cooling down to room temperature while supplying inert gas and acquiring sample |

MoS$_2$ content became 50 wt %, based on the total weight of the catalyst structure acquired. Then, the reactor was perfectly sealed and the temperature of the reactor was elevated up to 500° C., followed by allowing the reaction to take place for 60 minutes. After the reaction was completed, the internal pressure of the reactor was eliminated and the reaction was stabilized while supplying an inert gas to then remove unreacted materials and byproducts from the reactor. Thereafter, the temperature was lowered to room temperature, acquiring the catalyst structure including MoS$_2$ nanoparticles dispersed in the support.

FIGS. 105A to 105F illustrate a catalyst structure acquired in Experimental Example 55. MoS$_2$ crystal structures were well established on surfaces of all types of carbon supports illustrated in FIG. 105A to 105F.

While exemplary embodiments of the present invention have been described in detail, the spirit and scope of the present invention are not limited to the foregoing embodiments and it will be appreciated by those skilled in the art that various modifications and improvements using the basic concept of the present invention defined in the appended claims are also included in the scope of the present

What is claimed is:

1. A synthesis method of a catalyst structure having a plurality of nanostructured catalyst particles dispersed in a support by a single reactor process using a high-temperature high-pressure closed reactor,
   wherein the single reactor process comprises:
   (a) supplying the support and a catalyst source into the high-temperature high-pressure closed reactor;
   (b) perfectly sealing the high-temperature high-pressure closed reactor supplied with the support and the catalyst source and heating the reactor to produce the catalyst structure in the reactor under self-generated pressure and synthesis temperature conditions, the catalyst structure including the plurality of nanostructured catalyst particles dispersed in the support;
   (c) removing internal gases of the reactor to allow the reactor to be in a high-temperature and atmospheric pressure state after the step (b);
   (d) supplying an inert gas into the reactor to remove unreacted materials and byproducts remaining in the reactor after the step (c); and
   (e) cooling the reactor to room temperature after the step (d) while supplying the inert gas to synthesize the catalyst structure.

2. The synthesis method of claim 1, before the perfectly sealing of the high-temperature high-pressure closed reactor, further comprising supplying an atmosphere forming gas into the reactor.

3. The synthesis method of claim 1, before the cooling of the reactor to room temperature while supplying the inert gas, further comprising performing oxidation treatment, reduction treatment, doping treatment or a combination thereof.

4. The synthesis method of claim 3, wherein the oxidation treatment comprises supplying a mixed gas including an inert gas and oxygen, the reduction treatment comprises supplying a mixed gas including an inert gas and hydrogen, and the doping treatment comprises supplying a mixed gas including an inert gas and an ammonium gas.

5. The synthesis method of claim 1, before the supplying of the atmosphere forming gas into the reactor, further comprising elevating the temperature of the reactor to a temperature required to evaporate moisture while supplying the inert gas into the reactor, wherein the supplying of the inert gas is interrupted to then perfectly seal the high-temperature high-pressure closed reactor.

6. The synthesis method of claim 1, further comprising additionally performing the oxidation/reduction treatment, heat treatment or coating/doping treatment on the acquired catalyst structure using the closed reactor.

7. The synthesis method of claim 1, wherein at least some of the plurality of nanostructured catalyst particles are coated by a carbon shell or a doped carbon shell.

8. The synthesis method of claim 7, wherein the plurality of nanostructured catalyst particles form a stacked structure, in which neighboring ones of the nanostructured catalyst particles are separated from each other by the carbon shell or the doped carbon shell to prevent agglomeration of the nanostructured catalyst particles.

9. The synthesis method of claim 8, wherein the stacked structure is a single component stacked structure, a two or more component stacked structure, and a stacked structure formed by a combination of the single and two or more component stacked structures.

10. The synthesis method of claim 1, wherein the support is in the form of powder, a thin film, a foil, a foam, a mesh, a sheet, or a wire.

11. The synthesis method of claim 10, wherein the support includes a metal and the catalyst structure includes a Pt nanoparticle/Si nanoparticle support, a Pt alloy nanoparticle/Si nanoparticle support, a Co nanoparticle/Si nanoparticle support, a Co nanoparticle/Si nanoparticle support, a Co nanoflower/Si nanoparticle support, a Pt nanoparticle/Ti nanoparticle support, a Pt alloy nanoparticle/Ti nanoparticle support, a Pt alloy nanoparticle/Zn nanoparticle support, and a MoS2 nanostructure/Ti support.

12. The synthesis method of claim 10, wherein the support is a carbon support selected from the group consisting of carbon black, graphene, doped graphene, carbon nanotubes, carbon nanofibers, graphite and carbon spheres, and the catalyst structure is a MoS$_2$ nanostructure/carbon support structure.

13. The synthesis method of claim 1, wherein the synthesized nanostructured catalyst particles include combined metal/non-metal nanostructured catalyst particles.

14. The synthesis method of claim 13, wherein the combined metal/non-metal nanostructured catalyst includes a MoS$_2$—Pt nanostructure/the support, a MoS$_2$—Pt alloy nanostructure/the support, a MoS$_2$ shell-Pt core nanostructure/the support, or a MoS$_2$ shell-Pt alloy core nanostructure/the support.

15. The synthesis method of claim 1, wherein the support is a hexagonal boron nitride support.

16. The synthesis method of claim 1, wherein the nanostructured catalyst particles are controlled to have a particle size of 2 nm or less.

17. The synthesis method of claim 1, wherein the catalyst source is used in dispersing the plurality of nanostructured catalyst particles in the support without loss.

18. The synthesis method of claim 1, wherein the synthesis temperature of the catalyst structure is higher than 200° C. and lower than 600° C.

19. The synthesis method of claim 1, wherein sizes or the dispersion density of the nanostructured catalyst particles are varied by controlling the content of a metal contained in the catalyst source or the synthesis temperature or by controlling the atmosphere forming gas.

20. A synthesis method of a catalyst structure having a plurality of nanostructured catalyst particles dispersed in a support by a single reactor process using a high-temperature high-pressure closed reactor, wherein the single reactor process comprises:
(a) supplying the support and a catalyst source into the high-temperature high-pressure closed reactor;
(b) perfectly sealing the high-temperature high-pressure closed reactor and heating the reactor supplied with the support and the catalyst source to produce the catalyst structure in the reactor under a self-generated pressure of the reactor and a synthesis temperature in the range of 200° C. to 500° C., the catalyst structure including the plurality of nanostructured catalyst particles dispersed in the support.

21. A catalyst structure synthesized by the synthesis method of claim 1 and being in the form of a Pt nanoparticle/Si nanoparticle support, a Pt alloy nanoparticle/Si nanoparticle support, a Co nanoparticle/Si nanoparticle support, a Co nanoparticle/Si nanoparticle support, a Co nanoflower/Si nanoparticle support, a Pt nanoparticle/Ti nanoparticle support, a Pt alloy nanoparticle/Ti nanoparticle support, a Pt alloy nanoparticle/Zn nanoparticle support, and a $MoS_2$ nanostructure/Ti support.

22. A catalyst structure synthesized by the synthesis method of claim 1, wherein the support is a carbon support selected from the group consisting of carbon black, graphene, doped graphene, carbon nanotubes, carbon nanofibers, graphite and carbon spheres, and the catalyst structure is a $MoS_2$ nanostructure/the carbon support.

23. A catalyst structure synthesized by the synthesis method of claim 1, wherein the support is a hexagonal boron nitride support.

24. A catalyst structure synthesized by the synthesis method of claim 1, wherein combined metal/non-metal nanostructured catalyst particles are dispersed in the support.

25. The catalyst structure of claim 24, wherein the catalyst structure includes a $MoS_2$—Pt nanostructure/the support, a $MoS_2$—Pt alloy nanostructure/the support, a $MoS_2$ shell-Pt core nanostructure/the support, or a $MoS_2$ shell-Pt alloy core nanostructure/the support.

* * * * *